(12) United States Patent
Kahn et al.

(10) Patent No.: US 7,668,718 B2
(45) Date of Patent: *Feb. 23, 2010

(54) SYNCHRONIZED PATTERN RECOGNITION SOURCE DATA PROCESSED BY MANUAL OR AUTOMATIC MEANS FOR CREATION OF SHARED SPEAKER-DEPENDENT SPEECH USER PROFILE

(75) Inventors: Jonathan Kahn, Crown Point, IN (US); Cenk Demiroglu, Atlanta, GA (US); Michael C. Huttinger, Valparaiso, IN (US)

(73) Assignee: Custom Speech USA, Inc., Crown Point, IN (US)

( * ) Notice: Subject to any disclaimer, the term of this patent is extended or adjusted under 35 U.S.C. 154(b) by 348 days.

This patent is subject to a terminal disclaimer.

(21) Appl. No.: 11/203,671

(22) Filed: Aug. 12, 2005

(65) Prior Publication Data

US 2006/0149558 A1 Jul. 6, 2006

(51) Int. Cl.
*G10L 21/00* (2006.01)

(52) U.S. Cl. ...................................... 704/270
(58) Field of Classification Search ................. 704/270
See application file for complete search history.

(56) References Cited

U.S. PATENT DOCUMENTS 7,539,619 B1 * 5/2009 Seligman et al. ............ 704/277

* cited by examiner

*Primary Examiner*—Susan McFadden
(74) *Attorney, Agent, or Firm*—Jordan Sigale; Loeb & Loeb LLP

(57) ABSTRACT

An apparatus for transforming data input by dividing the data input into a uniform dataset with one or more data divisions, processing the uniform dataset to produce a first processed dataset with one or more data divisions, processing the uniform dataset to produce a second processed dataset with one or more data divisions, wherein the first and second processed datasets have the same number of data divisions, and editing data selectively within each one of the one or more divisions of the first and second processed dataset. This apparatus has particular utility in error-spotting in processed datasets, and toward training a pattern recognition application, such as speech recognition, to produce more accurate processed datasets.

30 Claims, 55 Drawing Sheets

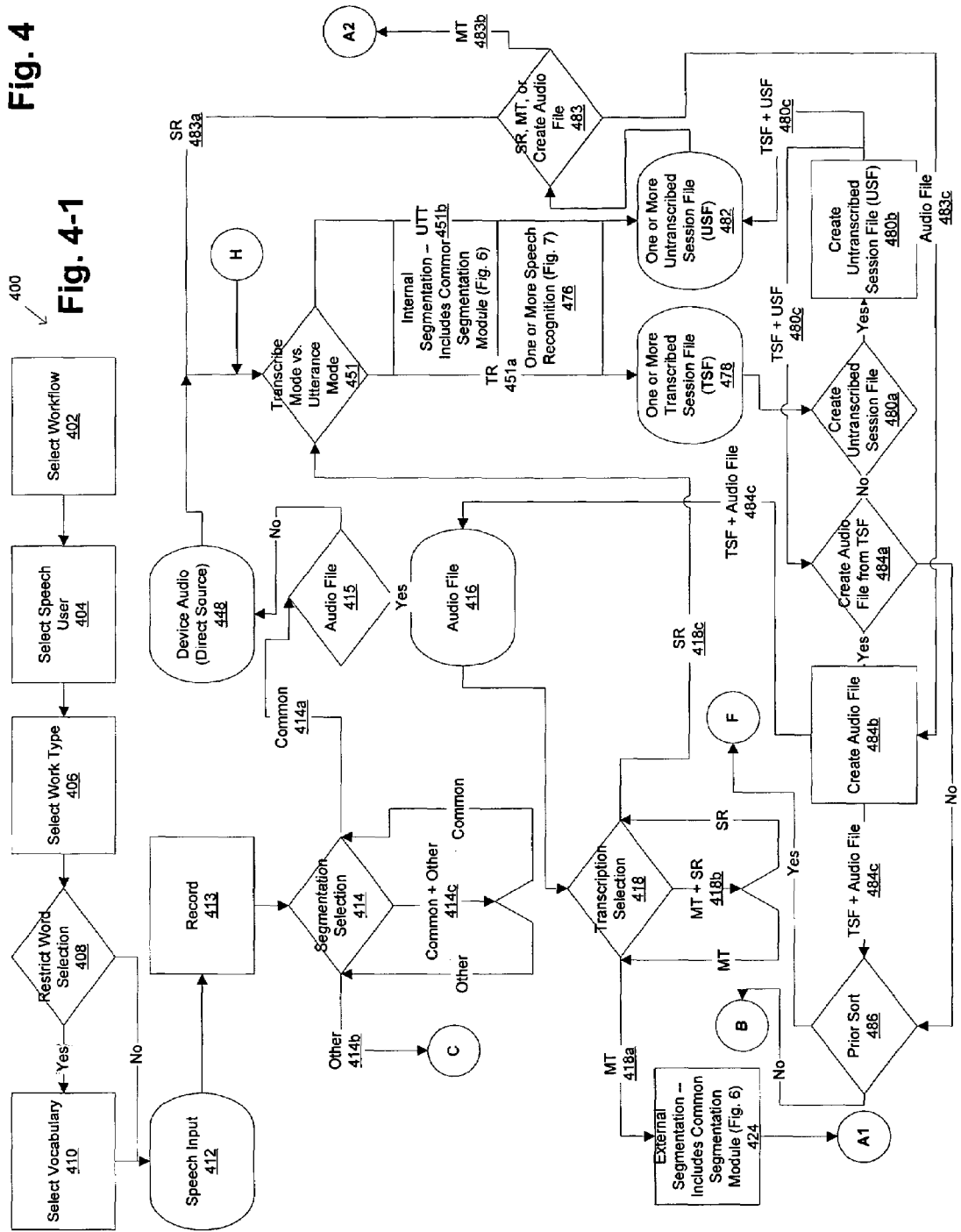

Fig. 5
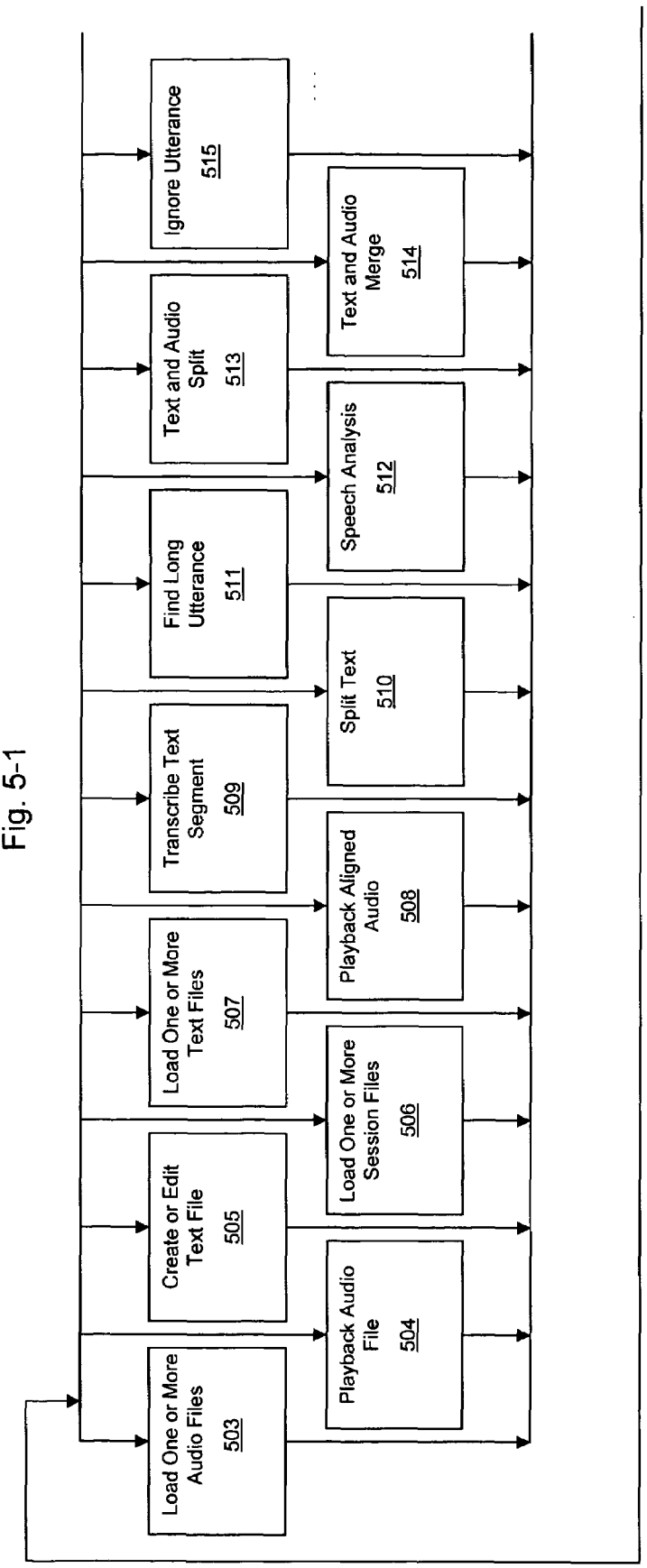

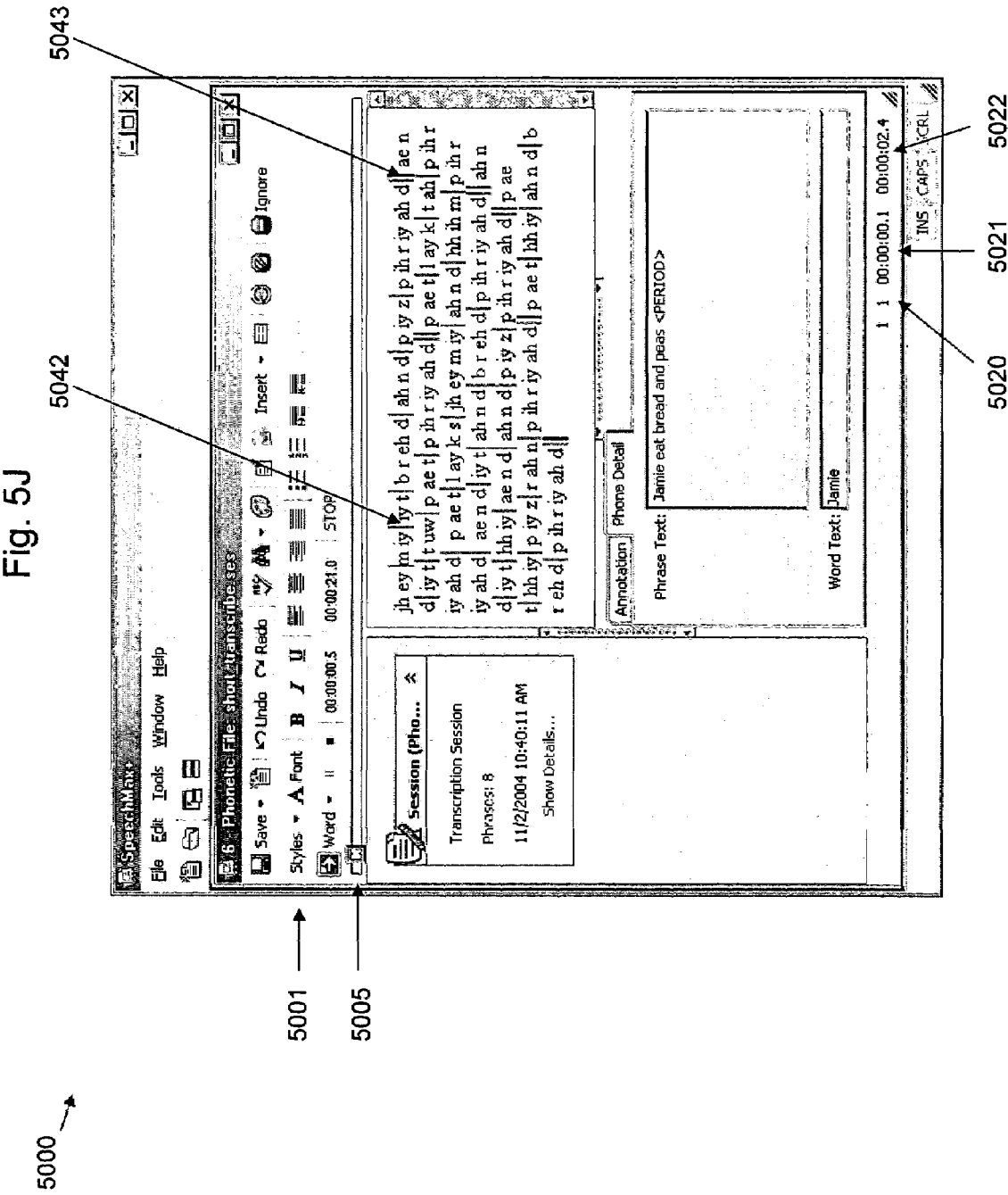

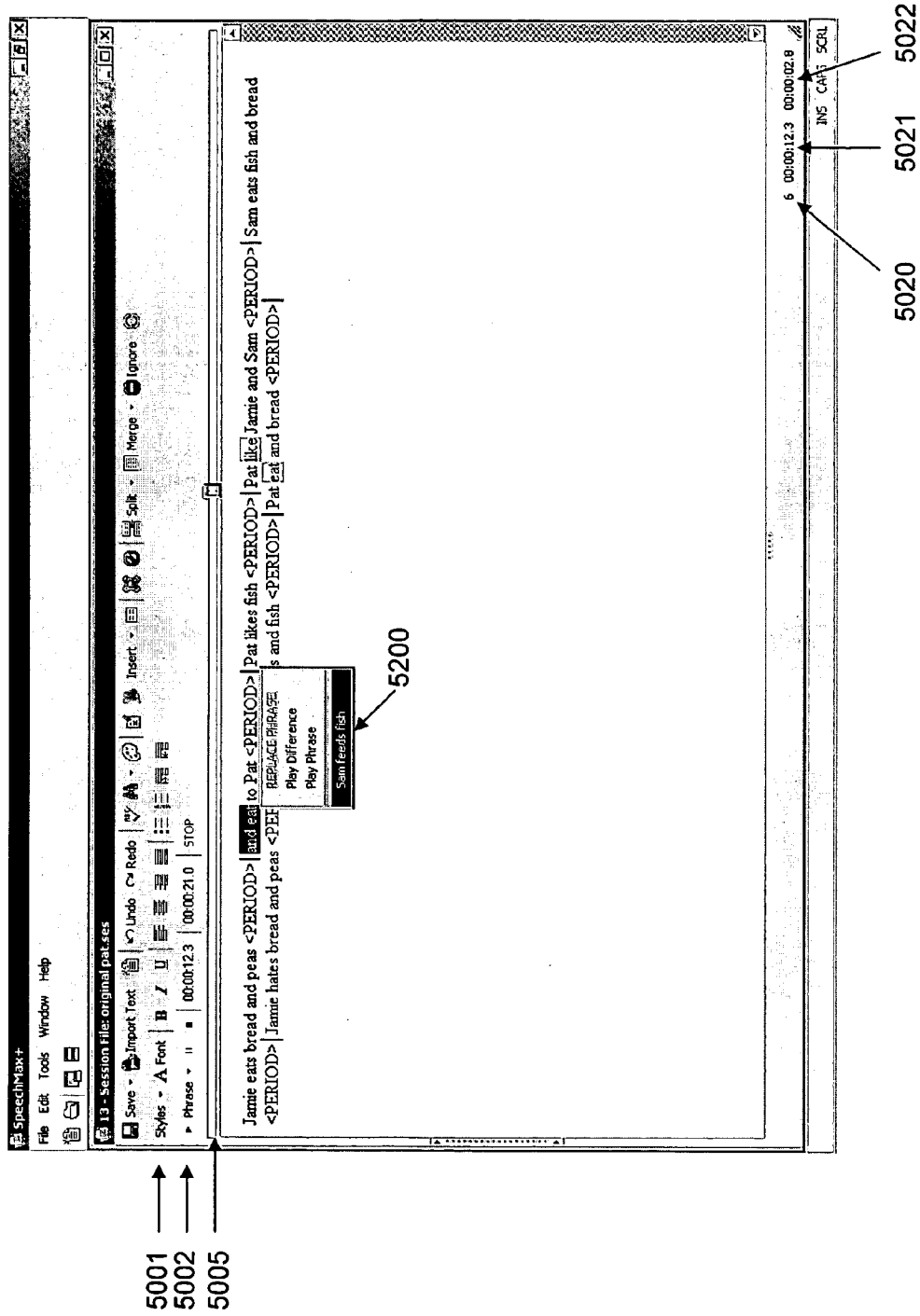

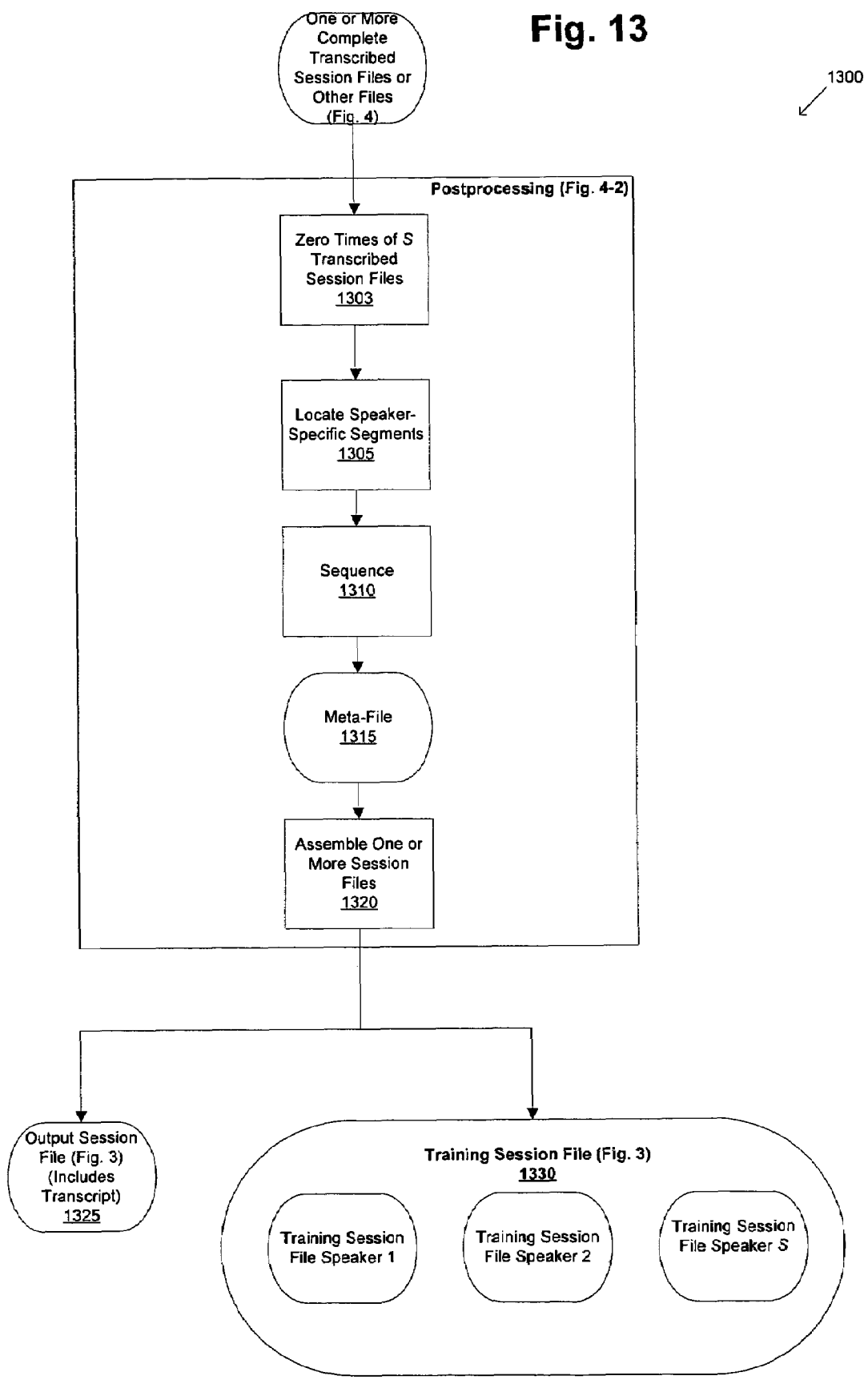

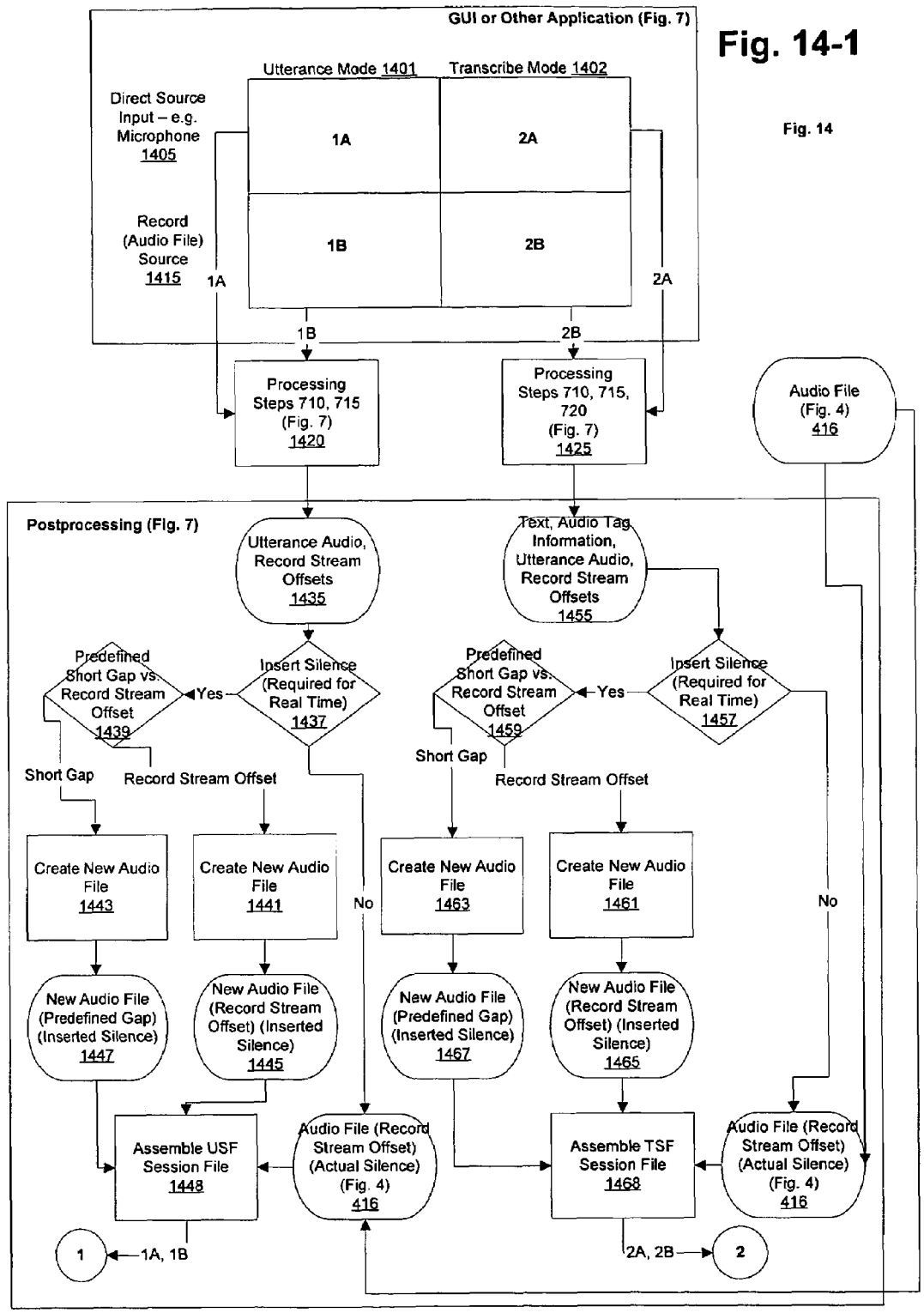

SYNCHRONIZED PATTERN RECOGNITION SOURCE DATA PROCESSED BY MANUAL OR AUTOMATIC MEANS FOR CREATION OF SHARED SPEAKER-DEPENDENT SPEECH USER PROFILE

CROSS-REFERENCE TO RELATED APPLICATIONS

This patent claims the benefit of the following applications:

U.S. Non-Provisional application Ser. No. 09/889,870, "System and Methods for Automating Transcription Services," filed Jul. 23, 2001, which claims the benefits of U.S. Provisional Application No. 60/118,949, filed Feb. 5, 1999, through PCT Application No. PCT/US00/0280, filed Feb. 4, 2000, each application of which is incorporated by reference to the extent permitted by law;

U.S. Non-Provisional application Ser. No. 09/889,398, "Automated Transcription System and Method Using Two Speech Converting Instances and Computer-Assisted Correction," filed Feb. 18, 2000, which claims the benefits of U.S. Provisional Application No. 60/120,997, filed Feb. 19, 1999, each application of which is incorporated by reference to the extent permitted by law;

U.S. Non-Provisional application Ser. No. 09/362,255, "System and Method for Improving the Accuracy of a Speech Recognition Program," filed Jul. 27, 1999, which application is incorporated by reference to the extent permitted by law;

U.S. Non-Provisional application Ser. No. 09/430,144, "Method and Apparatus For Directing An Audio File to A Speech Recognition Program That Does Not Accept Such Files," filed Oct. 29, 1999, which application is incorporated by reference to the extent permitted by law;

U.S. Non-Provisional application Ser. No. 09/625,657, "System and Method for Improving the Accuracy of a Speech Recognition Program," 0012-0001 filed Jul. 26, 2000, which claims the benefits of U.S. Provisional Application No. 60/208,878, "System and Method for Improving the Accuracy of A Speech Recognition Program," filed Jun. 1, 2000, each application of which is incorporated by reference to the extent permitted by law;

PCT Application/US00/02808, "System and Method for Automating Transcription Services," filed Feb. 4, 2000, which claims the benefits of U.S. Non-Provisional Application No. 60/118,949, "System and Method for Automating Transcription Services," 0003 filed Feb. 5, 1999, each application of which is incorporated by reference tot he extent permitted by law;

PCT Application/US00/04210, "Automated Transcription System and Method Using Two Speech Converting Instances and Computer-Assisted Correction," filed Feb. 18, 2000, which claims the benefits of U.S. Provisional Application No. 60/120,997, filed Feb. 19, 1999, each application of which is incorporated by reference to the extent permitted by law;

PCT Application No. PCT/US01/0, "System and Method for Comparing Text Generated in Association with a Speech Conversion Program," filed May 31, 2001 which claims the benefits of U.S. Provisional Application No. 60/208,994, "Text Comparison Method for Use In Association with Speech Conversion Program," 0013 filed Jun. 1, 2000, each application of which is incorporated by reference to the extent permitted by law;

U.S. Non-Provisional application Ser. No. 09/995,892, "System for Permanent Aligning Text Utterances to Their Associated Audio Utterances0015 filed Nov. 28, 2001, which claims the benefits of U.S. Provisional Application No. 60/253,632 filed Nov. 28, 2000, each application of which is incorporated by reference to the extent permitted by law;

U.S. Non-Provisional application Ser. No. 10/014677, "Speech Recognition Program Mapping Tool to Align an Audio File to Verbatim Text," filed Dec. 11, 2001, which claims the benefits of U.S. Provisional Application Nos. 60/118,949 filed Feb. 5, 1999; 60/120,997, filed Feb. 19, 1999; 60/208,878, filed Jun. 1, 2000; 60/208,994, filed Jun. 1, 2000; and 60/253,632, filed Nov. 28, 2000, each application of which is incorporated by reference to the extent permitted by law;

PCT Application No. PCT/US03/14, "Method for Locating An Audio Segment Within An Audio File," filed May 30, 2003 which claims the benefits of U.S. Provisional Application No. 60/384,540, "A Method for Locating an Audio Segment Within an Audio File," filed May 30, 2002, each application of which is incorporated by reference to the extent permitted by law;

PCT Application No. PCT/US03/20185, "Method for Comparing a Transcribed Text File with A Previously Created File," 0029 filed Jun. 26, 2003 which claims the benefits of U.S. Provisional Application No. 60/391,740, "Method for Comparing a Transcribed Text File with a Previously Created File," filed Jun. 26, 2002, each application of which is incorporated by reference to the extent permitted by law; and PCT Application No. PCT/US2004/013348, "Method and Systems for Creating a Second Generation Session File," filed Apr. 29, 2004 which claims the benefits of U.S. Provisional Application No. 60/466,512, "Method for Creation of a Second Generation Session File," filed Apr. 29, 2003, each application of which is incorporated herein by reference to the extent permitted by law.

BACKGROUND OF THE INVENTION

1. Field of the Invention

The present invention relates to speech and language processing.

2. Background Information

Speech and language technologies use pattern recognition approaches found in a variety of applications. Generally, there are separate programs that perform various captures of speech, audio, text, image, video, or other data, boundary definition of a segment, region, volume, or space of interest, elimination of unneeded data, feature extraction, comparison with stored representational models, and conversion, analysis, or interpretation of extracted features. See, e.g., Andrew R. Webb, *Statistical Pattern Recognition* (2nd ed. 2002).

Speech and language processing includes speech recognition for dictation, for command and control (voice activation), for interactive voice response in telephony, for text-based or phoneme-based audio mining (word spotting), for speaker recognition in detection, for identification, or for verification, for text to speech, for phonetic generation, for natural language understanding, and for machine translation. The various speech and language applications frequently use common or similar representational models and software algorithms. See, e.g., Lawrence Rabiner Biing-Hwang Juang, *Fundamentals of Speech Recognition* (1993), Xuedong Huang, Alex Acero, Hsiao-Wuen Hon, *Spoken Language Processing* (2001), Daniel Jurafsky & James H. Martin, *Speech and Language Processing* (2000).

For speech recognition, the representational model may be termed a speech user profile, or speaker model, and may consist of an acoustic model, language model, lexicon, and other speaker-related data. Other types of speech and language applications may share some or all of these components of the speech user profile.

Speech input reflects speaker-specific differences, such as physical vocal-tract size, age, sex, dialect, health, education, emotion, and personal style, including word use and expression. Recorded speech also reflects physical characteristics of the speech wave, as well as recording device, background noise, audio file format, and postprocessing artifacts.

The speech wave is composed of smaller packets of sounds. Words are separated by short pauses. Longer pauses separate phrases or sentences, and are often termed "utterances." In general, utterances may contain dozens or more phonemes. Phonemes are sound-subunits that convey different meanings, such as the perceptually different initial sounds in "mop," "hop," and "top." Phonemes may be further subdivided into a series of triphones that express phoneme variability based upon left to right context. Prosody refers to aspects of pronunciation not described by the text sequence of phonemes, such as stress, rhythm, and pitch.

The acoustic model used in speech-to-text decoding and other speech and language processing commonly represents a collection of probabilistic models for the audio characteristics of words, or small speech units, such as syllables or demisyllables, phonemes, triphones, or other word-subunits. The acoustic properties of speech units vary depending upon the position in a word, sentence, speech rate, or other factors. Improved performance can be obtained by modeling the variation explicitly, such as with context-dependent or speech-rate dependent models.

The speech input is commonly entered into a graphical user interface or other application and segmented in a signal processing stage prior to conversion, interpretation, or analysis. After segmentation, acoustic features may be extracted by observation through a finite-length analysis window that is regularly shifted along the speech sample and processed to produce a sequence of acoustic vectors that define the time evolution of the speech signal.

With speech recognition, an acoustic decoding block searches the sequence of words whose corresponding sequence of acoustical models are closest to the observed sequence of acoustic vectors. This search is constrained by a language model (e.g. grammar) and a lexicon. During the decoding phase, the acoustic data is typically processed with Hidden Markov Models, probabilistic methods that include parameters defined for states, transition probabilities, and observation likelihoods.

After speech recognition decoding for dictation, the speech engine output undergoes postprocessing whereby results are commonly converted to a user-compatible format. For instance, output text "January seventeenth <comma> two thousand five" may be postprocessed to "Jan. 17, 2005" using regular expressions algorithms or similar techniques. A session file consisting of audio-aligned text and other data may be assembled at this stage. After postprocessing, the results are displayed in a graphical user interface or may even be used to activate other applications. Other speech and language applications may process speech and other language input using a similar, layered process.

In speech recognition for dictation, confidence scores are assigned to alternative hypotheses as to what the speaker said during speech-to-text decoding. The display text in the graphical user interface in a speech recognition system for dictation represents a "best result" based upon the highest-scoring hypothesis. Alternative hypotheses may be listed in a drop-down window or other dialog for user reference and typically may be selected for substitution in the display text. Accuracy may be improved by exploiting differences in the nature of errors made by multiple speech recognition systems by automatic rescoring or "voting" process that selects an output sequence with the lowest score to identify the correct word. See, e.g., Jonathan G. Fiscuss, "A Post-Processing System to Yield Reduced Word Error Rates: Recognizer Output Voting Error Reduction (ROVER)," pp. 347-354 0-7805-3695-4/97/$10.00 © 1997 EEE Many hours of computational time are required to create an acoustic model. For a large set of training data, that may consist of several hundred hours of speech, single processor training may take months to complete. Consequently, parallel training with distributed computing techniques on multiple computers has been frequently used to reduce production time. During the training process, updates equations for state-transition and state-observation probability distributions and other computed values may be modified to permit parallel training on multiple processors. After completion of the processing on the individual computers, accumulator files from the different processors may be combined to create a final acoustic model. See, e.g., *Institute for Signal Information and Processing*, Department for Electrical and Computer Engineering, Mississippi State University, "Acoustic Modeling: Parallel Training" (website tutorial 2005). However, due to exacting requirements for data synchronization, parallel processing is not within the reach of the typical end user or independent speech developer.

The acoustic model may be trained using supervised or unsupervised techniques. In supervised training, word output corresponding to the speech input is known. In unsupervised techniques, the known word output is not submitted. Training occurs through use of confidence scoring or other techniques. Forced alignment is a form of supervised training whereby segmented speech input, verbatim text, and phonetic pronunciation are submitted to the speech engine for feature extraction and Hidden Markov Model processing. During the training, examples of each word or word subunit are presented to the speech engine to generate a statistical model for each subunit modeling the distribution of the acoustic vectors. With Hidden Markov Models, word models have been used for recognizing strings of connected digits. Lawrence R. Rabiner, Jay G. Wilpon, Rank K. Soong, "High Performance Connected Digit Recognition Using Hidden Markov Models, "IEEE Transactions on Acoustics, Speech, and Signal Processing, Vol. 37, No. 8, August 1989 0096-3518/89/0800-1214$01.00 C 1989 IEEE. However, word models have not generally been used for large vocabulary tasks, such as large vocabulary continuous speech recognition, because the data to train one word is not shared by others.

Selection of the basic speech unit may represent a tradeoff between trainability and specificity. The more specific acoustic models, such as those based upon word models, tend to perform better than the more general models, based upon triphones or other word subunits, but, because of their specificity, the acoustic data may occur relatively rarely and may be difficult to train well. General models may be trained well, because of the wide occurrence of phonemes or triphones in a language, but are less likely to provide a good match to any particular token.

Consequently, use of a small set of units, such as phonemes or triphones, can be used to cover all possible utterances, but the data available to train each model may be small. This sparse data problem can be handled by training models only for those units for which training data are available or to merge contexts to increase the training data per model and reduce the number of models applied during recognition.

Commonly, in cases of triphone sparsity, linguistic questions may be used to group triphones into a statistically estimable number of clusters for creation of the acoustic model. This technique is frequently referred to as "state-tying." While a professional linguist usually prepares the linguistic questions, automated linguistic questions generation has been described. The methods require creation of one or more acoustic models and testing of accuracy to determine the best automatically generated questions set. R. Singh, B. Raj, and R. M. Stem, "Automatic Clustering and Generation of Contextual Questions for Tied States in Hidden Markov Models," Research sponsored by the Department of the Navy, Naval Research Laboratory under Grant No. N00014-93-1-2005 (ICASSP 1999) and K. Beulen and H. Ney, "Automatic Question Generation for Decision Tree Based State Tying," pp. 805-808 0-7803-4428-6/98/$10.00 @ 1998 IEEE.

During the decoding phase, the search for the best sequence of words using the acoustic model is constrained by the language model and lexicon. The language model defines the most likely sequence of words based upon prior experience. This is based upon a frequency analysis of word combinations in a specified text corpus. While trigram modeling is common, other N-gram techniques may be used. The language model may provide information on the probability of a word or phrase following another, possible branching patterns given the a word or phrase, word use frequency, and likelihood that a particular trigram or other N-gram is present in the text corpus.

In preparation of the language model, text from day-to-day dictation may be converted to a speech engine compatible format. For instance, punctuation may be expressed as tokens, such as <comma> or <period>. During decoding, the lexicon defines the recognizable words and typically includes a phonetic representation for each word in the language model with a single symbol for each distinctive speech sound. See, e.g., International Phonetic Association (IPA), *A Guide to the Use of the International Phonetic Alphabet* (1999). The SAPI Universal Phone Set (UPS) is one example of a machine-readable phone set based on the IPA pronunciation. Microsoft® UPSWhitePaper3.2 © 2004.

Selection of the basic acoustic unit, e.g., triphone, phoneme, or word, is reflected in the lexicon. If phonemes are used, for example, a word is represented phonetically as a series of phonemes separated by a space. If word models are the basic units, a word is represented as a series of characters without a space.

The lexicon is usually prepared by a phonetic expert using the IPA representation or other system, or is derived from pronunciation data from the Linguistic Data Consortium (University of Pennsylvania, Philadelphia, Pa.) or similar sources. The LDC data does not offer pronunciation data for every particular language, dialect, or specialized vocabulary, such as medicine, engineering, law, and others. A lexicon may include pronunciation for more than one language for multilingual speakers. See, e.g., Giorgio Micca, Enrico Palme, Alessandra Frasca, "Multilingual Vocabularies in Automatic Speech Recognition," (MIST-1999).

Speech recognition and other speech and language processing may be speaker-independent, speaker-independent systems made more speaker-dependent by speaker adaptation ("speaker-adaptive"), or speaker-dependent. Speaker-dependent systems are based upon training data sets from a single speaker that reflect the speaker's speaking style and vocabulary, specific recording device, and local background noise. They are highly accurate and reliable for that single speaker, but are infrequently used. See, e.g., Yu Shi and Eric Chang, "Studies in Massively Speaker-Specific Speech Recognition," pp. I-825-828 0-7893-8484-9/04/$20.00 © IEEE ICASSP 2004.

Speaker-independent technology is commonly used for small vocabulary tasks. Speaker-independent systems should not require any training by the end user to work.

Speaker-adaptive systems are frequently used for large vocabulary continuous speech recognition such that would result from dictation. Sometimes these speaker-adaptive systems are referred to as "speaker-dependent." Unlike a speaker dependent system that requires data only from a single speaker, speaker-independent or speaker-adaptive technology require many hours of data from many speakers to create an accurate composite speaker-independent model. With speaker adaptive systems, the composite model is adapted to a particular end user speaking style by an enrollment and ongoing correction of recognition errors.

The enrollment may consist of reading from a prepared script to adapt the speaker-independent model to the speaker's speaking style, input device, and background noise. Correction of recognition errors is often done by selecting the audio-aligned text from the temporary buffer file and entering verbatim, corrected text into a pop-up window in the speech recognition text processor. Unfortunately, speaker-adaptive systems also show large performance fluctuations among some new speakers. This is frequently due to mismatches between the composite speech user profile and speaker accent, style, input device, and background noise.

In speaker-adaptive systems, acoustic model updates are commonly performed with relatively small amounts of data compared to the many hours of speech from different speakers initially used to create the speaker independent model. In this setting, data-sparse techniques such as maximum likelihood linear regression (MLLR), maximum a posteriori (MAP), and other approximation methods have been used for adaptive training for modeling the limited data. The purpose of these speaker adaptive methods is to use as small amount of adaptation data as possible to calibrate and change the recognition system so that the data models as much of the speaker-specific information as possible. See, e.g., P. C. Woodland, "Speaker Adaptation for Continuous Density HMMs: A Review," ISCA Archive (http://www.isca-speech.org/archive), ITRW on Adaptation Methods for Speech Recognition, Sophia Antipolis, France, Aug. 29-30, 2001, pp. 1-19.

Examples of real-time speaker-adaptive programs for dictation include Dragon NaturallySpeaking® (ScanSoft, Inc., Peabody, Mass.) and IBM ViaVoice® (IBM, Armonk, N.Y.). Dragon NaturallySpeaking® Systems Server or SpeechMagic® (Philips Speech Processing, Vienna, Austria) also provide offline, server-based solutions.

Despite improvements in technology, there has been limited adoption of speaker-adaptive speech recognition. This apparently reflects frustration with training time and frequent and inevitable recognition errors.

In view of limited use of adaptive speech recognition systems, assignee of the current invention has previously disclosed methods for text comparison to generate verbatim text for speech user training that improve upon prior systems. See, U.S. Pat. No. 6,704,709 "System and Method for Improving the Accuracy of a Speech Recognition Program," U.S. Pat. No. 6,490,598 "System and Method for Improving the Accuracy of a Speech Recognition Program Through Repetitive Training," U.S. Pat. No. 6,122,614, "System and Method for Automating Transcription Services." Even with these improvements, there are unmet needs to further improve speech and language processing.

This may be why speech recognition is still less commonly used than manual transcription for free-form dictation recorded by microphone, personal digital assistant or other handheld recorder, or telephone. There an operator plays back the recorded audio with a foot pedal and transcribes into a word processor, such as Word™ (Microsoft Corporation, Redmond, Wash.), WordPerfect® (Corel Corporation, Ottawa, Canada), or StarOffice™ (Sun Microsystems, Inc., Palo Alto, Calif.). In some cases, doctors, lawyers, and others may also use "structured reporting" whereby the speaker dictates, segment by segment, into a "fill-in-the-blank" form that is transcribed manually. As a result of its continued prevalence, manual transcription generates a large amount of text from recorded audio both from free-form dictation and structured reporting.

Yet, the dictation audio that could be used to create highly accurate speaker-dependent speaker model, or other representational speaker model, is generally discarded as a useless byproduct of the manual dictation-to-text process. The development of speaker-dependent applications has not been pursued because there is no cost effective system to acquire and process hours of speaker-dependent data available from business or professional dictation, let alone conversational and other speech generated at home, in a car, or other places.

Accordingly, there is a need for a system that can capture the currently discarded dictation audio and create a robust and accurate speaker-dependent speech user profile that can be shared across a number of related speech and language applications. There is an associated need for improvements in manual processing of day-to-day dictation to enable quick generation of training data sets for a speaker-dependent speech user profile with little added end-user effort. A further benefit would be the availability of large amounts of acoustic data to generate highly accurate word models for a large vocabulary system.

In the prior art, one limiting factor in the creation of a speaker-dependent model is the cost of obtaining lexical pronunciation data. Limited data is freely available, but may be restricted to certain languages, dialects, categories, or topics. In general, the prior art has relied upon expensive phonetic expertise or purchase from various sources to generate a lexicon. The expert often uses a sophisticated phonetic alphabetic, such as that available from the International Phonetics Association, that would not be understood by the average end user or software developer.

In cases of data sparsity, a professional linguist may also be used to create linguistic questions for the acoustic model for "state tying." While automated questions file generation has been previously described, the prior disclosures do not permit the end user to automatically select a best questions file among those created from a variety of different parameter values. Instead, the prior art relies upon creation of different acoustic models using different linguistic questions, determining the word error rate with the different models, and selecting the acoustic model for use with highest accuracy. This process may take many hours and requires significant computational resources.

The prior art is also characterized by general lack of portability, sharing, and interchangeability of a trained speaker model or its separate components between related speech and language processing applications. The hours or days spent improving a user profile for one speech recognition application often cannot be used to create or update the speaker model for another application. As such, there is a need for a system and method that can provide a portable speech model.

While there is also a proliferation of software programs for conversion, interpretation, and analysis of speech, audio, text, image, or other data input, there is continued reliance upon manual processes for interpretation of the same data input. Among other drawbacks, none of these programs have a single graphical user interface to process or compare results from computers, humans, or between both computers and humans.

One prime example where this approach would be useful is transcription where manual transcription and speech recognition are usually processed with separate applications. In no small part the absence of such programs may be due to the unavailability of systems and methods to support synchronized comparison where a user dictates and records using a real-time speech recognition program.

In the prior art, session files from different speech recognition programs also cannot be synchronized for segment-by-segment comparison. These different programs usually generate text with different numbers of segments, even though the same audio files were used, due to differences in proprietary segmentation techniques. Moreover, a program such as Dragon Naturally Speaking® also may make utterance start/duration times available, but another program, such as IBM ViaVoice®, may only provide audio tags for individual words.

In many instances, the notwithstanding the potential utility, prior art fails to provide a session file for review and correction of speech recognition errors. In one example, command and control (voice activation) programs typically activate a feature of a software program. If the voice command fails to achieve its desired result, the end user does not know if this was due to a misrecognition and has no opportunity to update and train the speech user profile. Similar limitations may be seen in other speech and language applications.

The frequent lack of audio-aligned text generated by manual transcription in the prior art also makes it difficult for a transcriptionist, quality assurance personnel, or other parties to quickly find the specific audio associated to a particular word or phrase. Instead, the entire audio file must be played back and searched. The lack of audio-aligned, segmented text also makes it difficult to sequentially track document changes and translations while associating the audio to the proper text segment.

Adaptation of preexisting speech processing programs for professional manual transcription for generation of training data sets for speech recognition would also be inefficient. The correction process in large vocabulary programs for dictation, such as Dragon® NaturallySpeaking® and IBM® ViaVoice®, require the selection of an incorrectly transcribed word or phrase, opening a correction window, manual entry of verbatim text into a text box in the correction window, acceptance of the entered text as verbatim, and closing the window. These multiple steps and mouse clicks often slow down the busy transcriptionist, increase turnaround time, and reduce acceptance of speech recognition.

Standard word processors and speech recognition text editors also include a generic spell check and grammar check based upon general, speaker-independent rules. In many instances, it would be of benefit to have tools to check transcription accuracy based upon a preferably speaker-dependent acoustic model, language model, or lexical data.

In manual dictation, the final text distributed in a letter, document, or report may include grammatical or factual corrections to the dictation, deletion of extraneous remarks or redundant material, and inclusion of non-dictated elements such as headers, footers, tables, graphs, and images. This is different from "verbatim text," which represents what the speaker actually said. Verbatim text is required for accurate training of a speech user profile.

Currently, word and text processors for speech recognition do not include techniques for simultaneous creation of verbatim and distributable final text, nor do they provide convenient methods to mark elements as "nondictated." Text processors for speech recognition also generally require saving the entire session file for speech user profile updates. They generally do not support selective exclusion of audio-aligned text unsuitable for training due to poor diction, increased background noise, or other factors.

Off-the-shelf speaker-adaptive programs such as Dragon® NaturallySpeaking®, IBM® ViaVoice®, or Philips® SpeechMagic® are designed for use by a single speaker and single channel. They may be modified for multispeaker, multichannel settings whereby each speaker is isolated with use of a separate microphone or recording device. The prior art does not provide for training and update of speaker-dependent models in cases, such as depositions, trials, or regular business meetings, where two or more speakers share the same microphone or other recording device.

The prior art of other, non-speech-related pattern recognition technologies also shows continued reliance upon manual processes. For instance, print copy may be converted to electronic text manually with a word processor or automatically with an optical character recognition program. In yet another example, handwriting may be converted to electronic text using a word processor or handwriting recognition. Electrocardiograms (EKGs), blood cells, and chest x-rays, mammograms, and other radiographic images may be interpreted and analyzed by humans, machines, or both. In radiology, for example, the doctor frequently dictates a mammography or other report at a computerized workstation that is part of a hospital or radiology information system. The radiologist increasingly uses speech recognition and must correct the report. With system integration and growing use of multimedia, a structured report with reporting categories may include a hyperlink to a thumbnail image for the referring physician and electronic medical record.

Despite this convergence and integration of technology and increased data output in medical imaging and other fields, the prior art does not teach automated comparison of results from human sources, computerized pattern recognition, or both to expedite throughput. The prior art also does not teach use of a single application that would support manual conversion, interpretation, analysis, and comparison of output of processing of speech, text, audio, or image source data processed by manual or automated methods.

SUMMARY OF DISCLOSURE

The present disclosure teaches various inventions that address, in part or in whole, various needs in the art. Those of ordinary skill in the art to which the inventions pertain, having the present disclosure before them will also come to realize that the inventions disclosed herein may address needs not explicitly identified above. Furthermore, those skilled in the art may also recognize that the principles disclosed may be applied to a wide variety of techniques involving data interpretation, analysis, or conversion by human operators, computerized systems, or both.

In a primary focus, the disclosure teaches methods for acquisition and synchronization of bounded data input that is processed by a human operator, computerized pattern recognition program, or both, with synchronized display of results in an exemplary session file editor. In the transcription field, the disclosure teaches a novel method whereby dictation audio is presegmented prior to manual transcription by the operator. The final and verbatim audio-aligned text are also saved in a transcribed session file to generate training data sets for a speech user profile. The term speech user profile is used broadly not only to include speaker and other representational models, but also other user data for related speech and language processing.

The present disclosure also teaches that related speech and language applications may share one or more components of a preferably speaker-dependent speaker model and processing modules. The appropriate components and modules may be activated automatically or by user selection. Related speech and language processing applications may include command and control (voice activation), interactive voice response for telephony, speaker recognition, audio mining, text to speech, machine translation, and natural language understanding.

The disclosure also teaches a system that provides for and a method that leads to a greater role for the transcriptionist (or a specialized member of a transcriptionist team) in preparing audio and text for speech user training of a speech processor. The disclosed features of an exemplary session file editor permit the transcriptionist to rapidly complete routine transcription jobs using the editor's text processor and built-in controls for audio playback using, for instance, a transcriptionist foot control.

The session file editor also include a variety of features not present in the prior art that reflect the transcriptionist's potentially greater role in creation of a speech user profile. For example, in one embodiment of the session file editor, the operator may review or add text, playback or record audio, and access image data, and add hyperlinks to images and other files in buffered read/write windows in a multiwindow Hypertext Markup Language (HTML) application. In some embodiments, the operator may also enter text in any Unicode compatible language with character entry based upon keyboard-defined code.

In some aspects, the system may divide the audio of a continuous audio (e.g. dictation) file into separate audio utterances and, thus, create an untranscribed session file. In this approach, the operator may load the untranscribed session file into the session file editor. The session file editor may playback the utterances from first to last (or as randomly selected) and permit the operator to input and align text corresponding to each audio utterance to create a transcribed session file. One additional enhancement allows the operator to also load text from a previously transcribed document, letter, or report from the speaker into the session file editor for comparison of language (and audio) to facilitate transcription of the current dictation audio.

The operator may also use the session editor to compare the transcribed session file output from two or more human transcriptionists and edit the results. In some instances, the previous transcriptionists may also transcribe only a part of the untranscribed session file. The separately transcribed, unbundled segments may be merged to create a single transcribed session file for the reviewing transcriptionist. Session file editor review may also include evaluation of output from other speech and language processing applications. In one approach, transcribed session file from programs using speech recognition may be opened and reviewed in the session file editor. These may include command and control (voice activation), interactive voice response for telephony, speaker recognition, and text-based audio mining.

The audio-aligned final text of the transcribed session file may be distributed (also referred to as "distribution text"), or the final transcribed letter, report, or document may be distributed as text only. Corrections in the text may also be made—without affecting the final text—to create a verbatim training session file, which file can be used to create or update the speech user profile for automated speech recognition. To assist with rapid transcription job completion and verbatim text creation, the session file editor may contain tools for simultaneous creation of verbatim training text and distribution text, reverse formatting of dates, measures, and currencies into a speech engine compatible format, export of paired audio and verbatim text for speaker model training, dividing large utterances into smaller ones for training purposes, exclusion of poor quality audio or nondictated material from training, and a time saving feature of automatic remapping of audio word tags during correction.

This correction feature may use text comparison without need to open and close a separate correction window and saves time for the production-oriented transcriptionist. Using this feature, an operator may make a text change (substitution, addition, or deletion) and select a function key to produce automapping of a changed word. If the number of words in the modified utterance is unchanged, the operator may indicate automatic reassignment of by use of a special dialog or function key. This timesaving technique of audio text alignment may use automatic text compare within the segment.

To facilitate rapid job completion and preparation of final text, the transcriptionist may use text comparison with a text file or text in one or more manually or automatically transcribed session files. These session files may be synchronized with use of common segmentation parameters for the speaker. Text comparison may be performed across the entire text or segment-by-segment.

Text comparison may also enable the novice transcriptionist to compare supervisor-edited text with the novice's transcription to quickly detect the novice's errors. The disclosure also teaches use of the audio-aligned text to reduce search time for reviewing quality assurance personnel or other parties to confirm that text is associated to particular spoken word. Again, this may be of particular assistance to the novice transcriptionist in training who can review errors in the transcribed text and quickly listen to the associated audio to learn how a speaker pronounced a particular word.

After creation of final text for distribution in the final transcribed session file, the disclosure teaches that in some situations it may be desirable to make other changes to create a complete transcribed session file. These include text and audio annotations to the text and creation of verbatim text through use of a verbatim tab. The complete transcribed session file may include a training session file and a final output session file. The training session file may include markup excluding certain audio-aligned text and other elements for training purposes.

In the disclosed approach, interchangeable modules are used for "real-time" and "server-based" speech recognition. Different output reflect both the nature of the speech input and operational mode selected. In this approach, both a local and offline, remote application can process real-time, device audio from a direct source, such as a microphone or streamed audio. Both the local and offline application may process an audio file. Using device audio from a direct source or an audio file, the local (sometimes referred to as "real-time") and remote (sometimes referred to as "server-based") both can produce a transcribed session file and untranscribed session file (which contains segmented audio only). A transcribed session file results from selection of "transcribe" mode that activates the speech-to-text decoding block. "Utterance" mode deselects speech-to-text conversion and produces a segmented, untranscribed session file with audio tags.

The disclosure also teaches synchronization of text output by creating an equal number of segments in session files from two or more instances of manual transcription, computerized speech recognition, or both. Synchronization may be achieved using identical audio segmentation parameters to presegment audio for manual transcription and speech recognition. A common segmentation module may be used both for external segmentation for manual transcription and internal segmentation by a real-time or server-based speech recognition program. Within the session file editor, synchronized selection of different segments in different buffered read/write windows may be accomplished with use of the tab key or other method.

The disclosure further teaches use of a preprocessing application that creates a composite, "best result" transcribed session file prior to review by a transcriptionist or other operator using the disclosed session file editor. As disclosed, the preprocessing application, generates a best result from confidence measures from two or more session files generated by an automatic process, such as speech recognition, or from text compare and occurrence for session files generated by one or more human operators using the session file editor. The preprocessing application may also generate a composite reference session file from two or more transcribed or other session files generated by manual and automatic means.

The composite session file includes the "best result" output and may serve as an index for use by the reviewing transcriptionist in comparing text from other manually or automatically generated transcribed session files using the disclosed session file editor. Use of a single, "best result" minimizes correction time by displaying the text most likely to be correct. The preprocessing step may also save time by performing text compare on an offline server rather than a local computer used for a transcription workstation by a human operator.

Different commercial speech recognition programs generally do not use a common segmentation module that results in an identical number of segments and synchronized output. However, asynchronized session files from different speech recognition programs, such as Dragon® NaturallySpeaking® and IBM® ViaVoice®, may also be synchronized for comparison using resegmenting and retagging techniques disclosed herein to create an equal number of segments. These methods may establish new segment boundaries using text comparison or least difference (audio) boundary estimates.

These methods may also be used to create an identical number of segments and align other session files with text or audio data, such as manual transcription created in the traditional way without presegmented audio, dictation from structured, "fill-in-the" blank dictation, or speech input from a single speaker that was recorded into a single microphone or other recording device shared with other speakers at a meeting or legal proceeding. Consequently, the disclosure also teaches synchronization of manual transcription and speech recognition that was prepared without use of a common speech segmentation module and use of resegmented and retagged material in the preprocessing application to generate a "best result" composite transcribed session file.

The disclosure also teaches the use of silence-based segmentation parameters for dictation speech input to improve accuracy, and that the segmentation data used to create a speech user profile may also be used during speech recognition to preprocess the same speaker's speech input before speech-to-text decoding. The disclosure also teaches that the session file editor may also include a speech analysis window. This may display a speech waveform to assist in the determination and reassignment of audio boundaries for an utterance, word, syllable, phoneme, or other word subunit.

The disclosure further teaches that synchronization techniques may be applied to a single or multispeaker setting and other input from a variety of speech and language processing applications. Synchronization can result in more rapid error detection in manual or automated processes, improved turn-around time, and faster generation of training data sets for a representational model for a pattern recognition program, such as speech recognition. With agreement from a sufficiently high number of processes, the operator may feel more confident about not reviewing matched results.

The disclosure also teaches that output comparison of two or more synchronized session files using different speaker models or different configurable options may also be used to rapidly determine best speaker model and settings for a particular speaker. This may be performed in a training phase in which various speaker models and configurable settings are tested before routine use for real-time and server-based speech recognition.

Other methods of creating audio tags for manually transcribed text may include manual edit of segmentation boundaries to narrow the boundary to the word level using the exemplary session file editor, submitting the manually edited verbatim text with utterance tags to a speech recognition program in forced alignment mode to create separate words tags in a process described as subsegmental utterance splitting, and post-transcription audio tag assignment using resegmenting and retagging process for text transcribed manually from an audio file.

As disclosed, "transcribe" mode results in creation of transcribed session file, "utterance" mode results in an untranscribed session file. The disclosure further describes a method for generating an untranscribed session file from a transcribed session file and creating an audio file during session file assembly in the postprocessing stage of the speech recognition process.

The disclosure further teaches the use of a speech recognition program that enables a user to record and transcribe in real-time, but at other times, record in utterance mode and quickly create an untranscribed session file. Consequently, the user may dictate in transcribe mode to create short transcribed sessions files, but switch to utterance mode to create an untranscribed session file for long dictation that can be transcribed on a local computer and later reviewed in the session file editor or other graphical user interface.

The disclosure also teaches generation of an audio file or untranscribed session file from the transcribed session file from real-time speech recognition. Both the untranscribed session file and audio file may be independently transcribed by a human operator or server to generate text for comparison with the real-time output. Similar modes of operation may be applied to server-based speech recognition.

If there is a misrecognition using voice activation (command and control), interactive voice response for telephony, text-based audio mining, the disclosure further teaches that correction may be saved and submitted with training session file to update the speaker model. The disclosure further teaches use of corrective updates for speaker recognition, phoneme-based audio mining, and phonetic generation and text-to-speech. This is in contrast to prior art. There the operation and management of many non-dictation, speech-related applications is transparent to the end user and do not permit continued improvement of the speech user profile.

In contrast to prior art, the present disclosure also teaches use of speaker-dependent data to assist in accurate transcription. This may include use of data from the acoustic model, language model, and lexicon. In one approach, pronunciation data may be used by the operator to determine the likely words with that pronunciation and determine what the speaker said.

The disclosure also teaches methods for processing speech from two or more speakers at a meeting or legal proceeding. The techniques utilize the ability of the session file editor to change the boundaries of audio segments, align the correct audio to a given speaker, and create verbatim text to create_a speech user profile for the group as a whole and speaker-specific profiles.

The disclosure teaches use of the multispeaker techniques primarily for situations where the same speakers, or a subset thereof, are repeatedly present, such as a lengthy legal proceeding, sequential meetings of a corporation's board of directors, or long-term surveillance of suspect individuals by national security or law enforcement groups. In these situations, the present disclosure teaches a system and method that assist in obtaining adequate training data for creation of one or more_speaker models.

The disclosure further teaches methods for text segmentation prior to processes converting, analyzing, or interpreting text. A common segmentation module may be used for external segmentation of text prior to manual processing. The common text segmentation module may also be used by automatic processes converting, analyzing, or interpreting text, such as text-to-speech, phonetic transcription, machine translation, or natural language understanding. Text segmentation may also be used to create session files of text for evaluation of updates and changes to legal documents.

Techniques are disclosed for user-dependent data generation of segmentation modules for speech that may be used for manual or automatic processing. In one approach, speech analysis may be used to determine typical silence length separating a speaker's utterances. Methods are further described for use with multiple speakers sharing a single microphone or other recording source.

As described in the disclosure, the shared speech user profile is not limited strictly to acoustic model, language model, and lexicon, and may include other data. For instance, the profile may also include audio or text segmentation data and other relevant user information, such as text formatting preferences that can be used for forward formatting of raw speech recognition engine text into a format acceptable to the dictating speaker, or reverse formatting final transcribed text to speech recognition engine compatible format.

The disclosure further teaches a variety of methods to help a novice unfamiliar with lexical representation to create and train a preferably speaker-dependent speaker model. One approach is support for word models (templates). This form of speaker modeling does not require entry of a phonetic pronunciation into the lexicon, but only the word itself. It may be used for same-language speech-to-text conversion or translation.

In another approach, the disclosed methods include an audio pronunciation generator that uses a text-to-speech engine for assistance in creating lexical pronunciation. The method permits an operator to enter pronunciation based upon a simplified phonetic scheme, playback and listen to text-to-speech audio based upon the entered pronunciation, and determine whether the entered pronunciation accurately represents the dictated speech. In one approach, the lexicon may be created with a simplified representation of individual speech sounds used by grade school speech teachers to teach phonetics and proper pronunciation.

The present disclosure also discusses a novel technique to generate speaker-dependent questions for state tying in automated linguistic questions generation. The disclosure teaches selection of different parameter range and incremental values for linguistic questions generation, and automatic selection of a set of best questions among those using maximum likelihood based distance measure. This avoids time-consuming generation of separate acoustic models, testing word error rate for each, and selecting questions file based upon the lowest word error rate or other performance consideration.

The disclosure further teaches that both manual and automatically generated questions may be used for state tying. Where both manually and automatically generated questions are available, in one approach, the state-tying methods will use questions that maximize likelihood of acoustic similarity with reference to data sparse triphones or other word subunits.

The disclosure teaches the novel use of accumulator and combiner techniques with distributed computing for updates to the preferably speaker-dependent acoustic model. In this method, states may be untied when updating the acoustic model. In the speaker-adaptive prior art, the acoustic model may be unsaturated in that there is substantial lack of triphone or other word subunit modeling based upon the end-user speaker's voice and style, especially at outset of use. Use of accumulator and combiner techniques may be of assistance in speaker-dependent systems where there is relative abundance of trained triphone states (compared to speaker-adaptive systems) and relative acoustic model saturation when the end-user begins use of speech recognition.

The disclosure teaches use of a single session file editor for human processing of data and review of computer results. Since the session file editor may open synchronized session files from speech, audio, text, and image source data, the disclosure teaches that it may be used as a common application for evaluation of processing from a variety of source input.

As described in the disclosure, the session file editor permits the operator to open and modify files in an unlimited number of buffered read/write windows with synchronized data output. As long as the session files have equal numbers of segments, they may be synchronized. Consequently, session files with different data input types, such as audio, text, image, and other sources, may be synchronized These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

BRIEF DESCRIPTION OF THE DRAWINGS

FIGS. 4-1 and 4-2 together comprise a flow diagram illustrating an overview of an exemplary embodiment of speech-to-text conversion session file creation and modification from segmented speech input.

FIGS. 5-1, 5-2 and 5-3 together comprise a flow diagram illustrating an overview of an exemplary embodiment of a session file editor process.

FIG. 13 is a flow diagram illustrating an exemplary embodiment of postprocessing a transcribed session file from more than one speaker (multichannel) based upon speech input from two or more speakers.

FIGS. 14-1 and 14-2 together comprise a flow diagram illustrating an exemplary embodiment of operational modes, source inputs, and output files for speech recognition, including generation of transcribed session file, untranscribed session file, and audio file.

FIGS. 19-1 and 19-2 together comprise a flow diagram illustrating an exemplary embodiment of speech user profile update with accumulator and combiner techniques.

DETAILED DISCLOSURE

While the present disclosure may be embodied in many different forms, the drawings and discussion are presented with the understanding that the present disclosure is an exemplification of the principles of one or more inventions and is not intended to limit any one of the inventions to the embodiments illustrated.

I. System 100

Figure 1A:
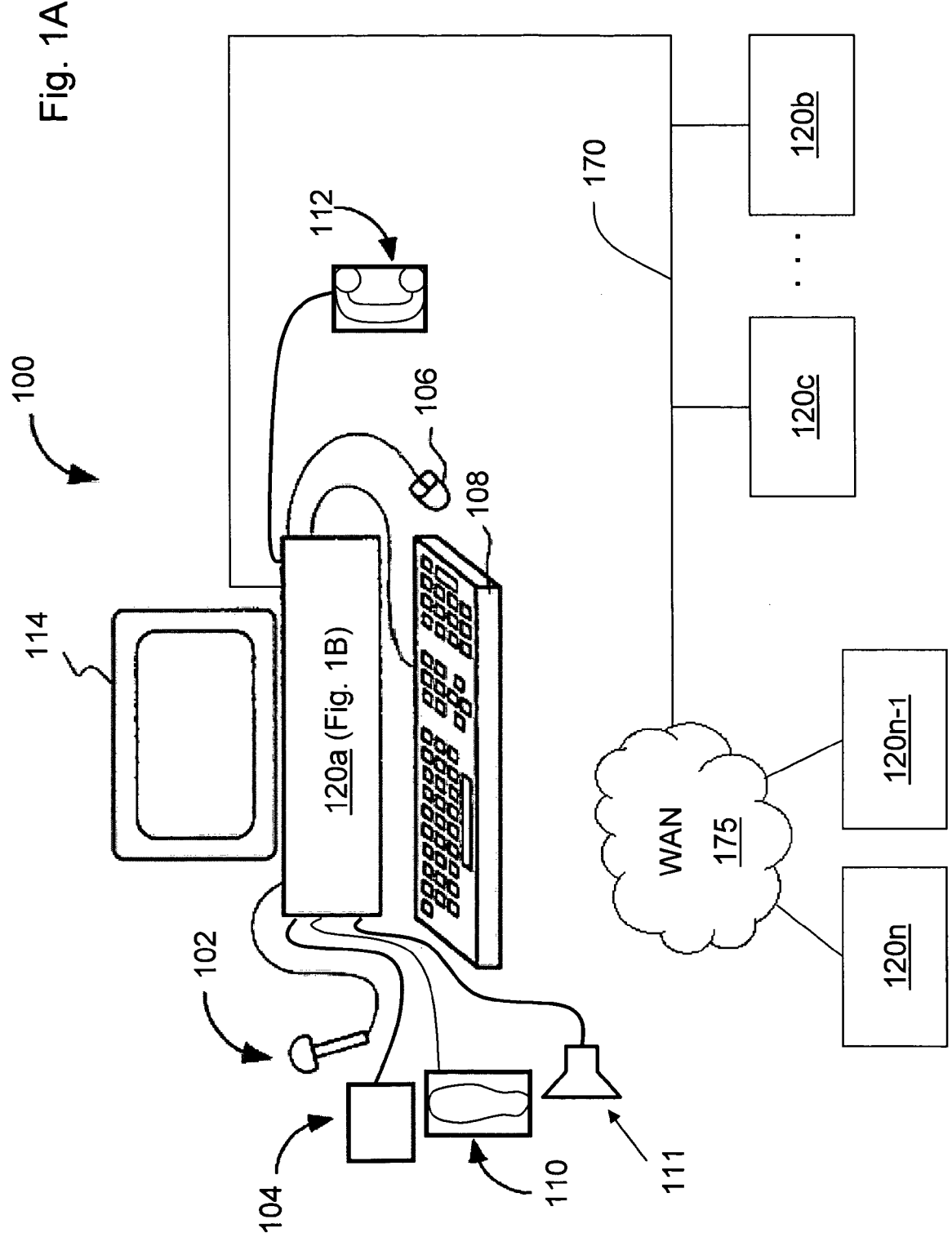
FIGS. 1A, 1B and 1C together comprise a block diagram of an exemplary embodiment of a computer within a system or a system using one or more computers.
Figure 1B:
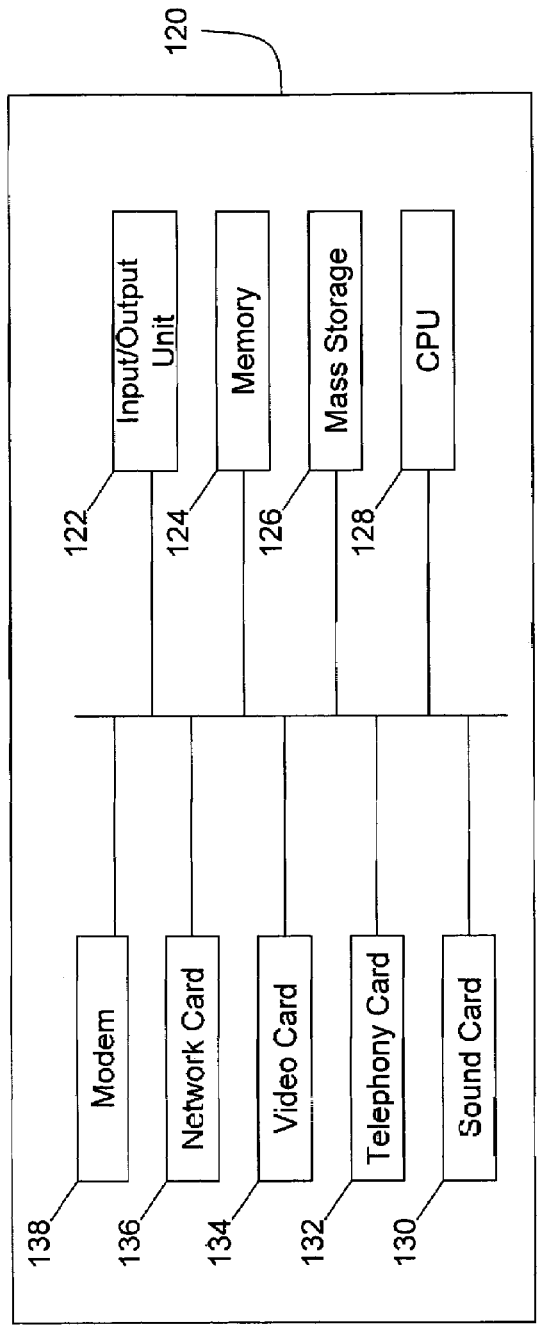
Figure 1C:
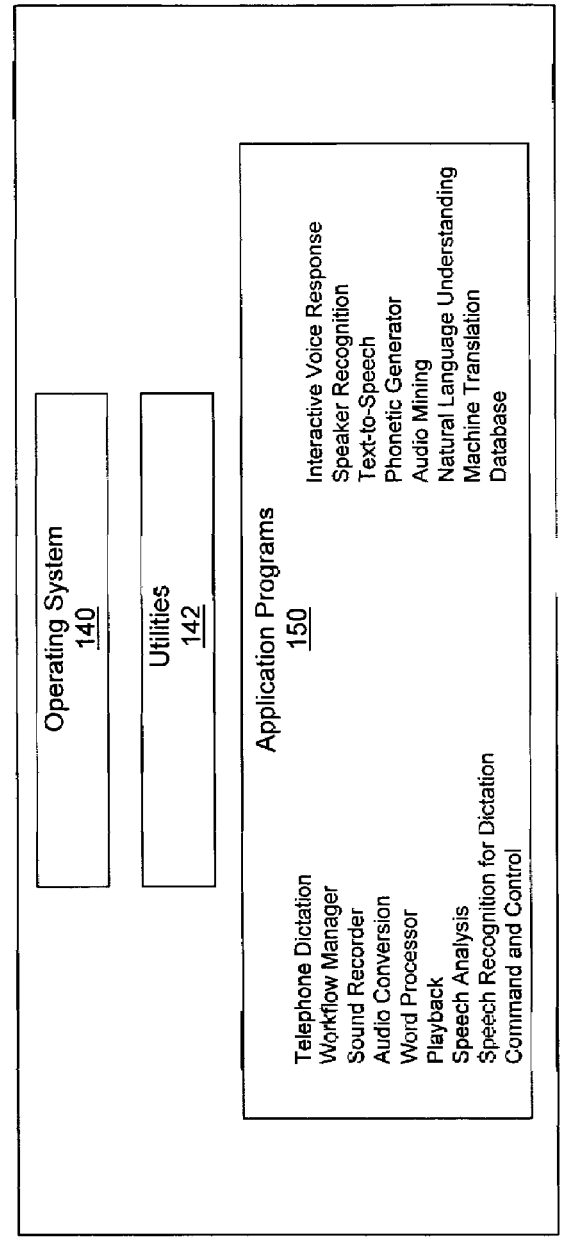

FIGS. 1A, 1B, and 1C together comprise a block diagram of one potential embodiment of a system 100. The system 100 may be part of the invention. Alternatively, the invention may be part of the system 100. The system may consist of functions performed in serial or in parallel on the same computer 120a or across a local 170 or wide area network 175 distributed on a plurality of computers 120b-120n.

Each computer 120 includes input and output (I/O) unit 122, memory 124, mass storage 126, and a central processing unit (CPU) 128. Computer 120 may also include various associated input/output devices, such as a microphone 102 (FIG. 1A), digital recorder 104, mouse 106, keyboard 108, transcriptionist's foot pedal 110, audio speaker 111, telephone 112, video monitor 114, sound card 130 (FIG. 1B), telephony card 132, video card 134, network card 136, and modem 138.

The sound card 130 and telephony card 132 may be single or multichannel. Two or more microphones, telephones, or other recording devices may be used for speaker isolation to record speech from two or more speakers. Alternatively, speech input from two or more devices may be recorded as a single file. The telephone system 112 may be analog, digital, or voice over internet protocol (VoIP). In one embodiment shown in FIG. 1C, memory 124 and mass storage 126 jointly and operably hold the operating system 140, utilities 142, and application programs 150.

The computer 120 may be controlled by the Windows® operating system. It is contemplated, however, that the system 100 would work equally well using a Macintosh® operating system or even another operating system such as Linux, Windows CE, Unix, or a Java® based operating system, to name a few.

As shown in FIG. 1C, application software 150 may include single or multichannel sound recorder, audio conversion, word processor, transcriptionist audio playback, workflow manager, and speech analysis software modules or programs. Application software 150 may also include speech and language applications, such as speech recognition for dictation, command and control (voice enabling), interactive voice response for telephony, telephone dictation software, speaker recognition, phonetic generator, text-to-speech, text-based or phoneme-based audio mining (word spotting), machine translation, natural language understanding, and database.

Sound recorder, audio conversion, transcription playback, workflow management, and telephone dictation software are available from a variety of sources, including Custom Speech USA, Inc. of Crown Point, Ind. The workflow management software may include general file management, document retrieval, and time tracking, as well as specialized software for document processing and speech user profile management.

Speech analysis may be performed using standard audio analysis and audio editing and processing programs, e.g., CoolEdit (Syntrillium Corporation Cool Edit software later acquired by Adobe Systems, Inc., San Jose, Calif.), or specialized speech analysis applications, e.g., Speech Analysis Tools (SIL International, Dallas, Tex.) or lingWAVES (Ling-Com GmbH, Forchheim, Germany). Speech and language applications are available from publicly available source code and toolkits, including materials from academic and other institutions, such as CMU Sphinx Group Open Source Speech Recognition Engines (Carnegie-Mellon University, Pittsburgh, Pa.) Institute for Signal and Information Processing (Mississippi State University, Mississippi State, Miss.), SRI International (Menlo Park, Calif.), and the Festival Speech Synthesis System (The University of Edinburgh, Edinburgh, UK). The Microsoft® Speech Software Development Kit (Microsoft Corporation, Redmond, Wash.) includes Microsoft® Speech Application Programming Interface (SAPI) v. 5.x (Microsoft Corporation, Redmond, Wash.) and a speech recognition and text-to-speech engine. Natural-Voices® (AT&T® New York, N.Y.) is another SAPI-compliant text-to-speech engine The speech recognition program may use 39-dimensional Mel Frequency Cepstral Coefficients (MFCC), a word-based and triphone-based acoustic model with 5 states (3 real, 1 entry, and 1 exit) and 8 mixtures, an N-gram language model, and a lexicon using words, phonemes (monophones), triphones, and other subword units. A SAPI 5.x application interface may be used and should be compatible with any SAPI 5.x compliant speech recognition program. Conversely, a speech application interface may be selected that is compatible with a non-Windows® based speech recognition program.

In word mode, the speech-to-text decoder block may provide standard text and alternative hypotheses (word graphs) in a transcribed session file and confidence scores for each hypothesis. In model mode, the decoder may generate a transcribed session file with text, phonetic pronunciation, and word graphs.

The speech-to-text decoder block may be modified for use in other pattern recognition programs. Among other uses, a modified speech-to-text decoder block may receive segmented speech input from a speech application programming interface, process the speech input using Hidden Markov Models that access the acoustic model, language model, or lexicon, or some combination, and return transcribed text and other information to the programming interface.

To improve speed with speaker recognition and phoneme-based audio mining, the acoustic model may be modified to use monophones instead of context-dependent triphone models with small number of mixtures (e.g., 4). Pruning parameters may be tuned to increase scoring speed. The language model may be inactivated.

MFCC or other parameters of the acoustic model may be used create a speech signal, as well as prosody information related to duration of pitch and other features, for creation of synthetic text to speech. In the concatenative approach, directly recorded sounds of phonemes or other word subunits may be used by the text-to-speech program to convert text to speech.

Application programs may also include off-the-shelf speech and language programs, such as Dragon® NaturallySpeaking®, IBM® ViaVoice®, Philips® Speech Magic® or pattern recognition programs for image, nonspeech audio, text, and other data input. These may further include handwriting recognition, e.g., Office XP™ (Microsoft Corporation), optical character recognition, e.g., OmniPage (ScanSoft, Inc., Peabody, Mass.), or other image-based pattern recognition, such as computer aided diagnosis for medical applications, such as mammography, e.g., Second Look™ (iCAD, Inc., Nashua, N.H.) or ImageChecker™ (R2 Technologies, Inc., Sunnyvale, Calif.). For image-based evaluation and manipulation, the system may include an image editor, such as Paint (Microsoft Corporation, Redmond, Wash.).

Text comparison of speech and language and other pattern recognition output may be performed by a GNU text compare (The Free Software Foundation of Cambridge, Mass.), a Windows FC File Compare utility (Microsoft Corporation, Redmond, Wash.) or other text compare applications. Forward and reverse formatting of text may be accomplished using regular expressions or similar techniques for analysis and processing of recognized text strings. The application programs may also include one or more databases.

A machine-readable medium may include any mechanism for storing or transmitting information in a form readable by a machine (e.g., a computer). A machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.).

Methods or processes in accordance with the various embodiments of the invention may be implemented by computer readable instructions stored in any media that is readable and executable by a computer system. A machine-readable medium having stored thereon instructions, which when executed by a set of processors, may cause the set of processors to perform the methods of the invention.

II. Process 200

Figure 2:
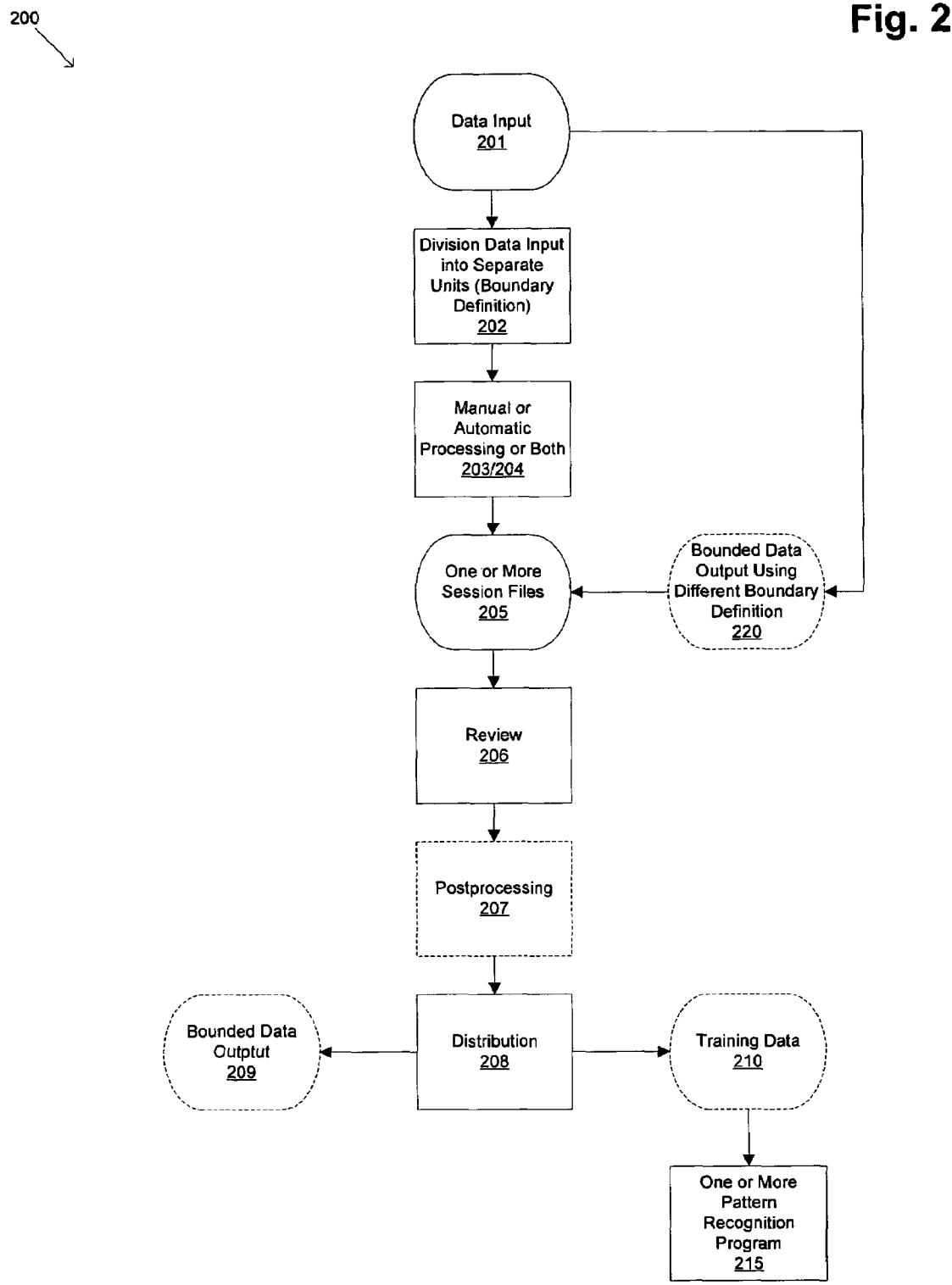
FIG. 2 is a flow diagram illustrating an overview of an exemplary embodiment of the general process of transformation of bounded data into one or more session files.

FIG. 2 provides a general overview of the process 200 of transformation of bounded speech, text, audio, image, or other data input into one or more session files and processing by one or more human operators, computer applications, or both. Data may be input into process 200 from various sources, such as various speech and language applications, text-based applications, dictation audio, and manually transcribed text with associated audio files.

In step 201, there may be division of the source data into separate units of data input. This boundary division typically follows capture of data input by some form of sensor (e.g., recorder, scanner, or digital camera). In one approach, the technique of boundary division reflects the source data type. For instance, segmentation may be used to establish boundary division of speech input and other audio data. Boundary division for images may be determined by pixels or other definitions of image area. Boundary division for three or more dimensional data may be determined by volumes or spaces.

Boundary detection and division in step 202 may be performed automatically by a computer software program. In this disclosure, in a preferred approach, the boundary definition is the same for division prior to both manual or automatic processing. Consequently, in this approach, the number of bounded source data units processed by one or more human operators or computers is the same. However, the disclosure teaches synchronization of asynchronized source data input for more rapid review and post-human edit.

In step 203/204, the bounded source data may be processed manually or automatically or both to produce bounded output data. This processing may involve conversion (e.g., speech-to-text), interpretation (e.g., definition of meaning or key concept of text), analysis (e.g., speaker identification), or other process. Use of identical boundary definition for both human and automatic processing results in an identical number of separate data units for conversion, interpretation, or analysis and potential synchronized review of results arising from the same source input.

In step 205, the data output that results from the conversion, interpretation, analysis, or other process are aligned to the bounded source data in a session file to create a link or tag associating the source input to the result. In one approach, the number of session files depends upon the number of human operators, and computer programs processing the source input data.

In step 206, the one or more session files are reviewed by a human operator. The one or more session files may be produced by one or more human operators, computer programs, or both. The review step 206 may include the correction of errors made by one or human operators or computer programs or both. In one approach, the corrected results are saved as part of the session file. Matches in synchronized output from two or more processing instances often indicate a higher likelihood of accuracy or reliability and may be displayed (or otherwise used) in the post-human review of prior human or machine processing, or both.

Step 207 provides optional postprocessing of the bounded data output which may involve assembling the linked source input and output into one or more session files, and may also include a final output session file for distribution to the end user that may include a document, letter, or report that includes the results of the conversion, analysis, or interpretation. The one or more session files may also include a training session file for training of the pattern recognition program. In another approach, the postprocessing may involve additional processing of the bounded source data. In the dictation and transcription field, for instance, the manually or automatically generated text may be formatted with headers and footers or subject to further error review and correction (e.g., by automated spell check). Postprocessing may involve manual or automatic processes or both. In some settings, the steps performed in optional postprocessing 207 may be performed in previous steps, thereby eliminating the need for a separate postprocessing step. Consequently, in some instances, files may be available for distribution after review 206.

Step 208 provides distribution of bounded data output 209, training data 210, or both. The distributed output may include one or more postprocessed session files, or part thereof, or other files, to human end users or other computers. The distribution may include training data 210 to create or update the statistical, probabilistic, or other models used by a pattern recognition program step 215, such as speech recognition or other speech and language processing application. The training data 210 may be used for a pattern recognition program 215 not using a common boundary definition, such as that resulting in bounded output with a different boundary definition in step 220.

As indicated by step 209, the distribution may transmit bounded data output to human end users. In one approach, by accessing the bounded data output, the operator may review the associated source data input. In speech recognition, for instance, an end user may select text in the graphical user interface of a speech recognition program for dictation and play back the associated audio using the stored audio data in the transcribed session file.

Data input 201 also may be optionally divided into separate units using different boundary definition 220 to create one or more session files 205 with or without creation of synchronized data output in step 203/204. In the review step 206, there may be synchronization of the output from differently divided source data. This synchronization may create an identical number of output units for the data created by the two different boundary definitions.

Processing of Segmented Speech or Text Input

Figure 3:
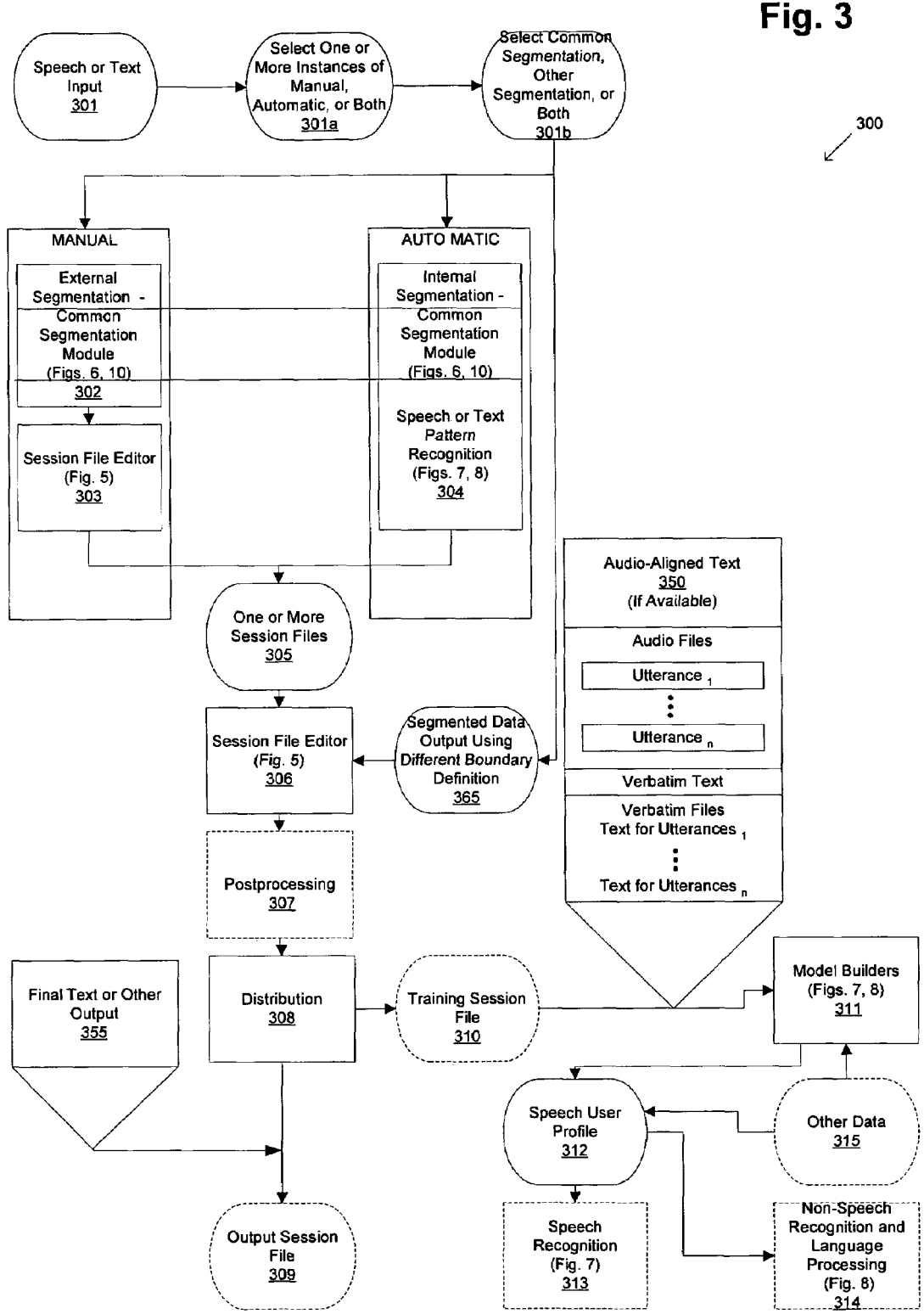
FIG. 3 is a flow diagram illustrating an overview of an exemplary embodiment of processing of segmented speech or text data input.

As described in FIG. 3, processing may begin with speech or text input 301. Speech input is defined broadly to include business or professional dictation, conversational speech from office, home, car, or other location, or any form of uttered speech input may also be from a single or from more than one speaker. The speech input may be an audio file recorded from live dictation into microphone, handheld recorder, telephone, or other device, or an audio file recorded during interactive telephony or use of a handheld, automobile, or home device using voice activation. The speech input may be a real-time input or from an audio file. The audio file may be embedded in another file or represent a pointer to a hyperlink or path string.

The speech input may represent streamed speech or computer generated audio from text-to-speech, voice animation, voice enhancement, robotic application, or other process. The speech input may be in one or more languages or dialects, from one or more speakers, or from the same speaker at different times. Text input is similarly broadly defined and may be presented as a file or in real-time (e.g. from a keyboard).

The user selects one or more instances of manual, or automatic processing or both 301a to process the speech or text input 301 and selects common segmentation, other segmentation (which may include no segmentation), or both 301b. In one exemplary embodiment, the speech input 301 may be for dictation and may be converted by manual transcription, speech recognition, or both.

Figures 2, 5:
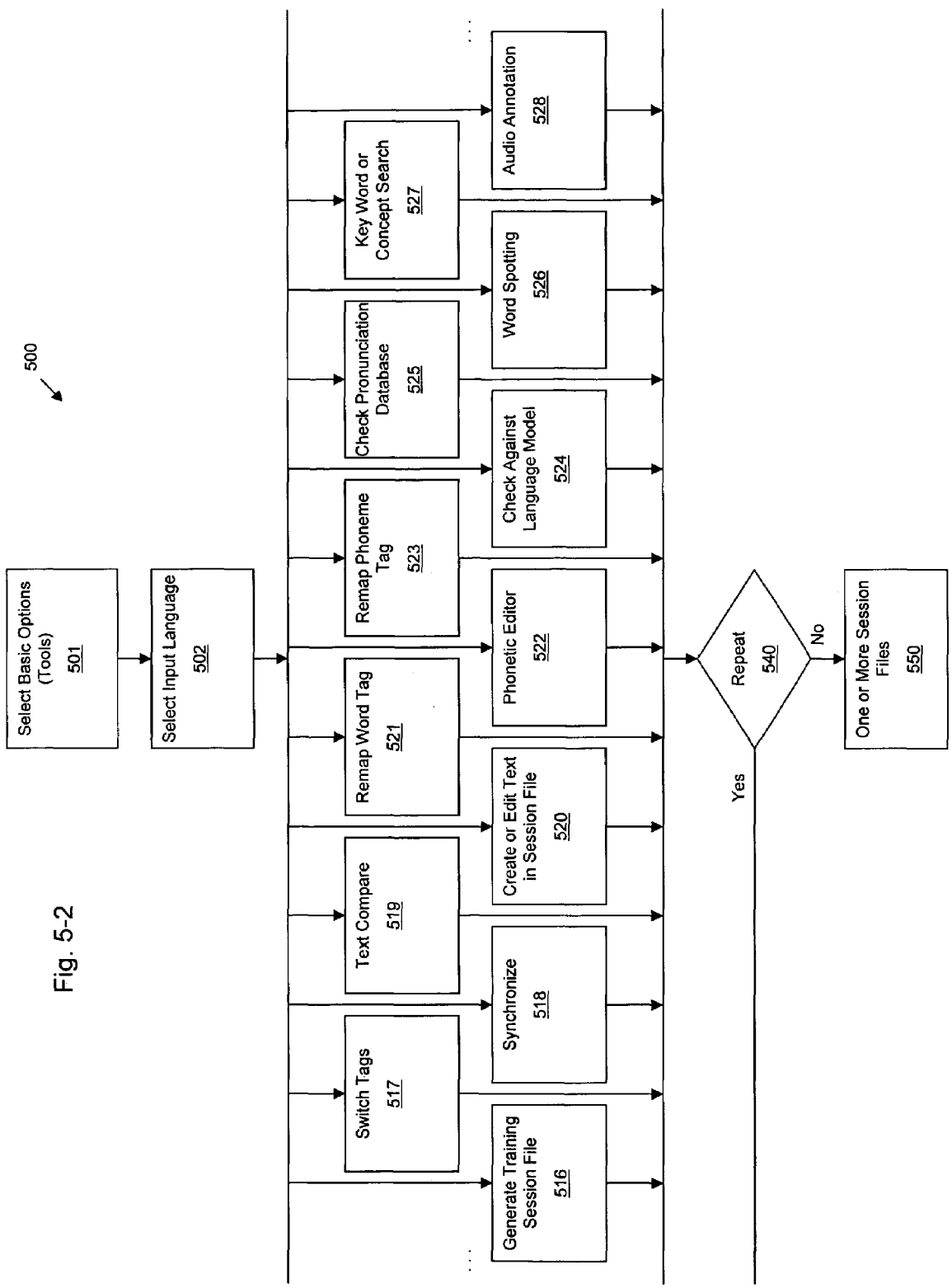
Figures 3, 5:
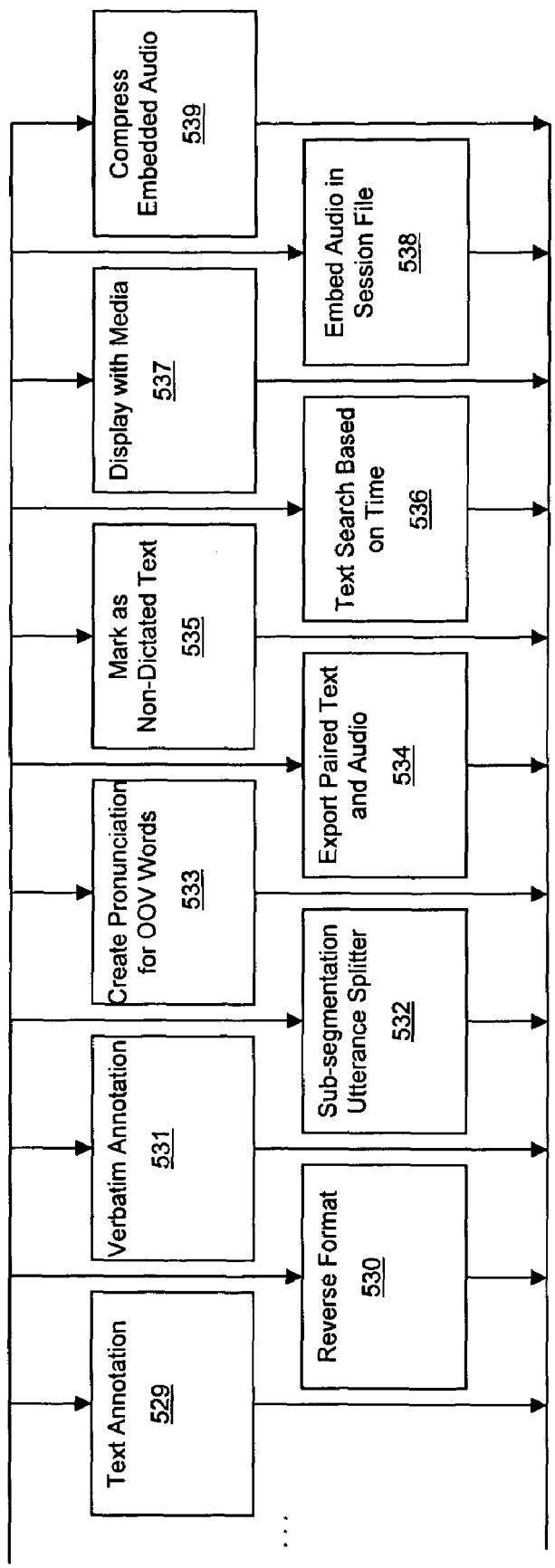
Figure 6:
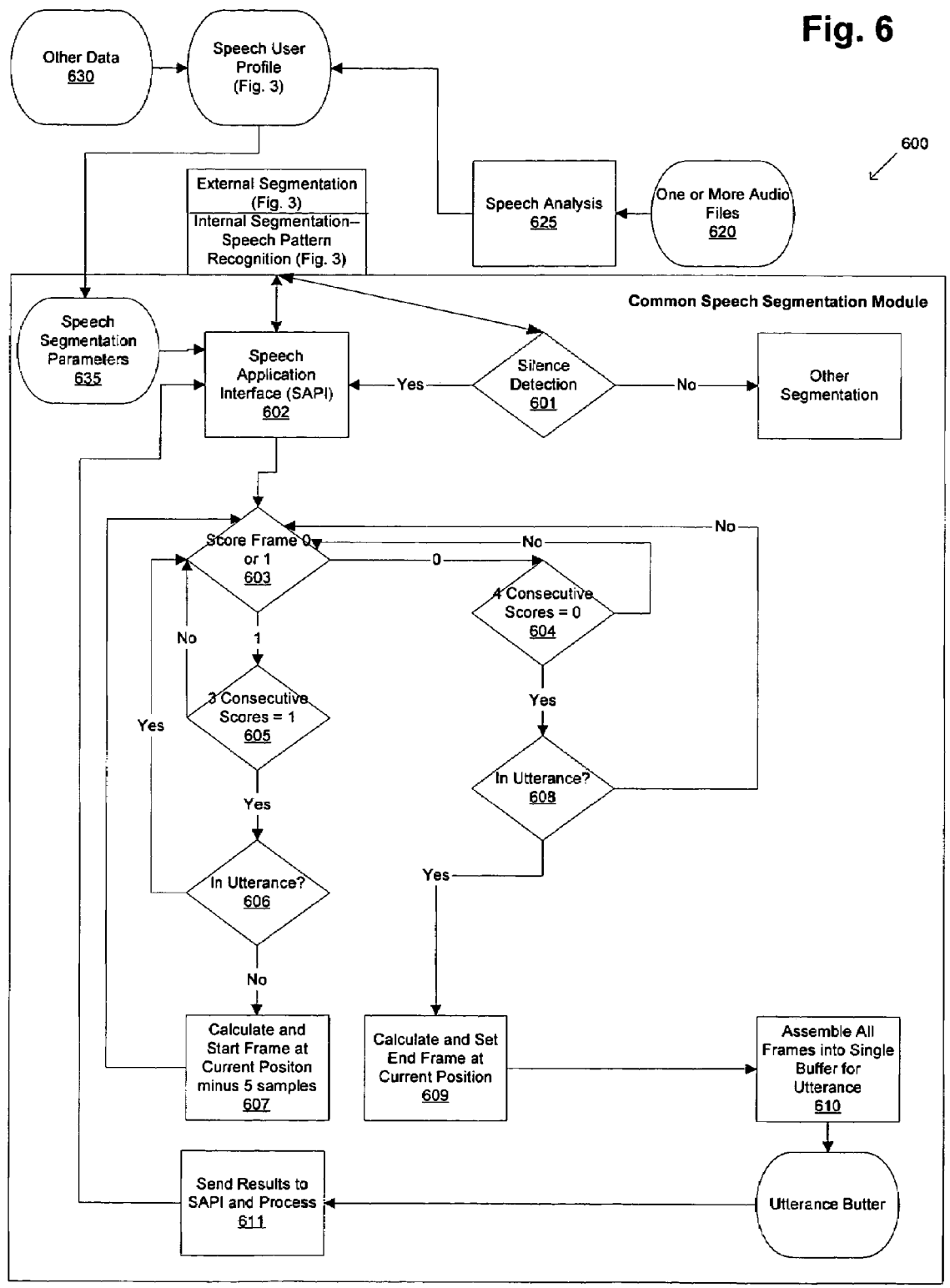
FIG. 6 is a flow diagram illustrating an overview of an exemplary embodiment of end point silence detection for segmentation of utterance for a speech segmentation module.

If manual conversion (the left path of FIG. 3) is selected, the speech input is processed using an external segmentation application 302 that includes a common segmentation module, such as that described in association with FIG. 6. After presegmentation of the dictation audio into an untranscribed session file, such as that described in FIG. 4, the speech input may be transcribed by segment in the session file editor 303 (see FIG. 5) to create a transcribed session file 305. More than one session file 305 is created if two or more manual instances transform the speech input 301. Manual processing of speech input 301 may also include speech to text conversion of a spoken command, identifying, detecting, or verifying the presence of a speaker, or searching a speech file for the same speech input 301.

After generation of the speech input 301, there may be "automatic" processing (the right path of FIG. 5) by a speech pattern recognition program 304 that includes the common segmentation module 302, such as that described in association with FIG. 6. The pattern recognition program may include a variety of speech and language processing applications, such as speech recognition for dictation, speech recognition for command and control or interactive voice response, speaker recognition, and audio mining (word spotting).

Figure 7:
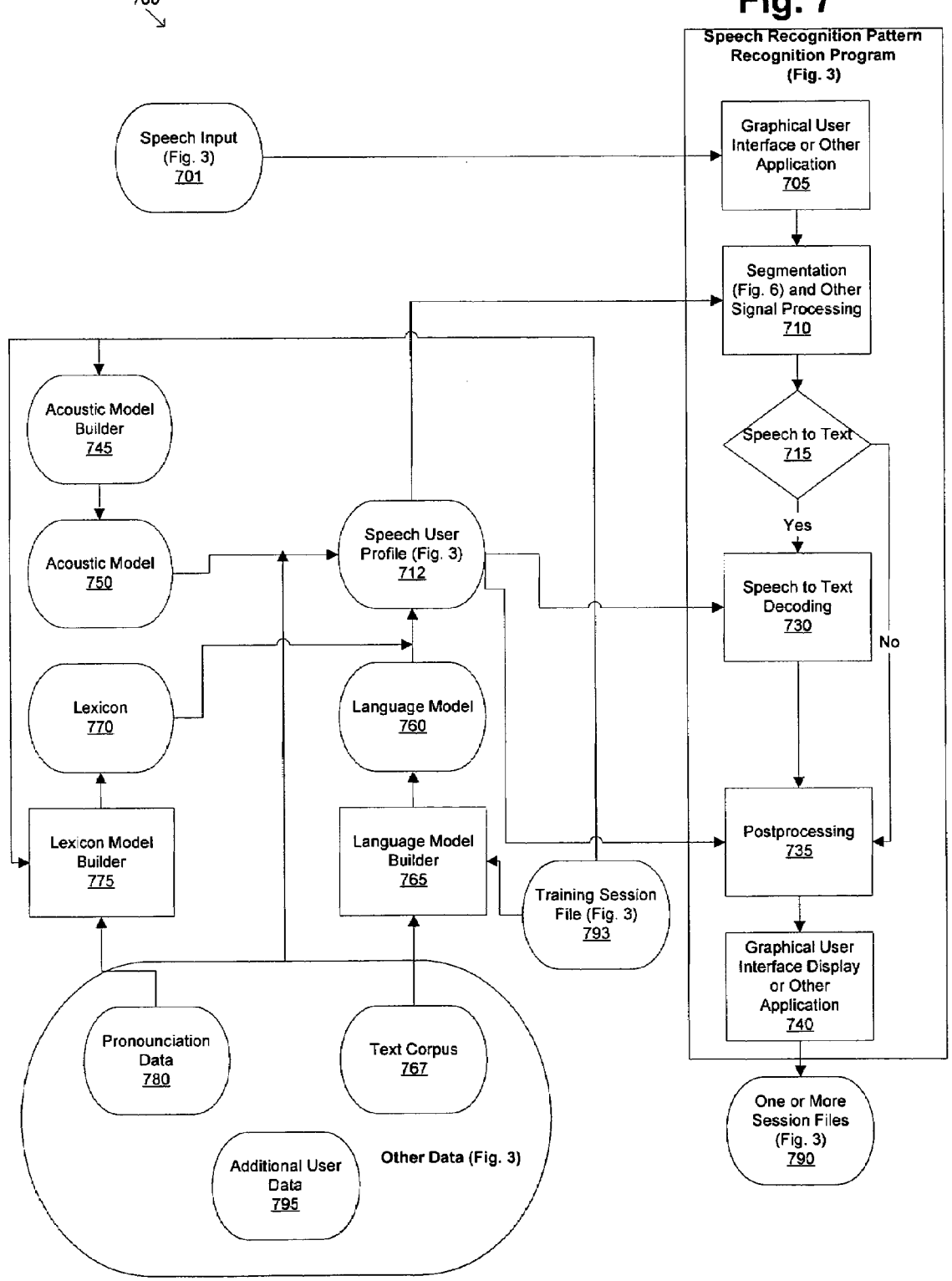
FIG. 7 is a flow diagram illustrating an overview of general techniques for shared use of speech user profile (acoustic model, language model, lexicon, and other data) and processing of speech input by speech recognition program for dictation and related programs using speech recognition, such as command and control, interactive voice response, and text-based audio mining, and session file creation by these applications.

In the case of dictation, the speech pattern recognition program would typically be a large vocabulary continuous speech recognition program, such as described in FIG. 7. This results in an output session file 305, typically including a transcribed session file, and training session file 310. Alternatively, the transcription may be performed manually with one or more instances of the session file editor 303 and speech pattern recognition program 304. These one or more transcription instances may run in series or in parallel. As there may be one or more manual and/or automatic converting instances, the result may be two or more session files 305.

In the session file editor step 306, the one or more session files produced by automatic or manual processes may be reviewed in one or more instances of a session file editor 500 (as will be described in association with FIGS. 5, 5A, 5B, 5C).

In each case, the one or more transcribed session files may be opened in one or more of the buffered read/write windows of the session file editor 500 (FIG. 5). The person reviewing the session file may be the original speaker or another party.

Further, the session file editor step 306 may involve a series of transformations in one or more instances of a session file editor 500 (FIG. 5) before postprocessing 307, and may involve both manual processing and automatic subroutines that modify one or more previously created session files. For instance, as discussed in association with FIG. 4, markup of the tag lines of one or more transcribed session files or other files in step 436 proceeds through multiple steps before one or more complete transcribed session file or other files 444 are submitted for optional postprocessing (FIG. 3) in step 307.

Figures 2, 4:
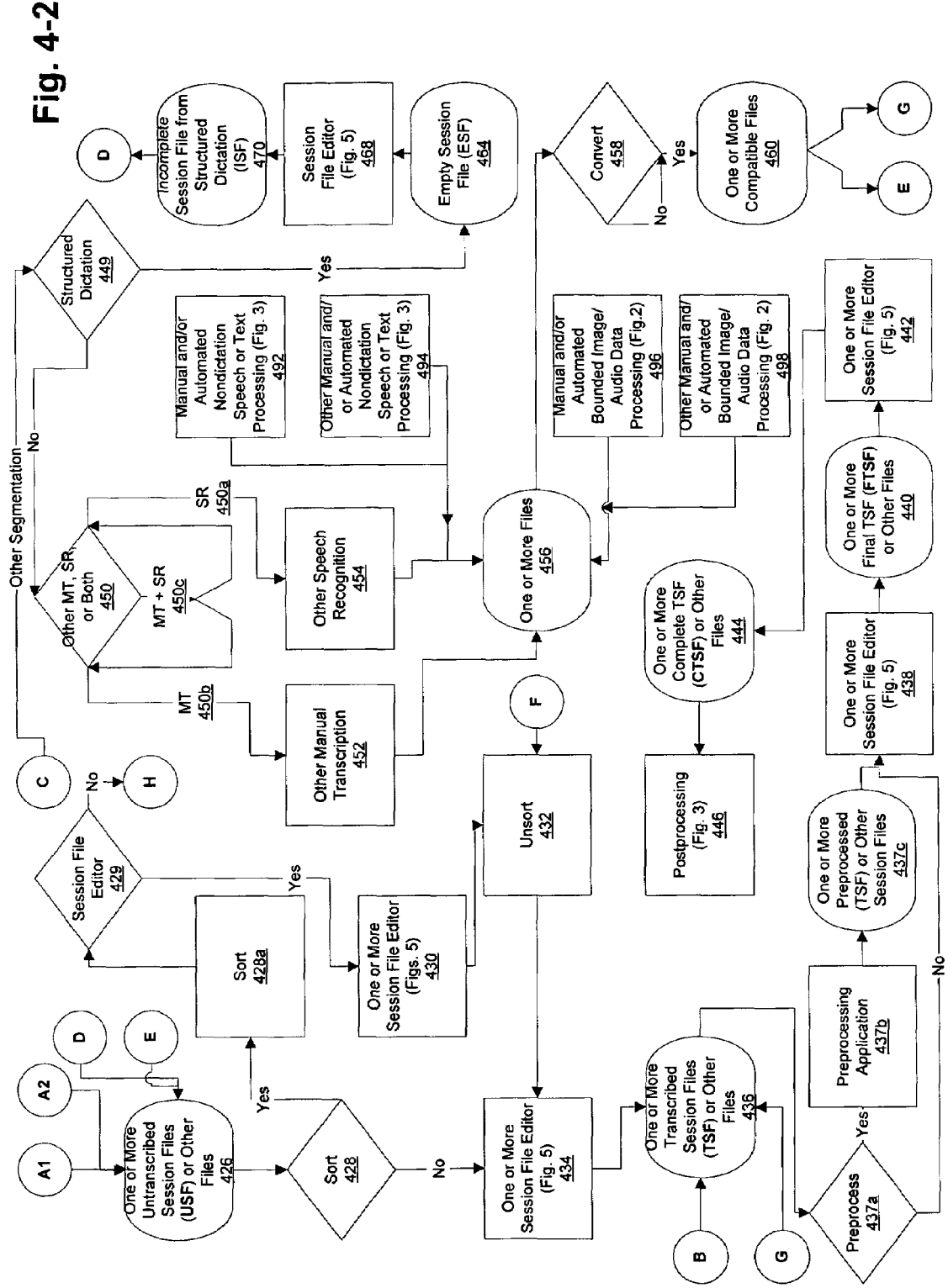

In one approach, as for manual transcription or speech recognition for dictation, using the session file editor 500, (FIG. 5) a final transcribed session file may be created, such as that described in FIG. 4 (step 440), that includes the final text for distribution as a letter, document, or report. A complete transcribed session file, such as that described in FIG. 4 (step 444), may be created in the session file editor 500 (FIG. 5) to include verbatim text and other formatting, such as insertion of headers and footers and other nondictated elements, and an organized group of one or more session files, including output session file (FIG. 3) and training session file (FIG. 3).

Optional postprocessing 307 may include manual or automatic modification or both. This may include additional formatting and other changes to the complete transcribed session file.

Distribution 308 may include delivery of output session file 309, training session file 310, or both. In the case of speech recognition for dictation (FIG. 7), output session file 309 may include document, letter, report, or other audio-aligned text output. If a training session file is distributed, it may deliver 350 audio-aligned text having 1 through n utterances and corresponding verbatim text to the model builders 311 for creation of acoustic model, language model, and lexicon for speech user profile 312 based on the speech input 301. The speech user profile 312 may be used for speech recognition (FIG. 7) 313, non-speech recognition and language processing (FIG. 8), or both. Other data 315 may optionally be used for processing by the model builders (FIGS. 7, 8) 311.

Final text may be delivered in step 355 as part of the output session file 309. Speech-to-text conversion, including speech recognition (FIG. 7), will generally include audio-aligned text in the training session file 310, but non-speech recognition and language processing applications 314 may include other processed data. For example, machine translation may provide source language data for inclusion in a text corpus for language model training (FIG. 7). The distributed session file text output 309 may be in the same or different language than the speaker, one or more languages, a standard or phonetic alphabet, or in an imaginary or computer-programming language.

Figure 8:
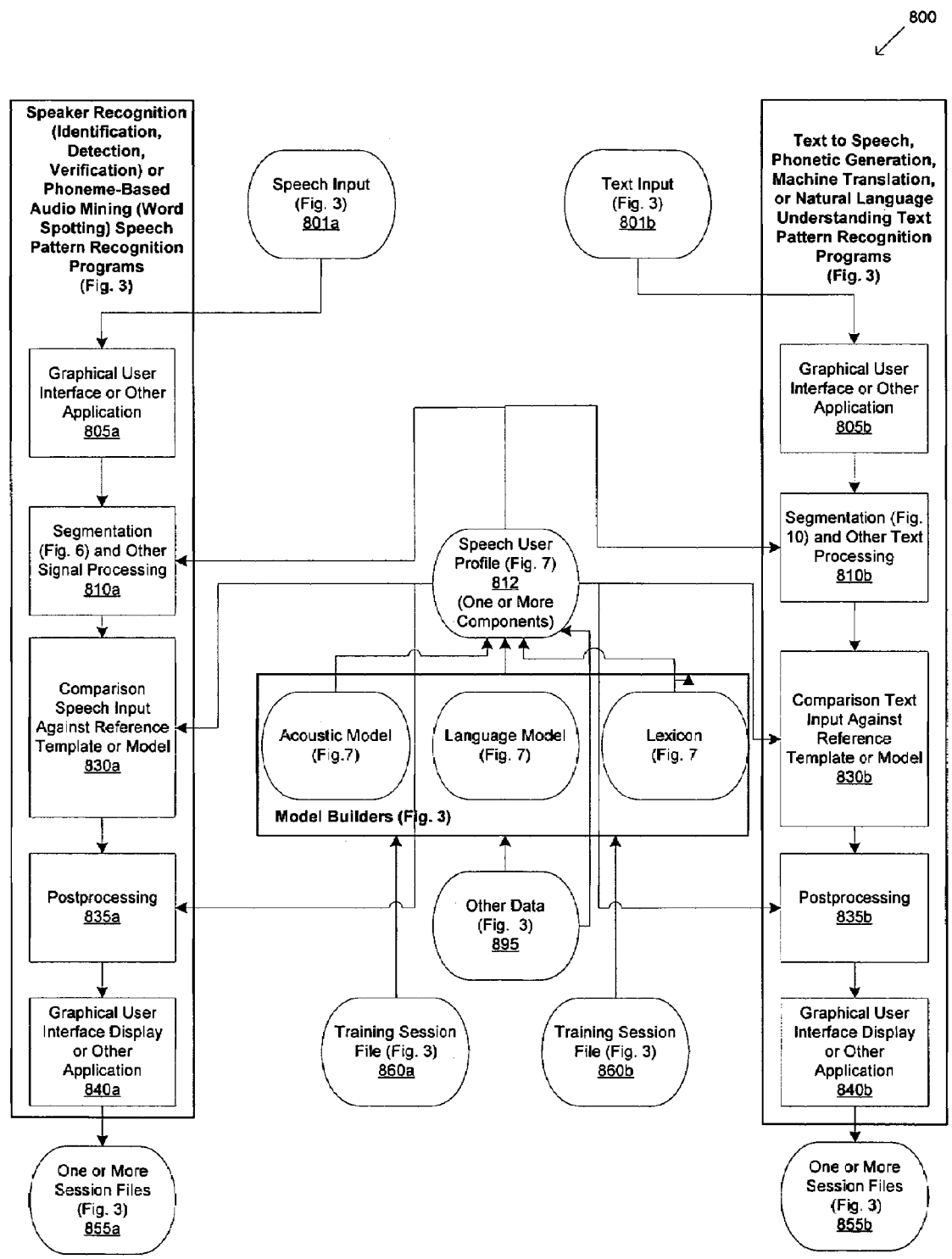
FIG. 8 is a flow diagram illustrating an overview of general techniques for shared use of one or more components of speech user profile and other data by speech-related processes, such as speaker recognition and phoneme-based audio mining, and text-related processes, such as text to speech, phonetic generation, and natural language understanding, and session file creation by these applications.
Figure 9:
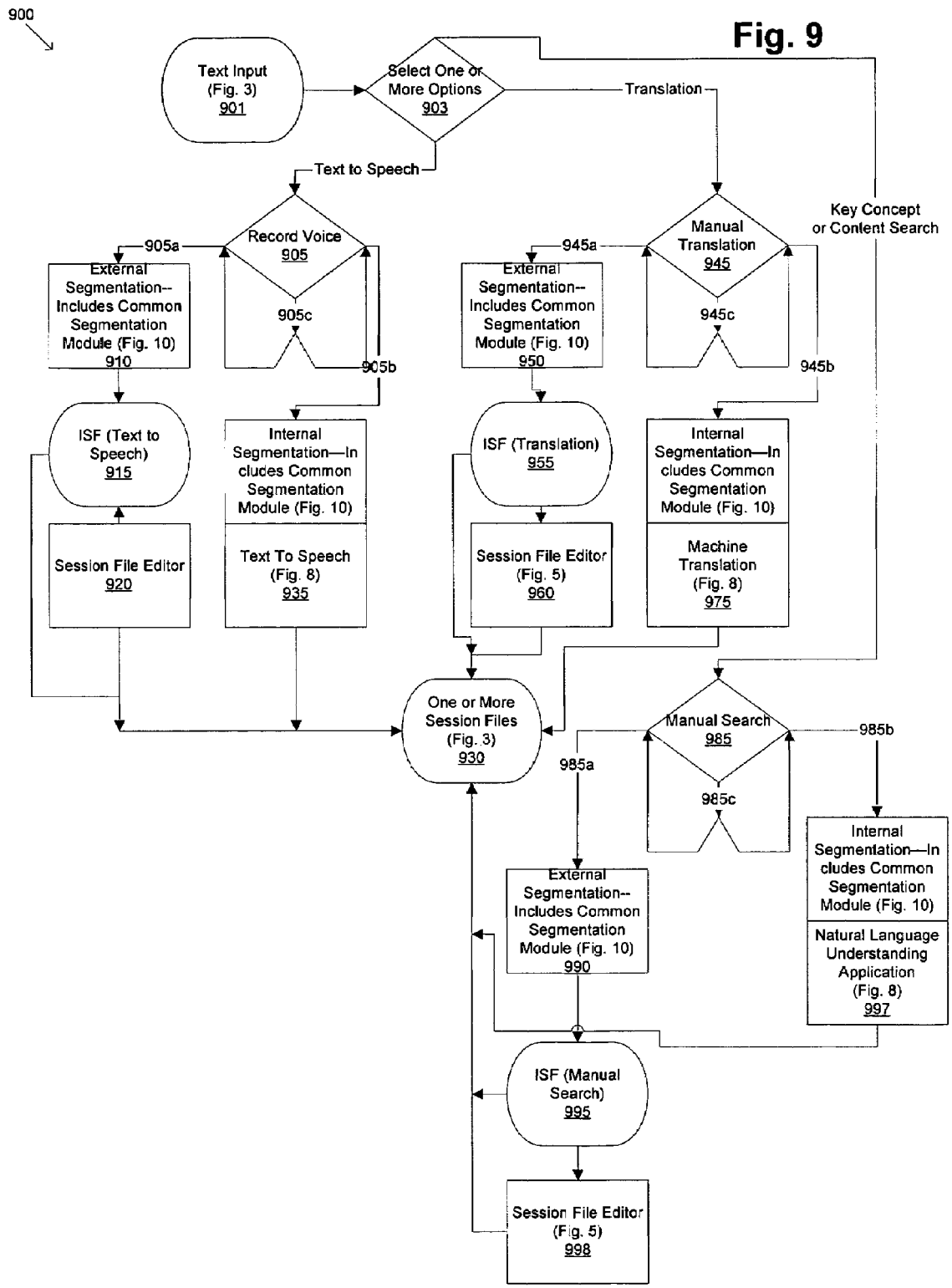
FIG. 9 is a flow diagram illustrating an overview of the sequence of exemplary embodiments of session file creation by text to speech, machine translation, and natural language understanding concept search and similar processes performed by human operators with the session file editor.

The pattern recognition process 304 may also begin with text, for processes such as text to speech, phonetic generation, translation, and natural language understanding, as described in association with FIGS. 8 and 9. The text input 301 may also be processed by common text segmentation module (FIG. 10) before processing by one or more manual instances of the session file editor 303 to create one or more session files 305.

The disclosed process may determine in step 301b to use common segmentation module (FIGS. 6 and 10) with another segmentation technique, the other segmentation technique only (which may include no segmentation), or both common segmentation and other segmentation. The processed speech or text input 301 results in segmented data output using different boundary definition, as indicated by step 365. This will generally result in a different number of segments than source data 301 processed using a common segmentation module. In step 306, these asynchronized session files may be synchronized using the session file editor 500 (FIG. 5) to create an identical number of segments for comparison with the other processing method.

In both FIGS. 2 and 3, respectively, both bounded data output using different boundary definition 220 and segmented data output using different boundary definition 365 are displayed as optional steps. In the experience of the inventors, this represents the most common processing sequence. However, those skilled in the art with the present specifications before them will recognize that the optional processes depicted in relation to steps 220 and 365 could be undertaken independently of other processes involving common boundary definition or segmentation, and that the output may be synchronized in the session file editor 500 (FIG. 5) or otherwise using the resegmenting and retagging (FIG. 15) algorithm or similar techniques.

In the preferred approach, the training session file 310 is used to train speech user profile 312 for speech recognition 476 or automated nondictation speech or text processing 492 using common segmentation (See FIG. 4). Although not specifically shown in FIG. 3, the training session file 310, other data 315, or both may be used for training one or more pattern recognition programs other than those described using common segmentation definitions. For instance, the training session file 310 may also be used for other processes not using common segmentation, such as other speech recognition 454 or other automated nondictation speech or text processing (FIG. 3) 494 of FIG. 4.

Speech to Text for Dictation and Transcription

FIG. 4 depicts the particular case of process 300 (FIG. 3) where the speech input is for speech-to-text conversion, most generally involving dictation and transcription. Typically, file creation and management will be handled by a workflow manager such as described in relation to FIG. 1.

Speech-to-text file creation for dictation and transcription may begin with workflow selection 402 of dictation and transcription by the end user and entry of other identifying information. Workflow manager, as described in relation to FIG. 1, may regulate job activity sequence, file management, document retrieval, time tracking, and other process-related issues, and make information and data available to users, including previously transcribed dictations.

The workflow depicted in FIG. 4 may determine to process other session files resulting from speech or text input 301 (FIG. 3) on the workflow. The workflow depicted in FIG. 4 is one of many that may be selected embodying the methods described in the disclosure.

For purposes of speech-to-text conversion, important decision points determined by a specialized script running on the workflow manager workflow selection step 402 include segmentation selection 414. This determines whether only the common speech segmentation module (FIG. 6) 414*a*, other segmentation methods 414*b*, or both 414*c* will be used to process the input. If common speech segmentation option 414*a* is selected, untranscribed 426 and transcribed 436 session files will be synchronized to have an equal number of segments.

The other segmentation option 414*b* may include various approaches, such as traditional manual transcription 452 or speech recognition 454, that do not use a common segmentation module and will generally produce asynchronous output with a different number of segments. This option may include traditional manual transcription 452 without audio file presegmentation, manual transcription with a different presegmentation algorithm, or speech recognition 454 that does not use the common segmentation module. The other segmentation option also includes structured dictation originating with an empty session file (ESF) 464.

Workflow selection 402 may determine the source of speech input 301 (FIG. 3) in step 415 and transcription method in step 418. The speech input 301 (FIG. 3) options may be audio file 416 versus device audio (direct source) 448.

Audio file 416 handling may include manual transcription only 418*a* ("MT"), manual transcription with speech recognition 418*b* ("MT+SR"), or speech recognition only 418*c* ("SR"). If manual transcription only 418*a* ("MT") option is selected, the process may proceed to external segmentation 424 followed by processing of the resulting untranscribed session file in step 426 (see "A1"). While device audio (direct source) 448 could be used for manual transcription option 418*a*, in one approach, as described in FIG. 4, use of device audio is used only with speech recognition option 418*c*.

Consequently, in the preferred approach, the external segmentation application 424 presegments the audio file 416 for manual transcription in the session file editor 500 (FIG. 5), but speech recognition 476 processes an audio file 416 and device audio (direct source) 448. Speech input 301 processed by speech recognition 476 (options 418*b* or 418*c*) produces a transcribed session file in step 478 or untranscribed session file in step 482, depending upon whether transcribe or utterance mode is selected in step 451.

Transcription method selection 418 may be based upon such factors as speech user profile 312 (FIG. 3) training (e.g. trained vs. partially trained vs. untrained for speech recognition), as described by assignee in U.S. Pat. No. 6,122,614, "System and Method for Automating Transcription Services." The process may also consider user preferences, expense, processing availability, and transcription turnaround time.

Production of transcribed session file 478 or untranscribed session file 482 by one or more speech recognition instances 476 may be determined in the transcribe mode vs. utterance mode selection step 451. If transcribe mode is selected, the process follows option path "TR"451*a*. If utterance mode is selected, the process follows option path "UTT" 451*b*. Additional options and transformations are described further in relation to FIGS. 14, 14-1, and 14-2.

After creation of transcribed session file 478, depending upon whether there has been prior sort 486, the transcribed session file 478 may continue on workflow at step 436 (see "B") or unsort 432 (see "F"). The transcribed session file, in this approach, goes to decision point prior sort 486 for determination of processing by unsort (see "F") or post-human edit as a transcribed session file in step 436 (see "B").

The select workflow step 402 also may determine other options, such as whether to initiate production of two or more session files. Two or more session files may be produced by two or more instances of the same modality, e.g., server-based transcription, or by two or more modalities, e.g., manual transcription, server-based transcription, or by two or more modalities, e.g., manual transcription, server-based transcription, or real-time transcription. In one approach, this may be accomplished by copy audio file and distributing this to two or more transcription instances. These instances may be generated by manual, automatic, or both means.

The select workflow step 402 also may process transcribed or untranscribed session files to create secondary files for transcription by one or more additional transcription instances. As one example of this approach, as further described in association with FIGS. 14, 14-1, 14-2, speech recognition 476 using real-time, interactive techniques may also be used to produce an audio file 416 or untranscribed session file 426 for manual transcription with session file editor 500 (FIG. 5) or for speech recognition 476 using server-based processing.

In one approach, the process may determine 480*a* whether to create untranscribed session file in step 480*b* from the transcribed session file 478. If "yes," the result, in one approach, is the transcribed session file plus an untranscribed session file in option 480*c* ("TSF+USF"). Options for processing untranscribed session file are provided in step 483. In this approach, the process also determines whether to create audio file from the transcribed session file in step 484*a*.

If "yes," an audio file is created 484*b* with resulting output transcribed session file plus audio file in option 484*c* ("TSF+ Audio File"). The audio file may be used in step 416 for additional processing following transcription selection 418. If the "no" option to audio file creation 484*b* is selected, the workflow may proceed to the prior sort 486 decision point.

As determined in step 483, the untranscribed session file output 482 may go (option 483*a* "SR") to step 451 for further processing by speech recognition 476. It may also go for manual conversion in step 426 in session file editor 434 to a transcribed session file 436 (option 483*b* "MT"), or extraction of audio file 484 (option 483*c* "Audio File"). If option 483*b* "MT" is selected, the process follows the "A2" circle (FIG. 4) for processing untranscribed session file in step 426. Creation of untranscribed session file (USF) 480*b* from a transcribed session file in option 480*c* ("TSF+USF"), an audio file from an untranscribed session file in option 483*c* "Audio File"), or an audio file from a transcribed session file in option 484*c* ("TSF+Audio File") therefore represent, in one approach, a file for processing by a second or subsequent "transcription instance."

The workflow selection step 402 also determines if untranscribed or other files 426 will undergo sort/unsort. In this approach, session file segments may be numbered, sorted (unbundled), and distributed for processing by different transcription operators using the session file editor 500 (FIG. 5) or by offline speech recognition 476. The resulting "mini"-transcribed session files, consisting of different transcribed segments, may be later sorted (rebundled) into a unified transcribed session file 436. The distribution may be random or based on different work site activity levels or other factors.

In another approach, the sort results in a random order of the segments for processing by a single operator, that is, they are "scrambled" for single-operator processing. If the process decides to sort 428, the untranscribed sessions files or other files 426 are sorted or unbundled 428*a*, and the process determines 429 whether to send them to one or more session file editor 430 or one or more speech recognition option "H" following step 429. If the sorted segments are sent to one or more session file editors 430, they are sorted (rebundled) in step 432 in proper sequence.

If the sorted, untranscribed session file segments are sent for processing by one or more instances of speech recognition 476, one or more transcribed session files 478 are produced corresponding to the various parts of untranscribed session files sent to it. Typically, with prior sort 428, the workflow selection 402 will choose not to delete text to create untranscribed session file in optional step 480*b* and not create audio file in optional step 484*b*. Since there was a prior sort with respect to these files, the process determines "yes" in step 486 to send the various parts of the transcribed session files back for unsort (rebundling) in step 432, as indicated by "F" following the decision point.

Among its benefits, the sort/unsort process can promote confidentiality and security by limiting access, route certain transcription sections to better qualified personnel, or more rapidly complete a large transcription task. Similar techniques may be applied to other speech and language processing applications (FIG. 8) with segmented input.

After creation of one or more transcribed session files (TSF) in step 436 by manual conversion in session file editor (FIG. 434) or speech recognition 476, workflow selection may determine whether (in step 437*a*) to preprocess the transcribed session files in option step 437*b*. Step 437*b* may prepare a best result composite transcribed session file for use as a session file editor 500 (FIG. 5).

In step 437*b*, the preprocessing application may generate the composite from evaluation of two or more session files created from manual or automatic means or both. The preprocessing application is described further in relation to FIG. 11. The preprocessing application may shorten human review in session file editor 500 ((FIG. 5) in step 438 by preparing a best-result file that minimizes need for correction. In another approach, not specification shown in FIG. 4, a similar preprocessing application to that described in FIG. 11 may be used in the sort/unsort process to preprocess the rebundled session files after unsort 432 and before manual review with session file editor 500 (FIG. 5) in step 434.

After optional preprocessing, in the dictation and transcription workflow, session file editor in step 438 is used to create a final transcribed session file 440 with the final report, document, or letter. The session file editor is used in step 442 to create a complete transcribed session file 444 that includes verbatim text, text annotation, audio annotation, and other possible markups to the final transcribed session file 440. After CTSF completion, the session file is sent for postprocessing 446. This may include additional formatting and other changes.

The select workflow step 402 may also determine whether activity will include structured reporting, a format that directs the speaker to provide defined information segment by segment. Where structured reporting is desired, bounded dictation audio input may also be created from an empty session file (ESF) 464. An ESF has boundary markers only with no text, audio, or other data tags. In step 468, a dictation with one or more bounded divisions may be created with the audio annotation feature 528 of session file editor 500 (see FIG. 5N) that is accessed by the annotate tab 5100.

Using this feature, the operator may record dictation for each segment based upon categories or fields (such as "patient name," "social security number," and so on) assigned to each segment. Unlike an untranscribed session file produced by external segmentation 424, the dictation audio speech input 301 (FIG. 3), the incomplete session file (ISF) from structured dictation is divided based upon dictating speaker selection of division points, not utterance breaks based upon silence length. The incomplete session file enters the routine workflow at step 426, as indicated by circle "D".

Figure 12:
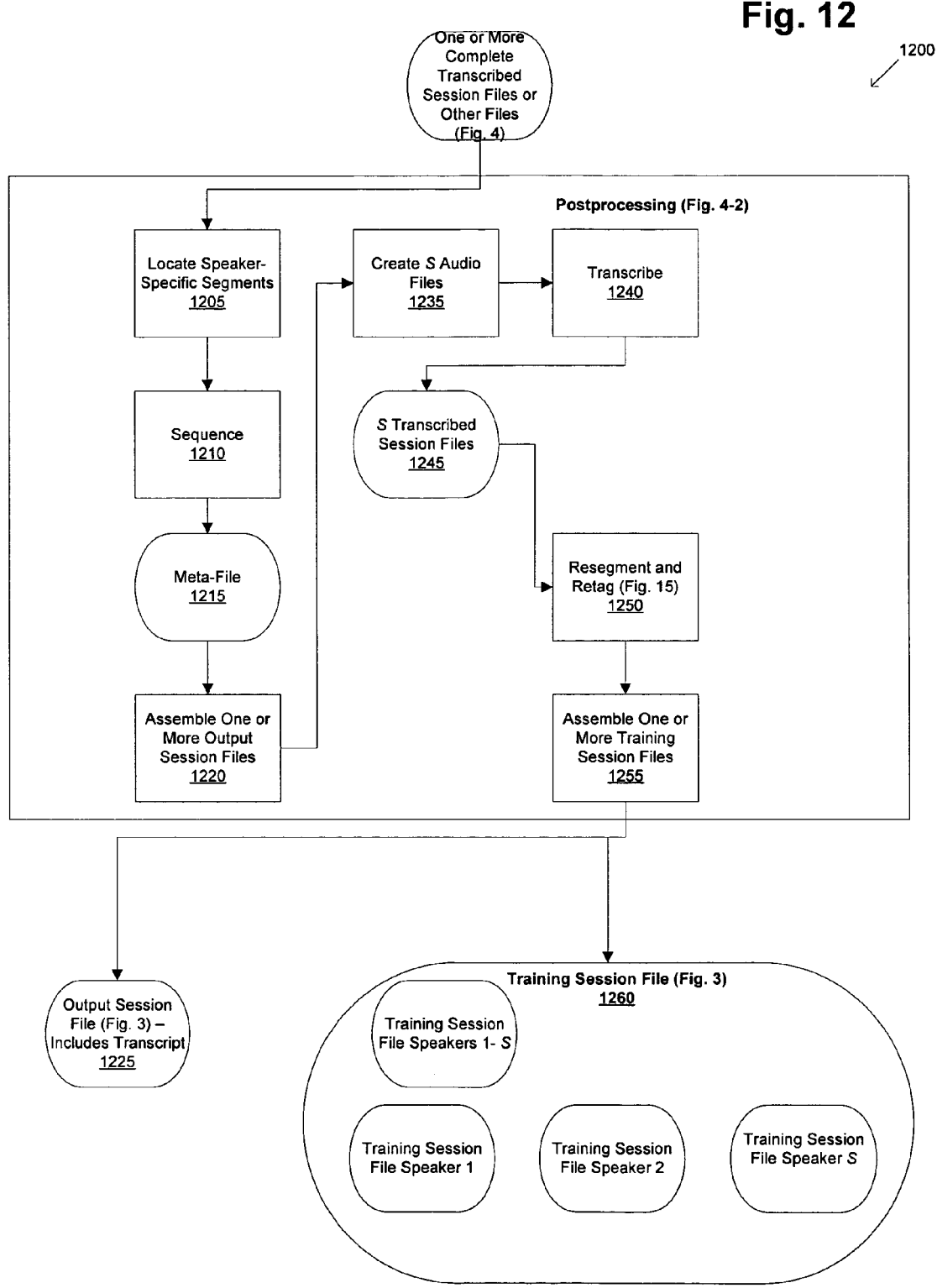
FIG. 12 is a flow diagram illustrating an exemplary embodiment of postprocessing a transcribed session file from more than one speaker (single channel) based upon speech input from two or more speakers.

After determination of file routing, production, and other issues by workflow selection 402, selection of speech user 404 may be initiated by entry of speaker identifying information into a workflow manager. If there are two or more speakers, each sharing a common microphone 102 or other single channel, this may be considered a "multispeaker, single channel" case. This is functionally equivalent to a multiport recording where a single audio file results from merging of the different line input. In other instances, there may be two or more speakers each using a different microphone 102 or other recording device. This case may be considered, "multispeaker, multichannel." Both multispeaker "single channel"

and "multichannel" speech input 301 (FIG. 3) may be processed on the routine speech-to-text workflow and verbatim transcript of a meeting or legal proceeding formatted in the postprocessing step 446, as disclosed in relationship to FIGS. 12, 13.

Selection of speech user identity 404 may be used by a transcriptionist or a speech recognition correctionist to format session file editor 500 (FIG. 5) output according to the personal preferences of the speaker. With speech recognition 476, this information may be used to select the appropriate acoustic model. The speech-user selection preferably results in loading a speech user profile, such as that created in step 312 (FIG. 3), that accurately reflects the acoustic properties of the speech input given the current device, speech rate, speaker health, background noise, and other conditions.

Speech user selection 404 also affects selection of segmentation parameters. To promote speech recognition accuracy, segmentation data used to create a speech user profile also may be used during speech recognition to preprocess the same speaker's speech input before speech-to-text decoding. Segmentation parameters are preferably also speaker-dependent for external segmentation 424 of an audio file. However, based upon experience of the assignee of the current application, pause lengths that trigger utterance segmentation may be set such that the same parameters may be used by individuals with similar speech styles and rates.

For the single channel, multispeaker case, a single speech user profile 312 (FIG. 3) composed of training session file data 310 from two or more speakers may be used. Determination of speech segmentation parameters (FIG. 6) is dependent upon characteristics of the multispeaker speech input 301 as a whole, not the speech characteristics of a single individual.

In the next step 406, a work type is selected that indicates the subject matter and document type (e.g., patient history, business letter, scientific report, legal memo, etc.). In manual transcription, this information may be used to select format or style. In a multispeaker setting, this may include selection of document template for verbatim transcript. Where speech recognition is used, this "work type" selection may determine selection of appropriate language model and lexicon most suited for the expected word use.

If workflow selection 402 has determined that speech recognition 476 will be used in step 408, the process selects a vocabulary 410. This may limit the number of words in the lexicon applied to the language model and increase accuracy by reducing selection alternatives. Once the appropriate lexicon has been selected in step 410, speech input 412 is recorded 413. Alternatively, in manual transcription, the process would begin with record 413 after selection of work type 406.

Based upon select workflow 402, the process also determines 414 segmentation method. Use of common speech segmentation module (FIG. 6) in option 414a results in identical segmentation parameters for speech input 301 (FIG. 3) and identical number of segments in one or more untranscribed 426 and transcribed 436 session files.

By selecting (in step 414) "common" and following path 414a, the process next determines 415 whether to create an audio file 416. If "yes," it proceeds to transcription selection step 418. Path 418a ("MT") is followed if manual transcription is selected, followed by external segmentation 424 with common segmentation module, as described in FIG. 6. The result may be a single untranscribed session file (USF) 426. If the process 428 determines "no" to the sort option, the untranscribed session file (USF) may be converted using the session file editor in step 434 to create a single transcribed session file 436. If there is only a single transcribed session file, it will not be processed in the optional preprocessing step 437b designed to produce a composite, best result based upon evaluation of two or more transcribed session files generated from step 436.

In another approach, a single transcribed session file from step 436 may be copied and processed by two or more manual transcriptionists using the session file editor (step 434). This will create two or more transcribed session files 436. The text output may be evaluated in the preprocessing step 437b before review in the one or more session file editor step 438.

Alternatively, after speech user profile 312 has been created in process 300 (FIG. 3), the speech-to-text workflow may determine 414 to use common segmentation option 414a, determine 415 to create audio file 416, and select 418 speech recognition only 418c ("SR") option. Depending upon workflow selection in transcribe vs. utterance mode step 45 1, transcribed session file 478 or untranscribed session file 482 is produced. If two or more instances of speech recognition 476 are used, two or more of the respective session files are produced.

An audio file 416 may also be converted by two or more instances of the same speech recognition program 450 using two or more speech user profiles or different configurable options that will produce differences in text output. This will produce two or more transcribed session files However, in the preferred approach, the one or more instances of the speech recognition program 476 use the same speech segmentation parameters (FIG. 6) in order to generate synchronized output with an identical number of segments.

Alternatively, after selection of common segmentation option 414a, the transcription selection step 418 may select a third transcription option 418b ("MT+SR"). This results in manual transcription plus speech recognition with speech recognition 476 to produce one or more transcribed session files (TSF) 482. These may be reviewed by the session file editor 500 (FIG. 5) in step 436 along with manually-generated output. Since the workflow process 400 (FIG. 4) for session file creation from segmented and synchronized speech input is designed for integration with other dictation and transcription methods, the process may also select 414 speech-to-text processing that does not use common segmentation or any segmentation (designated "other" in path 414b).

For instance, traditional manual transcription (as may be used in step 452) is an example of a process that does not segment dictation audio prior to processing. Off-the-shelf speech recognition programs (as may be used in step 452) typically are not synchronized with manual input and are examples of workflow that do not use common segmentation. The process may also select common segmentation plus other segmentation. This is indicated in option 414c ("common+other"). As indicated in step 449, the process may also select structured dictation starting with empty session file 464 (option 449a).

To support job activities other than manual transcription and speech recognition, the workflow select 402 may also process one or more compatible files 460 files from manual and/or automated nondictation speech or text processing (FIG. 3) 492. Automated processes using common segmentation module (FIGS. 6,10) are described in relation to FIGS. 7, 8, and 9. The automated processes in step 492 may include speech recognition for command and control, interactive voice response (IVR),and text-based audio mining (FIG. 7), speaker recognition, phoneme-based audio mining, text to speech, phonetic generation, machine translation, and natural language understanding (FIG. 8). In step 492 the workflow may also select similar processes performed by manual means, as described in relation to FIG. 3, with examples provided in FIGS. 4 and 9. Other manual and/or automated nondictation speech or text processing (FIG. 3) 494 that do not use a common segmentation module 494 may also be included in the workflow. Output from manual and/or bounded image/audio data processing (FIG. 2) step 496 using common boundary definition and different boundary definition (FIG. 2) 498 may also be processed.

The result of processing data in one or more third-party applications may be one or more other files 456 that need conversion 458 to the proprietary .ses format. This results in session files 460 compatible with use in the session file editor 500 (FIG. 5). Some text files, such as .rtf, .txt, or .html, that may be output by other transcription processes will not require conversion to the proprietary .ses format. After any file conversion, load point in the workflow is determined by file type. An untranscribed session file or incomplete session file typically has been segmented and contains tag lines for a single data type, e.g., text or speech. It may be loaded into one or more untranscribed session files or other files at step 426, as indicated by "E". Transcribed session files, other transcribed text, or other session files with two or more tag lines may be loaded into one or more transcribed session files (TSF) or other files at step 436, as indicated by "G".

Session File Editor

The session file editor may be used in a number of the data input transformations, including those involving source input of speech, text, other audio, or images. One approach to a session file editor process is described in association with FIG. 5 (5-1, 5-2 and 5-3).

Figure 5A:
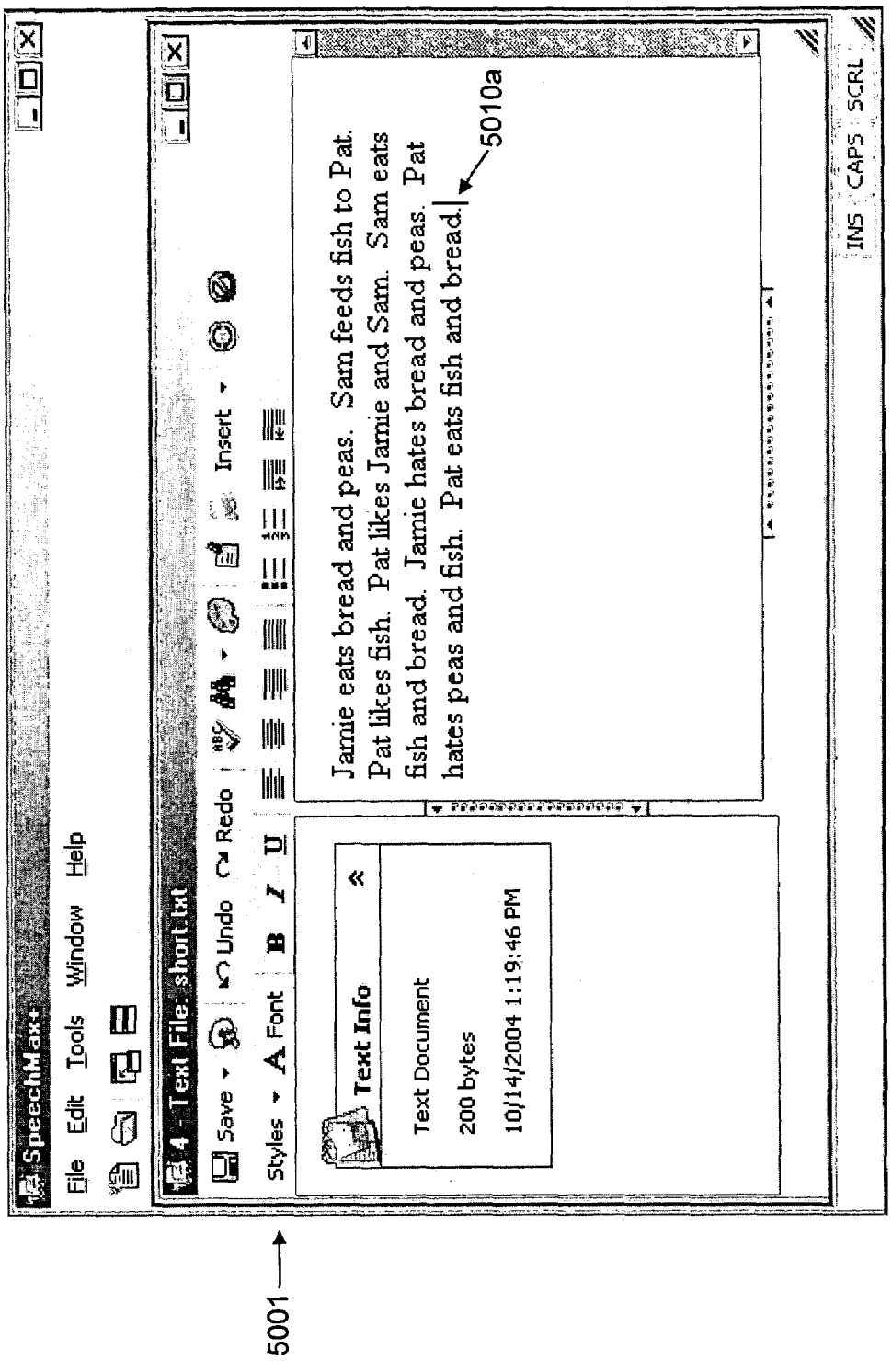
FIGS. 5A through 5BB illustrate an exemplary embodiment of the graphical user interface of a session file editor.

The session file editor process 500 may begin with the select basic options (tools) step 501. This may include selection of basic display settings, hotkey definition, selection of spellchecker spelling dictionaries, configuration of style sheets, macro definition, selection of one or more USB playback devices and the activation or deactivation of certain graphical toolbars, as illustrated in FIG. 5AA. Style sheets may be used to handle layout of text in the editor and may be used to indicate the appearance of utterance (segment) markers and other display elements. One toolbar icon for style sheets is illustrated at 501 in FIG. 5B. Select basic options step 501 may further include selection of advanced display settings for text compare and for multispeaker transcript session files and associated text file transcripts.

The next step in the session file editor process 500 (FIG. 5) may be selecting language mode 502. For instance, the session editor could be made to accommodate various languages (e.g. Arabic, Chinese, English, French, Greek, Hebrew, Japanese, Spanish, and Russian) and dialects. In the Windows® operating system, input language and keyboard layout are determined by configuration of "regional options" from a list of installed input locales. In step 502, the user might select input language by selecting an icon in the system tray of the operating system.

An exemplary graphical user interface showing basic editing of data in for example, .rtf, .txt, or .html format is illustrated in FIG. 5A. This graphical user interface 5000 and others provided with this disclosure are generated within a Windows® Operating System environment. As such, these graphical user interfaces and other features of the systems and methods assume input/output operation and other Windows® functionality to the extent that it does not conflict with the operation of the systems and methods. As would be understood by those of ordinary skill in the art having the present specification before them, various other operating systems may be used instead of Windows®, including Linux, Java®, Macintosh®, and others.

In one approach, the session file editor may only open a session file with a proprietary format (.ses). This proprietary format may use Extensible Markup Language (XML).

In one approach, the editor 500 may support editing of basic text, including use of structured formatting commands, e.g., style, bold, italics, underline, font, and color, as illustrated in the toolbar 5001 in FIG. 5A. As also shown in FIG. 5A, special style formats may also be included, e.g., headings, bulleted lists, numbered lists and text alignment controls. In "html" mode, the user may format text, as found in a standard email client, with headers, footers, and other attributes, including hyperlinks to image, audio, and other files.

In one approach, the operator may load one or more audio files (step 503), playback the loaded audio file (step 504), and create new text in the graphical user interface 5000 of the session file editor (step 505). This integrates the functionality of traditional audio playback and text processing software. The operator may also audio annotate 528, text annotate 529, or verbatim text annotate 531 a selected sentence, phrase, or word within the text file displayed within the interface 5000 by clicking-and-dragging the pointer in a Windows® environment and selecting the text to be so annotated.

Figure 5B:
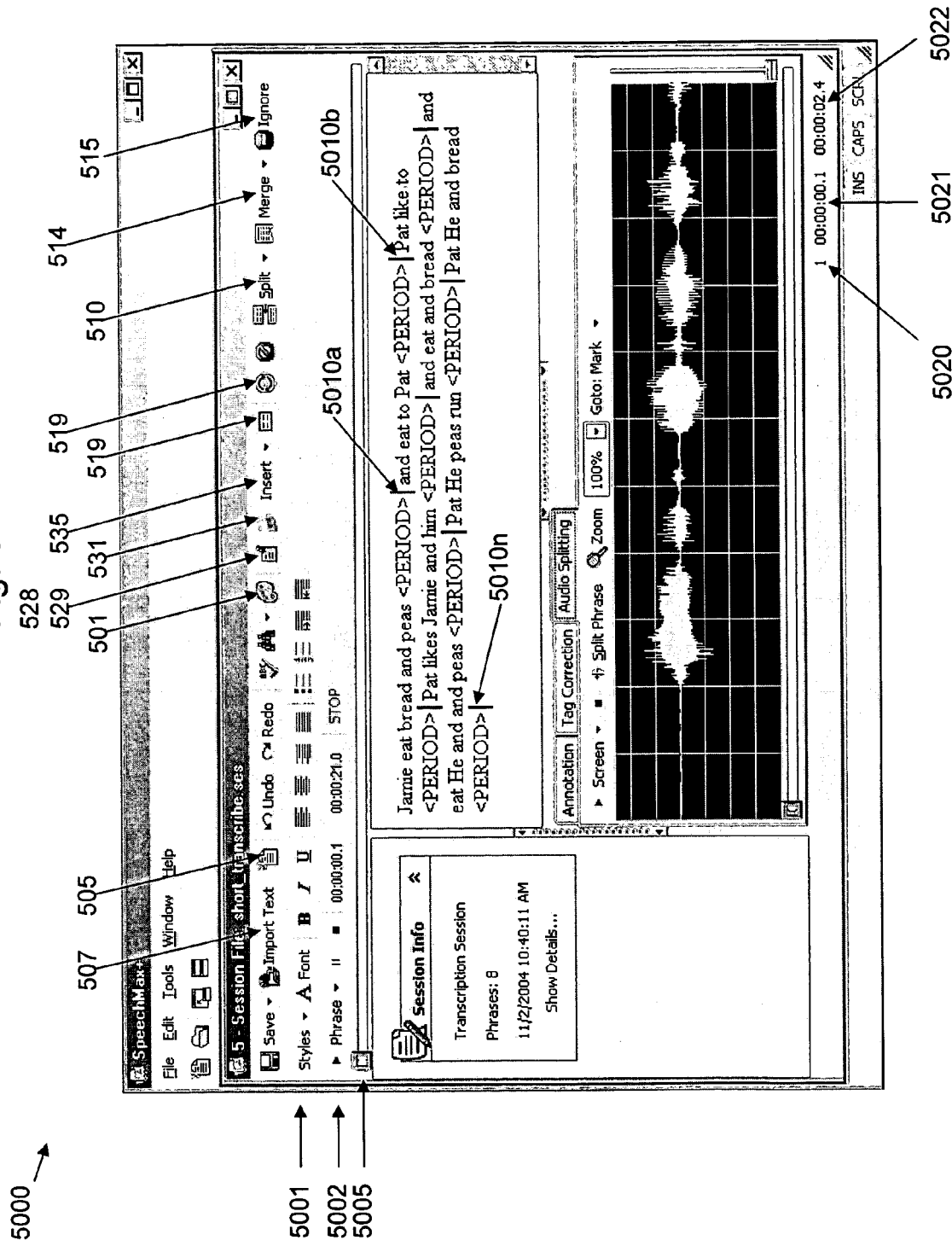

As shown in FIG. 5B, the session file editor 5000 in session file editing mode and other modes may incorporate segment audio playback as illustrated in the toolbar 5002. In one approach, the operator may load one or more session files (step 506) and playback aligned audio (step 508). Using the same playback feature, the operator may also playback a word if an individual audio tag exists for the word, though this is typically only available with speech recognition, such as described in step 476 of FIG. 4.

The operator may also or alternatively load one or more text files (step 507) by using the File/Open menu of the toolbar or associated standard Windows® icon and edit that text in the graphical user interface 5000 with or without audio playback. In one approach, the Import Text button, as illustrated in FIG. 5B, may be used in the load a text file (step 507). This may be used with verbatim transcript or script when "splitting" the audio of an untranscribed session file 426 whereby the operator aligns audio segments of the session file to corresponding text.

As shown in FIG. 5B, each audio-aligned text segment may be indicated in the session file editor 5000 by a special marker 5010a, 5010b, . . . 5010n. The appearance of the special marker depends on the style sheet selected in step 501. Based upon the style sheet, the text segment markers correspond to divisions between utterances. In both the basic text/html and session file editing modes, the user may also open one or more buffered read/write windows within the main window. As illustrated in FIG. 5B, each window may further include information about file and segment audio. As illustrated in FIG. 5B, the audio tool bar 5002 displays, from left to right, the current position and duration of the loaded audio file for each buffered read/write window. A slider bar 5005 may also be associated with each window.

The identification number of the segment 5020, start 5021, and duration 5022 times of the selected utterance are displayed at the bottom of the buffered read/write window. During auto playback, segments may be played continuously. With playback, the slider bar 5005 may appear to be moving directionally to the right, and display with the played duration time 5022 and segment identification number 5020 will change. This bar 5005 may be "dragged" to a new position along the bar to change the current play position within the audio file.

Figure 5C:
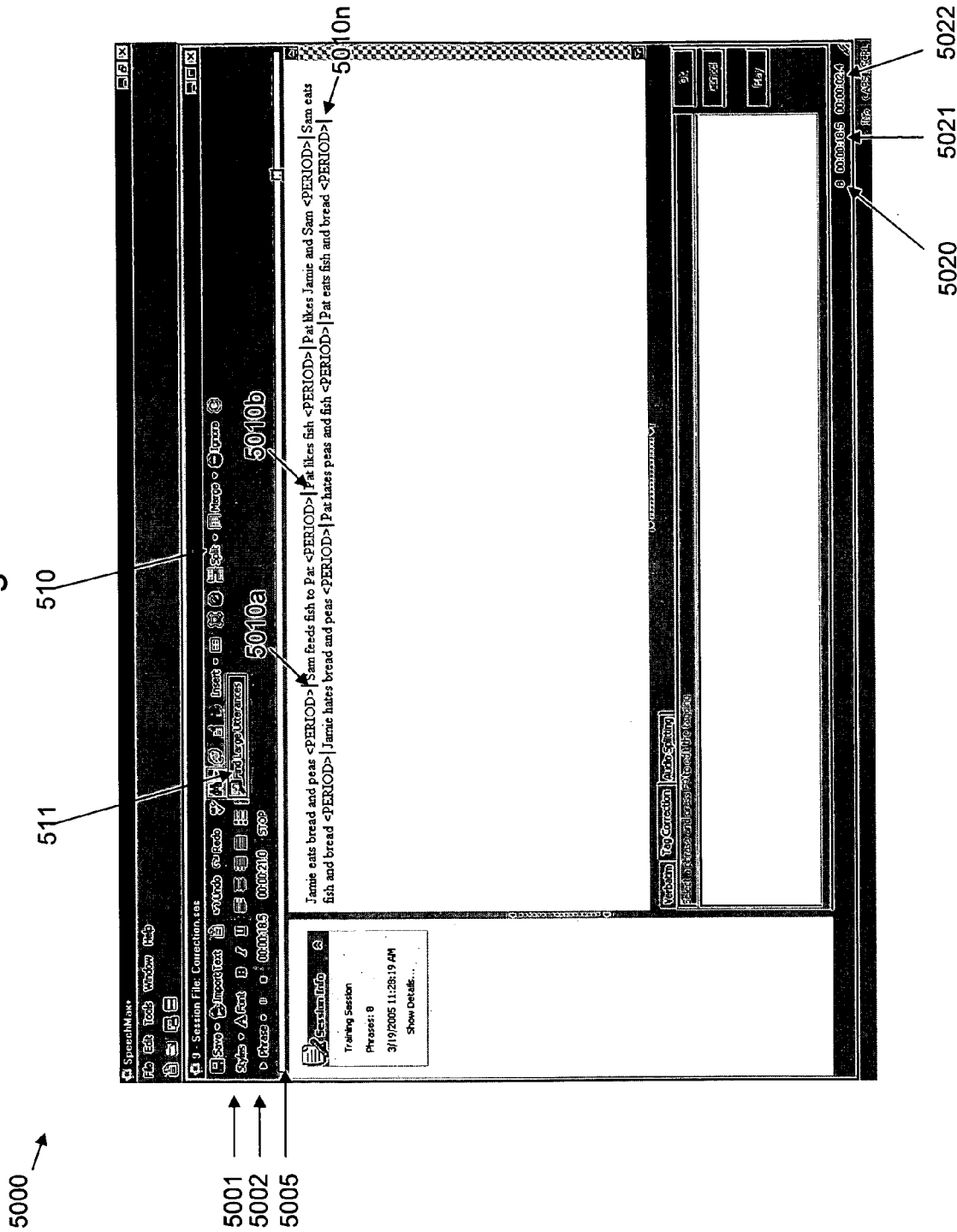

Generating training data mode (step 516) may also be similar to session file editing, but in the training data mode, session file may initially consist of audio-aligned utterance boundaries without text in an untranscribed session file. Session file creation from conversion of speech to text of FIG. 4 may result in creation of one or more transcribed session files (TSF). Exemplary graphical user interfaces showing an untranscribed session file (USF) 5030 and partial transcription 5040 are shown in FIGS. 5K and 5L, respectively.

Editing mode may also use phonetic transcription. An exemplary graphical user interface for this session file editor 500 mode is illustrated in FIG. 5J. Corresponding standard-English text for this phonetic transcription is shown in FIG. 5B. Based upon the style sheet selected for these examples, text segments are indicated by the darker vertical markers. Word divisions are indicated by lighter markers. Phonemes are separated by a space. In this example, tokenized punctuation for <PERIOD> is represented by phonetic pronunciation "p ih r iy ah d". Presently, using the phonetics editor requires a session file transcribed using a speech recognition mode that returns phonetic spellings.

The session editor 500 may also facilitate audio playback of a segment or one or more selected words (step 508). The session editor 500 may support USB playback devices (e.g. a transcriptionist foot pedal 110), a mouse 106, keyboard 108 and/or other user input mechanisms for navigation of audio and continuous playback, or playback of selected utterances.

Various additional features of the session file editor process 500 are described in FIG. 5. The features of the session file editor may be used in different combination depending upon the task.

Real-time speech recognition programs commonly use a modified text processor for display and editing of real-time results. In another related approach, the session file editor 500 (FIG. 5) may be adapted for use as a front-end, graphical user interface 740 (FIG. 7) for a real-time speech recognition pattern recognition application. The speech recognition application may reside on a local computer or another computer on a network (see FIG. 1A). In this approach, the speech recognition application (FIG. 7) internally builds and stores session file data segment by segment. The session file data may include audio and other session data as is described in relation to FIG. 14. As the data is being accumulated "on the fly," audio-aligned text may be displayed in a buffered read/write window, such as displayed in FIG. 5B.

In this approach, the operator may edit the text (see 520), separately create verbatim annotation (see 529) for a training session file 310 (FIG. 3), or use other tools of the editor as may be adapted for use with a real-time application. Style sheets configured in basic options setup 501 may be used to handle layout of text or to indicate the appearance of utterance (segment) markers and other display elements. The session file editor 500 (FIG. 5) may be used for speech recognition program using common segmentation 476 or other speech recognition 454.

Figures 1, 19:
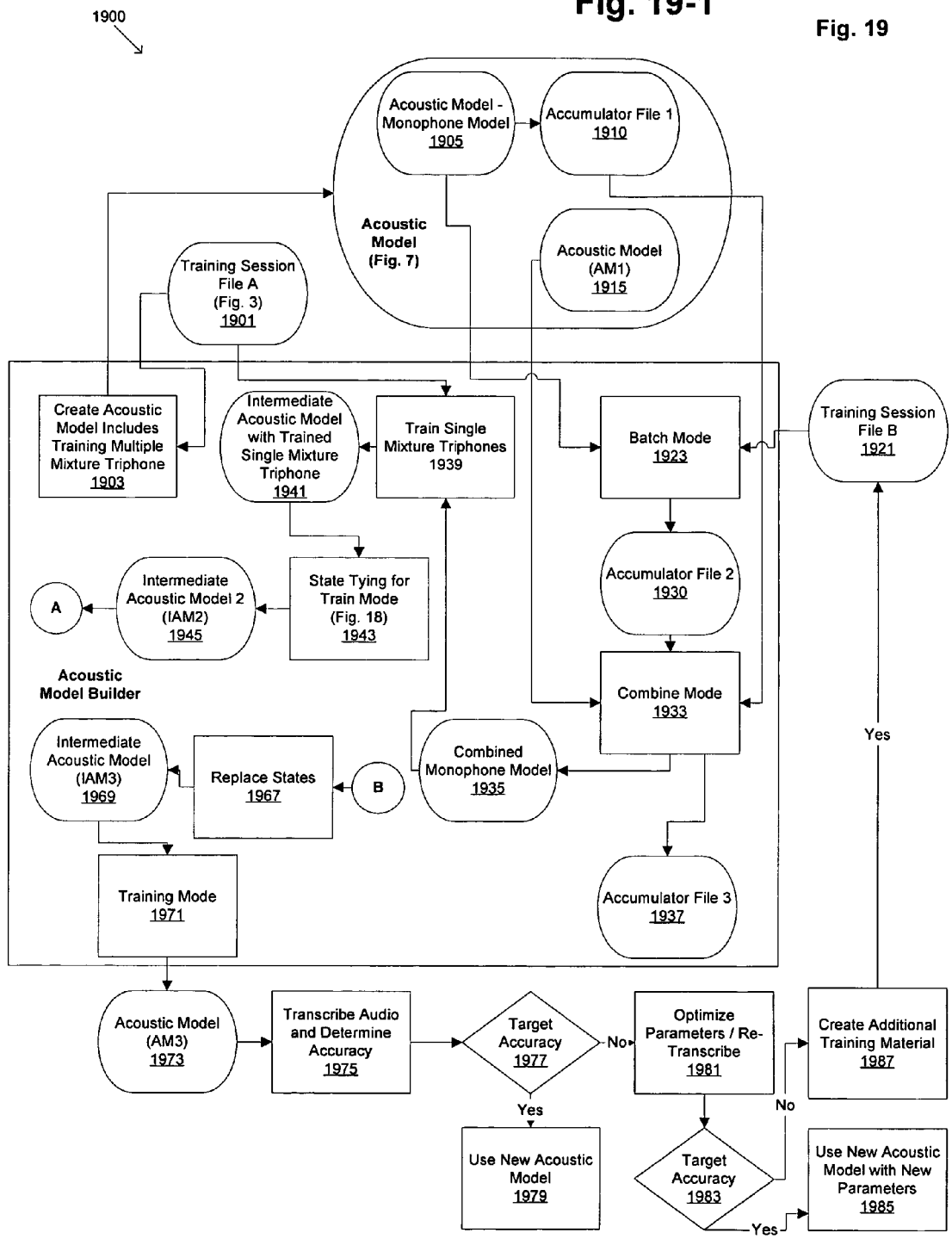
Figures 2, 19:
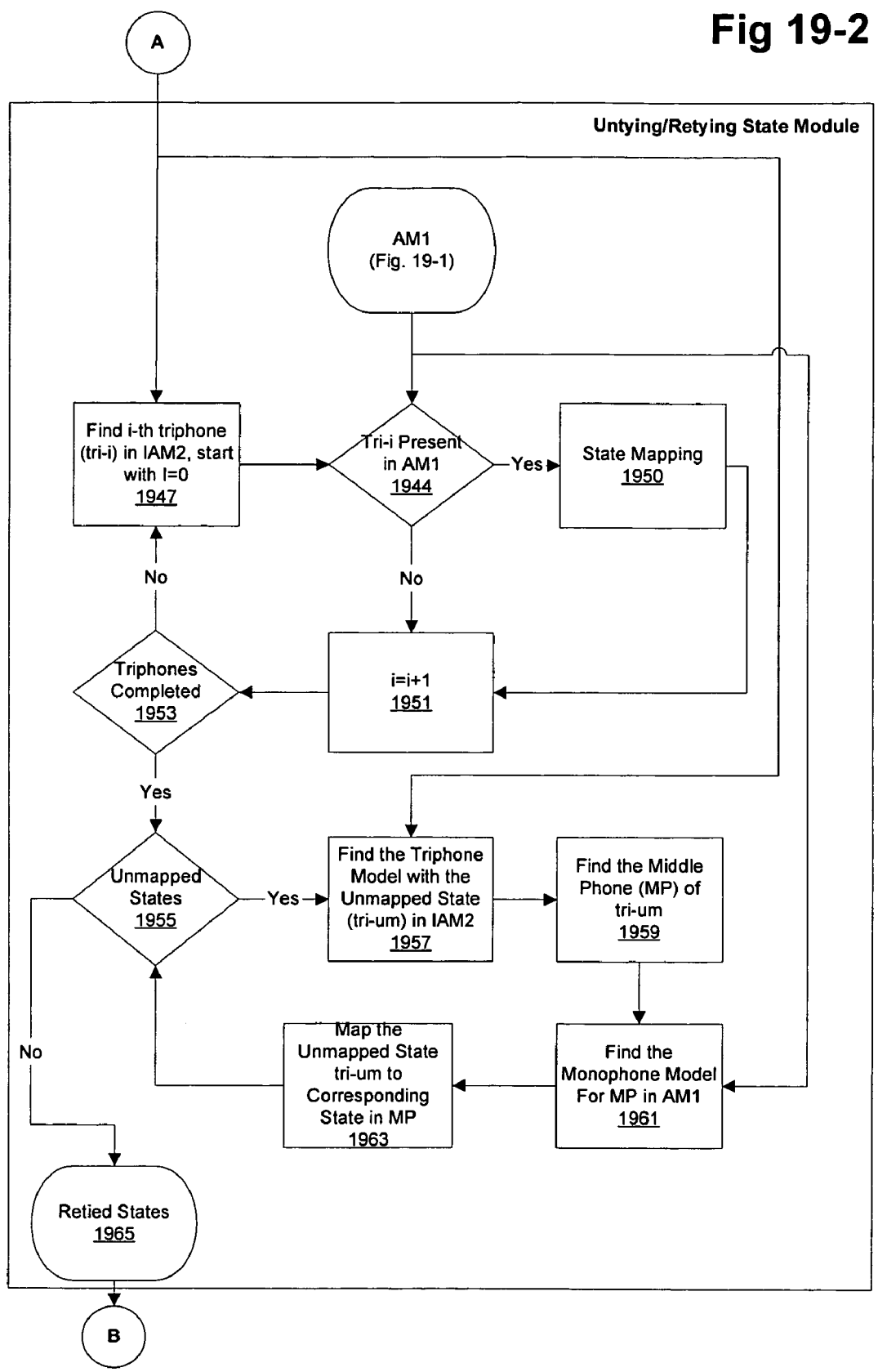

In a further related approach, two or more users, each with a separate microphone or other recording device as described in relation to FIG. 1, may dictate each using a real-time separate speech recognition application (FIG. 7). The real time transcription from each of the two or more users may be separately in a separate window of the exemplary session file editor 500 (FIG. 5). Those skilled in the art with the present specifications before them, will recognize that, using zeroing techniques described in relation to FIG. 13, the transcribed text may be chronologically displayed in the separate buffered read/write windows. In one approach, text annotation 529 is automatically created that indicates time overlap of dictated words or segments in the two or more buffered windows.

Use of Common Segmentation

In the preferred approach, common segmentation (FIGS. 6, 10) is used for processing of speech or text input, as described in FIG. 3. With respect to manual transcription and speech recognition for dictation, the process 400 (FIG. 4) is described with respect to a single speaker or two or more speakers.

A. Untranscribed Session File (USF)

In the transcription industry, the process of creating a transcribed report, document, or letter for a single speaker typically begins with dictation and recording an audio file. In the exemplary approach, shown in FIG. 4, the one or more untranscribed session file 426 may result from presegmentation with external segmentation application 424. An untranscribed session file 426 may also be optionally created 480$b$ from a transcribed session file from speech recognition 476. In the exemplary approach, an untranscribed session file 426 may be converted to a transcribed session file manually with session file editor 500 (FIG. 5) or speech recognition 476.

In the speech to text process 400, the process may select a dictation and transcription workflow 402 for single speaker processing. If there is no speech user profile available to process the speech input 412 with speech recognition, a manual only workflow is selected. In select speech user 404, the process selects speaker name or other identification. Work type is selected 406 to assist the transcriptionist in formatting completed document, letter, or report. Each speaker may have different preferences. Work type also may indicate subject matter or topic of the dictation. This is followed by process decision 408 whether to restrict word selection. As there is manual transcription in the training, preautomation phase with no speech recognition, the process may decide "no" and move to speech input 412 step, record 413, and determine 414 to segment with common segmentation parameters in option 414*a*, and determine 415 to create audio file 416.

In some instances, in manual processing, the workflow selection 402 may decide to restrict word selection 408 to indicate to the human operator that word choice should be limited to a certain field or topic. For instance, by indicating a restrictive vocabulary, the process may convey to the transcriptionist that a certain subset of words from a general vocabulary is to be used, e.g., using a cardiology vocabulary that is a subset of a general physician word list.

The external segmentation software used in step 424 to segment the audio file 416 may share a common segmentation module with speech recognition software. As described in FIG. 6, the first step 601 within the speech segmentation module 600 is to determine whether the module uses silence detection or another method. By using an identical segmentation module, the external segmentation application 600 creates an identical number of segments from the speech input as would be created by server-based or real-time speech recognition 476 using the common speech segmentation module.

In one frames-based silence detection method, statistical analysis for each window of sound (e.g. 100 msec in length) may be performed using moving sample window techniques in relation to the defined silence and sound thresholds. Sometimes the preceding edge of an utterance has low level of speech audio that may be below the threshold. To insure that low, audible levels of spoken sound are not misinterpreted as silence and cut off, two separate frames of silence are attached at the beginning of utterance. Essentially, in this approach, to define the beginning of sound, a sound threshold of consecutive frames of sound may be required. To define the silence before or after an utterance, a silence threshold of consecutive frames may be necessary.

The communication to and from the upper layers of the external segmentation software 424 may be managed by a speech application programming interface (SAPI) in step 602 (see FIG. 6). Start and end sets may be written to a buffer, resulting in delimiting an utterance. The segmentation process may identify the start and duration of an utterance within the audio stream, and return this result in a buffer to the application programming interface.

SAPI may build a result message to send to the calling application about the audio segment found by the process to include the start time, duration, and audio data of the segment. In this case, the calling application may be an external segmentation tool 302/420 of the system and method. Silence on either side of the word, or between utterances, may be deleted by the external segmentation tool As described further in relation to FIG. 14, the amount of silence that is "spliced" out, if any, depends upon a number of factors, including availability of an audio file 416 in the assembly stage (step 1448) of an untranscribed session file (USF), corresponding to the untranscribed session file in FIG. 4. In one approach, to promote efficient processing, as described in relation to FIG. 14, a short predefined gap (step 1447), for instance 250 milliseconds, may be inserted in place of the deleted silence that provides for an audible separation of the utterances, but minimizes playback time for the transcriptionist. In another approach, as later described for one form of manual conversion, the utterance boundary may be marked by a short audible tone. This may be more appealing to some transcriptionists who prefer an audible cue, rather than visualized boundary marker.

Frames may be scored 0 for silence and 1 for sound in step 603. The silence threshold may be selected as 4 frames, as in step 604. The sound threshold may be selected as 3 frames, as in step 605. A start set for the utterance may be created once 3 initial frames of "1" are obtained. If 3 score frames of "1" are obtained (step 606), the speech segmentation module process may determine if the current data is an "utterance" based upon "memory" of prior frames. If the current data is not in an utterance, the process will calculate and set the start frame, step 607. In a preferred approach, start frame is set as current position minus 5 samples (to include 2 silence frames as keep frames at beginning of utterance). After each score of "0," the process may ask if it is in the utterance based upon memory of prior frames step 608.

In one approach, after 4 consecutive scores of "0", the end set is created, step 609. If there are 4 consecutive scores of "0", the method analyzes again if it is in an utterance, step 608. If it is, the system calculates and sets the end frame at the current position, step 609.

The data may be assembled into a single utterance and placed in an utterance buffer, in step 610. The results may be sent to the speech application programming interface and processed by the external segmentation application to create an untranscribed session file, step 611. As would be understood by those of ordinary skill in the art having the present specification before them, other numbers of frames (as represented by the foregoing constants) may be selected for the segmentation process while achieving the same or similar.

B. Transcribed Session File (TSF)

As shown in FIG. 4, one or more transcribed session files (TSF) for single speaker may be created by different sequences of automatic 476 and manual converting means with the session file editor 500 (FIG. 5). If the common segmentation module (FIG. 6) is used, transcribed session files are synchronized via the segmentation process. Synchronized TSF may also be created from an empty session file 464 with structured dictation, other manual transcription 452, and other speech recognition 454 if these files have been synchronized in step 518 of the session file editor process (500). Synchronized transcribed session files may also undergo preprocessing 437b (FIG. 4). The one or more transcribed session files may also be processed in the session file editor 500 (FIG. 5) for creation of final transcribed session file 440 and complete transcribed session file 444. Transcribed session file for two or more speakers is also available.

1. Manual Transcription for Single Speaker a. Transcription from Untranscribed Session File The operator may load one or more session files into the session file editor 500 (FIG. 5) in step 506. One or more of these session files may be an untranscribed session file (USF) 426. Based upon the style sheet selected in step 501, the GUI 5000 may appear with vertical markers representing utterance boundaries. See 5010a and 5010n in FIG. 5K. The operator may select and playback any segment in step 508 and navigate to successive segments to playback the audio aligned to each segment. The operator may also playback the untranscribed session file 426 utterances continuously using a built-in playback function, or playback the dictation continuously 504 from an audio file 416.

In one approach, the operator sequentially transcribes the segments of the untranscribed session file with the text corresponding to the segmented audio to create a transcribed session file (TSF). See FIG. 5L. The operator may transcribe using regular keyboard entry for punctuation.

In one approach, the operator may transcribe using punctuation tokens, e.g., <PERIOD>, especially if the resulting text is for speech engine training (See FIG. 5B). For example, these tokens may be inserted during transcription with use of "F11-function key," (see FIG. 5BB) with execution of a macro that converts the punctuation "." to its tokenized form. This would be consistent with keyboard-activated macros widely-used in transcription. In another approach, the punctuation may be formatted to tokens using the reverse format step 530, after completion of the transcription. The reverse format step 530 may use a macro-activated regular expressions tool.

In some instances, the audio also may be poor quality with a large amount of background noise or otherwise unsuitable due to coughing, sneezing, lip smacks, or other speaker-generated noise. Using the Ignore button 515 (FIG. 5B), the operator may deselect any audio utterance and text for training in the ignore utterance step 515. In another approach, the operator may deselect an audio-aligned word or word subunit. In a related approach, the operator in step 535 may also mark nondictated text so that it is not included when generating training data. As illustrated in the drop down menu of FIG. 5D, the operator may use "Insert Header," "Insert Footer," and "Insert Untagged" to insert text that is excluded from the training process, marking it as non-dictated text 535. A training session file 310 (FIG. 3) may be generated that includes audio-aligned text 350. The user may embed audio 538 or compress embedded audio 539 in the file.

Figure 5D:
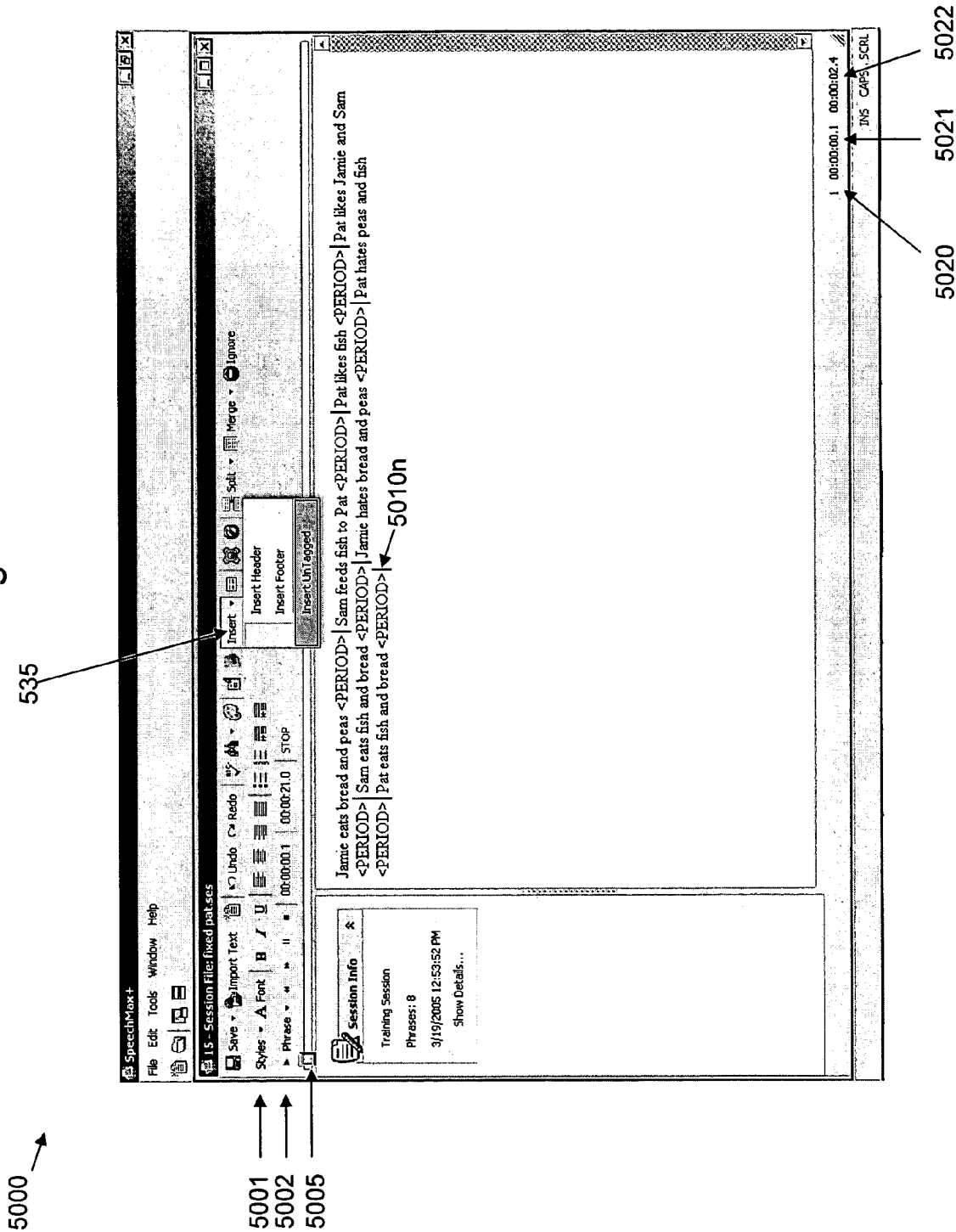
Figure 5E:
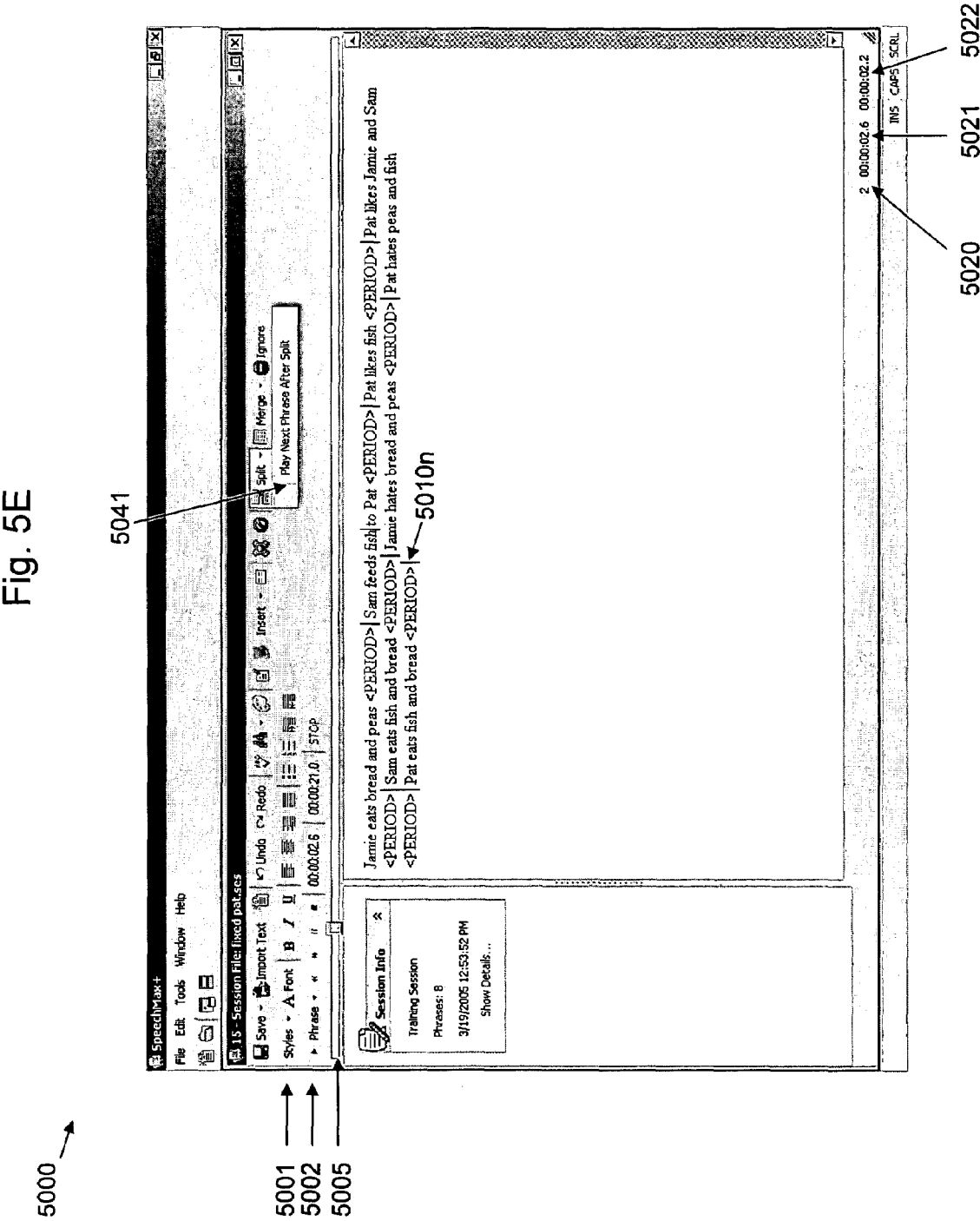
Figure 5F:
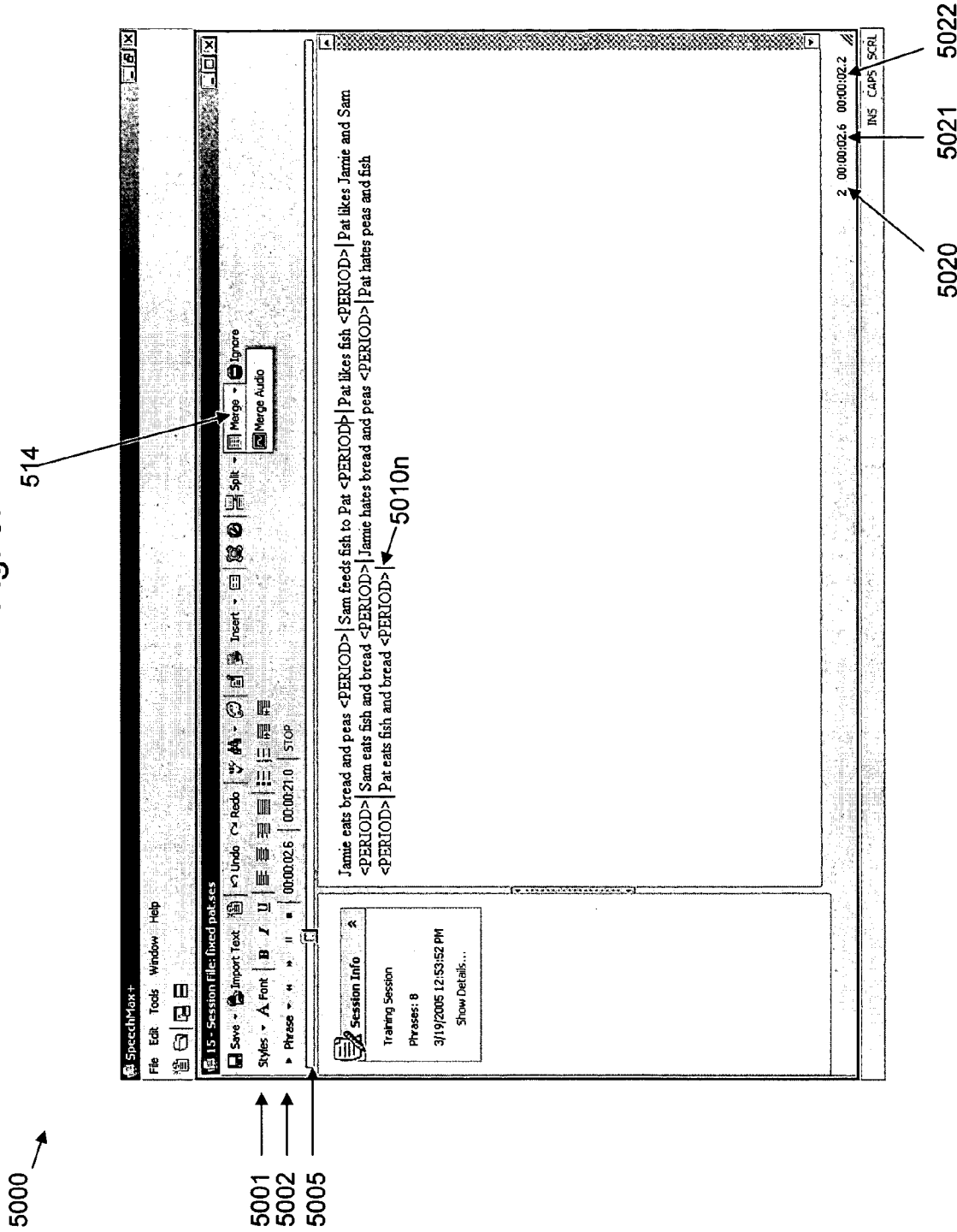
Figure 5G:
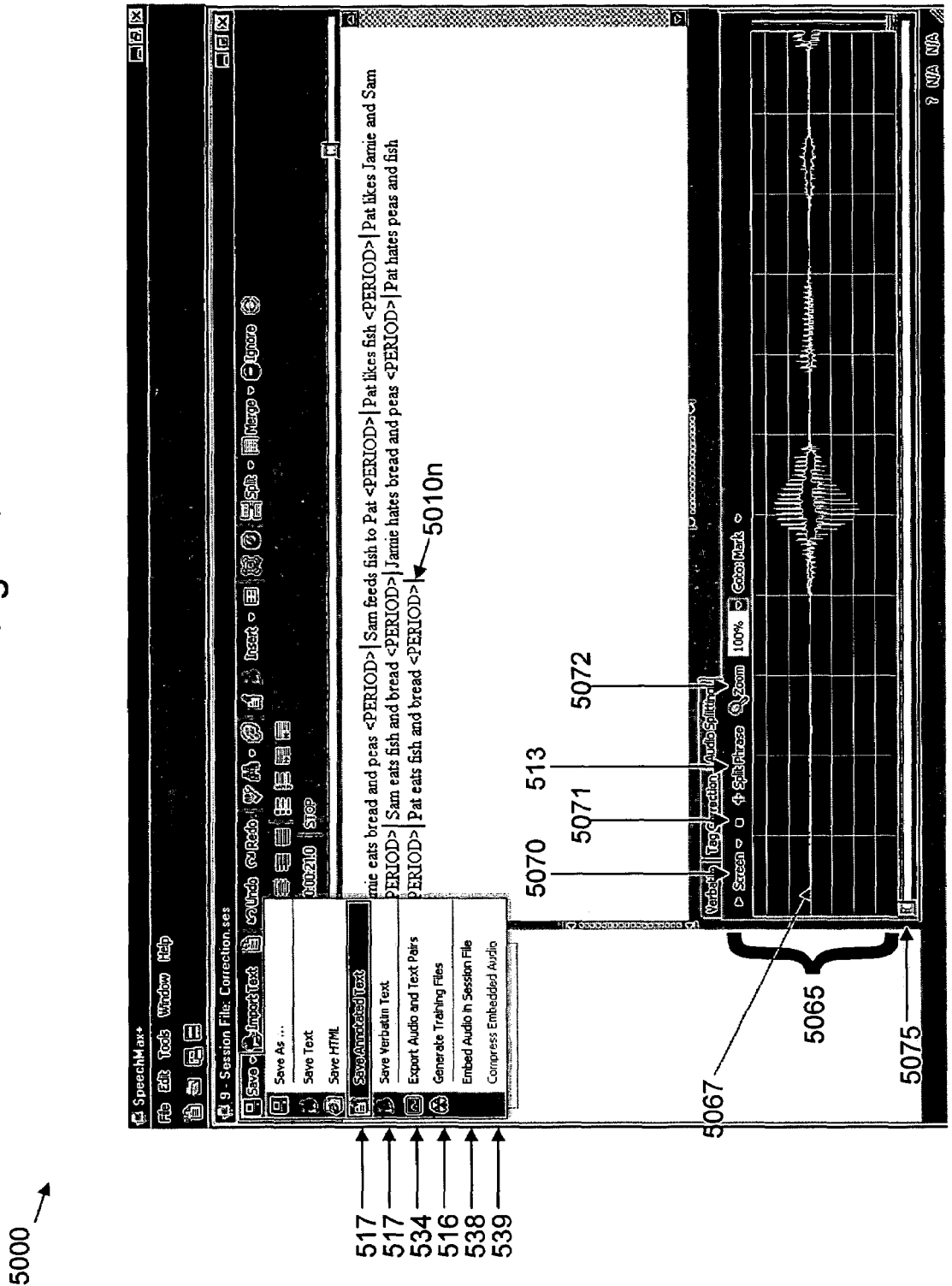
Figure 5H:
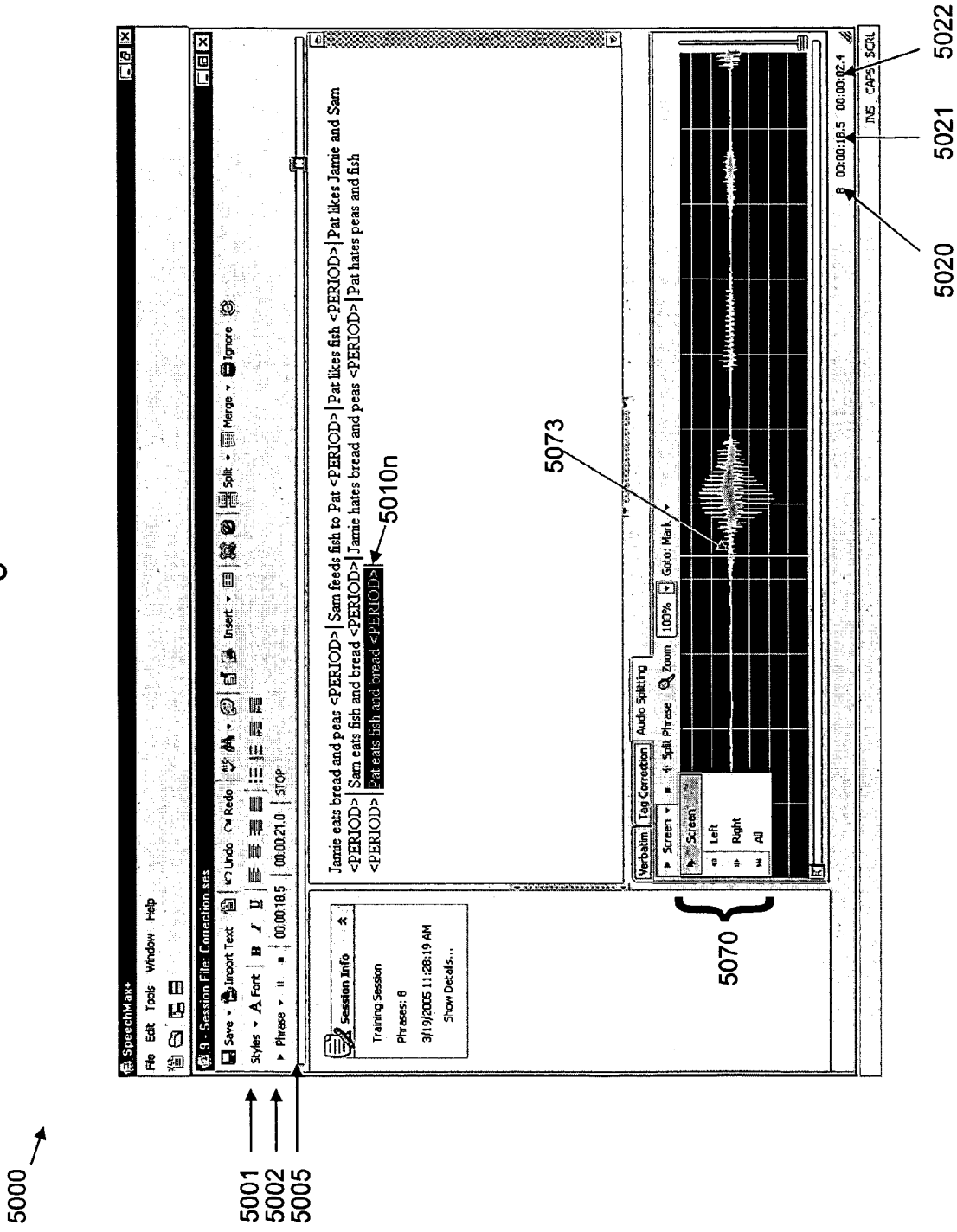
Figure 5I:
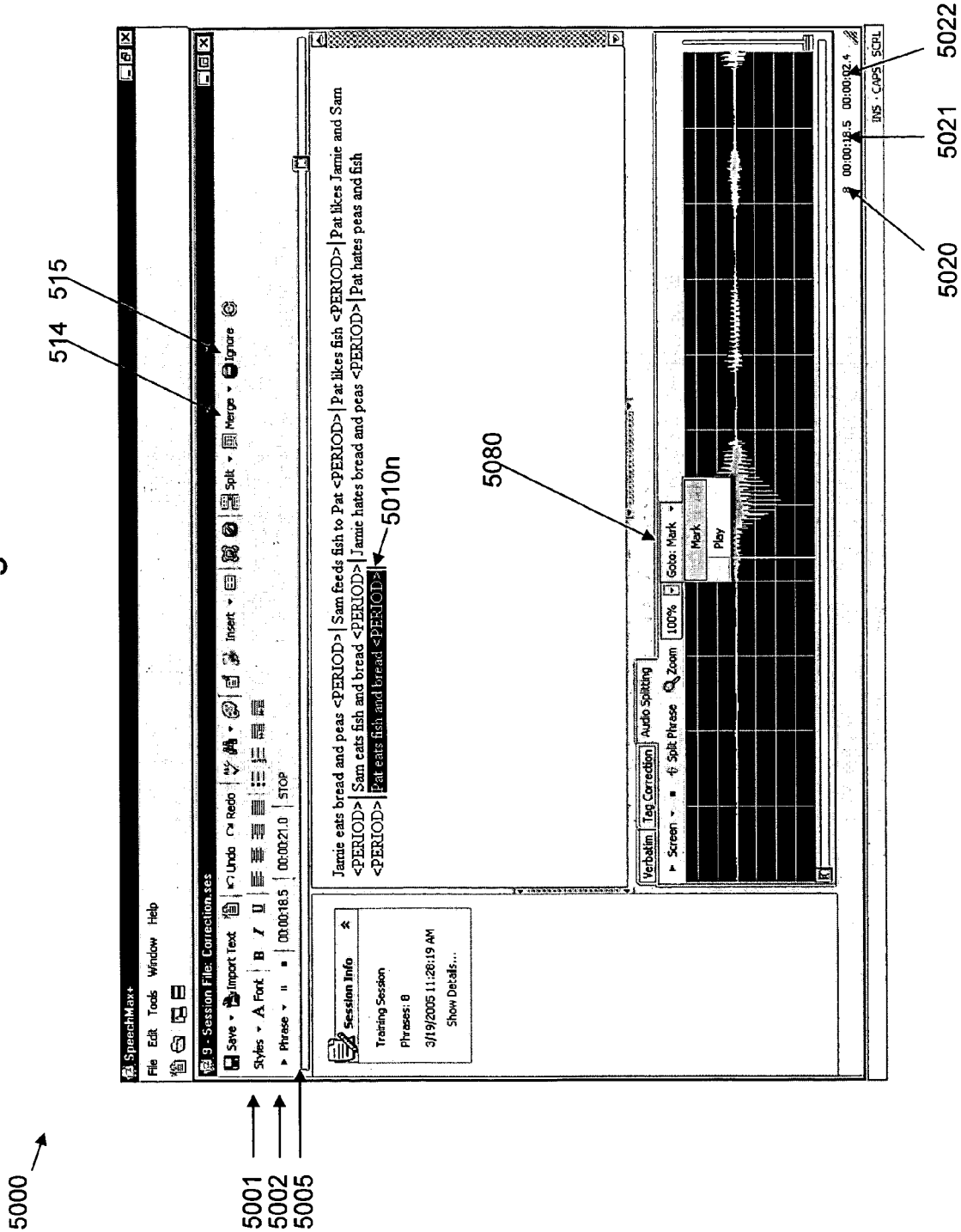
Figure 5K:
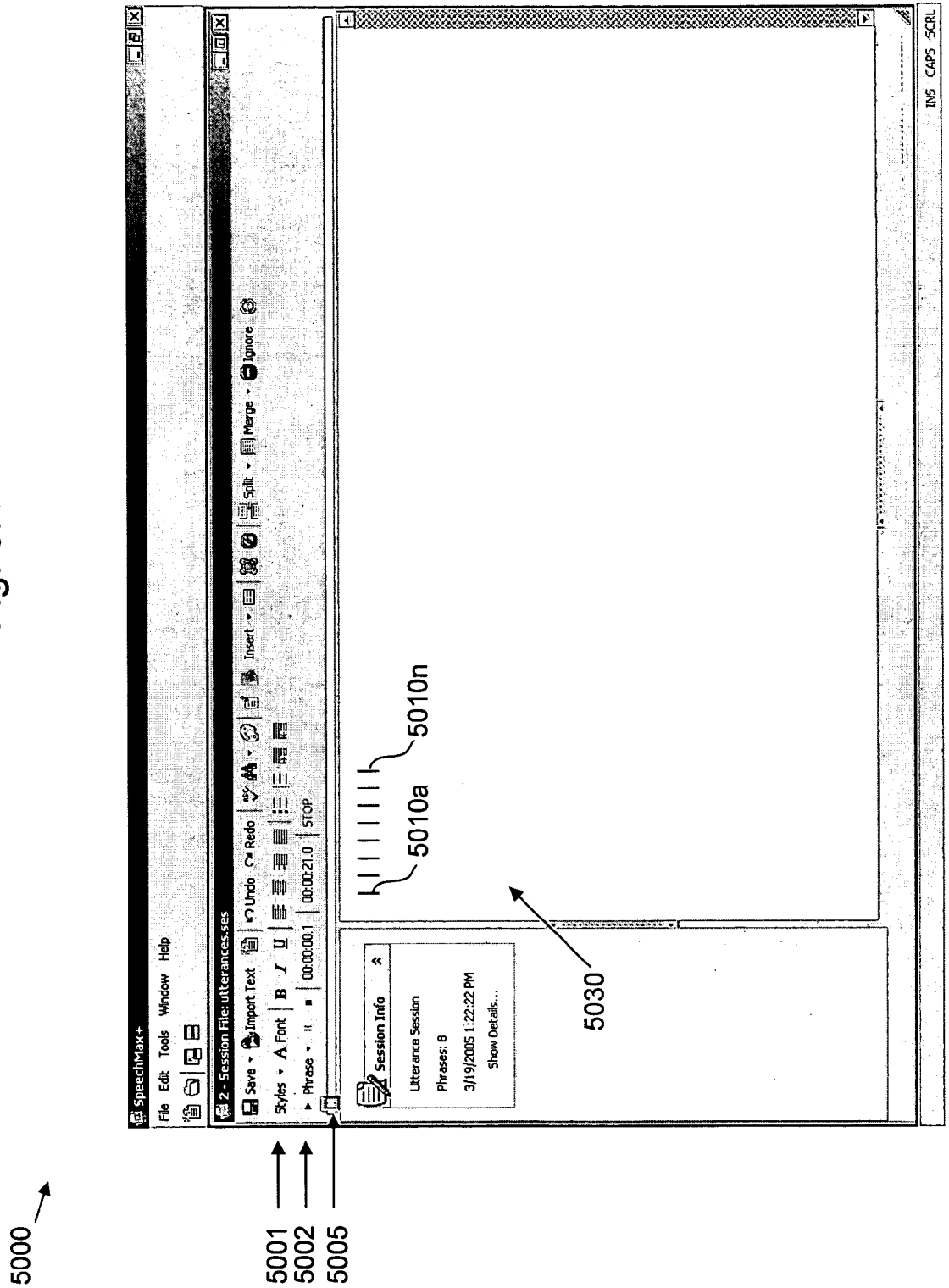
Figure 5L:
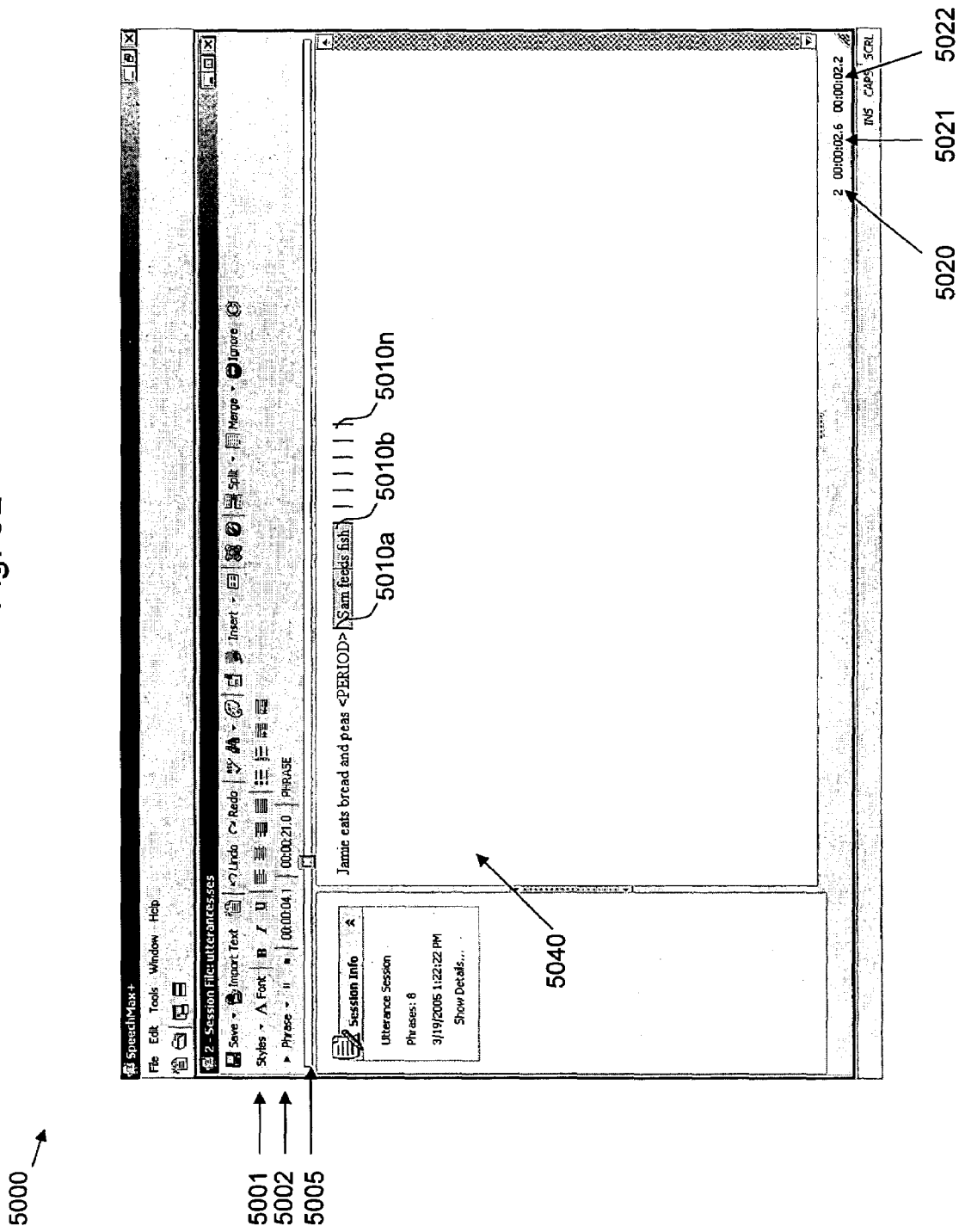
Figure 5M:
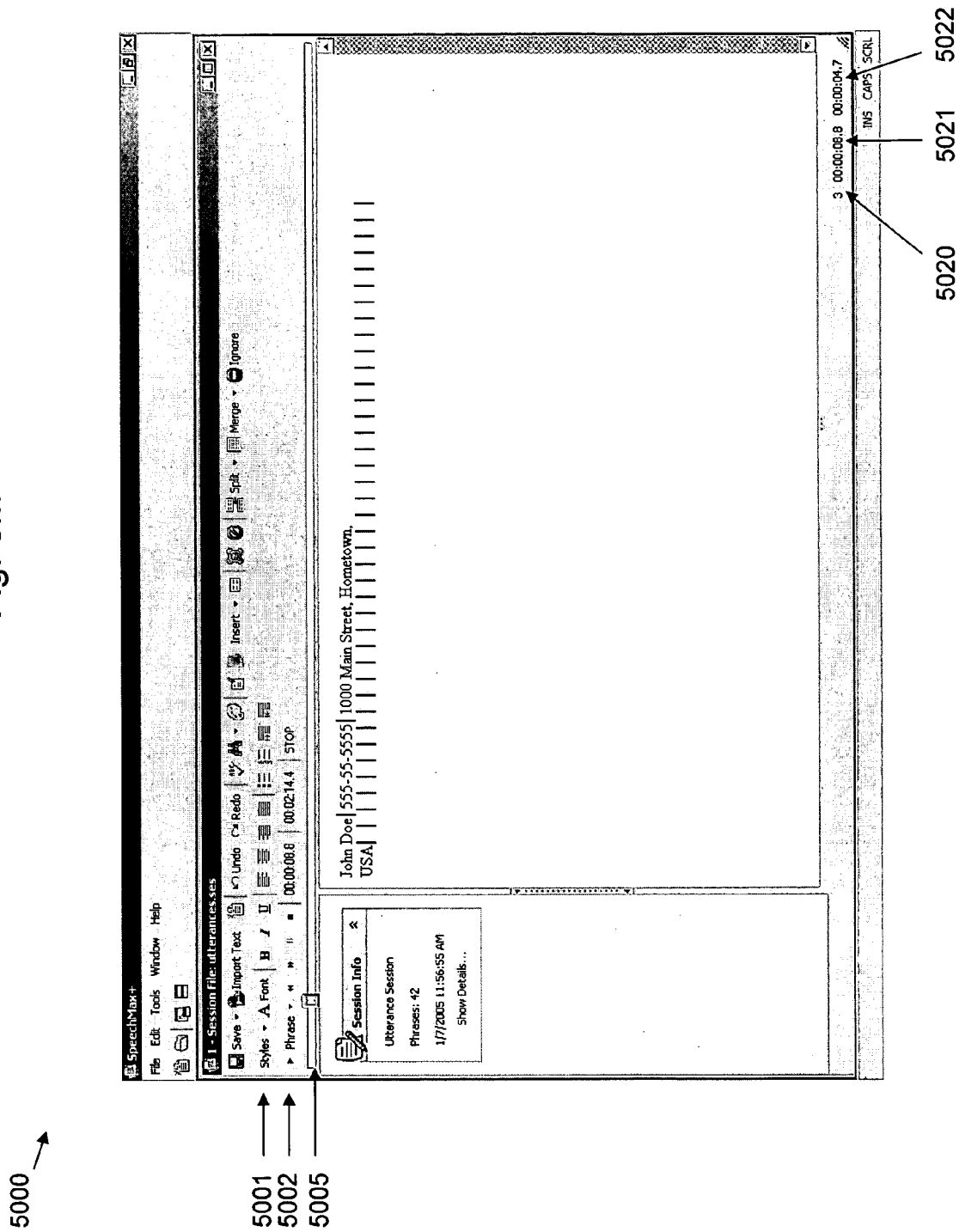
Figure 5N:
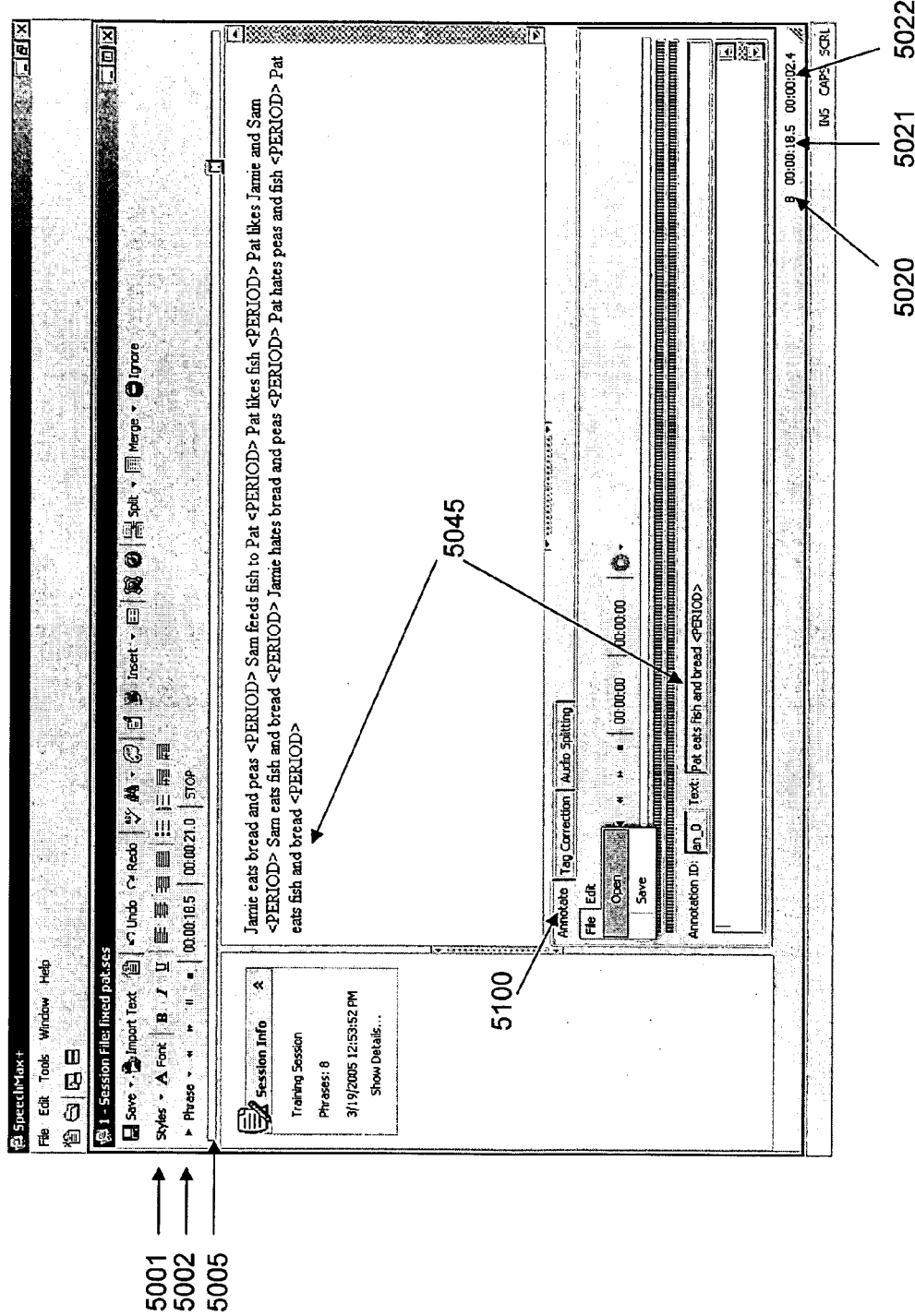

After completion of the transcription, the vertical boundary markers 5010 may also be removed, as shown in FIG. 5N without markers compared to FIG. 5D. In another, related approach, based upon selection of the style sheet in basic options step 501, the audio is transcribed segmentally without initial visualization of boundary markers. In this approach, the operator may playback the audio using a function key, such as "F4" (see FIG. 5BB) or other selected input means. After the operator transcribes the text, the operator may mark the text split by placing the cursor at the end of the text segment and pressing on a function key, such as "F5" as selected via the user interface shown in FIG. 5BB. This approach may be used by some transcriptionists who prefer transcribing into an "empty page" without having to keyboard entry between two vertical or other boundary markers.

With segmented audio, audio alignment will usually be at the utterance level with boundaries usually at the phrase or sentence level. In some situations, word tags may be requested by a transcriptionist quality assurance supervisor, dictating speaker, or other reviewer for word-specific playback of audio. This may assist in more rapid determination of whether the audio was correctly transcribed.

In one approach, the transcriptionist may redefine utterance boundaries by using the speech analysis tool, as illustrated in FIG. 5G, to visualize the speech waveform and narrow the defined segment(s) down to the word level for one or more words. This readjustment may be accomplished with the speech analysis text and audio split 510 tools, as described in association with the session file editor (FIG. 5). Unless otherwise changed by the operator, the subsegment division is saved as part of the session that is included in the training session file 310 (FIG. 3).

In another approach, as indicated by sub-segmental utterance splitting step 532, the operator may send a training session file consisting of the audio-aligned verbatim utterance text for sub-segmental utterance splitting 532. This automated creation of word tags relies upon the training functionality of a speech engine.

In forced alignment training of speech recognition, the operator submits audio-aligned verbatim text to the speech engine. The speech engine may use Hidden Markov Models to associate each subsegment of the utterance audio to an associated word. In addition to providing audio-aligned text at the word level, this may also represent one form of training in the Acoustic Model Builder step 745 of the speech recognition process (FIG. 7).

As those skilled in the art will recognize with the present specifications before them, the speech recognition process (FIG. 7) may be modified so that audio-aligned text at the word level may be returned by a speech engine operating in forced alignment mode. Based upon the experience of the inventors, a speech engine trained with a few hours or less of speaker-dependent audio and text may be sufficiently well trained to and return word-based audio tags. The sub-segmentation utterance splitter step 532 may be implemented by use of a macro utility that transfers part or all of a transcribed session file to the speech recognition engine for processing.

Some operators may prefer an approach that does not display all the utterance markers in the read/write window. Consistent with this approach, the operator may elect to place utterance boundary markers after transcription of each segment. In this approach, the operator may load 506 the untranscribed session file (USF). A blank document with utterance markers only will display. See FIG. 5K. Using the "Import Text" button of the first row toolbar of a read/write window, such as illustrated in FIG. 5B, the operator may also open a "blank" document into the read/write window for display in the load text file step 507. In this approach, with a blank document, only the last utterance marker will be displayed.

Using the mouse, for example, the operator may also place the cursor to the left of the single marker and playback aligned audio of first utterance using function key "F3" for PlayCurrent. See FIG. 5BB. The operator may transcribe text segment 509 and select the MarkSplit function key "F5." See FIG. 5BB. This places an utterance marker at the end of the transcribed utterance. The operator moves the cursor to the right of the newly created utterance marker and follows the same sequence for each successive utterance until all have been transcribed. One or more transcribed session files (TSF) 436 results if the process is performed by one or more operators.

In another related approach for those operators who prefer to transcribe beginning with a "blank document," the audio file 416 may be segmented based upon silence definition to create an untranscribed session file. As before, the operator loads 508 an untranscribed session file. The operator also uses the "Import Text" button of the first row toolbar of a read/write window, such as illustrated in FIG. 5B, to open a "blank" document into the read/write window for display in the load text file step 507. Using techniques similar to those described in relation to FIG. 14-1, a new audio file may be created by external segmentation application 424 that replaces inter-utterance silence with an audible tone between the utterance segments. At end of playback aligned audio 508, the operator would hear this tone. After transcription of each text segment 509, the operator may use the text and audio split 513 feature to mark utterance end, except for the last utterance which is marked during load of text into the read/write buffered window.

In a further related approach, an operator may use text and audio split 513, such as with the MarkSplit function key "F5," to separate and delineate merged audio-aligned utterance after playback aligned audio 508. These previously-separate utterances may have become merged during text and audio merge 514 as a result of operator error. They may also become merged during other processes, such as resegmenting and retagging, such as described in relation to FIG. 15, where segments may be combined to synchronize asynchronized files to create identical numbers of segments.

Some merged utterances may be too long for effective training. Combined utterances that are too long may be located using the finding long utterance 513 feature. Generally, it has been determined through experimentation by the inventors that utterance length is optimal at less than 10 seconds, which often represents 8-10 words. This may vary depending upon the speech recognition program.

b. Creation of Audio-Aligned Verbatim Text from Previous Verbatim Transcription

In addition to creation of distributable final text document, letter, or report (see step 309, FIG. 3), the session file editor 500 (FIG. 5) may be used to create audio-aligned verbatim text for training. Verbatim "text" is text that follows exactly what was said by the dictating speaker and includes extraneous remarks, misstatements, or ungrammatical dictation. It may also include "ahs" and "uhms." Verbatim text may be created using the verbatim annotation tool 531, which in turn may be used to generate a training session file 310 (FIG. 3) in step 516 of the session editing process 500 (FIG. 5).

In some cases, the transcriptionist may create verbatim text while simultaneously generating the output final text for a document, letter, or report. In one approach, unless the operator separately records a verbatim annotation, as described in step 531 of FIG. 5, the final text is saved as the verbatim text.

In another approach, using the switch tags functionality 517, verbatim text may be saved as a text file. In this case, verbatim annotation may have been entered in step 531. Using the save menu (shown in FIG. 5G), the operator may select "Save Verbatim Text." With this selection, the one or more segments containing verbatim annotated text are pasted into the appropriate segments of the final text to create a final verbatim text file.

In a related approach using switch tags 517, the operator may select "Save Annotation Text" via the dropdown menu. This pastes annotation text into the one or more appropriate segments of the final text to create text including substituted annotation. Unlike verbatim text, this results in an audio-aligned session file with the text annotation as substituted text.

In another case, the operator may be aligning a previously transcribed verbatim text file to its audio to create a transcribed session file (TSF). Here the purpose may be generation of a training session file 310 (FIG. 3). The verbatim text may have been previously transcribed using standard audio playback software and word processor, such as described in FIG. 1, or incorporated, similar features of the session file editor, as disclosed in the load one or more audio files step 503, audio file playback step 504, and create or edit text file step 505. FIG. 5A shows a text file created in the exemplary session file editor. The verbatim text may also have already been created by another operator using the switch tags 517 functionality.

In one approach, the text may represent a script for speaker model creation or update. The file may have been generated in the session file editor 500 (FIG. 5) or in a text processor in a compatible text format 460. In one approach, the script may be part of an enrollment process similar to that commonly used in off-the-shelf speaker-adaptive speech recognition programs. There the reader reads a prepared script that is recorded segment by segment for adaptation to the speaker's voice and speaking style. The commercial programs often provide different reading passages for user enrollment and additional adaptive training and require the reader to pause before reading the next sentence or phrase.

Unlike the script provided in typical off-the-shelf programs, the user may read the script continuously without waiting for "approval" by the speech recognition program and permission to read the next passage. A verbatim transcription of a day-to-day dictation may also be used as training material, thereby using data sets that are more likely to match the speaker's dictation acoustically. With a previously transcribed text, script, or other compatible text file 460, in step 434, the operator may load an untranscribed session file (USF), such as that described in step 426 in FIG. 4. The USF may have been created using external segmentation 420 from an audio file 416 or from other methods illustrated in FIG. 4. For instance, as disclosed in more detail in FIG. 14, it may be produced after speech recognition 476 in step 482.

The one or more untranscribed session files (USF) may be displayed in the graphical user interface as a series of vertical boundary markers with no intervening text, such as illustrated in FIG. 5K. The corresponding, previously-segmented audio file 416 may represent recording of an enrollment script read by a speaker or untranscribed dictation of a letter, report, or other speech input. Using the "Import Text" button of the first row toolbar of a read/write window, such as illustrated in FIG. 5B, the operator may also import the entire verbatim text into read/write window for display in the load text file step 507.

In step 508, the operator may use playback aligned audio functionality to listen to the utterance audio from the untranscribed session file (USF) corresponding to the loaded text. Based upon assignment of function keys, see FIG. 5BB, in one approach, the operator clicks on "F4" function key. This results in audio playback of the first utterance and selection (highlight) of the entire text, as illustrated in FIG. 5O. This indicates that the text corresponding to the utterance corresponds to some or all of the highlighted text.

After listening to the audio playback and reviewing the text, in the split text step 513, the operator may place the cursor in the text corresponding to the end of the utterance. In one approach, by clicking on "F5" function key, configured to "MarkSplit," as shown in FIG. 5BB, the operator may delimit the end of the text corresponding to the end of the current utterance. In one approach, the operator clicks on the F4 function key again. This results in audio playback of the second utterance in the untranscribed session file (USF) and selection (highlight) of all the text except the first utterance text. This indicates that the text for the second utterance corresponds to some or all of the highlighted text. The operator places the cursor at the end of the text corresponding to the second utterance and clicks on the F5 function key to delimit the text end of the second utterance. To delineate the text associated to the utterance, the operator in step 510 may also select the Split button 510 from the toolbar, as illustrated in FIG. 5C. To facilitate rapid "splitting" of the verbatim text, the operator may select play next phrase after split button 5041 in FIG. 5E to playback audio after split text completion.

Figure 5P:
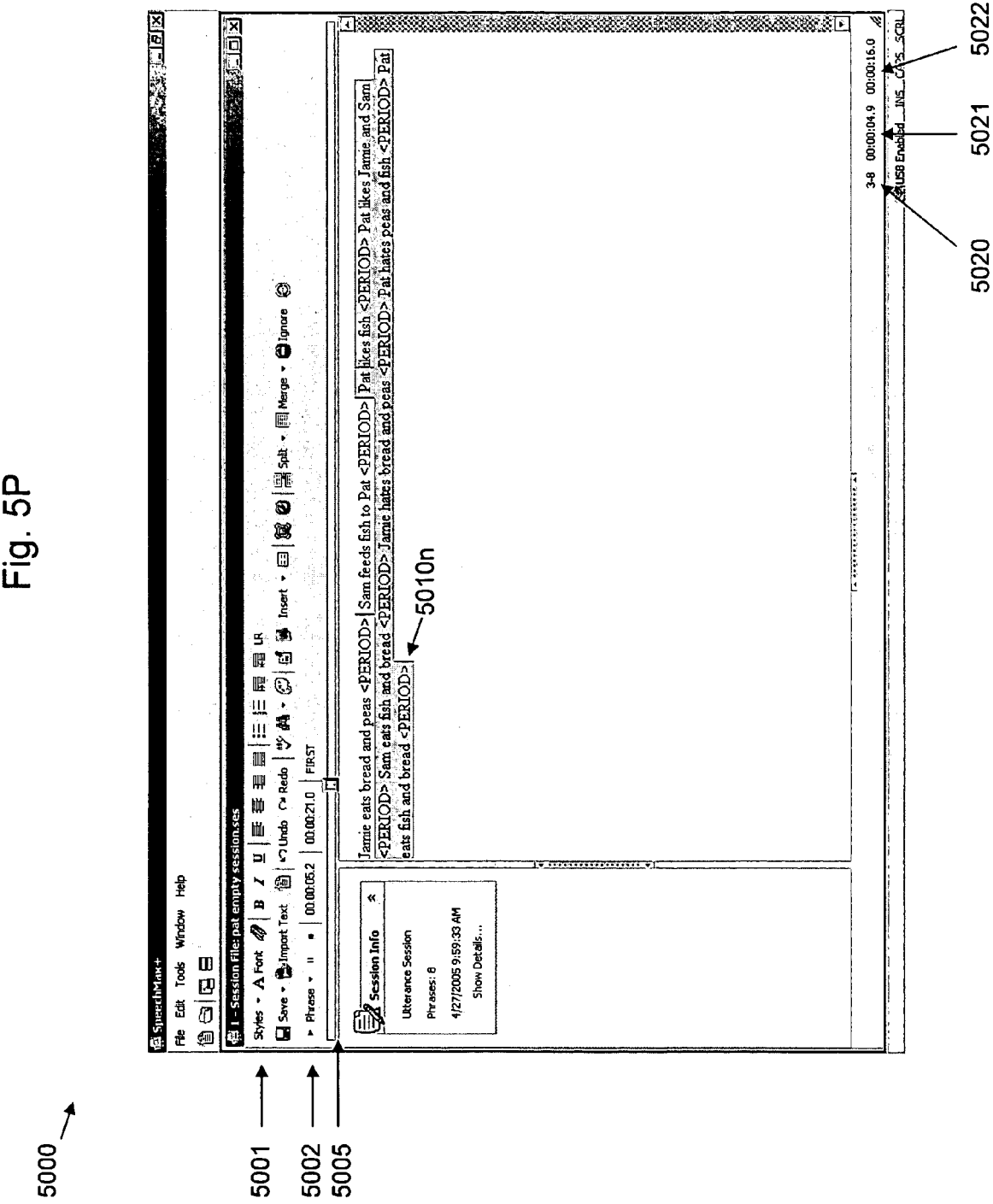

The operator would follow this process sequentially for the remaining utterances until the text is aligned to the audio of the untranscribed session file. After each selection, the utterance text is "split" off from the main body of the text with less text "highlighted" for the next step. FIG. 5P shows the remaining highlighted text after selection and "splitting" off of the first two utterances. The operator continues the process until text is no longer highlighted and utterances have been aligned to their audio. As would be understood by those of ordinary skill in the art having the present specification before them, other user input means may be used to delimit segments and/or play the next audio.

In some instances, the utterance audio may be too long for effective processing by the speech engine. In the find long utterance step 511, the operator may use a dropdown menu associated with the search button, as illustrated in the graphical user interface in FIG. 5C, to locate long utterances.

The operator may playback the audio segment of the long utterance using the appropriate input means (such as F3, "PlayCurrent," see FIG. 5BB) and open the speech analysis tool 5065 to playback utterance audio and locate silence between words (see FIG. 5G). Using the split text and audio feature 513, the operator may mark the selected division spot in the utterance text using the cursor, use the Split Phrase button 513 (see FIG. 5G) of the Audio Splitting Tab 5065 to delimit the audio division with a thin yellow vertical line, and use F5 function key ("MarkSplit," see FIG. 5BB) to divide the text and audio utterance and place a new vertical boundary text marker at the split site.

To assist with division of an audio utterance, the operator may visualize the wave form 5067 and determine the proper division points. In the speech analysis window 5065, audio playback is determined using the Screen menu 5070. If no division point within the utterance has been selected, the operator may play the utterance audio from the beginning by opening the dropdown menu 5070, as shown in FIG. 5H, and selecting the "All" option. Returning to FIG. 5G, the operator can pause or stop playback by clicking on the small square 5071 to the right of the "Screen" menu 5070.

To assist the operator in selecting audio division site, the speech analysis tool 5065 permits the user to playback the audio and visualize position in the wave form 5067 with a moving vertical blue line. By selecting the zoom setting 5072, the user determines whether the entire wave form, or only a section thereof, is visualized in the speech analysis window 5065. Consequently, user selection of zoom size determines the number of successive sections that must be displayed and visualized in the speech analysis window in order to completely visualize the entire utterance waveform 5067. If the waveform is made very small, more or all of it will be visualized within the viewing window, but potential division points, as suggested by short pause, silence, or near silence, may be harder to visualize.

As an audio segment is visualized during audio playback, the blue audio marker line moves through the segment left to right until the segment is graphically replaced in the speech analysis window. It then moves back to the left as playback of the next segment begins. The sequential playback of audio segments continues until playback of the utterance is completed or the user stops the playback. In some cases, the operator may need to listen to an audio segment more than once to determine the division site within the utterance. To assist the operator in selecting the site, the operator may drag the slider bar 5075 depicted at the bottom of the speech analysis window to any given point along the wave form shown in the speech analysis window.

Once the user has marked a division site (e.g., marker 5073 in FIG. 5H) in the utterance audio, the operator may use the Screen dropdown menu 5070 to playback the audio to the "Left" and "Right" of the division. By selecting "Left," playback begins at the beginning of the long utterance and ends at the selected split point. By selecting "Right," playback begins at the division and continues until the end of the utterance. Selecting "All" results in playback of the entire utterance. The Goto dropdown menu 5080, as shown in FIG. 5I, permits the operator to return to the vertical division mark 5073 by selecting the "Mark" option from the menu. Selection of "Play" plays back audio from the division line.

In some instances, the operator may elect to change the initial utterance division marked by the yellow line. The operator may change the selection by placing the cursor on a different site and selecting the "Split Phrase" menu item 513 in the Audio Splitting tab. In some cases, the utterance may divide the audio in the middle of words or otherwise create utterances that are too short. This may occur if there are long pauses between syllables.

The text and audio merge feature (step 514, FIG. 5) permits the user to merge text and audio from two adjacent utterances. In one approach, in a two-step process, the operator views the boundary in the speech analysis window, finds the corresponding division in the text, places the cursor in the first (left-hand) utterance of the two utterances that the user wishes to merge, and clicks on the Merge button 514 from the toolbar (FIG. 5I). This results in text merge. Following the text merge, the operator, may click on the Merge button dropdown 514 shown in FIG. 5F to merge the associated audio and create a new utterance.

An additional use for the text and audio merge function 514 is for correcting mistakes made in delineating the text associated to the utterance by incorrect placement of the text cursor in the "splitting" process, as described above using an untranscribed session file 426 and verbatim text. In such cases, the delineated text associated to the utterance audio may be too short or too long. The operator may reverse the split text 510 operation by placing the cursor in the utterance created from the divided text and click on the Merge 514 button from the toolbar (FIG. 5I). This results in removal of the utterance marker and reassociation of the text to the highlighted, unsplit text. The operator may then repeat the split text operation 510.

After creation of the audio-aligned verbatim text, the user may generate a training file (step 310, FIG. 3). A training session file (.trs) 350 may include a compressed file that contains audio files (one file per utterance), the complete verbatim text, and verbatim text corresponding to each audio file (one utterance per line).

2. Manual Transcription for Two or More Speakers

As described in the speech to text process 400 (FIG. 4), two or more speakers may each use their own input recording device, such as a microphone or a shared microphone at a meeting, that may result in a single audio file 416. In some instances, the multichannel sound card may result in a mixed version where the speech input 412 from each speaker may be superimposed and merged. Similarly, a real-time speech recognition program may process speech input 412 from two or more speakers if both are speaking into the same microphone or recording device. These cases are categorized, for simplicity, as "multispeaker, single channel."

In other instances, there may be multichannel recording where each speaker's speech input 412 is isolated. In this "multispeaker, multichannel" setting, speech input from each speaker 412 is recorded separately to create a single audio file 416. S speakers will result in S separate audio files. In the "multispeaker, single channel" or "multispeaker, multichannel" setting, each separate audio file 416 may be processed by manual transcription, speech recognition, or both.

Both "multispeaker, multichannel" and "multispeaker, single channel" audio may be processed on a routine speech-to-text 400 (FIG. 4) workflow. In both instances, creation of a chronological written transcript identifying each speaker may require additional steps in the postprocessing 446 step for sequencing and formatting the text. The process may include optional sort 428a, preprocessing 437b, and various other steps of the speech-to-text 400 (FIG. 4) workflow.

While the disclosed process may be used for any situation involving manual transcription of two or more speakers, it may be used most advantageously where there is repeated speech by the same two or more speakers over time. As disclosed in relation to FIGS. 12 and 13, acquisition of large amounts of speaker-specific speech data permits creation of a speaker model for each speaker, creation of one or more multispeaker speech user profile for speakers 1 through S (FIG. 12), transcription using speaker-dependent speech recognition for isolated singer speaker input (FIG. 12) and multispeaker speech user profile for nonisolated speaker input from two or more speakers, and deployment of the speaker model, or selected parts thereof, with related speech and language processing applications, such as speaker recognition, audio mining, or others. Potential uses include creating verbatim transcripts of corporate board meetings, lengthy depositions or trials, surveillance by law enforcement or national security personnel, or other situations where the same speakers may be present over an extended period. However, the process may also be used for speaker independent or speaker-adaptive speech recognition.

a. Single Source (Multispeaker, Single Channel)

i. Transcription From Untranscribed Session File (426)

As described in the speech-to-text process 400 (FIG. 4), the process may select a dictation and transcription workflow 402 for multispeaker, single channel processing. If there is no speech user profile 312 (FIG. 3) available to process the speech input 412 with speech recognition, a manual only workflow is selected. In select speech user 404, the process selects "multispeaker" where recording 413 results in a single audio file 416 with speech input 412 from two or more speakers. Work type is selected in step 406. Work-type selection may determine the transcript format used in the postprocessing 446 step. This is followed by process decision 408 whether to restrict word choice, speech input 412 step, record 413, segmentation selection 414, audio file vs. device audio 448, and transcription selection 415.

With manual transcription, the workflow manager may select audio file 416 and manual transcription option 418a

("MT") followed by external segmentation 424 using multi-speaker segmentation parameters. As described in FIG. 6, the speech segmentation parameters 635 may have been derived from one or more audio files from one or more speakers 620 using a speech analysis tool 625 or other data 630.

After external segmentation, an untranscribed session file 426 (FIG. 4) may be created and processed using the session file editor (FIG. 5) step 434. Unlike single-speaker structured transcription where segmentation is typically used to define speech utterances, segmentation with two or more speakers is used here to delineate speech input 412 from different speakers and time sequence the segments for creation of a chronological transcript.

In using the session file editor 500 (FIG. 5), after playing back aligned audio 508 and transcribing text 509, the transcriptionist may determine that the first speaker's input ends at the first segment end boundary, falls short, or continues across the initial end boundary. Using the text and audio split 513 and the text and audio merge 514, the transcriptionist may create a new boundary that shortens or lengthens the segment. In one approach, the transcriptionist may enter periods, commas, and other punctuation. These may be entered in standard format or tokenized, e.g., <period> or <comma>, using the macro capability of the session file editor 500 (FIG. 5). The transcriptionist may also identify the segment speaker, speech overlap, or uncertainty as to speaker identity. This may be recorded as a text comment (annotation) in step 529 with the text annotation tab 5100 (FIG. 5N). The operator may also use the ignore utterance function 515 to exclude material from training, mark as non-dictated text 535 (e.g., "witness pointed to exhibit A"), or other features. The next segment of the untranscribed session file (USF) 426 may be then transcribed.

The transcriptionist may follow a similar routine of playing back segment text, transcribing text, redefining segment boundaries, and identifying speaker in text annotation tab. This procedure may be followed until each segment is transcribed. Alternatively, as described for single-speaker transcription, the transcriptionist may begin with a "blank" document, playback aligned audio 508, transcribe text segment 509, and sequentially mark speaker boundaries using text and audio split 513.

Consequently, processing the untranscribed session file 424 may involve transcription and redefining boundary markers to delimit speech input of separate speakers, not utterances of a single speaker.

In one approach, these segments represent continuous, uninterrupted speech by a single speaker and may represent a single sentence, many sentences, or only a word. In this approach, as an example, segment 1 (two sentences) may be associated to speaker A, segment 2 (nine sentences) to speaker B, segment 3 (one word) to speaker A, segment 4 (two sentences) to speaker C, segment 5 (one word) to speaker B, segment 6 (two words) to speaker A, and so on. By a series of segment boundary adjustments, transcription, annotations, and other editing in steps 436/438/442, a complete transcribed session file (CTSF) 444 may be created such that each segment is associated to the uninterrupted speech of a particular speaker.

The workflow may then proceed to postprocessing (FIG. 3) 446 where an output session file 309 (FIG. 3) with segmented data output may be created. This may include an audio-aligned verbatim transcript of the meeting or proceeding. A training session file 310 (FIG. 3) may be generated that includes audio-aligned text for S speakers. This is multi-speaker training data based upon speech input 301 (FIG. 3) from all speakers, not material for a speaker-dependent model based upon the utterances of a single speaker. The postprocessing may also generate a training session file 310 (FIG. 3) for each speaker based upon speaker-specific transcribed segments based upon previous verbatim annotation 531 mark-up in the session file editor 500 (FIG. 5). As described in process 1200 (FIG. 12), postprocessing begins with one or more complete transcribed session files or other files (FIG. 4), corresponding to step 444 of FIG. 4-2. The first phase of postprocessing may include locate speaker-specific segments 1205, sequence 1210 words, phrases, or other text, meta-file 1215 creation, and assemble one or more output session files 1220. At least one of the output session files 1220 may include data for a text file verbatim transcript that is derived from the verbatim transcript output session file 1225.

In the locate speaker-specific segments 1205, each of the time-stamped segments associated to a particular speaker may be identified. In some cases, a segment may consist of one or more sentences. In other cases, a segment may include only a word or syllable. In one approach, the identification is based upon text annotation 529 with the session file editor 500 (FIG. 5). The text annotation 529 may also include overlap data for each segment. This may include information that overlap occurred, the probable identity of the overlapping speakers, and other information. In sequence 1210, the process may index each audio-aligned text segment based upon speaker identity. In one approach, the locate speaker-specific segments and index steps may be performed simultaneously. The indexing may reference start/duration times of segments ("time stamps") and sequentially number each segment. During sequence 1210, the index may also be include speaker identity, speaker overlap, and other segment-related data. A meta-file 1215 may be created that includes data on start/duration time, speaker identity, overlap, text, markup, or other session file data for each segment. In one approach, the indexing and meta-file creation occur as a single, integrated step.

In assemble one or more output session files 1220—the first of two assembly stages—an output session file (FIG. 3) 1225 that includes a labeled verbatim transcript may be generated using the index data from meta-file 1215. During this assembly step, various elements for formatting the verbatim transcript session file may be added. The assemble one or more output session files 1220 step may also include creation of a verbatim transcript text file that may be viewed in step 507 of the session file editor 500 (FIG. 5).

In one approach, the display of the output session file 1220 may be in a conventional format with speaker identity and associated transcribed and punctuated speech input displayed chronologically on successive lines that run down the page. For example, the first line might read "Smith: Good morning. Welcome to the annual meeting of the Hometown Boys Club." The transcription "Good morning. Welcome to the annual meeting of the Hometown Boys Club." may correspond to the first bounded segment transcribed by the transcriptionist using the session file editor 500 (FIG. 5). Typically, the transcriptionist will have entered the nondictated punctuation.

In a session file, this segment will typically be aligned to speaker's audio for playback 508 in the session file editor 500 (FIG. 5). In some instances where there is speaker overlap, a comment may be included in the displayed text based upon data originally recorded in text annotation 529, e.g., "Good morning. Welcome to the annual meeting of the Hometown Boys Club. (other speakers talking in background)". The associated verbatim transcript text file resulting from assembly step 1220 may be similarly displayed.

In another approach, audio-aligned text for each speaker may be displayed in a separate buffered read/write window in the session file editor 500 (FIG. 5). In a further approach, speakers may be identified in a single line of audio-aligned text that runs horizontally from start to end with no word wrap in a single read/write window of the session file editor 500 (FIG. 5).

In another approach, the audio-aligned transcript for each speaker may be displayed in a separate buffered read/write window of the session file editor 500 (FIG. 5) such that speaker audio-aligned segments are gapped. For any given speaker, the gap may represent a period of silence where no speech is recorded from that speaker regardless of length. In one approach, a placeholder, such as an asterisk, vertical bar, or other symbol may be used to mark the silence. Each placeholder may represent a period of time, and the number of placeholders may indicate the exact or approximate time the speaker was silent. In a further related approach, the number of placeholders may be proportional to the transcription length as determined by text length, such as by text characters and spacing. Additional display approaches may be considered, such as, to name a few, using color coding, different shaped placeholders, or other text with speaker name to represent speech of another speaker and corresponding silence of first speaker.

As described, each placeholder may represent a segment of another speaker's speech irrespective of length. For instance, speaker A may have spoken briefly and was followed by 54 utterances of speech from speaker B and 12 utterance segments from speaker C. In this example, if each placeholder represents one utterance segment, in the buffered read/write window for speaker A, the transcribed text is followed by 66 (54+12) placeholders, indicating speaker A silence during the speech of other speakers B and C. In this approach, as utterance lengths may be variable. A single gap placeholder (representing silence from speaker A) may indicate, for instance, silence of 45 seconds one time, but 15 seconds for another utterance. In one approach, the placeholder may be a colored vertical line as may be used to separate utterances, see, e.g., 5010*a*, 5010*b*, . . . 5010*n* of FIG. 5B.

Figures 2, 14:
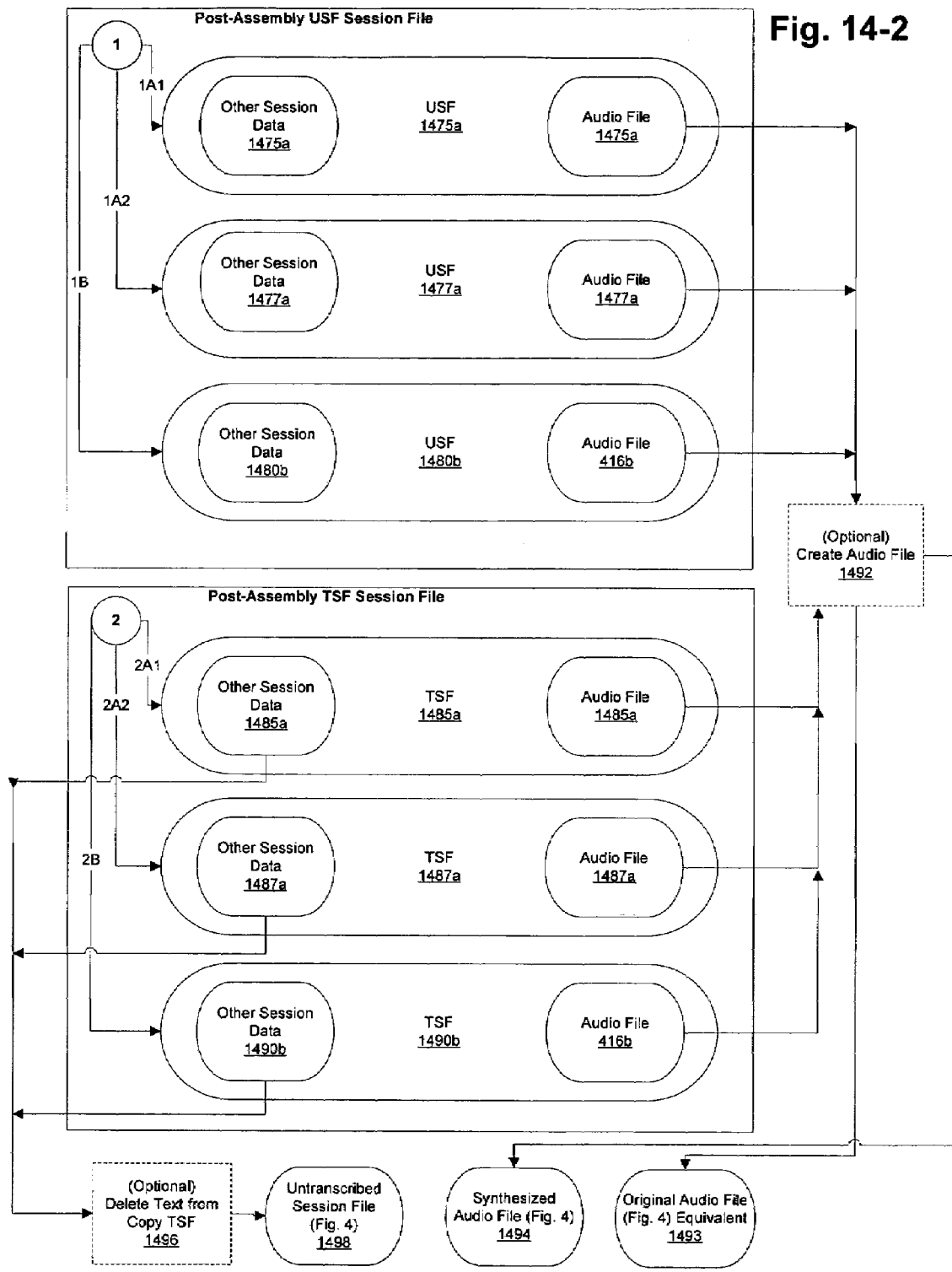

As is further described in relation to FIG. 14, the gap silence represented by a placeholder, such as a vertical marker, may be dependent upon the actual silence present in an audio file or duration of silence inserted during the session file assembly stage. As further explained in relation to FIG. 14, the inserted silence may be variable and represent actual length of the silence or a different value. For instance, the actual time between two utterances from speaker A may be several minutes, but the gap inserted may be only approximately 250 milliseconds. Depending upon the number of utterances spoken by the other speakers and the placeholder technique selected, there may be one or more than one placeholder following a single, isolated utterance of speaker A.

In one approach, the number of segments and placeholders separating a speaker's transcribed speech may be dependent upon the number of segments in the transcribed speech for other speakers. In this approach, an operator may select a placeholder in a buffered read/write window and playback audio 508 associated to that segment in the session file editor 500 (FIG. 5) from any speaker. As illustrated in FIG. 5B, the audio tool bar 5002 may display, from left to right, the current position and duration of the loaded audio file, including silence, for each buffered read/write window. A slider bar 5005 associated with each window may move with playback 508 and be repositioned to start playback at a different time.

In a related approach, in order to minimize the physical width separating a speaker's transcribed speech due to limits in monitor size, the placeholder and the width separating the placeholder may be very small. In effect, a number of placeholders may be merged into a series of placeholders that appear to the unaided eye as a single placeholder. Many vertical colored markers adjacent to each other may have the appearance of a continuous, solid mark or bar.

In the approach where each placeholder represents an utterance segment from any one of S speakers, given S speakers and a total n segments of speech from all speakers, S buffered read/write windows may be displayed, each with n segments. For any given speaker, one or more of the n segments would represent speech from that speaker. If there was only one segment that represented transcribed speech from that speaker, only one of the segments may contain text in the buffered read/write window displaying the transcription for that speaker. The other segments, as displayed in the buffered read/write window for that speaker, may be blank and represent silence for that speaker and speech for other speakers. Consequently, each of the n segments in each of the S session files in a buffered read/write windows would contain, depending upon the segment, audio-aligned verbatim text associated to a speaker, or audio from another speaker. In one approach, the n segments may be delimited by a vertical marker. The speech of another speaker may be indicated by a blank space between the vertical marker or a placeholder such as an asterisk.

Further, each of the S buffered read/write windows may be synchronized in that each contains an equal number of n segments. Using the tab key, based upon configurable option in basic options step 301, see FIG. 5BB, the operator may tab forward or backward to view text (or absence of text) segment by segment in each of the S buffered read/write windows and view the corresponding text or absence of text in one or more other read/write windows. In another approach, as each of the n segments may be indexed with known time stamps, each of the segments may also contain one or more untranscribed audio segments for other speakers in the buffered read/write window of the first speaker.

With segment synchronization with tabbing, see FIG. 5BB, the operator may view text in some of the n segments in each buffered read/write window and playback aligned audio 508 in all n segments. In some settings, the process may result in selective transcription of speech from only a single speaker. In these cases, a user may load 506 audio-aligned text for a single speaker with aligned audio for other speakers in a single buffered read/write window of the session file editor 500 (FIG. 5). Depending upon which of the n segments is selected in which buffered read/write window, the user may playback aligned audio 506 only or playback audio 506 and view text. In one buffered read/write window, segment 10 may display audio-aligned text representing transcribed speech from that speaker. In another buffered read/write window, segment 10 may display a blank or an asterisk placeholder aligned to audio only from another speaker, thus representing silence for the first speaker.

In this approach, the selective transcription of a single speaker at a meeting or proceeding also results in synchronization of the transcribed output session file of a single speaker with untranscribed speech associated to one or more other speakers. This speech represents silence with respect to the first speaker. Where there is overlapping speech of two or more speakers, this may be indicated in an annotation of buffered read/write window for first speaker. Other approaches may be used for display of overlap speech. Selective transcription may benefit, for instance, a congressional representative who only needs his or her remarks transcribed, or a lawyer who selects the statements of a particular deponent or witness for transcription, but would like an associated chronological audio record of one or more other speakers available for playback 508.

Further, audio playback 508 associated to a given speaker's silence may result in playback of silence corresponding to the length of one or more untranscribed segments, a predetermined amount of silence, such as approximately 250 milliseconds, or a short audible tone or beep. Consequently, during the create S audio files step 1235, an audio file may be created for each speaker along with, as indicated below in this section (i), a session file including the transcribed text and aligned audio for that speaker's speech during the session. Using techniques similar to those described in FIG. 14-1 where silence is inserted in the utterance gap in session file assemble steps 1448/1468, silence, untranscribed speech from another speaker, or a short audible tone or beep may be inserted such that selection of the placeholder results in playback of the inserted speech, silence, or tone or beep in each of the S session files for each speaker.

Display of verbatim transcript output session file (FIG. 3) in step 1225, including visualized display in S buffered read/write windows or placeholders, may be determined in setup basic options (tools) 501 of the session file editor 500 (FIG. 5). The output session file 1225 may also be synchronized for playback with a video file in the session file editor 500 (FIG. 5) using display with media 537 feature.

After assembly one or more output session files 1220, a training session file 310 (FIG. 3) 1260 may be created that includes training material based upon speech input from the group of speakers 1 through S, and training material from speaker-specific, audio-aligned text. In one approach, in step 1235, the previously-identified (step 1205) speaker-specific segments are extracted and merged to create S transcribed session files, one corresponding to the speech input 301 (FIG. 3) for each speaker. As the transcription is intended to prepare a verbatim transcript of the proceedings or meeting, the text is presumably verbatim. During this step, the text may be reverse formatted in each of the S transcribed session files to remove nondictated material, including speaker identification and punctuation. For quality control, the transcript may be reviewed in the session file editor 500 (FIG. 5) to determine accuracy, correct errors, and remove non-dictated items before further processing. An audio file may also be extracted from each of the speaker-specific separate transcribed session files, corresponding to audio file 416 of FIG. 4, using techniques similar to those described in relation to optional step 1492 in FIG. 14-2, in which audio is copied from a session file to create a new audio file.

In step 1240, each of the speaker-specific S audio files 416 may be transcribed with speech recognition 476 of FIG. 4 using speaker-specific speech segmentation parameters to create, in step 1245, a S transcribed session files 478, i.e., one for each speaker. The purpose here is to take speaker-specific audio and create utterance segments based upon speaker-specific segmentation parameters (see FIG. 6), not segmentation parameters based upon group speech. If a speaker dependent speech user profile 312 (FIG. 3) is unavailable or has low accuracy, the audio file 416 may also be processed using a speech-to-text decoder block in a speech recognition program (FIG. 7) using a speaker independent or speaker adaptive speech user profile 312 (FIG. 3).

Figure 15:
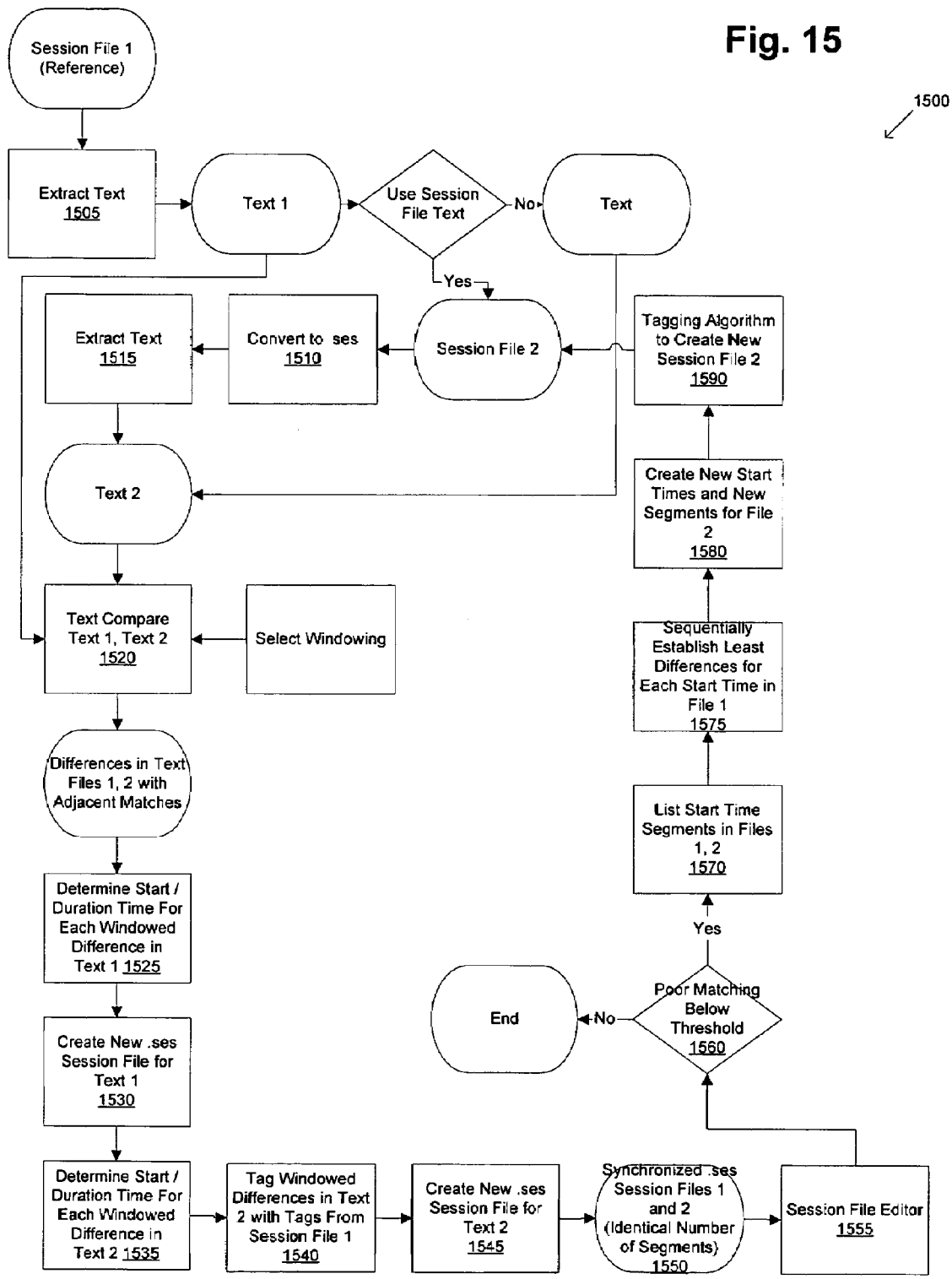
FIG. 15 is a flow diagram illustrating an exemplary embodiment of resegmenting an asynchronized text from a session file or text file to create an identical number of segments with audio-tagged text from the reference session file.

Using techniques described in association with FIG. 15, the new transcribed session file using speaker-specific segmentation parameters may be used as the reference file to resegment and retag 1250 the initial session file resulting from manual transcription. This initial session file was produced in step 1235 before extraction of speaker-specific audio, and includes verbatim text from the reverse-formatted verbatim transcript. The resegment and retag (FIG. 15) step 1250 is used, in this approach, to align the verbatim text from the initial transcription with utterance segments reflecting pause length and silence for that individual speaker after transcription with speech recognition 476. Where the speech user profile 312 (FIG. 3) is insufficiently trained, manual "splitting" techniques described below in sections (i) and (ii) may be used to associate verbatim text to the proper utterance.

In assemble one or more training session files 1255, using the session file editor 500 (FIG. 5), the resegmented and retagged session file with audio-aligned verbatim utterances may be used to create a speaker-specific training session file 310 (FIG. 3) for each of the 1 through S speakers. In assembly step 1255, the session file editor 500 (FIG. 5) may also be used to create a multispeaker training session file 310 (FIG. 3) based upon reverse-formatted, audio-aligned verbatim text for the entire session and speech input from all speakers. As shown in step 1260, the result of postprocessing (FIG. 4-2) is a training session file 310 (FIG. 3) based upon the speech of two or more speakers ("training session file speakers 1-S") and a series of speaker-specific training session files 310 (FIG. 3) for each of the 1 through S speakers.

Alternative approaches may also be used to create speaker-specific training session file 310 (FIG. 3). The operator may also use various features of the session file editor 500 (FIG. 5) to generate appropriate training material, such as ignore utterance 515 or mark as non-dictated text 535. A training session file 310 (FIG. 3) for each speaker may be created by extracting the audio-aligned transcribed segments for each speaker from the output session file that includes a verbatim transcript 1225. In this approach, the export paired text and audio feature 534 of the session file editor 500 (FIG. 5) may be used to generate speaker-specific training data sets for training session file 310 (FIG. 3). In one approach, returning to FIG. 4, this may be performed during postprocessing (FIG. 3) 446 or during any one of prior steps 434/438/442. Based upon experience of inventors, exported audio-aligned text may be sufficient to create a relatively accurate speech user profile 312 (FIG. 3) for each speaker, though the segmentation parameters used to create the training session file 310 (FIG. 3) are based upon group and not individual speaker characteristics.

Similarly, during postprocessing (FIG. 3) 446 or before, an operator may use the session file editor 500 (FIG. 5) to export paired text and audio 534 or create a training session file 310 (FIG. 3) based upon the speech input of the group. In this approach, the training session file 310 (FIG. 3) would correspond to training session file speakers 1-S in step 1260 of FIG. 12.

In another alternative, returning to FIG. 4, the audio file 416 for each speaker may be segmented 424 with speaker-specific parameters to create an untranscribed session file 424. Using techniques more fully described in section (ii) below for processing of untranscribed session file 424 with previously created verbatim text, the transcriptionist may, first, obtain an untranscribed session file 426 for each speaker, use this session file to "split" the verbatim text, and create S verbatim-transcribed session files that may be used for a training session file 310 (FIG. 3).

In some instances, not all speakers will be present at each session. With accumulator and combiner techniques described in relation to FIG. 19, the separate, speaker-dependent acoustic models may be combined to create one or more multispeaker acoustic models to transcribe the audio file containing input from two or more speakers. Depending upon the speakers present, a different multispeaker speech user profile 312 (FIG. 3) may be selected. This permits selection of appropriate speech user profile 312 (FIG. 3) based upon actual speakers present.

ii. Using Untranscribed Session File and Previously Transcribed Verbatim Text

As indicated in section (i), another approach to multispeaker, single channel transcription that uses the "splitting" function with external segmentation application 424, as described in FIG. 4, to create an untranscribed session file (USF). Similar to the process described for transcription of single speaker audio file 416, a verbatim transcript or script may have already been created.

The operator may have used the session file editor 500 (FIG. 5) to perform traditional manual transcription to transcribe an audio file in steps 503/504/505 and to create a verbatim transcript of an entire proceeding or meeting. Alternatively, the operator may have loaded the multispeaker session file 506, played back aligned audio 507, and transcribed each text segment 507, as described above in section (i). The operator may create verbatim text 531 and save it 517 as a text file that may be used with a multispeaker "splitting" function described below. If the transcriptionist has inserted formatting and punctuation, the transcribed text may be reverse formatted to remove the non-dictated material and saved to file.

Analogous to the approach used for a single user where there is a preexisting verbatim text, the transcriptionist may load the untranscribed session file in step 506, load the transcribed text 505 using the "Import Text" button, as described in FIG. 5B, sequentially playback aligned audio in step 508, "split text" based upon segments in step 513, redefine segments to correspond to single speaker input using text and audio split 513 or merge 514, and identify each speaker in text annotation tab 5100 (FIG. 5J) in step 529. As indicated above, the loaded text file may be verbatim or nonverbatim and corrected as required using the verbatim annotation tab 531. If non-dictated punctuation and other formatting was not removed previously, the transcriptionist may reverse format the text before processing by activating a macro utility of the session file editor 500 (FIG. 5).

In a related approach, an operator may have transcribed a script to be recorded by speech recognition enrollees or other persons into a single microphone or recording device order to prepare a multispeaker speech user profile 312 (FIG. 3). The untranscribed session file 426 from the group session, representing, in one approach, a single audio file 416 recorded by different members of a group reading an enrollment script in succession, may be processed using "splitting" techniques to create a multispeaker speech user profile 312 (FIG. 3).

b. Two or More Sources

In some instances, each speaker may have a separate input device, such as a separate microphones. This results in speaker isolation and separate audio file for each speaker that is similar to the single speaker case, except if the record sources are "mixed" to create a single audio file. "Mixed" audio from two or more speakers is treated analogously to the multispeaker, single channel case. In non-"mixed" cases, the selection dictation and transcription workflow step 402 (FIG. 4) may be used to organize the processing of each of the separate audio files 416.

Figure 5Q:
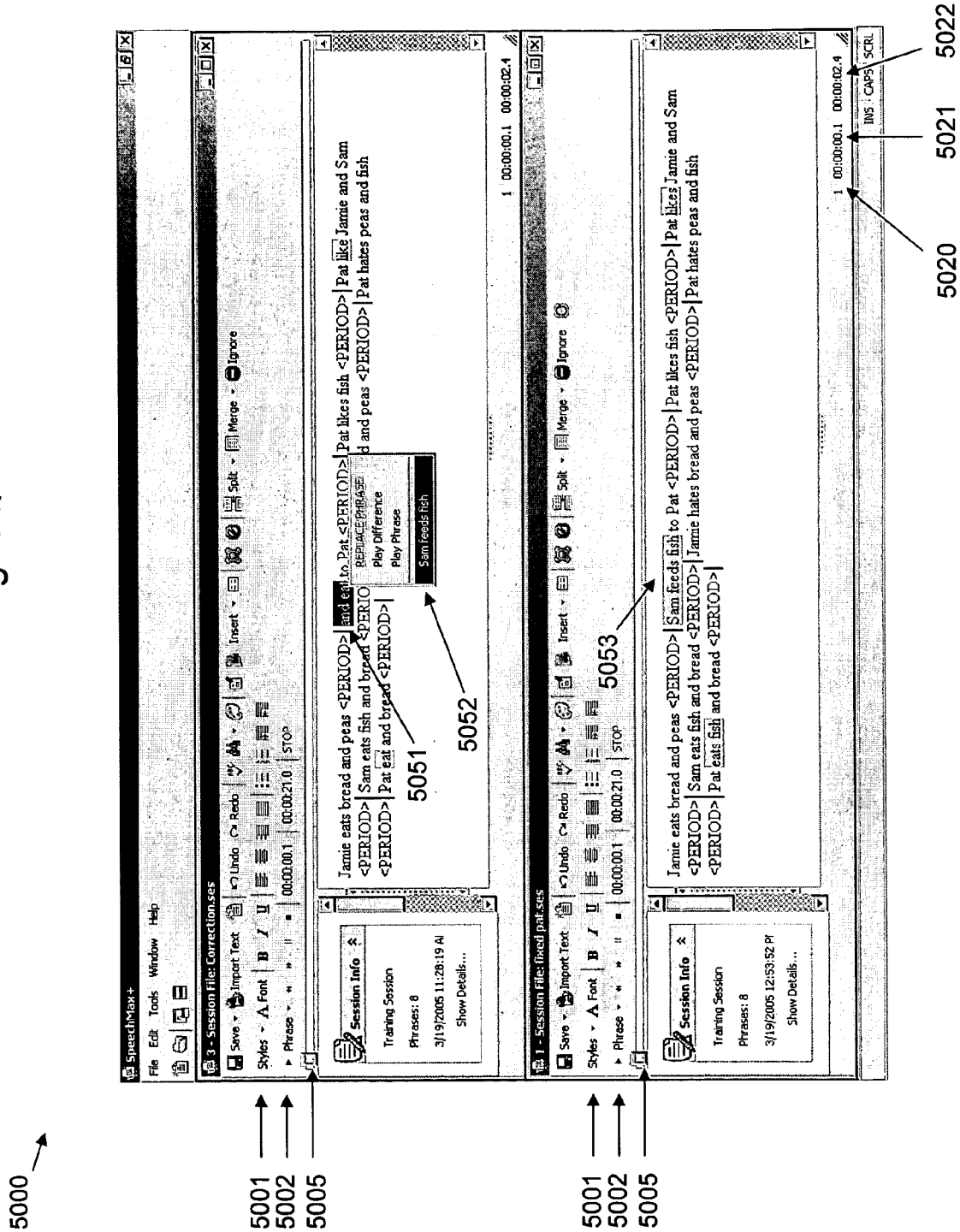

As described in FIG. 4, the audio file 416 may be segmented using external segmentation to create an untranscribed session file (USF) 426 that is manually converted to a transcribed session file (TSF) 436 with verbatim annotation 531. Nondictated punctuation or other formatting may be removed with reverse formatting or other technique. The current audio file position time and start and stop time for each segment may be displayed using the session file editor, as illustrated in various FIGS. 5A through 5X. Each untranscribed session file 426 for each speaker, in one approach, may be transcribed separately.

Alternatively, as previously described for a single speaker or multispeaker, single channel, there may be preexisting verbatim text. In this case, the process may use the external segmentation application 424, as described in FIG. 4, to create an untranscribed session file (USF) 426 using the previously-disclosed methods to align segments from verbatim text with associated audio. In this approach, the operator may use Import Text button 507 (FIG. 5B) to load a text file 507 representing a previously transcribed verbatim transcript or script and use the "splitting" techniques to transcribe segment by segment until complete. During the process, the operator may use the Ignore button, as illustrated in FIG. 5B, to ignore utterance text 515 that is unsuitable for acoustic model training, annotate the text 529, or perform other steps in the speech to text process 400 (FIG. 4). After creation of a complete transcribed session file (CTSF) 444 for each speaker, the transcribed session file may be postprocessed 446 to create a verbatim transcript for the group session.

Using well-known techniques, the audio times for the two or more session files may be zeroed, time overlapping segments determined manually or automatically, and a verbatim transcript created on a workflow with sequential presentation of transcribed speech in a conventional format. The chronological assembly of the successive segments by a workflow manager for multichannel, multispeaker speech may be performed in the postprocessing step 446 of process 400 (FIG. 4). One approach is illustrated in FIG. 13.

As described in FIG. 13, postprocessing may begin with one or more complete transcribed session files, corresponding to step 444 of FIG. 4-2. The postprocessing includes zero times of S transcribed session files 1303 to synchronize start times, locate speaker-specific segments 1305 for speaker model training (as described in FIG. 3), sequence phrases, words, or other segments 1310, meta-file 1315 creation, assemble one or more session files 1320, and verbatim transcript complete transcribed session file 1330. The postprocessing activity may be selected in the configure workflow step 402.

After zeroing of start times for each of the S transcribed session files in step 1303, in step 1305, the process 1305 locates all speaker segments. As these are for a transcript, each of the should contain verbatim text. In sequencing step 1310, the process may use zeroed start times for each transcribed session file, determines chronological sequence of segments, and marks overlapping segments. In step 1315, the process may create a meta-file that indexes each segment chronologically and may index speaker identity, overlap, and other data. In step 1320, the process assembles one or more session files, including the verbatim complete transcribed session file. The verbatim transcribed session files for each of the speakers is available from the transcription process of each separate speaker. Steps 1305/1310/1315/1320 are similar to those for multispeaker, single source postprocessing described in FIG. 12.

The final result is an output session file (FIG. 3) that includes a verbatim transcript 1325 for distribution, see FIG. 3, and training session file (FIG. 3) 1330. This includes a training session file for each of S speakers corresponding to the training session file 309 of FIG. 3. The output time-merged transcript session file permits read/write chronological display of transcribed, merged segments from the original S audio files. Display options may be determined in the setup basic options (tools) step 501 using the session file editor 500

(FIG. 5). These may be similar to those available in the multispeaker, single channel case. Further, with speaker isolation, in contrast to the process illustrated in FIG. 12 in relation to single-source recording, there is no need to generate multispeaker data for a group speech user profile 312 (FIG. 3). However, placeholders may be used to indicate silence with respect to a given speaker, and selective transcription of a given speaker's speech, as described in relation to FIG. 12.

2. Speech Recognition for Single Speaker

Conventional real-time, interactive speech recognition programs create a transcribed session file, but do not return an untranscribed session file an audio file that would support transcription using the session file editor 500 (FIG. 5) or server-based speech recognition. In one approach, speech recognition is designed to output, as described in relation to FIG. 14, a transcribed session file 436, but also may produce an original audio file equivalent 1493 (FIG. 14-2), synthesized audio file 1494 (FIG. 14-2), or untranscribed session file 1498 (FIG. 14-2). The resulting audio file may be processed as audio file 416 (FIG. 4) on workflow. The untranscribed session file 1498 may be processed as one of more untranscribed session files 426 (FIG. 4).

As previously described in relation to FIG. 4, the workflow determines whether record function 413 is for audio file 416 or device audio (direct source) 448. Direct source may include microphone, line input, CD, or other options available with the installed sound card. These may be selected by the operator in the Control Panel of the Windows® operating system or likewise in other operating systems. The options available in association with direct source are determined by the device specified by the operator.

If device audio 448 or audio file 416 are selected, the process determines 451 whether to use transcribe or utterance mode. Transcribe mode option 451a results in a transcribed session file (TSF) 478. Utterance mode option 451b results in untranscribed session file (USF) 482.

After creation in utterance mode of the untranscribed session file (USF) 482 with a speech recognition program (FIG. 7) following option UTT 451b, the process may determine 483 to send the file for transcription with speech recognition ("SR" in option 483a), to send the untranscribed session file (USF) for manual transcription ("MT" in option 483b), or to send untranscribed session file to create an audio file ("Audio File" in option 484c).

After creation of transcribed session file (TSF) 478 following option TR 451a, the transcribed session file may undergo decision points and may enter workflow at step 436 after prior sort 486 decision point (see "B") for further processing by session file editor 500 (FIG. 5). The process may also determine 480a whether to create untranscribed session file (USF) 480b from the transcribed session file. If "yes," the result is transcribed session file that enters workflow at step 436, plus creation of untranscribed session file ("TSF+USF" option 480c).

The process may also decide 484a to use a transcribed session file 478 to create an audio file 484b, resulting in a transcribed session file plus audio file ("TSF+Audio File" option 484c). Depending upon transcription selection 418, the audio file 416 may be used for manual transcription ("MT" in option 418a), speech recognition ("SR" in option 418c), or both ("MT+SR" in option 418b). In another approach not specifically shown in FIG. 4, the derivative audio file 416 may be processed with other manual transcription 452, other speech recognition 454, and manual and/or automated nondictation speech processing (FIG. 3) 492/494.

As illustrated in option 480c ("TSF+USF") of FIG. 4, both a transcribed session file (TSF) and untranscribed session file (USF) may be available for processing after creation of the USF from copy TSF in step 480b. In one approach, the process may also determine 484a whether to create audio file from the TSF and create the audio file in step 484b. This results in "TSF+Audio File" in option 484c. Consequently, the transcribed session file 478 from speech recognition 476 may be used to produce both an untranscribed session file, an audio file, or both. As indicated, the transcribed session file 478 will continue on the workflow and enter prior sort 486 decision point. Typically, the transcribed session file 478 will be processed without unsort 432 and enter workflow prior to determination 437a of whether to preprocess (see "B"). The audio file 416 may be processed depending on selection made in transcription selection 318, and the untranscribed session file may be processed depending on selection made in step 483.

More than one transcribed session 478 file may be created in series or parallel by varying audio file 416 characteristics (e.g., preprocessing audio with noise reduction), changing speech user profile 312 (FIG. 3), or changing other speech recognition 476 configurable settings. The process may use "ROVER" techniques for generation of more than one output with use of different representational models or parameter settings. These techniques have been described in a reference by Fiscuss submitted with this application. With use of identical segmentation parameters (FIG. 6), however, the session file output may be synchronized and compared with output from speech recognition, manual transcription, or both.

As described in FIG. 4, the real-time and server-based speech recognition (FIG. 7) options may use an identical speech recognition module described in FIGS. 14, 14-1, 14-2. In an approach illustrated in FIGS. 14-1 and 14-2, various output options are available and are dependent upon the source and mode selected. The options available using a speech recognition program may be displayed in a graphical user interface or other application in step 705 of FIG. 7. Both the real-time and server-based options may provide transcribed session file, untranscribed session file, audio file, or some combination.

As described in FIG. 14-1, referencing the GUI or other application of step 705 of FIG. 7, the two basic session file output paths are untranscribed session file (1A, 1B) or transcribed session file (2A, 2B). In one approach, the selection of utterance mode 1401 and transcribe mode 1402 are mutually exclusive. In FIG. 14, the "1" refers to use of utterance mode 1401, "2" refers to transcribe mode 1402. The "A" refers to use of direct source, such as microphone (or other direct source). The "B" refers to use of an audio file 416 of FIG. 4.

Utterance mode 1401 may result in an untranscribed session file, corresponding to untranscribed session file 482 of FIG. 4, and process option "1A" with selection of direct source 1405 and process option "1B" with selection of audio file 1415. Transcribe mode 1402 may result in a transcribed session file, corresponding to transcribed session file 478 of FIG. 4, and process option "2A" with selection of direct source 1405 and process option "2B" with audio file 1415. Options "2A" and "2B," respectively, typically would be used for real-time and server-based speech recognition. Both processes may result in a transcribed session file.

FIG. 14 illustrates that, in one approach, the untranscribed and transcribed session file each may be associated to one of three different output audio files. As with the input source audio file 416, the audio file associated to the session file may be embedded within the file or referenced by a path string or hyperlink pointing to it. As illustrated in step 1420 of FIG.

14-1, the utterance mode track subsequently involves steps 710 and 715 of the speech recognition process 700 (FIG. 7), but does not involve speech-to-text decoding. The transcribe mode sequence, step 1425,includes steps 710, 715, and 720 (speech to text decoding).

Consequently, transcribe mode 1402 is more memory intensive. Utterance mode 1401 requires less memory and may create an untranscribed session file more quickly than it takes to create a transcribed session file from microphone input.

Use of direct source input 1405, e.g., microphone 1405, is more resource intensive than processing of record (audio file) source 1415. Real-time, interactive speech recognition (FIG. 7) is usually performed in transcribe mode 1402 with microphone input. This approach is the most resource intensive of the combinations. Consequently, the speaker may prefer to use transcribe mode 1402 only for short, quick dictations, and record in utterance mode 1401 with deferred local computer transcription of a longer untranscribed session files (USF).

Record (audio file) source 1415 is less resource intensive than real-time speech recognition 476 with microphone input. Speech recognition (FIG. 7) may support local, speech-to-text conversion with an audio file 416. This may be used where the speaker would like to transcribe an audio file 416 locally instead of using a remote, offline server.

As depicted in FIG. 14-1 in step 1420, selection of a "1" process results in processing (FIG. 7) that does not include speech-to-text decoding and produces an untranscribed session file. As described in step 1425, selection of a "2" process results in a transcribed session file from other processing (FIG. 7) that includes the speech-to-text decoding. After processing steps 1420/1425, the process reaches higher-level postprocessing, corresponding to step 735 (FIG. 7). Various processes occur in this upper layer, including assembly of a session file. The assembled session file may include an embedded audio file or hyperlink or path string to an audio file.

When processing in record (audio file) source 1415, audio file creation is not required for creation of untranscribed session file (1B) or transcribed session file (2B) because an audio file 416 exists that may be embedded or referenced by a session file pointer. However, an audio file is required for creation of an untranscribed session file (1A) or transcribed session file (2A) where direct source input (e.g., microphone) 1405 was selected and no audio file was processed. In one approach, an embedded or referenced audio file in the session file assists in playback of session file or later generation of audio file for independent speech-to-text conversion by manual transcription in session file editor 500 (FIG. 5) or speech recognition 476 (FIG. 4).

Creation of an untranscribed session file (resulting from selection of options 1A, 1B) or transcribed session file (resulting from selection of options 2A, 2B) may be determined by the input files provided to the postprocessing (FIG. 7) block. If the files consist of utterance audio and record stream offsets (1435), an untranscribed session file may be assembled. Delivery of text and audio tag information (from speech-to-text decoding), utterance audio, and record stream offsets (1455) may result in creation of a transcribed session file.

At the insert silence decision points 1437/1457, the process determines whether to insert silence between utterances. As indicated by FIG. 14-1, silence must be inserted where there is no audio file in order for playback to simulate human speech. This would occur where the process selected direct source (e.g., microphone) 1405—e.g., utterance mode 1401 and direct source (e.g., microphone) 1405 (indicated by "1A"), or transcribe mode 1402 and direct source (e.g., microphone) 1405 (indicated by "1B").

In the one approach, the "silence" inserted into the created audio file refers to complete, blank silence, not the silence with minimal sound or background noise that normally exists in speech input 301 (FIG. 3). However, silence with minimal "white noise" or other sound could be inserted instead. In another approach, as for creating trigger tones to activate a computer function, specific sound frequencies may be inserted. In another related approach, a short audible tone demarcating utterance begin and end could be inserted.

If the process 1437/1457 determines "yes" to silence insertion, it may insert silence between utterances resulting from direct source input 1405 or record (audio file source) 1415. If the process 1437/1457 determines "no," the process may use original audio file (FIG. 4) 416 for session file assembly. The audio file (FIG. 4) 416 may include record stream offsets and gaps based upon actual, recorded silence. Steps 1448/1468 refer to assembly of untranscribed and transcribed session files, respectively.

If the process 1437/1457 determines "yes" to silence insertion because there is no audio file (FIG. 4) 416 available, the process may determine 1439/1459 whether to use predefined short gap versus gap based on recorded stream offset in creating a new audio file. Gap length selected may depend upon purpose.

Based upon experimentation, the inventors have determined that about a 250 millisecond gap between utterances may assist the user in differentiating between utterance segments during playback aligned audio 508 during session file (FIG. 5) editing. This gap may be indicated by the vertical markers separating utterances in the exemplary session file editor, as shown in FIG. 5B. The vertical markers, however, do not indicate the actual length. This can be determined by continuous playback and viewing time stamps change in tool bar 5002. An inserted silence gap based upon record stream offsets may be of assistance to create an audio file with silence intervals similar to those of the original speech input 301. Use of record stream offset times also may define play time for different segments based upon actual, chronological ("wall clock") occurrence.

After determining whether to use short, fixed gap or silence based upon record stream offset, the process creates an audio file in assemble session file steps 1448 and 1468. In one approach, where there is a preexisting audio file 416 with record stream offset and actual silence, the assembly may involve copying the original audio file 416 and embedding the copied audio file within the session file. In another approach, it may embed original audio file 416 within the file. The (optional) create audio file 1492 step of FIG. 14-2 may produce an original audio file (FIG. 4) equivalent 1493 that is a copy of a copy of the original audio file 416, or copy of the embedded original audio file 416.

Audio files 1445 and 1447 (for untranscribed session file) and 1465 and 1467 (for transcribed session file) may result each in a synthesized audio file (FIG. 4) 1494 that, in one approach, may also be embedded into the session file in the assembly step. In these cases, (optional) create audio file 1492 may extract a copy of a synthesized audio file (FIG. 4) 1494.

In FIG. 14-2, the post-assembly session files for utterance mode 1401 (track 1) and transcribe mode 1402 (track 2) are depicted. Each of the session file capsules may include other session data and an audio file. In another approach, the session file may include hyperlinks or other pointers to the relevant audio and other files. Depending upon the process, the "other session data" may consist of tagging information and other data. This "other data" may, in one approach, reference speech recognition program, segmentation parameters, other parameter and configuration settings, acoustic and language model, lexicon, original speech-to-text decoding, text output from regular expressions conversion of raw speech engine output, or markup of text as may occur from text or audio annotation. The "other data" may vary depending upon the type of session file. For instance, an untranscribed session file 482 will not include data on speech-to-text decoding or markup of transcribed text.

As depicted in FIG. 14-2, for track 1, USF 1475a (record stream offset) and USF 1477a (predefined gap) are associated to audio files 1475a and 1477a and other session data 1475a and 1477a, respectively. USF 1480b is associated to audio file 416b (actual silence), that may represent an embedded copy of 416 of the original audio file 416, and other session data 1 480b. Transcribed session files TSF 1485a (record stream offset), 1487a (predefined gap), and 1490b (actual silence) are similarly assembled and have similar components.

With identical segmentation parameters and a common segmentation module (FIG. 6), the segment number in an untranscribed session file (USF) 426 created from real-time speech recognition 476, or from external segmentation (see FIG. 4) of an audio file 416 derived from the same real-time application 476 in step 484b, should be equal. Consequently, if following speech recognition 476, the dictation is retranscribed manually 434 or with speech recognition 476, the one or more transcribed session files 436 will be synchronized with the original speech recognition transcribed session file 478 and have an identical number of segments.

In addition, playback audio file 504 of session file editor 500 (FIG. 5) results in continuous mode playback of dictation audio associated to each segment and silence separating the utterance. Playback will last longer with a transcribed session file 1490b if the actual silence between utterances is longer than, say, the approximately 250 millisecond silence gaps introduced to create an audio file in session file assembly 1448/1468, as described in FIG. 14-2. Consequently, transcription efficiency may be increased by use of a transcribed or untranscribed session file or audio file that eliminates lengthy silences between utterances of slow or hesitating speakers.

As shown in FIG. 14-2, the process may also determine (optionally) 1492 to create an audio file 1492 from a session file. An original audio file (FIG. 4) equivalent 1493 with actual silence may be extracted from session files USF 1480b and TSF 1490b that were created with utterance mode 1401 and transcribe mode 1402 using record (audio file source) 1415 and audio file 416 (FIG. 4). The extracted audio file may represent a copy of an embedded file or a copy of a pointer to audio file location. This does not eliminate the playback capability of the original session file.

Extracted audio files from other session files may include silence based upon predefined gap or record stream offset. Playback time may, as described above, depend upon the "silence" present between utterances. Similarly, the time stamps of the audio file may depend upon the length of the silence separating utterances. Start times may vary depending upon the length of the silence separating the utterances. If short, approximately 250 millisecond gaps are inserted, the time stamps will be different than if record stream offsets are used that insert silence equal to the original silence separating the spoken audio.

FIG. 14-2 indicates that a synthesized audio file (FIG. 4) 1494 may also result from (optional) create audio 1492. This may result from audio file assembly in assembly steps 1449 or 1468 where recording was performed with direct source, e.g., microphone 1415. The synthesized audio file (FIG. 4) 1494 also may represent an audio file 416 that may be processed manually, by speech recognition, or both on the speech-to-text workflow 400 (FIG. 4) to provide a transcribed session file 436 for comparison purposes. As illustrated in relationship to FIG. 4, the process may determine to create audio file 484b after decision in step 483 to process an untranscribed session file (USF) 482 created by speech recognition 476, or after decision in step 484a to create an audio file from a transcribed session file. Those skilled in the art with the present specifications before them will recognize that an audio file could be created using similar techniques with an untranscribed session file 426 created from external segmentation 424, or an audio file created from a manually generated transcribed session file 436.

Further, the optional delete text from copy TSF step 1496 may result in an untranscribed session file (FIG. 4) in step 1498. This corresponds to the create untranscribed session file (USF) 480a step of FIG. 4. This USF represents one or more untranscribed session file 482 that may be processed according to decision step 483 where the options are retranscription by speech recognition or manual transcription or create audio file.

As depicted in FIG. 14-2, in step 1496, text may be optionally extracted from copy of transcribed session files 1485a, 1487a, or 1490b, respectively, to create a untranscribed session file corresponding to one of untranscribed session files 1475a, 1477a, or 1480b. If text is extracted from a copy of the transcribed session file 1490b created using transcribe mode 1401 and record (audio file) source 1415, the resulting untranscribed session file (FIG. 4) 1498 will have an audio file corresponding to the original recorded audio file 416 and represent an original audio file (FIG. 4) equivalent 1493. If the text is extracted from a copy of other transcribed session files 1485a or 1487a, the resulting untranscribed session file (FIG. 4) 1498 will have an audio file corresponding to the equivalent of the synthesized audio file (FIG. 4) 1494.

In one approach, the features of the Microsoft Corporation SAPI 5.x, may be used to create an transcribed session file from a transcribed session file or to create an audio file from both session file types. Other speech application interfaces or approaches may be deployed without departing from the spirit of the invention.

Interactive, real-time speech recognition programs (e.g., Dragon®NaturallySpeaking® or IBM®ViaVoice®) commonly permit real-time display and editing of transcribed results. The edited audio-aligned text may be saved as a "session file" and opened in the real-time application or other compatible specialized text processor for later review and, if required, further editing. Similarly, those skilled in the art with the present specifications before them will recognize that the process described in FIG. 14 may be modified for use with a real-time speech recognition program (FIG. 7) whereby the application internally builds and stores session file data segment by data and displays the results real-time in a graphical user interface (740). In one approach, the graphical user interface may represent the session file editor 500 (FIG. 5) adapted for use with a real-time speech recognition (FIG. 7) application.

2. Speech Recognition for Dictation for Two or More Speakers

Speech recognition may be used for single channel and multichannel multispeaker settings. In addition to the benefits of automating transcription, speech recognition 476 may also assist in determination of sequence in cases of speech overlap. Using "ROVER" techniques, different speech user profile 312 (FIG. 3) or configuration parameters, or both, may be used to create 1 through N transcribed session file s478.

In one approach, with model mode, as described in relationship to process 100, the speech recognition program (FIG. 7) may return audio tags permitting playback for utterances, words, and phonemes. The transcribed session file with phonetic pronunciation may be opened in the session file editor 500 (FIG. 5). See FIG. 5J. Using the session file editor 500 (FIG. 5), the operator may select a phoneme or other word unit and playback audio 508 for the selected segment if an audio tag exists for that phrase, word, syllable, or other subword unit. The operator may determine start 5021 and duration 5022 utterance times, as well as current audio file position in toolbar 5002, see FIG. 5B. With audio tags assigned at the subword level, the transcriptionist potentially can determine sequence by viewing start/duration times for the tagged word or subword using the phonetics editor mode. See FIG. 5J.

a. Single Channel

In reference to FIG. 4, in contrast to the manual transcription phase, the process determines that a multi-speaker speech user profile 312 (FIG. 3) exists for the speakers as a group in the select dictation and transcription workflow 402 step. The audio file 416 may be segmented using segmentation parameters determined from group speaker data using speech analysis, as described in FIG. 6 and may be transcribed using server-based speech recognition 476. In one approach, two or more instances of the server-based program are used.

In a preferred approach, segmentation parameters remain the same to maintain an identical number of segments. The resulting multispeaker training session file 310 (FIG. 3) may be used to update the multispeaker speech user profile.

312 (FIG. 3). However, the segmentation parameters may be changed, and asynchronized output may be synchronized using the resegmenting and retagging algorithm described in association with FIG. 15. In one approach, the algorithm is incorporated in the synchronize 518 step of the session file editor 500 (FIG. 5).

The reviewing transcriptionist may listen to the audio for the transcribed session files 436, including composite TSF created in optional step 437b, compare alternatives, and correct errors in the composite TSF in step 519. Using the text and audio split and the text and audio merge steps 513 and 514 of the session file editor 500 (FIG. 5), the transcriptionist may create new boundaries based upon speaker identity, and text annotate 529 speaker identification in the text annotation tab. Using the ignore utterance feature 515, the user may mark certain utterances to be ignored in the creation of a training session file 312 (FIG. 3). As with manual transcription, boundary definition establishes segments associated to a particular speaker.

Postprocessing (FIG. 3) 446 may be used to assemble a verbatim transcript in an acceptable format using techniques similar to those for manual transcription in a multichannel, single source setting. As was previously described in relation to manual processing in relation to FIG. 12, an output session file, including a verbatim transcript 1225, and speaker-specific and group training session files 1260, may be distributed. If there are S speakers present, S different training session files 310 (FIG. 3) may be prepared for generation of one or more different speech user profiles 312 (FIG. 3) for each of the S speakers.

As is further described in relation to FIG. 20, parallel training and techniques may also be used to create one or more multispeaker speech user profiles. For instance, if speakers A, B, and C are present at 100% of the meetings, a multispeaker speech user profile 312 (FIG. 3) may be created using the training data sets for these speakers alone. If speaker D is present at 25% of the meetings, a second multispeaker speech user profile 312 (FIG. 3) may be created that is used for those relatively few meetings attended by speaker D. Unlike conventional programs that use MLLR or other sparse data techniques to update the acoustic model 750 (FIG. 7), the accumulator and combiner techniques described permit bulk modification of a multispeaker speech user profile 312 (FIG. 3) with data from a new speaker.

In reference to FIG. 3, the different multispeaker speech user profiles 312 may be created in two ways. First, speaker-specific user profiles 312 may be used in various combinations with accumulator and combiner techniques, as described in relation to FIG. 19, to create group speech user profiles 312 that reflect different potential combinations of speakers present. Second, different multispeaker speech user profiles may 312 be created based upon data acquired from different multispeaker training session files 310. For instance, data and training session files may be acquired for occasions where speakers A, B, and C are present to create one multispeaker speech user profile 312. Another set of data may be acquired for the less frequent occasions where all speakers A, B, C, and D are present to create another speech user profile 312.

b. Multichannel

Audio from each channel may be recorded 413 and saved as an file 416 (FIG. 4). Postprocessing generation of verbatim transcript 1325 or S training files 1330 may be generated. See FIG. 13.

C. Final Transcribed Session File (FTSF)

Source material for creation of final transcribed session file (step 440) may include the one or more transcribed session files (TSF) or other files from step 436. These ma undergo preprocessing 437b to create preprocessed files 437c before session file editor review 438. The transcribed session files may result from manual or automatic conversion. The "other files" in step 436 may include other files that may be produced as a result of other manual transcription 452, speech recognition 454, and/or structured dictation.

Speech recognition segmentation parameters are preferably the same for each transcription of audio file 416 or device audio 448 of FIG. 4. This would produce an equal number of audio synchronized text segments. Alternatively, different segmentation techniques may be used and will produce asynchronized output, corresponding to the one or more "other" manually transcribed 452 or speech recognition 454 files of process 400.

In one approach, if it is expected that preprocessing will be applied to asynchronized files, in step 434 the operator may synchronize asynchronized files in step 518 of the session file editor. This results in an equal number of segments using resegmenting and retagging techniques described in relation to FIG. 15. The process may next determine 437a whether to submit session files for preprocessing 437b to create a composite transcribed session file. The preprocessing application is described in relation to FIG. 11.

In one approach, the preprocessing application 1100 (FIG. 11) creates a best result transcription based upon output from speech recognition 476, manual transcription using session file editor 500 (FIG. 5), or both, depending upon the availability of output files from these sources, as determined by workflow selection 402. The purpose of the preprocessing application 1100 is to create a composite transcribed session file that may be used as an index or reference session file for evaluation in the session file editor 500 (FIG. 5) in step 438 before creation of the final transcribed session file with final report, document, or letter. Since it represents a best result, it may reduce correction time. The preprocessing application may also be used to offload to a server the potentially resource-intensive task of performing a text compare on multiple documents on a local computer. The preprocessing application may also be used for other processes involving conversion, analysis, or interpretation of speech or text input 301 (FIG. 3) or other data input 201 (FIG. 2) where the processed data output is expressed as text.

In one approach, the preprocessing application (FIG. 4) may use "ROVER" techniques to determine a best match based upon output from two or more instances of the same or different speech recognition programs 476 using different configurable options or different speech user profiles. These techniques may determine best results based upon confidence scores or occurrence and are described in a paper submitted with this application. In addition, the preprocessing application may also evaluate one or more transcribed session files prepared by manual transcription using the session file editor 500 (FIG. 5).

The decision 437a to send files for preprocessing 473b may be based upon minimal thresholds, such as availability of transcription material (two or more transcribed session files required), expected improvement in the accuracy for speaker's transcription (e.g. 5% or more improvement desired), and short delay only for transcription turnaround time due to server processing (e.g. less than 30 minutes). To some extent these thresholds may be determined by local preferences.

Figure 11:
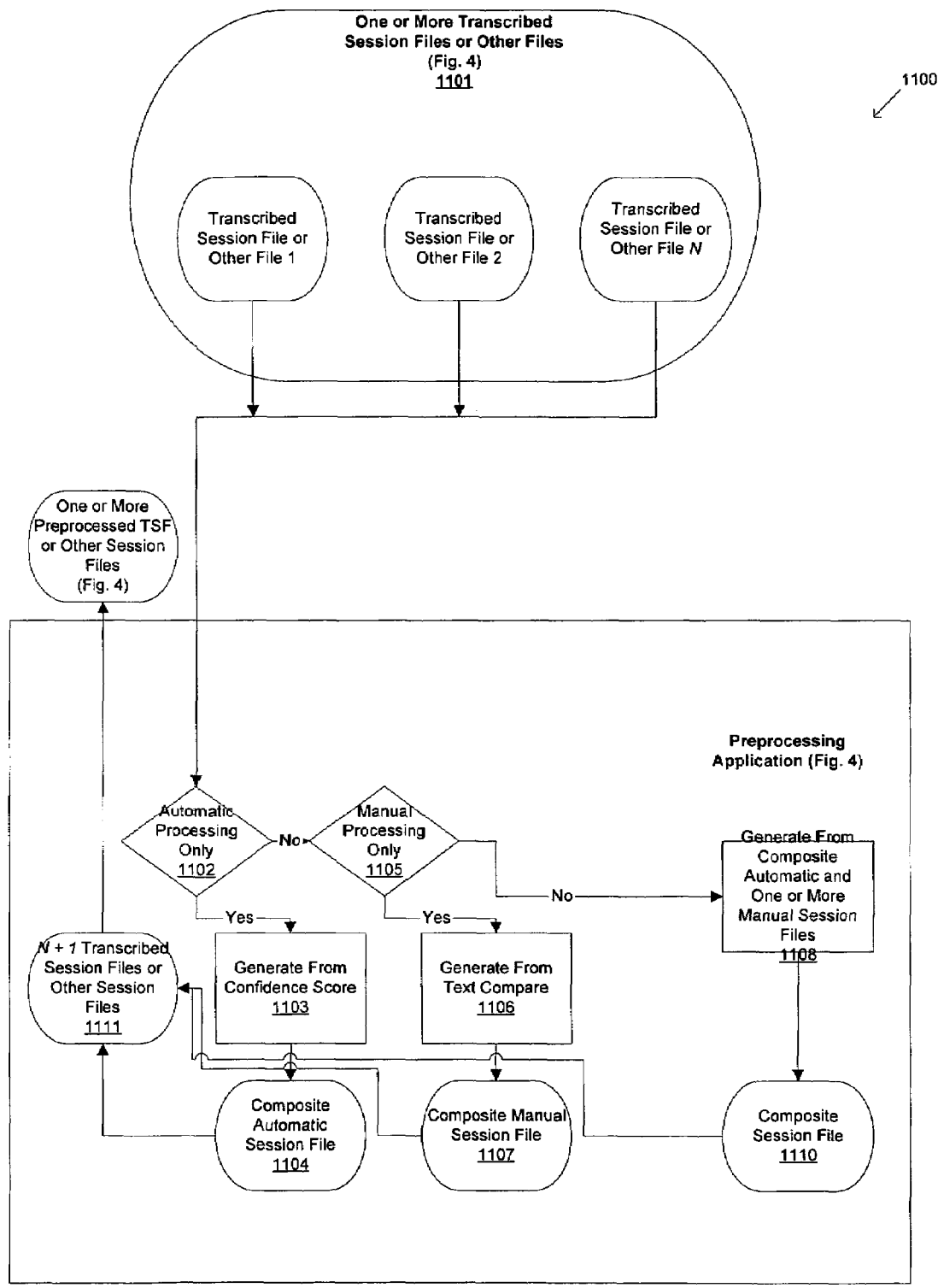
FIG. 11 is a flow diagram illustrating an exemplary embodiment of a preprocessing application that generates a composite, best result from two or more synchronized transcribed session files using automatic or manual processing or both, such as from a speech recognition program using a common speech segmentation module and manual transcription from untranscribed session files using the same segmentation module.

If the process selects 437a preprocessing application 437b, it may submit transcribed session files or other files 436 (FIG. 4), corresponding to step 1101 (FIG. 11). The preprocessing application 1100 (FIG. 11) first determines 1102 whether there is output only from automated processing, such as speech recognition 476 of FIG. 4. If there are files only from automated processing, the preprocessing application may generate a composite score for each segment based upon confidence score 1103 and create a best result, composite automatic session file 1104. This composite file may include the top-scoring alternative from each transcribed session file or other session file generated from an automated process. If there are 1 through N speech recognition 476 servers of FIG. 4, this results in N transcribed session files 476a through 476n+1, corresponding to the one of more transcribed session files 434. With creation of the composite 1104, there are N+1 transcribed session files 1111 corresponding to one of more preprocessed transcribed session files 437c of FIG. 4.

Experimentation by the inventors that use of the same speech recognition program 476 and identically segmented speech input improves the reliability of the confidence scores as a measurement of reliability between two or more text outputs. Confidence scores may be less reliable when comparing output from different programs or asynchronized output from the same program.

On the other hand, in step 1102 the process may determine not to generate composite transcribed session file on speech recognition or other automated process only and determines in step 1105 whether to generate composite only from manual process, such as manual transcription. If there are 1 through N manual transcription session file editors 500 (FIG. 5) creating files, this results in N transcribed session files 500a through 500n+1, corresponding to the one of more preprocessed transcribed session files 437c of FIG. 4. In this setting, the process generates a composite transcribed manual transcription session 1107 using text compare techniques 1106.

Figure 5S:
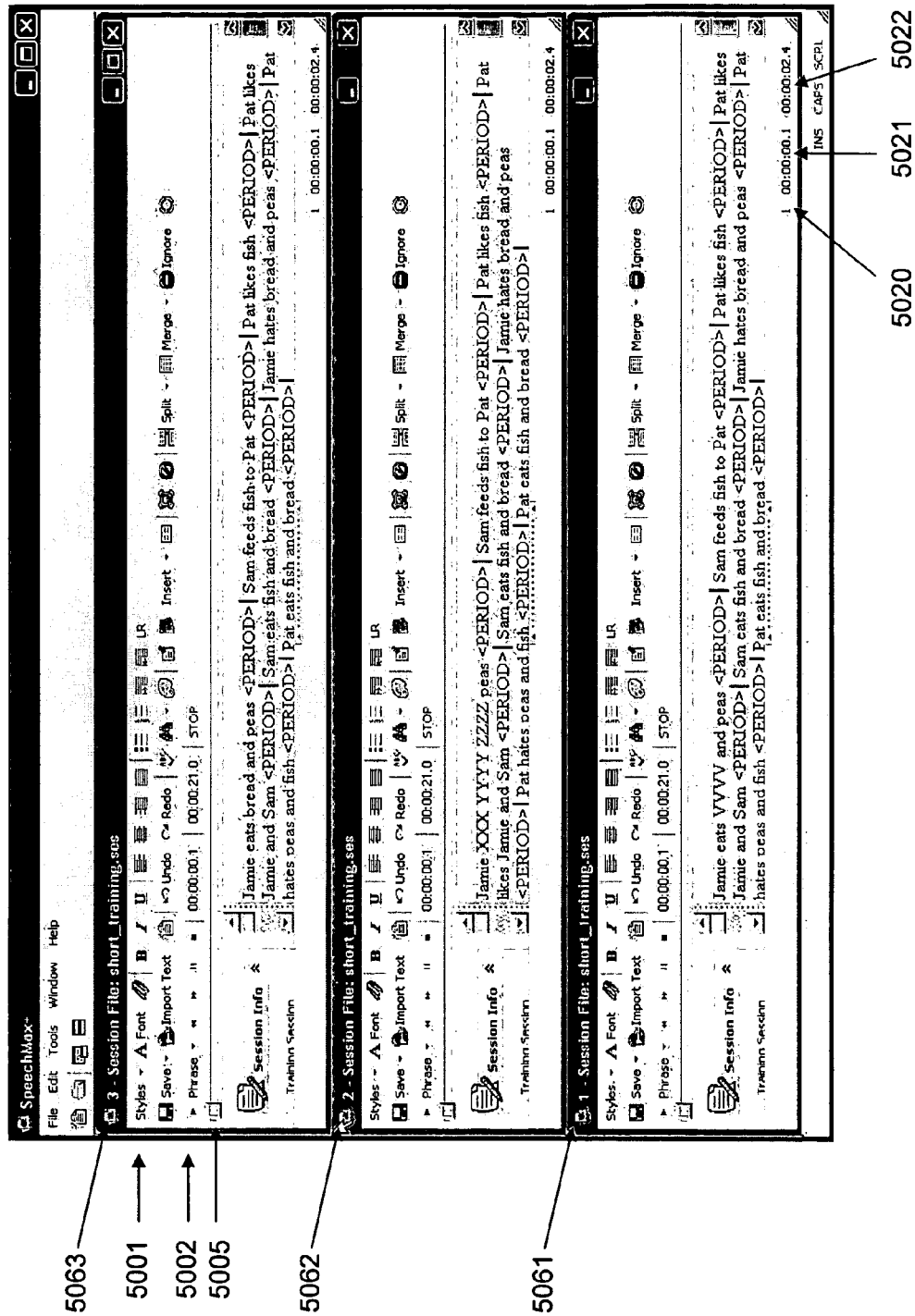
Figure 5T:
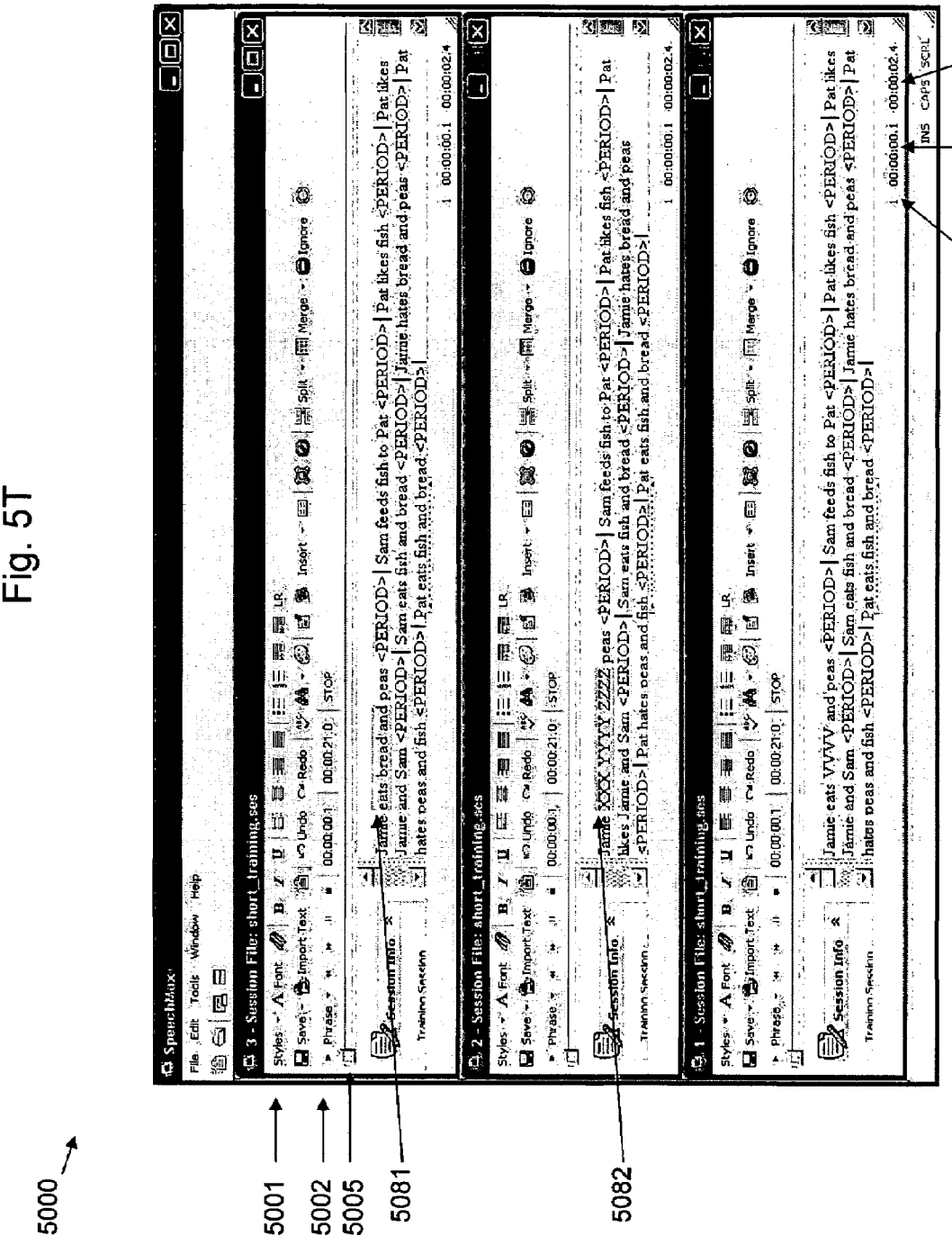
Figure 5U:
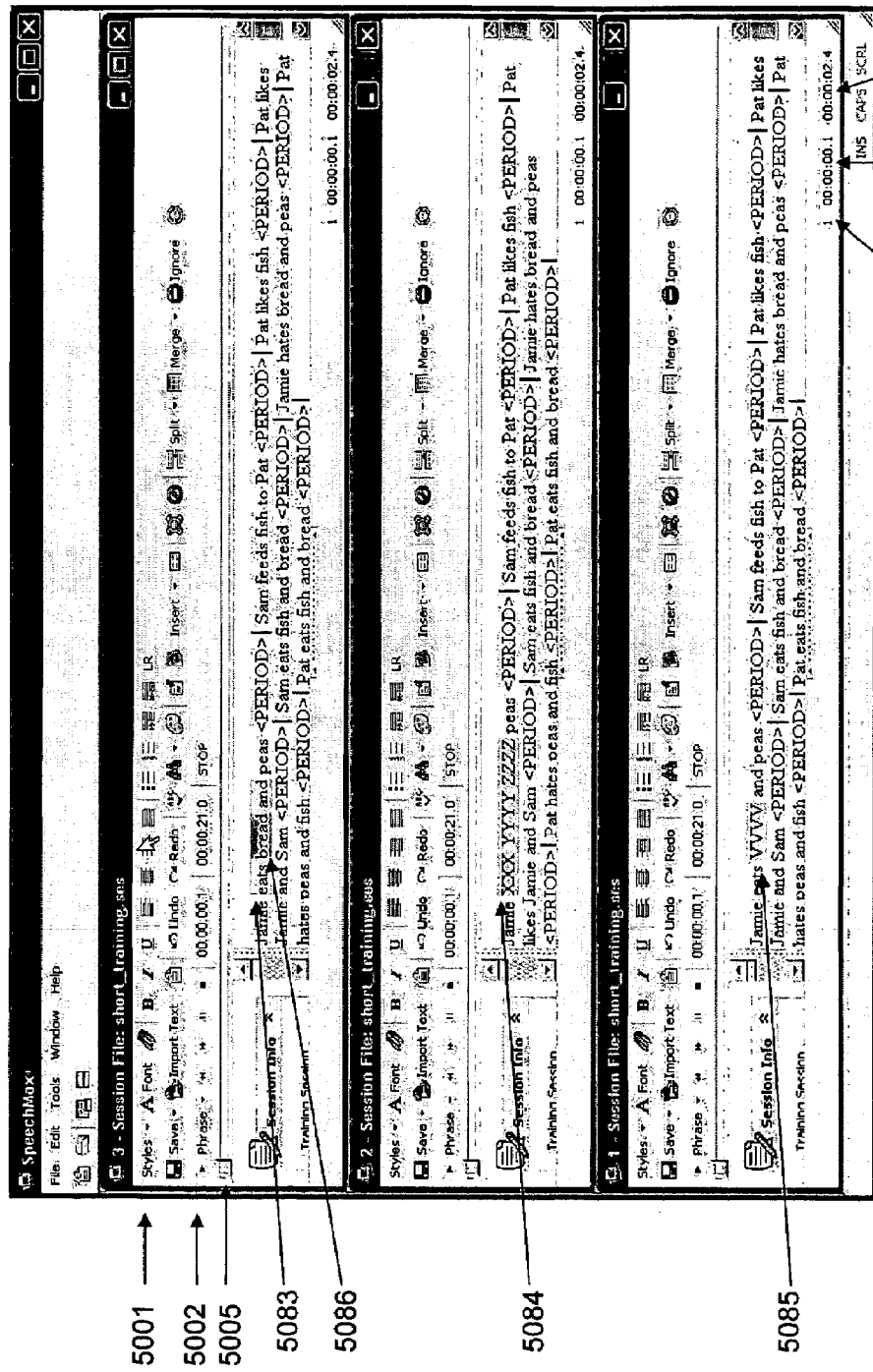
Figure 5V:
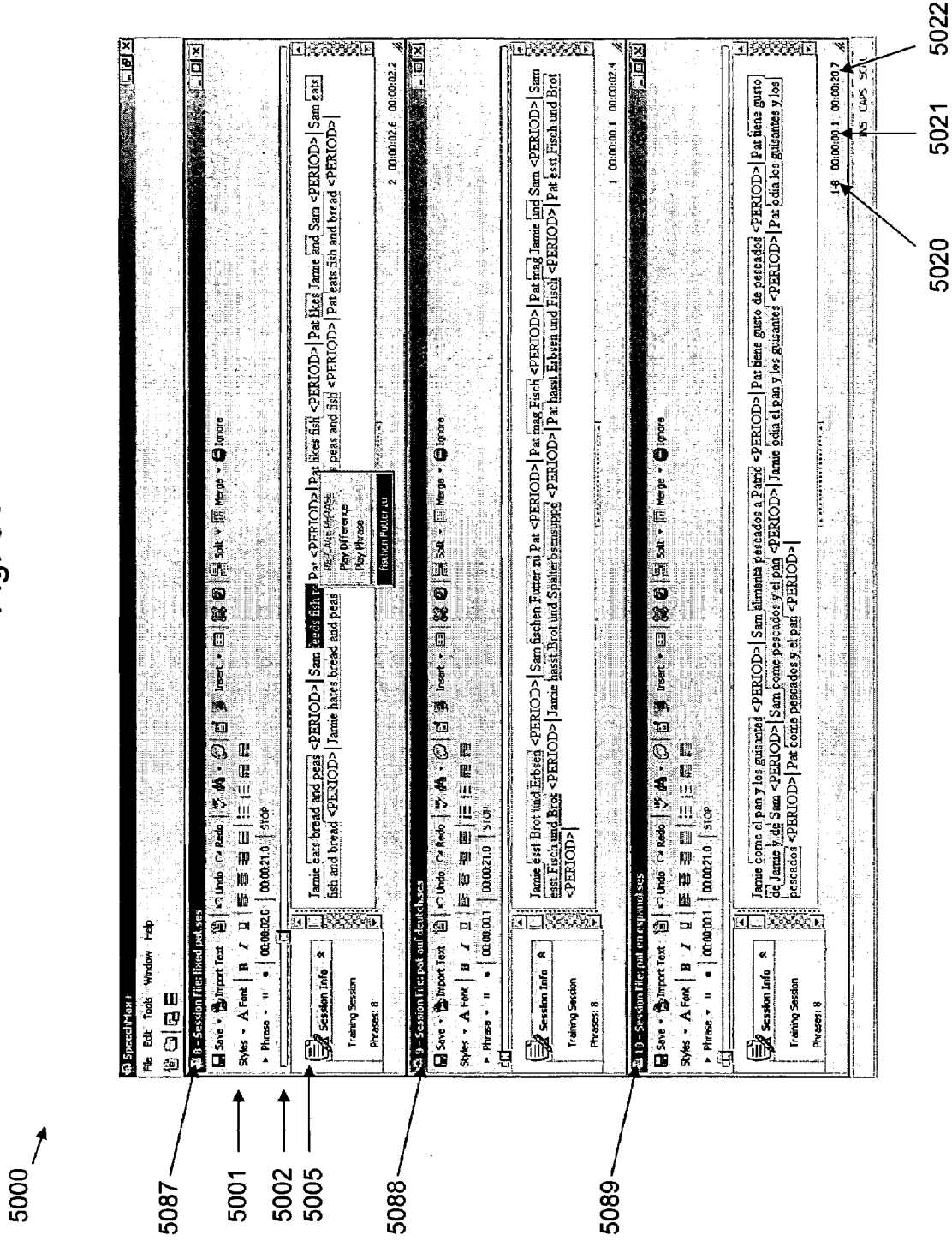

In a preferred approach, described in more detail in reference to speech recognition 476 output, and in relationship to FIGS. 5S, 5T, and 5U, a consolidated text compare is used. In this approach, the number of text matches and differences in a single transcribed session file are determined against each of the other manually transcribed files. Increased numbers of matches generally indicate increased reliability.

If the process determines 11 05 not to process manually processed session files only, it may determine to process both manually and automatically generated files. In step 1108, it may generate a composite from the composite automatic and each of manually-created session files. In this example, the total number of manual transcription and speech recognition instances is N. In one approach, the application may generate a composite TSF from the speech recognition transcribed files based upon confidence scores. A best result may be obtained based upon a consolidated text compare using the single composite automatic and one or more manually produced session files. The result is a composite session file 1110. With the other N transcribed session files, there are now N+1 transcribed session files or other files 1111. These correspond to the one or more preprocessed TSF session or other session files of FIG. 4.

Generation Final Transcribed Session File

After optional generation of one or more preprocessed TSF or other session files 437c, the workflow proceeds to session file editor 500 (FIG. 5) in step 438 for preparation of final text.

1. In the optional switch tags (step 517), the operator may elect to switch audio or text segment tags for buffered read/write windows with annotation audio or text segment tags to create a session file. This may create a more user-friendly format, e.g., the segment annotation text may be displayed as segment text in the read/write window, for preparation of the final output document, letter, or report.

The tag switching is performed using the paste feature of the operating system. Similarly, the audio annotation may be pasted into a tag line for playback by selecting text using playback aligned audio 508.

Figure 5W:
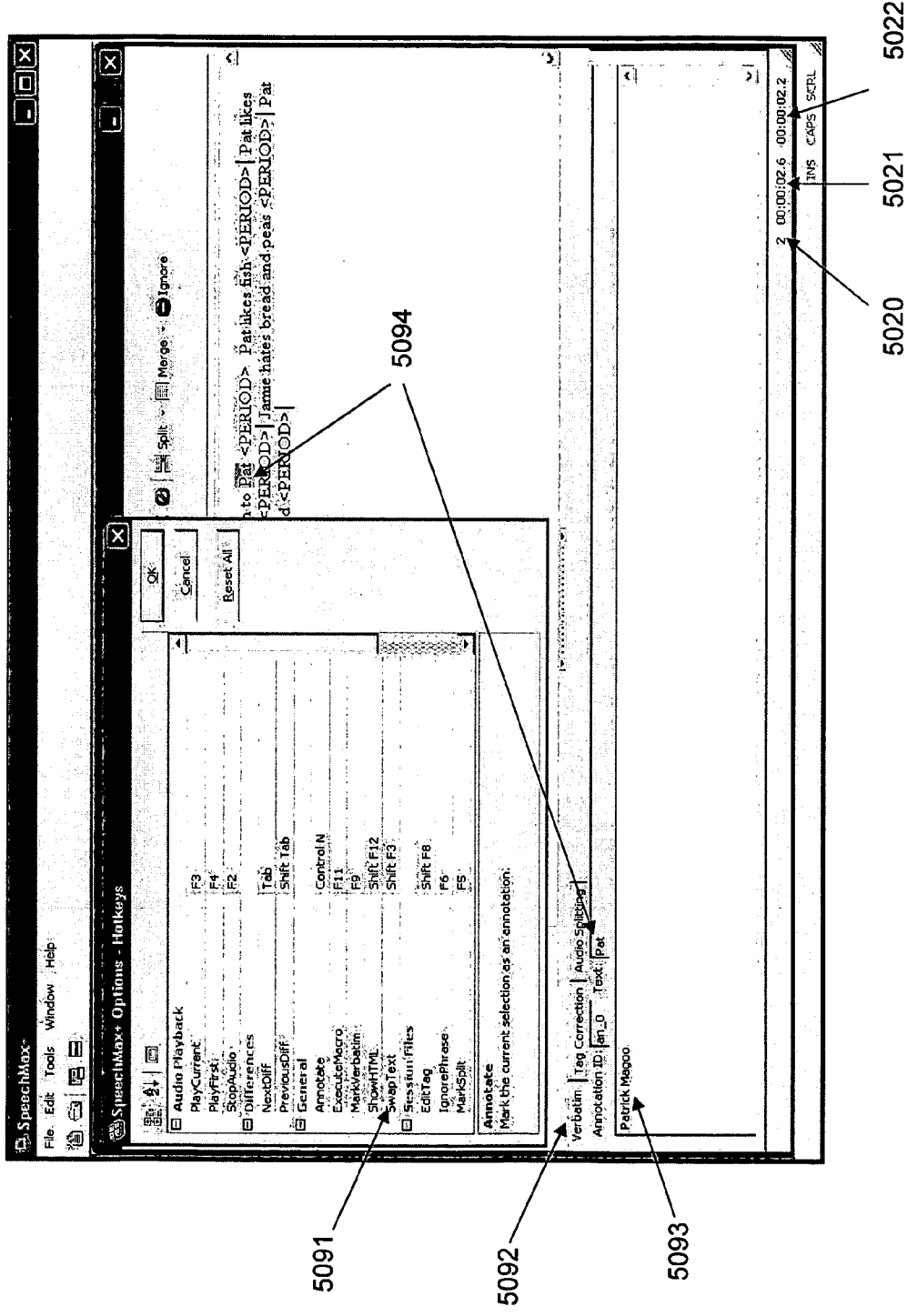
Figure 5X:
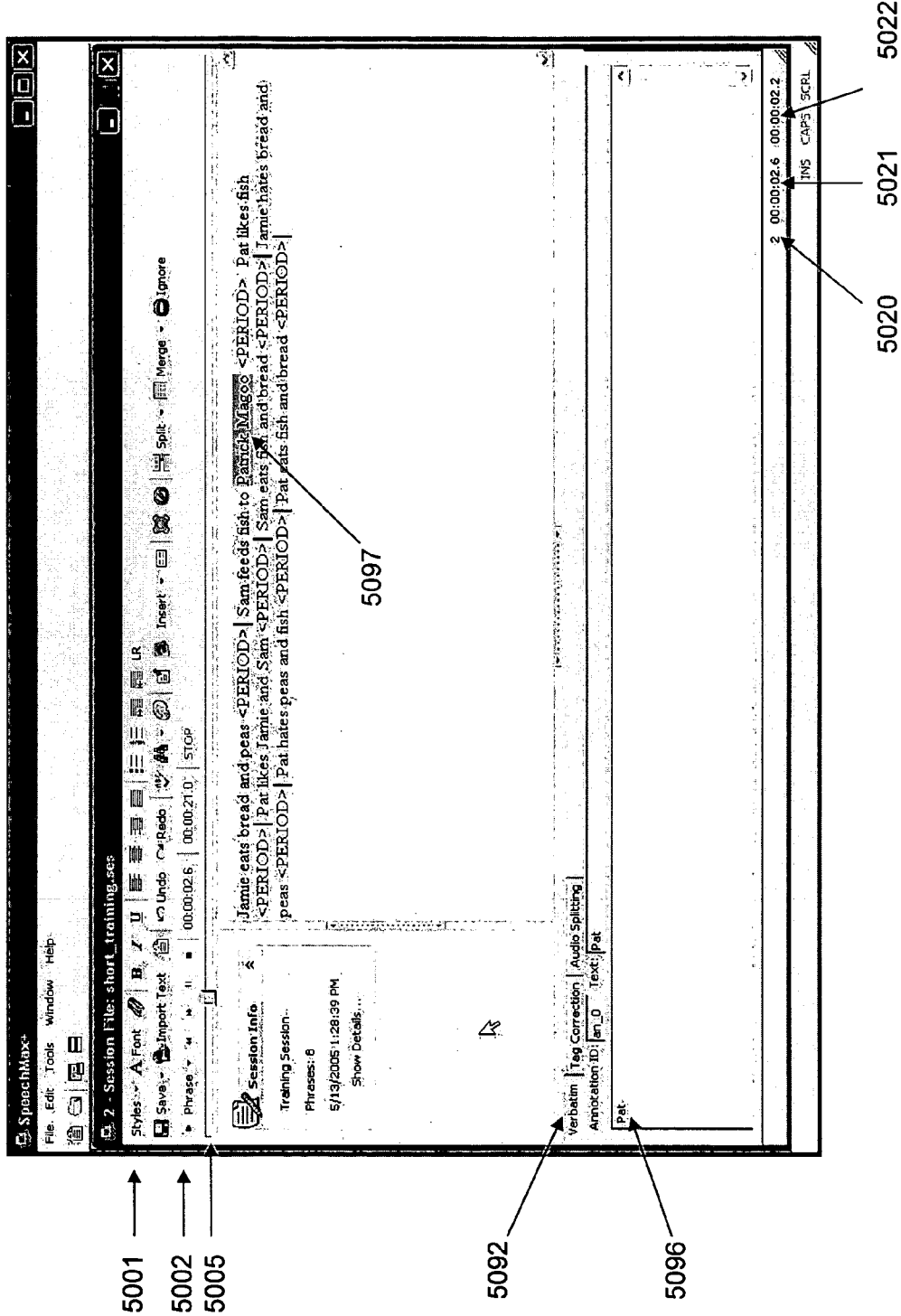
Figure 5Y:
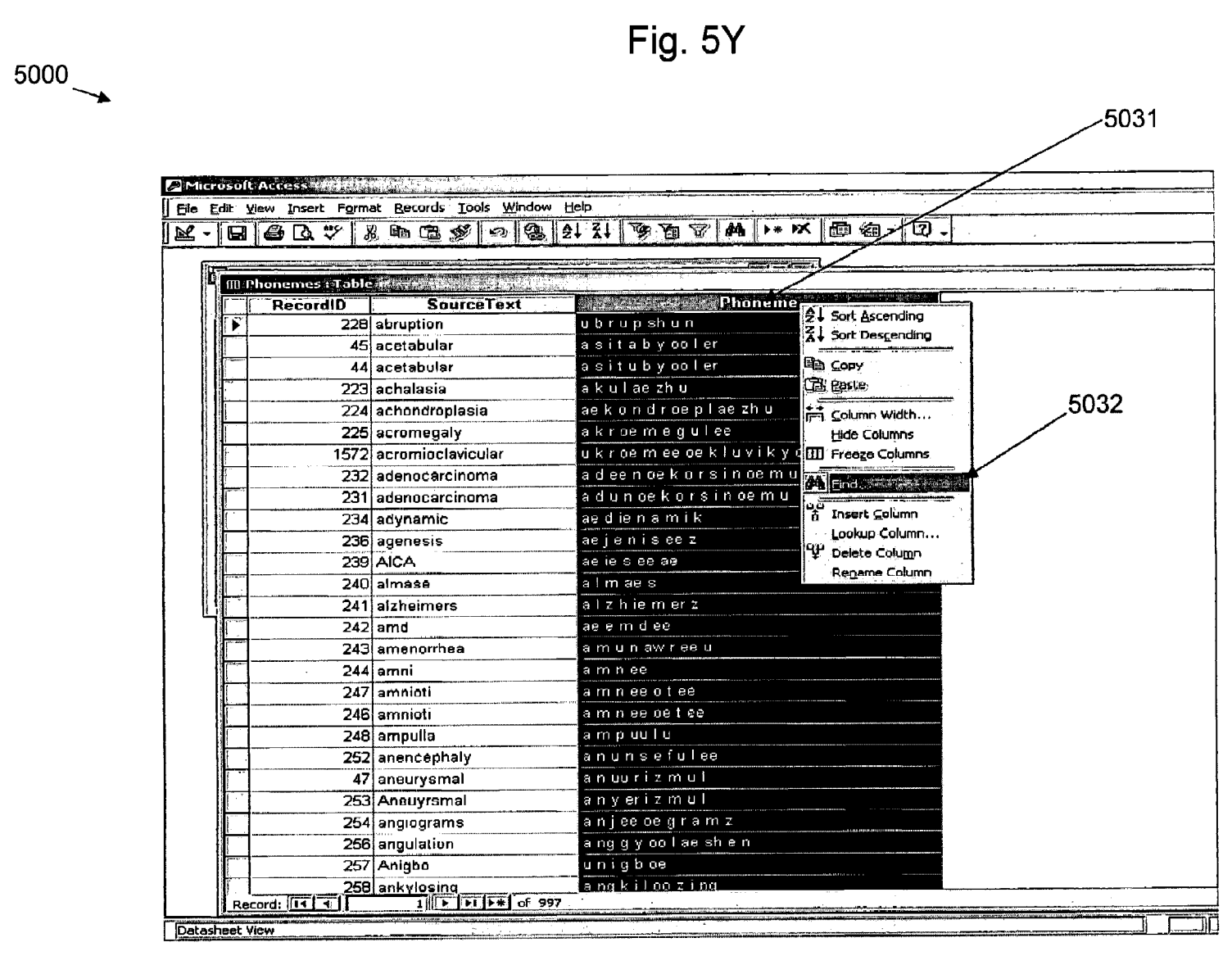
Figure 5Z:
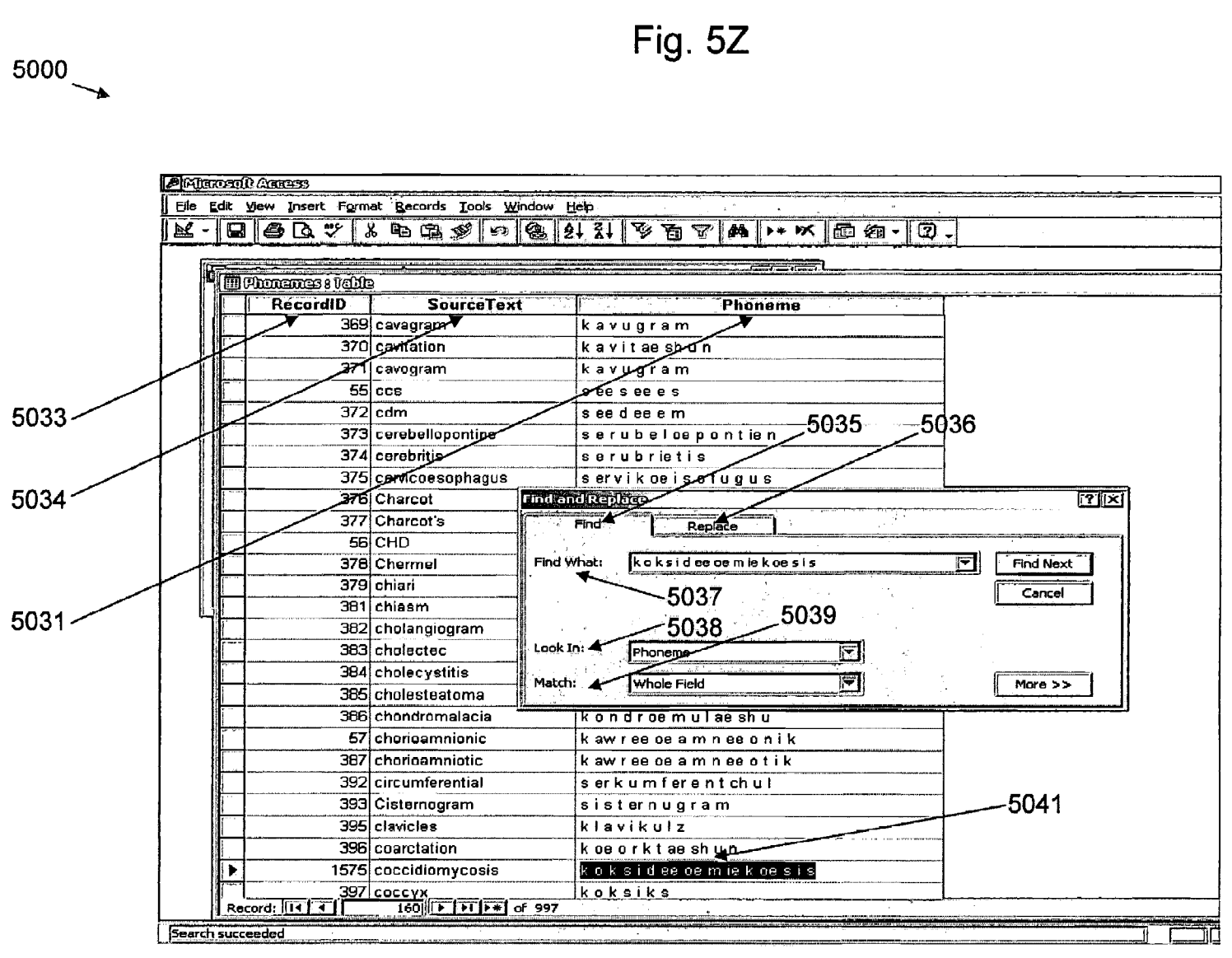
Figure 5A:
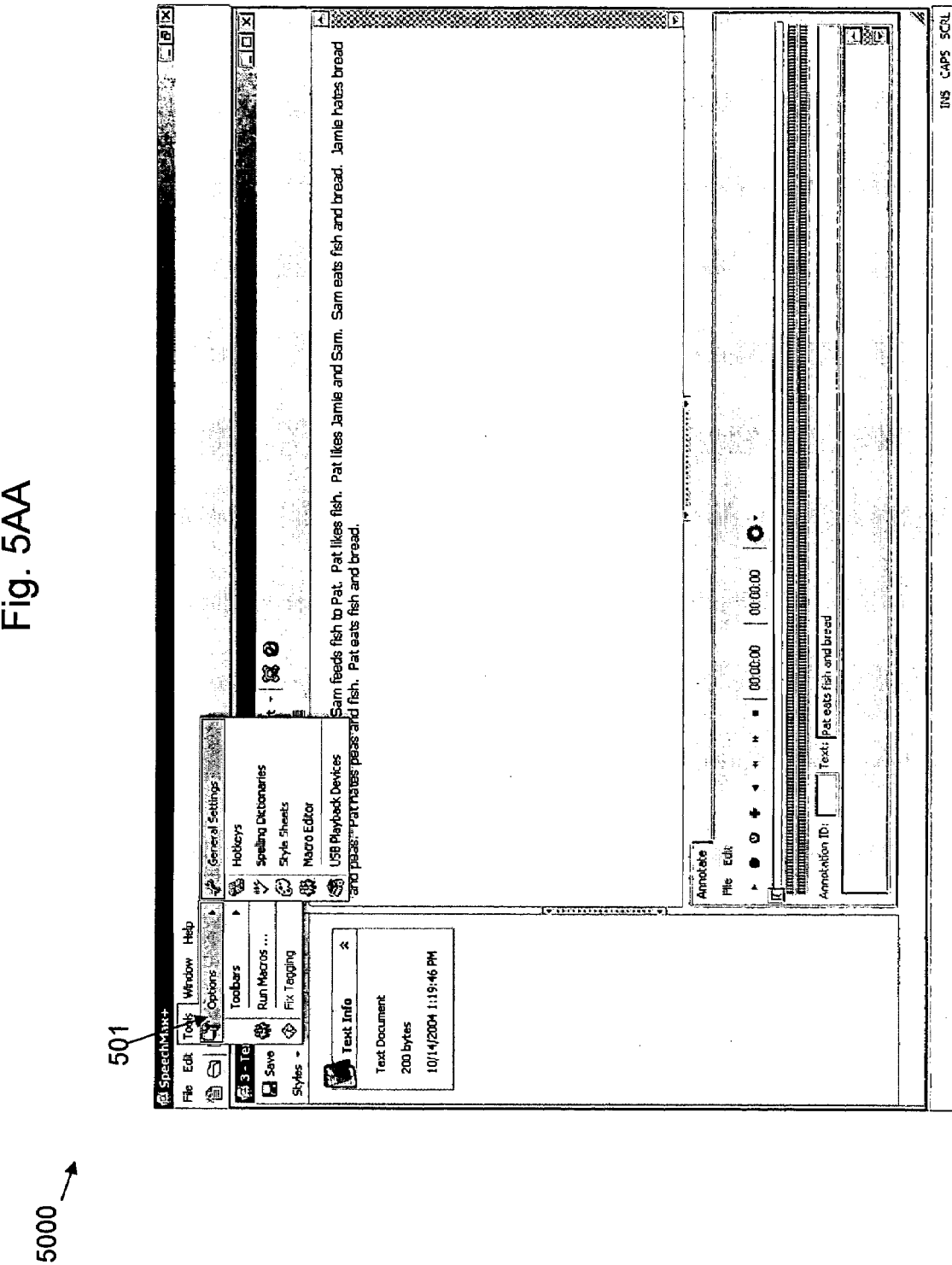
Figure 5B:
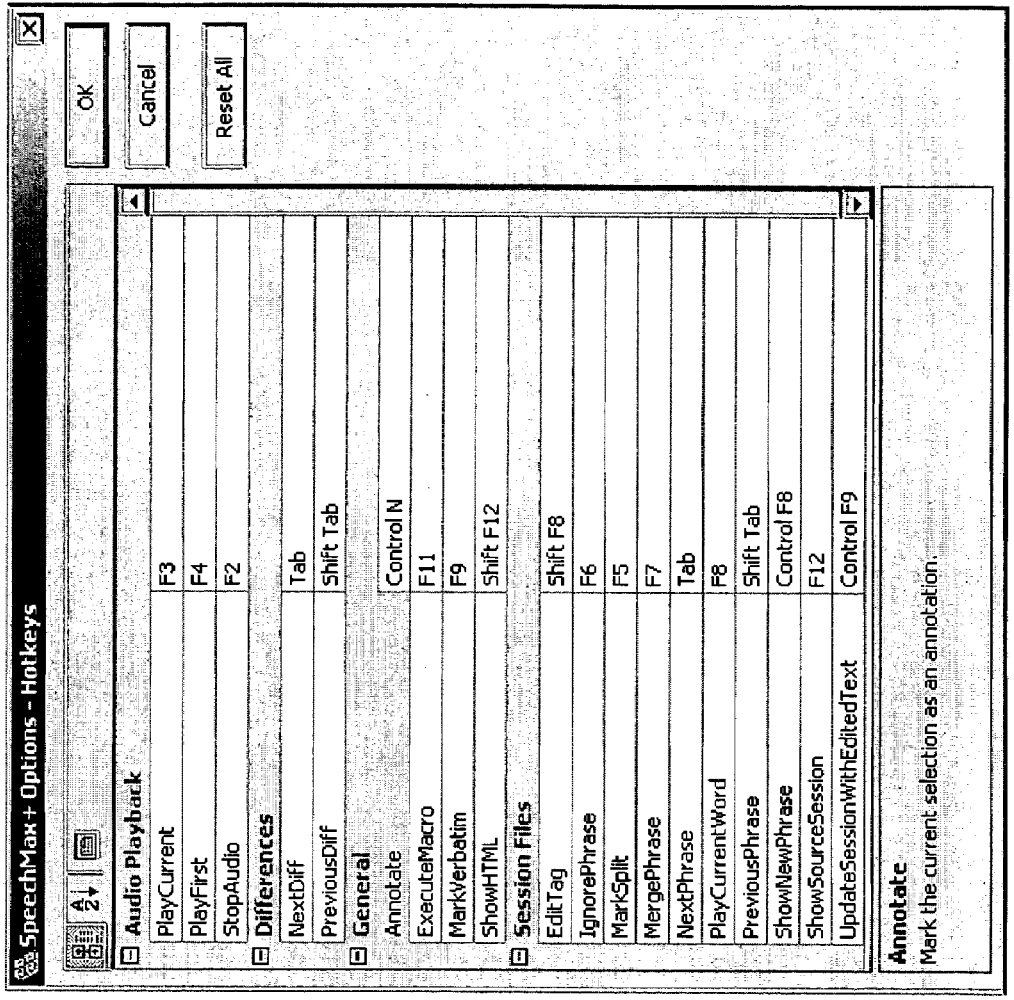

In one approach, tag switch 517 may be performed by activation of a macro , e.g., "Shift F3" to swap text from text annotation to the read/write window. In the example of FIG. 5W, the original, selected text 5094 is "Pat", which is displayed in both the read/write window and the "Verbatim" tab 5092 reference text window. The text annotation 5093 is "Patrick Magoo" such that after the swap, the read/write window text 5097 has "Patrick Magoo" and the text annotation window 5096 has "Pat." See FIG. 5X.

2. In the optional synchronization step 518, a resegmenting and retagging algorithm (FIG. 15) is used to produce an identical number of segments from asynchronized files. This may be used in synchronizing asynchronized text from other speech recognition 454 such as Dragon® NaturallySpeaking® for comparison to IBM® ViaVoice® that do not use common segmentation parameters. However, the resegmenting and retagging algorithm (FIG. 15) may be used for other asynchronized files.

3. In the prior art, text compare using conventional techniques may be performed across the entire text file. This functionality is included in the session file editor 500 (FIG. 5). Within the present invention, to determine reliability of transcribed text, a text compare of synchronized session files may also be performed segment by segment in text compare 519.

In one approach, the operator may select a button to text compare across the entire document, as with "Text Compare" button 519A in FIG. 5B, or by phrase, as with "Text Compare" button 519B. The operator may also remove highlighting from the text compare by the button just to right of the text compare by phrase icon. Text compare may be used for transcription into the same or different language of the speaker.

In one approach, text compare may be performed between two or more viewable buffered read/write windows 5000 in the multiwindow session file editor 500 (FIG. 5). In this approach, as illustrated in FIG. 5Q, differences may be highlighted. A selected difference 5051 may have the alternative text 5052 from the other buffered read/write window 5053 displayed in a popup window. In one approach, the tab key may be configured in step 501 basic options (tools) to shift between recognized text differences. See FIG. 5BB.

In another approach, a session file may be chosen as the reference and viewed as a buffered read/write window 5000. Text compare may be performed on a hidden, synchronized, buffered session file segment by segment. Differences in the reference session file text may be highlighted. See FIG. 5R, where the differences are highlighted with color highlighting to indicate a difference exists.

In one approach, the different texts may be displayed in a popup dialog 5200 when, for instance, the cursor is passed over the indicated text. The dialog 5200 may display the difference text from the second (and hidden as in FIG. 5R) session file and permit the operator to play audio for the difference or the synchronized utterance. Using the paste feature of the operating system, the operator may copy the alternative text into the sentence of the reference session file. By providing popup dialog 5200, the operator will be assisted in correcting the document more efficiently. Alternatively, the user may keyboard the change directly.

In the exemplary embodiments illustrated above, using two different buffered, synchronized session files, aaa and bbb, each transcription may use a different speech user profile for speech recognition program or different configurable settings, such as relatively weighting of language and acoustic models, beam pruning parameters, and others, but identical audio segmentation. As a result, each will have the same number of segments (8 in the examples above). Using the tab key, based upon configurable option in basic options setup step 501, see FIG. 5BB, the operator may tab forward or backward to view matched or unmatched text displayed utterance by utterance.

In another embodiment shown in FIG. 5S, consolidated text compare uses two or more different buffered session files for example, windows 5063, 5062, and 5061, respectively. In this case, matched and unmatched text between text A (5063) and text B (5062), and between text A and C (5061), would be both noted in the same markup of text A. The markup of text A would vary depending upon the number of matches associated to the text in A. If both the text in B and C differed from A, the markup score would be two. If only C differed from the text in A, the markup would be 1.

By color coding the text in A, colored underlining, colored highlighting of the space surrounding the text, or other visual methods, dimensionality is created as to the certainty of the text in A based upon the number of texts matching to it. If A, B, and C were matches, it may be color coded black to indicate high likelihood of accuracy. If both B and C differed, it may be color coded red. If only C differed, the font might be color coded pink.

As illustrated in FIGS. 5S, 5T, or 5U, in FIG. 5S, session file 3 at 5063 is referenced as the index file. Session file 2 at 5062 and 5061 may be displayed and compared to the index. In FIG. 5T, the results of text compare are shown between session files 3 and 2, with differences indicated at 5081 and 5082 respectively. In FIG. 5U, text compare has also been performed with session file 3 against session file 1 and the results scored in reference to the index session file 3. A difference is displayed in session file 1 at 5085 compared to session file 3. The preexisting differences between session file 3 against 2 are again displayed in the respective session file windows (at 5083 and 5084). In FIG. 5U, in the index session file 3, increased color coding is shown at 5086 for the word "bread," indicating relative high differences markup compared to other highlighted text.

A high number of matches with other session files indicates increased likelihood of reliability. With a multiwindow session file editor 500 (FIG. 5), an unlimited number of texts may be compared. As the percentage agreement increases, the likelihood of accuracy increases, unless there is systematic error. In certain situations, where decisions are not life-threatening or critical, it may be convenient to assume the accuracy of computer-generated results where there is agreement by a threshold number of transcribed session files 436 of FIG. 4 concerning the transcription of a phrase or word without post-human review. In these situations, it may also be practical for the unvalidated results of matched transcription to be exported as paired text and audio 534 or otherwise used as data sets for training session file 310 (FIG. 3).

Any session file text output from human processing, automated pattern recognition processing, or both may be compared using the above techniques in review step 205. See FIG. 2. Speech and language applications with speech input and text output in a session file may include speech recognition for dictation, command and control, interactive voice response, audio mining, speaker recognition, text to speech, machine translation, and natural language understanding. See FIGS. 3, 4, 7, and 8. Output from similar manual processes may also be compared. See FIGS. 4, 9.

Further, text-based description of results of two or more pattern recognition programs, such as optical character recognition, handwriting recognition, computer aided detection in medicine, or others may also be compared in the session file editor 500 (FIG. 5) using the same color-coding techniques described above. It should also be understood by those of ordinary skill with art having the present specification before them that any graphical techniques for distinguishing between text may be used as an alternative to color-coding, including font type, font sizing, underlining, italicizing, and other means of emphasizing text.

Figure 10:
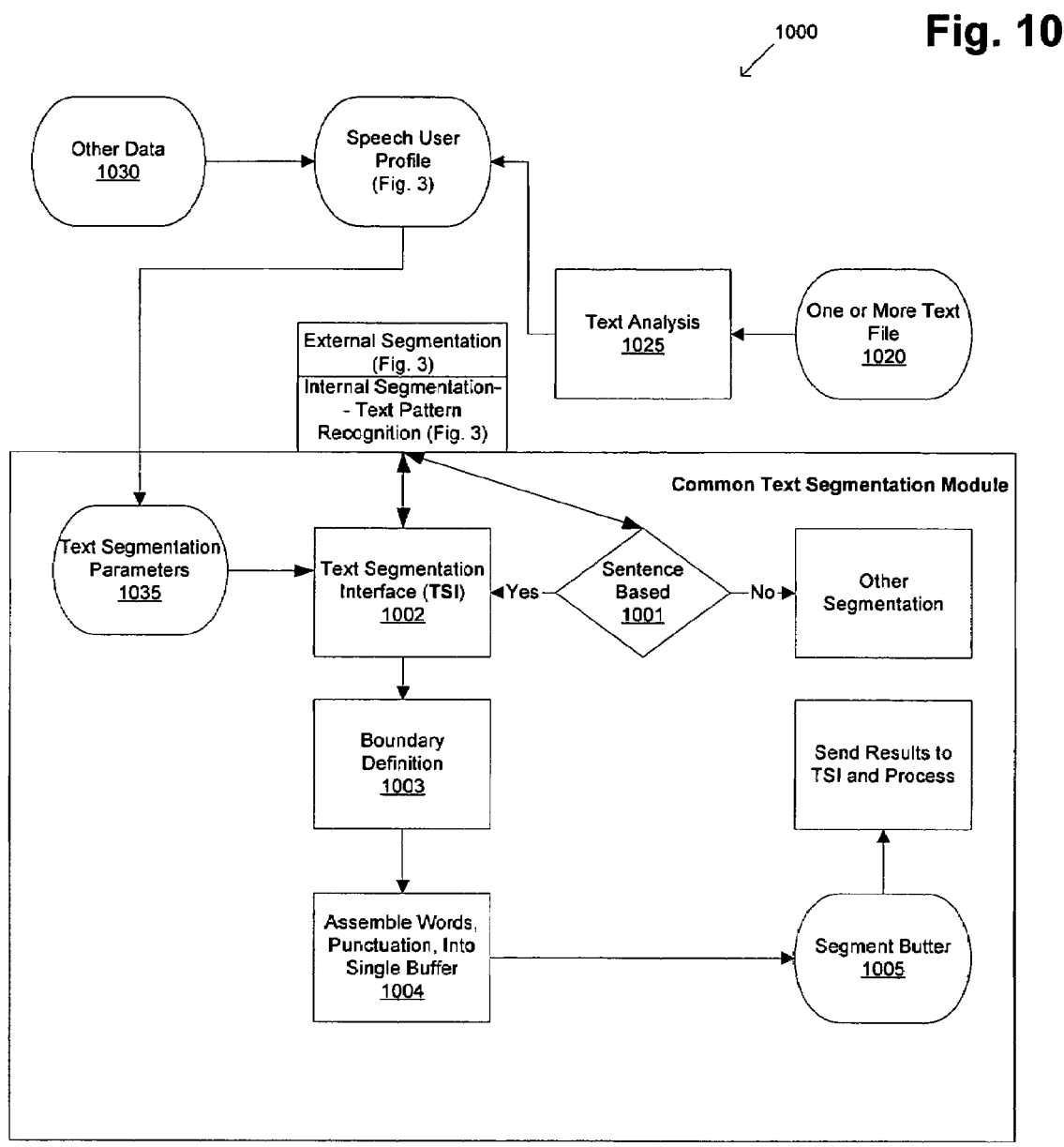
FIG. 10 is a flow diagram illustrating an exemplary embodiment of diagram of sentence-based segmentation for a text segmentation module.

In a further-related approach, a session file may be created with text input and aligned text output both corresponding to initial text and segmented, as illustrated by FIG. 3, based upon sentence or other criteria, as shown in FIG. 10. For instance, a baseline segmented session file could represent the initial draft for a legal document. In this approach, the initial text may be transcribed using the session file editor 500 (FIG. 5) on the speech-to-text workflow 400 (FIG. 4). This may transcribe into an empty session file (ESF) 464 into the read/write window to create an incomplete session file (ISF) 470. The text entered into each segment may be determined by the human operator. Depending upon manual selection, one or more words, sentences, paragraphs could be entered into each segment.

As changes were made to the text output in successive versions of the draft, text compare 519 could be performed on a segmented basis. Creating such a text-based session file permits synchronized comparison of successive changes made by the author or changes made by other parties. In one approach, each segment of the original would be numbered. The application would track repositioning of various numbered segments in the document for purposes of text comparison with the same numbered previous or new corresponding segments.

In another approach, text compare may be restricted to text not marked using that has been marked as non-dictated 535 or other similar feature. This may be used to focus correction on dictated text for creation of speech user profile 312 (FIG. 3). In another related approach, the process may begin with a "blank" document that has boundary markup performed using split text 510 function of session file editor 500 (FIG. 5).

4. After text comparison, in the create or edit text in step 520, the operator may enter or modify text in one or more buffered session file windows based upon the results of the text compare. In one approach, if no changes are made, the transcribed text from a speech recognition program that has been text compared becomes the final text. In another approach, the editor may create text based upon an untranscribed session file (USF) 426, such as shown in FIG. 4, or edit text from a real-time or server-based speech recognition program, such as described in FIG. 4, without reference to outside text.

5. If the operator in the create or edit text step 520 makes text changes through direct keyboarding or using the paste function of the operating system to copy text, this may result in automatic realignment (remap) of word tags, as shown in step 521. In one approach, automatic realignment occurs within a segment. This automatic realignment results in time savings to the transcriptionist without need to remap using the speech analysis window, as described in FIG. 5A, using audio and text realignment features in steps 513 (text and audio split) and 514 (text and audio merge).

Figure 16:
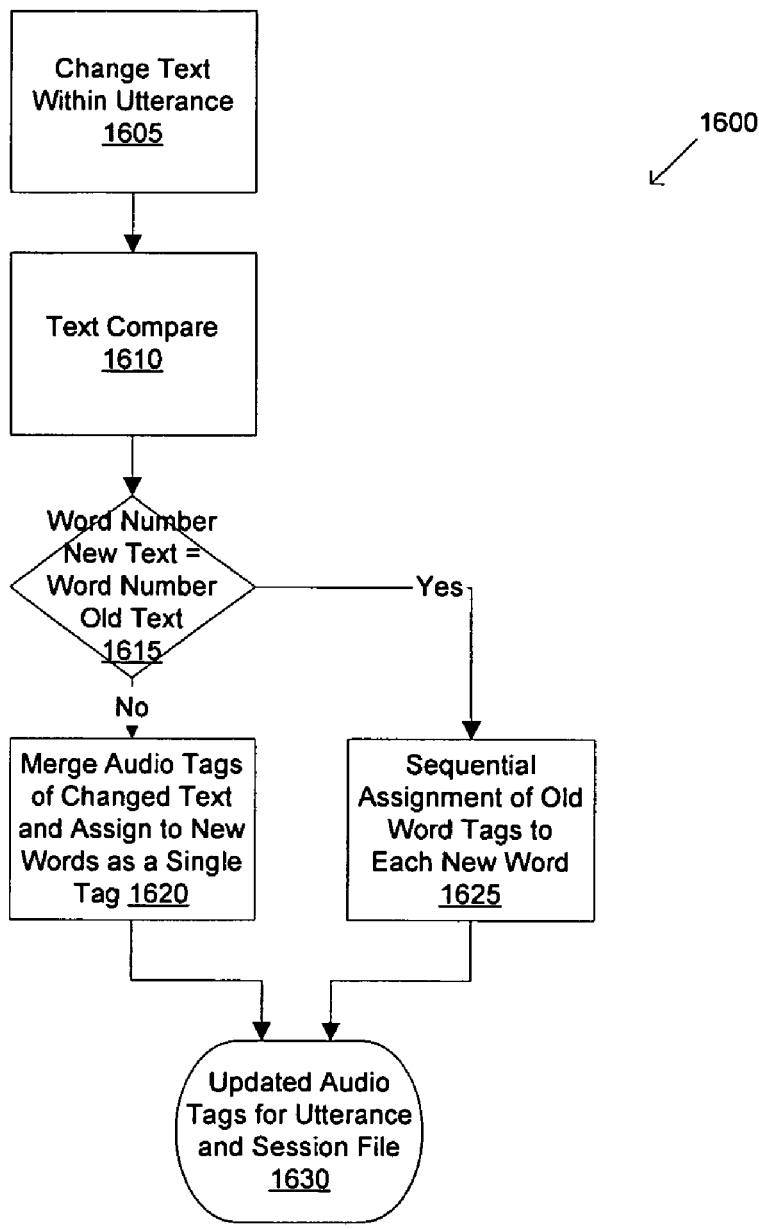
FIG. 16 is a flow diagram illustrating an exemplary embodiment of automatic reassignment of audio tags for edited text using text compare.

Automatic realignment may be accomplished by a function key (hotkey) automapping feature that reassigns audio-word 521 or audio-phoneme 523 tags after performing text compare. See FIG. 16. While the disclosed technique is advantageous for generating audio-aligned verbatim text for a training session file 310 (FIG. 3), the automapping technique may be used regardless whether the substituted text is verbatim.

In one approach, using one text window as the main reference, the transcriptionist may play the audio, and correct text in the main window by keyboarding the corrections into the segment using the create or edit text in session file function 520. Unlike conventional systems that require verbatim text entry into a special correction window to maintain audio text alignment, the operator may make, as disclosed in FIG. 16, a change (substitution, addition, or deletion) within an utterance 1605, click on an automapping hotkey or otherwise initiate automatic remap of a word 521 or phoneme 523 with text compare 1610, and reassign of one or more original audio tags. If process determines 1615 that the word number of new text equals the word number of old text, there may be sequential assignment of one or more old word tags to one or more new words 1625. If not, audio tags may be merged and assigned to one or more new words as a single tag 1620. This updates the audio tags for the utterance 1630.

In another approach, the operator may use the operating system to copy and paste text from one or more buffered session files into the reference window.

In one approach, the original segment text may be A B C D E F G and the new text is X Y Z D E F G. Each of individual audio tags for A, B, and C are assigned sequentially to X, Y, and Z, if the operator initiates the reassignment after the replacement of each word to indicate automatic reassignment.

If the operator fails to reinitiate word or phoneme tag remap 521/523 and replaces A, B, and C with X, Y, and Z, the audio tags of A, B, and C are merged into one tag and reassigned as a merged tag to the word group X, Y, and Z. The start/duration time (milliseconds) for the X-Y-Z audio tag corresponds to the consolidated start/duration time of the originally separate audio tags for A, B, and C.

In this approach, a word is defined as a sequence of continuous characters not separated by a space. In a previous, copending application, the assignee has disclosed word mapping using a simplifying assumption that word number equality between original and changed text indicates that each word in the original and changed text were generated from the same speech input. U.S. Non-Provisional application Ser. No. 10/014677, "Speech Recognition Program Mapping Tool to Align an Audio File to Verbatim Text," filed Dec. 11, 2001, which claims the benefits of U.S. Provisional Application Nos. 60/19,949 filed Feb. 5, 1999; 60/120,997, filed Feb. 19, 1999; 60/208,878, filed Jun. 1, 2000; 60/208,994, filed Jun. 1, 2000; and 60/253,632, filed Nov. 28, 2000, each application of which is incorporated by reference to the extent permitted by law.

In a further approach, the remapping of audio tags of an entire text may be partially automated by performing text compare between the original session file and session file with changed text segment by segment. Audio tags and alignment may be automatically reassigned based upon the number of words. Where there are an equal number of words in the original and changed text, audio tags may be automatically reassigned on a one-to-one basis.

6. In one approach, a speech recognition program may also be optionally configured to return standard text and phonemes in model mode. The session file editor may include phonetic editing 522. See FIG. 5J for illustration of the graphical user interface during phonetic editing. In the phonetic editor step 522, the operator creates or edits phonetic transcription. Switch tags 517, synchronize 518, and text compare 519 steps may be used with phonetic transcription.

7. In the remap phoneme tag step 523, session file phoneme tags can be remapped automatically during manual editing of the single utterance or copy and paste from an utterance in another session file window, as described for routine transcription. See FIG. 16.

8. A language model may include information on the probability of a unigram, bigram, trigram, or other N-gram appearing in the text corpus, statistics on out of vocabulary words, and the likelihood that the entire phrase was uttered by the speaker based upon model statistics.

In step 524, check against language model may assist the operator in determination that a word or phrase was uttered by the speaker. In one approach, the macro activation feature of the session file editor may be used to implement word check using a language model. This functionality may be of more assistance where the audio quality is poor and the operator would like to determine likely word choice primarily based upon language model statistics.

For example, if the questionable phrase is "coccidiomycosis lung disease", the operator could use the check against language model 524 feature to determine the probability of each unigram, bigram, and trigram appearing in the text corpus 767, the percentage of out of vocabulary words, and likelihood that the phrase is in the text corpus.

In this example, the unigrams are the separate words "coccidiomycosis," "lung," and "disease." The bigrams are "coccidiomycosis lung," and "lung disease." The single trigram is "coccidiomycosis lung disease." Using established techniques in the speech and language processing field, the operator may generate a likelihood for the unigram, bigram, and trigram that each are generated from the text corpus 767 (FIG. 7). As the text corpus represents the transcribed dictation of a speaker, the likelihood, for instance, of the trigram "coccidiomycosis lung disease" provides the transcriptionist with a likelihood estimate of the dictating speaker having uttered this phrase.

In one embodiment, the operator selects the questionable transcription and reverse formats it to language model 760

(FIG. 7) compatible text using reverse format feature of step 530. Reverse formatting may be required because the language model preferably generates statistics based upon verbatim, not nondictated formatting of dates, measures, and other formatted text. For example, the author might say "sixteenth of July nineteen hundred and forty two", but it is forward formatted after speech-to text-decoding 730 in postprocessing 735 to "Jul. 16, 1942" using regular expressions in speech recognition process 700 (FIG. 7). Therefore, the likelihood that the speaker said "July sixteen nineteen <comma> forty two" might be quite low, but the likelihood of having uttered the trigram "sixteenth of July" might be quite high.

9. A novice transcriptionist may also be uncertain of a word's spelling after listening to the audio and require assistance. In the check pronunciation database (step 525), using the database of a text-to-speech audio pronunciation generator (FIG. 17), the transcriptionist may search for a word by entering phonetic pronunciation using standard database lookups. This may be activated by a session file editor 500 macro utility.

As illustrated in FIGS. 5Y-5Z, the operator does a word lookup based upon its pronunciation. For instance, the operator may access a specialized vocabulary (such as a subdirectory with the Radiology Terms.lxd) and selects the database. In FIG. 5Y, after accessing the Radiology Terms stored in a database, the operator selects "Find" 5032 in the dropdown menu, as illustrated in FIG. 5Z, showing part of the database table with "RecordID" 5033, "SourceText" 5034, and "Phoneme" 5031. A "Find" 5035 and "Replace" 5036 dialog appears that enables the operator to enter the suspected "Simple" phonetic pronunciation for the medical term "coccidiomycosis" in the "Find What" 5037 dialog text box: "k o k s i d ee oe m ie k oe s i s". The lookup results are illustrated in the background of FIG. 5Z showing selection of the phoneme representation for the RecordID/SourceText for coccidiomycosis.

Those skilled in the art will recognize that database lexicon lookups may be based upon some or all of the phonemes in a word's phonetic pronunciation and return one or more items. They may also be based upon a variety of phonetic pronunciation representations.

10. In one approach, audio mining (word spotting) may also be performed to determine if the word or phrase has been uttered in one or more previous (target) dictations in step 526 compared to speech input from a specific source dictation. Text-based audio mining may be performed, as illustrated in FIG. 7, or phoneme-based audio mining, as described in FIG. 8. Audio mining functionality may be implemented by a macro feature.

11. In step 527, the operator may elect to search for previous transcriptions based upon key concepts or paraphrases. The text annotation tab 5100 (FIG. 5N) may have been previously used to record key concepts or paraphrases of specific text segments. The key concepts or paraphrases may be stored in a database in addition to being stored in the session file from the session. In another approach, this information may be recorded in the audio annotation tab and later transcribed manually or with speech recognition.

In one approach, a doctor's description of a patient with pulmonary coccidiomycosis may be annotated as a key concept or paraphrase in one or more segments as "lung disease," "fungal infection," or other category. Each the session file and its corresponding segment number that refers to each category may be listed in a database table. The operator may perform a database lookup by category to determine the session files and segments associated to a key concept or paraphrase such as "fungal infection." With this information, the operator may load one or more session files in step 506 (FIG. 5), open a session file, find the segment number corresponding to the annotation tab entry for the key concept or paraphrase "fungal infection," and view the transcription for the key concept to better understand the words that might have been uttered by the speaker.

In another approach, a user may associate a key concept or paraphrase to one or more words in the segment. A user may also create a database table that associates each unigram, bigram, trigram, or other N-gram in the language model with its frequency of occurrence. A text word or phrase may be associated to an annotation key concept.

Consequently, the frequency of that key concept or paraphrase may be expressed as the sum of language model frequencies of all the words or phrases associated to that key concept or paraphrase. As an example, the annotated phrase "fungal infection" may be associated to unigrams, bigrams, and trigrams having a combined, summed frequency of 0.09.

The frequency of the key concept is 0.09 minus the duplication of frequencies where the unigram and bigrams also appear in the trigram. If the occurrence unigram and bigram frequency is 0.04, the key concept frequency of "fungal infection" is 0.05. This may provide the transcriptionist with a likelihood estimate that the speaker dictated any subject matter related to "fungal infection."

As is well known by practitioners in the natural language understanding field, many techniques using language model frequencies have been developed to search for key concept or content in web or other content. However, a single-speaker text corpus is more likely to be consistent in word combination and contextual use than the text corpus based upon multiple speakers or authors. Restricting concept search to text files from a single speaker is more likely to produce reliable natural language understanding key concept search results and reliable statistics as to the occurrence frequency of a key concept.

D. Complete Transcribed Session File (CTSF)

As disclosed in association with FIG. 4, after final text creation 440, other changes may be made using the session file editor 442 that result in a complete transcribed session file 444 (CTSF), and add to the plurality of tag lines in the session file. The completed transcribed session file may be sent for postprocessing 446 and eventual distribution as final document, letter, or report or training session file for a speech user profile 312 (FIG. 3).

1. In step 528, audio comments may be created by use of an annotation tab. Audio comments in any language may be recorded by session file sound recorder. In one approach, audio comments may be recorded by playback capture of a file with manipulation of sound card controls. In a previous, copending application, the assignee has described related techniques for audio capture. U.S. Non-Provisional application Ser. No. 09/995,892, "System for Permanent Aligning Text Utterances to Their Associated Audio Utterances," filed Nov. 28, 2001, which claims the benefits of U.S. Provisional Application No. 60/253,632 filed Nov. 28, 2000, each application of which is incorporated by reference to the extent permitted by law . Related techniques were also described by assignee in U.S. Pat. No. 6,421,643, "Method and Apparatus for Directing an Audio File to a Speech Recognition Program That Does Not Accept Such Files."

In one approach, the audio annotation 528 may represent re-dictation whereby a transcriptionist respeaks the dictation and has it transcribed with a speech user profile 312 (FIG. 3) for the transcriptionist. In another approach, an operator may wish to selectively edit some phrases or sentences within the text. The operator may use the text and audio split 513 or text and audio merge 514 functions to shorten or lengthen segment boundaries so that the one or more phrases are each within an separate segment. Using audio annotation 528, the editor may dictate the substitution text for each phrase or sentence.

Each of these audio annotations may be separately transcribed by a human operator using the session file editor 500 (FIG. 5) or speech recognition program 476 of FIG. 4 and associated to the original text. The transcribed session file 436 text may be displayed in a read/write window of the session file editor 500 (FIG. 5). The text annotation tab 5100 (See FIG. N) may include the original unedited text. The operator may review and edit the transcribed text. If the operator approves the changes, these may be automatically substituted on a workflow, using a workflow manager, into the original text at the proper site.

2. In step 529, text comments may be added using the text annotation tab 5100. (See FIG. 5N). Phonetic pronunciation, translation, key words or paraphrases (for creation of a database of key concepts), or other comments may be associated to the original audio and text. In one approach, text may be entered by keyboard, copy and paste, or speech recognition. In another related approach, more than one text and/or audio comment may be made and identified by author and time.

3. In step 530, a reverse formatting feature permits the transcriptionist to reverse format dates, measures, and currencies into a speech engine compatible format for the words dictated by the speaker. The session file editor 500 (FIG. 5) may include one or more macro utilities executed by selection of macro followed by use, in one approach, of function key F11. See FIG. 5BB. The reverse formatting feature may be implemented using a macro capability of the session file editor to activate a regular expressions utility.

As an example, a speech-to-text decoder may output text without formatting, e.g., "January seventeenth <comma> two thousand five". In speech-to-text postprocessing of FIG. 3, this may be formatted, based upon preferences in the speech user profile, to "Jan. 17, 2005" using regular expressions algorithms or similar techniques.

Using the reverse formatting utility 530, the transcriptionist may change the forward formatted "Jan. 17, 2005" to "January seventeenth <comma> two thousand five" for speech user profile training or remove punctuation if not dictated by speaker, e.g., saving "January seventeenth two thousand five" in the verbatim tab.

4. In step 531, additional tag information may also be generated by verbatim annotation to the transcribed segment to create a verbatim transcript. In one approach, unless the user annotates the final text in the verbatim tab, the verbatim text is the same as the final text and is included in the complete transcribed session file (CTSF) of step 444 in FIG. 4. In cases of voice macros whereby a trigger phrase launches transcription of "boilerplate" text, the actual command uttered, e.g., "normal history and physical," may be saved as the verbatim text. This may be used to generate a training session file 310 (FIG. 3) in step 516. The "boilerplate" will appear as final text 355 for the output session file 309 (FIG. 3). Consequently, by using verbatim annotation 531, the verbatim text (voice macro text) may be isolated from the boilerplate final text, thereby facilitating training of the trigger word or phrase for voice macros.

5. The disclosure teaches use of a text-to-speech audio pronunciation generator 1700 for speech user profile training, as described in FIG. 17. In one approach, audio pronunciation generator may run as a separate desktop application during transcription to assist with pronunciation creation for out of vocabulary (OOV) words, as indicated in step 533.

Figure 17:
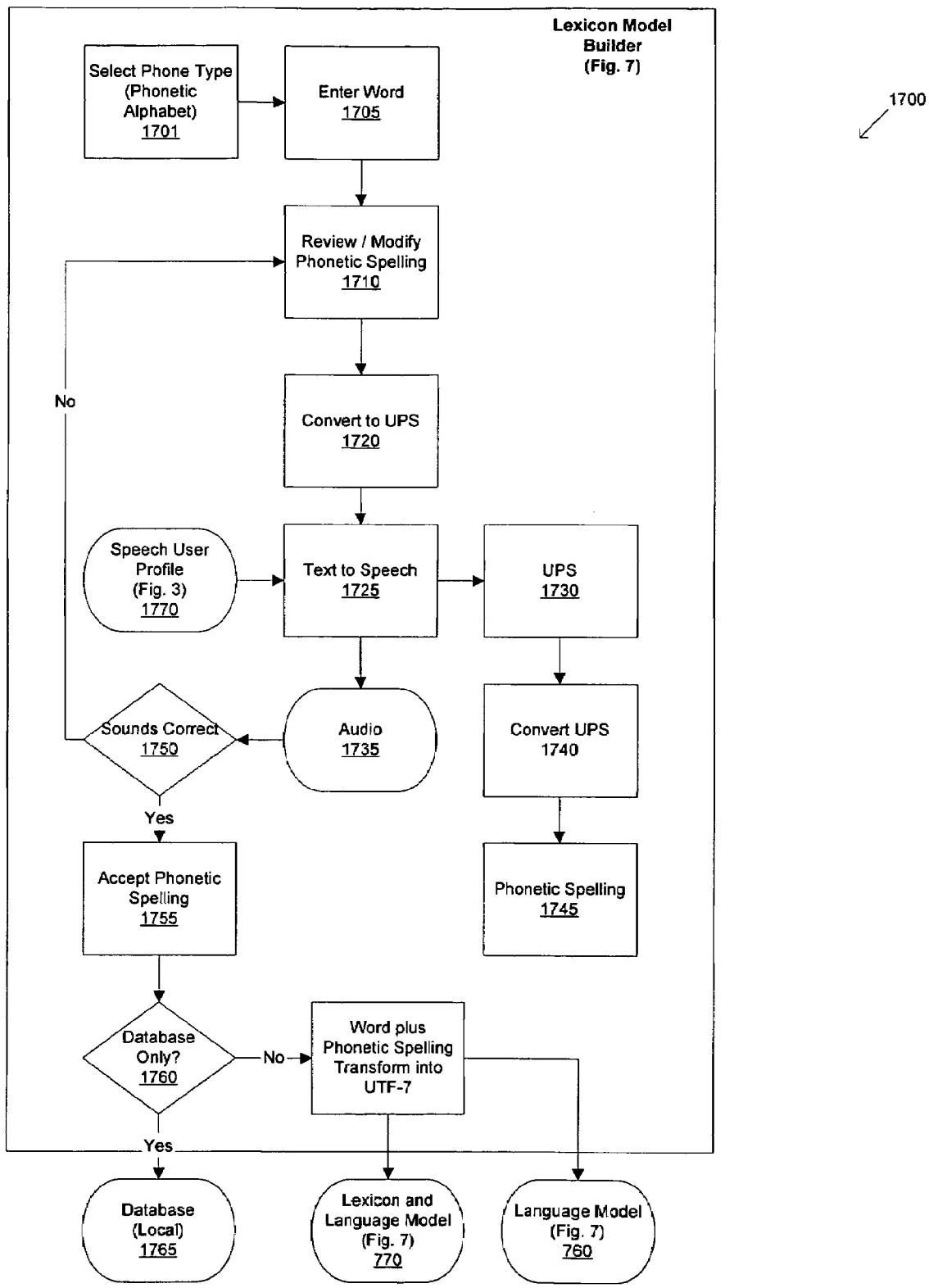
FIG. 17 is a flow diagram illustrating an exemplary embodiment of an audio pronunciation generator using text to speech.

In this approach, the transcriptionist may spell the word in the audio pronunciation generator window, such as that generated in association with the process of FIG. 17, using a simplified or other phonetic alphabet, listen to the pronunciation of the word created by a text-to-speech program, and adjust the phonetic spelling in the entry window until the audio and phonetic spelling most closely represent the speaker's pronunciation. The operator may save the lexical pronunciation with the text annotation tab in step 529 of FIG. 5. As described in FIG. 7, this pronunciation data 780 may be entered into the lexicon model builder 775 for update or creation of lexicon 780 for speech recognition program 700 (FIG. 7).

6. The session file editor 500 (FIG. 5) also may also support export of audio-tagged text in step 534 using the "Export Audio and Text Pairs" 534 item in the save means, see FIG. 5G. The paired audio and verbatim text may be confined within an utterance or represent a phrase that crosses one or more utterance boundaries. The exported paired audio and text may represent paired verbatim text and audio in step 740 of FIG. 7 for submission to acoustic model builder 745 to train the acoustic model 750. As is the case with a training session file 310 of FIG. 3, the exported audio and text may also be used for automated nondictation speech or text processing using common segmentation (FIG. 3) 492, other speech recognition 454 not using common segmentation, or other automated nondictation speech or text processing (FIG. 3) 494.

In one approach, the export function may also support merging the two or more single paired audio and verbatim text files to create a single exported file. For instance if many audio/word pairs are exported, the user does not have to process each one separately, but may process them as a group for training. This permits more rapid generation of training session file 310 for processing by model builders (FIGS. 7, 8) 311 of FIG. 3.

7. Use of non-dictated material in a language model degrades model accuracy. Based upon the experience of the inventors it is also easier to mark non-dictated material when inserted than to later find and mark (or remove them) by automated document processing. In the mark as nondictated text step 535, the transcriptionist may select and mark non-dictated material to be excluded for speech user profile 312 (FIG. 3) training by using the "Insert Header," "Insert Footer," and "Insert Untagged" menu items to exclude the text from the training process. See 5D. Using the ignore utterance feature 515, the transcriptionist may also mark one or more audio utterances as unsuitable for generation of an acoustic model (FIG. 7). In one approach, the operator may select the "Ignore" button at 515 in FIG. 5B.

8. In step 516, the operator may generate training session file 310 of FIG. 3 by selecting the menu item "Generate Training Files" 516. See FIG. 5G. For speech recognition, this may include audio-aligned text 350 (FIG. 3) with sequentially numbered, paired audio files and verbatim text. Session file editor also includes an embed audio in session file feature 538 and compress embedded audio 539. See 5G. Embedding permits the audio file to become part of the session file. Compression reduces file size.

9. In one embodiment, as indicated in step 536, text search may be restricted with reference to an audio point in time or bounded time. In one approach, the slider bar 5005, as displayed in FIG. 5B (among other figures), is used to select a point in time. The multiwindow session file editor 500 (FIG. 5) highlights the word in one or more buffered read/write session file windows associated with that time. In another embodiment, the operator may use text boxes to define begin and end points for the bounded time period.

10. Various types of video, sound, animation, graphics, text, and music may be played on different media players. Examples include Windows® Media Player (Microsoft Corporation, Redmond, Wash.) or QuickTime® (Apple Computer, Inc., Cupertino, Calif.). As displayed in various ones of FIGS. 5A through 5U, start/duration times may be displayed in a session file editor. Consequently, session file editor time stamp information may be used to manually or automatically locate and view of corresponding points in time or segments of a video, animation, audio, or other media file, as indicated by step 537. This may assist a transcriptionist in understanding certain words that reference an object or person. In one approach, a court reporter may use this feature to transcribe 509 poorly understood testimony of a witness who is referring to a defendant or physical evidence present in the courtroom.

In another embodiment, synchronized media file may be used for teaching or training purposes. As a foreign language teaching aid for children or adults learning American English, a real person in a video or cartoon character in animation may be shown in conversation at a restaurant, sporting event, or other recreational, business, or educational activity.

In one approach, selection of nonsequential or sequential segments in the transcribed session file 436 of FIG. 4 may switch playback to different points in the media file in display with media 537 step. Use of the multiwindow session file editor 500 (FIG. 5) permits the user to simultaneously view synchronized segments of (source) transcribed session file in English, (target) transcribed session file in Spanish, and corresponding media section.

One or more steps may be repeated, as indicated in step 540 of FIG. 5. The result is one or more session files, as indicated by step 550, including one or more complete transcribed session files (CTSF), corresponding to step 444 of speech to text workflow 400 (FIG. 4).

E. Postprocessing and Distribution

Returning to FIG. 3, in step 307 (FIG. 3), the text may be postprocessed for addition of headers, footers, and other text or otherwise further modified using a wide variety of manual or automated routines. As indicated in FIG. 3, distribution may include output of a final document, letter, or report in session file 309 or a training session file 310 for creation or update of a speech user profile 312. As indicated in FIG. 4, one or more complete TSF (CTSF) 444 may undergo postprocessing (FIG. 3) 446.

Postprocessing (FIG. 3) 446 may also include creation of word tags in cases where audio splitting 424 prior to manual transcription 434 resulted in a transcribed session file 436 with audio tags at the utterance level. In this approach, the verbatim text and transcribed session file are submitted to a speech recognition program (FIG. 7) operating in forced alignment mode. The speech recognition program may be a separate application or integrated with the session file editor 500 (FIG. 5). Using the session file editor 500 (FIG. 5), the verbatim text and transcribed may be processed using the sub-segmental splitter 532 feature. Even if the speech user is partially trained and recognition accuracy is low, the speech recognition engine program (FIG. 7) may generate word audio tags by aligning the word text to the audio to create session file (FIG. 3) 790 with the verbatim text audio aligned at the word level. In the experience of the inventors, as little as one hour of training data may be sufficient to create audio tags for submitted text. With the session file editor 500 (FIG. 5), speech analysis 512 may also be used to text and audio split 513 to create audio tags at the word level.

Postprocessing (FIG. 3) 446 may also include assignment of audio tags to a text file after manual transcription. In this case, the audio file, corresponding to audio file 416 of FIG. 4, may be transcribed by a server-based speech recognition program 476 to create a transcribed session file 478. Using techniques illustrated in FIG. 15, the resegmenting and retagging algorithm may be used to assign audio tags to the manually transcribed text in the synchronize step 518 of the session file editor process (FIG. 5). Similarly, a verbatim text file resulting from verbatim annotation 531 may be audio aligned using the resegmenting and retagging process FIG. 15 during synchronization step 518.

No Segmentation or Different Segmentation

In the speech-to-text process 400 (FIG. 4), the workflow manager makes a segmentation selection 414. In addition to selection of use of the common segmentation module (FIG. 6) in option 414*a*, the process may alternatively select use of common segmentation module with other segmentation or no segmentation in option 414*c*, or in option 414*b*, only other manual transcription 452 and/or other speech recognition 454. The manually transcribed text is represented by one or more other files 456 and may require conversion 458 to one or more compatible files 460 for session file editor 500 (FIG. 5) processing.

1. Manual Transcription from Audio File

Playback of an audio file with a transcriptionist foot pedal is commonly used in the transcription industry and may be used to create a text file. Similarly, a transcriptionist may play the audio file 416 using playback audio file step 504 of the session file editor process 500 (FIG. 5). As the exemplary session file editor 500 (FIG. 5) includes playback for one or more USB devices, as described in options step 501, the transcriptionist may use two or more USB-compatible foot pedals. One may be used for playback of audio file 416, the other for untranscribed session file 426.

The result of other manual transcription 452 of FIG. 4-2 from option 414*b*, see "C" may be generation of one or more compatible files 460, such as .html, .rtf, or .txt text files. While these files may be opened in the buffered read/write window of the session file editor (500 FIG. 5), these files cannot be compared segment by segment as they are not session files and have no boundary markers. They result from "no" segmentation. The select workflow step 402 may determine when these compatible files will be generated on the workflow. The segmentation selection step 414 may also determine, as with option 414*c*, to use both the common segmentation module (FIG. 6) and "other" transcription.

2. Creation of Intermediate Session File (ISF) from Empty Session File (ESF)

Unstructured, free-form dictation is the most common form of dictation recorded by dictating speakers. In some instances, the speaker may be asked to dictate according to a predefined set of instructions and complete a "fill-in-the-blank" form where audio material for each division is aligned to a particular section or "blank" in the form. The current disclosure describes a method for structured reporting and creation of a training session file 310 from speech input 301 (FIG. 3).

An empty session file (ESF), as indicated in step 464 of FIG. 4, may be created by inactivating, hiding, or deleting tag lines and leaving only boundary markings. FIG. 5K illustrates a graphical user interface showing an untranscribed session file 426. Each segment in the buffered read/write window may be selected and audio played back 508. An empty session file 464 may be displayed using a similar graphical user interface, but has no audio or text associated to a segment.

An empty session file 464 may be used to create session file with bounded speech or text input or both. In the session file editor 500 (FIG. 5), text may be added to the read/write window in the create or edit text in step 520 or into the text annotation step 529. Audio may be recorded using audio annotation 528.

The resulting incomplete session file (ISF) 470 contains bounded speech input, but the boundary divisions are typically determined by the categories or speaker, not by common segmentation module process 600 (FIG. 6) that segments speech input based on silence or other characteristics of the speech input 301 (FIG. 3). Further, the incomplete session file created by a series of annotations may consist of a series of separate audio files, not a single segmented session file. Consequently, the incomplete session file (470) is a file produced by "other" (step 414b) segmentation methods. After selection of "other" option, the process determines in step 449 whether or not to use structured dictation.

In one approach, the user is given instructions concerning the audio input into each segment of an empty session file 464. For instance, in a medical reporting form, the first segment may correspond to patient name, the second patient social security number, the third patient address, and so on. In step 468, the user selects the first segment in an empty session file 464 in a buffered read/write window and audio annotates 528 the empty segment under the annotation tab 5100 (see FIG. 5N) of the session file editor 500 (FIG. 5). The user selects and audio annotates 528 the next segment, and continues the process until all the segments are audio annotated.

Depending upon the instructions given for dictating into this ESF dictation template, the dictation audio into each segment may or may not include sentences. It may instead be a succession of words or phrases, such as name, social security number, address, and so on. After completing the dictation, the user has created an incomplete session file from structured dictation 470 that may be submitted to workflow in step 426 as one or more untranscribed session files or other files (see "D").

If the process decides "no" to sort 428 option, the audio annotation 528 may be played back using the annotation tab, such as window 5100 of FIG. 5N in step 434 of the speech-to-text workflow 400 (FIG. 4). The operator may be the same or different person than the dictating speaker. Alternatively, the operator may elect to playback aligned audio 508 after segment selection in the main read/write window. Using the switch tag functionality (step 517) of the session file editor 500 (FIG. 5), which uses the paste functionality of the operating system, the annotated audio of the ESF 464 may be converted to an audio tag for playback of aligned audio (step 508). The GUI of session file editor 500 (FIG. 5) with loaded incomplete session file (ISF) for structured dictation has same appearance as the GUI for processing untranscribed session file (USF). See FIG. 5K.

As disclosed, the dictation annotation input 528 into each segment may be based upon a category or field and represent structured dictation into a dictation template. The same session file operator as in step 434 of FIG. 4 may playback aligned audio (step 508) for the first segment in the buffered read/write window, and transcribe text in step 509 into the first segment of the read/write window using keyboard entry. The user may select the next segment, playback and transcribe audio. This transcription process may continue until the text is transcribed to create a transcribed session file 436.

An illustrative example of information entered as if into a dictation form is provided by FIG. 5M whereby a user may have dictated identifying information for a patient, such as [name] "John Doe," [social security number] "555-55-5555," and [address] "1000 Main Street, Hometown, USA".

Dictation without the explicit labeling of each separate field or segment in the session file editor 500 (FIG. 5) is one form of structured dictation. In related approach, using an empty session file 464, the speech input may be structured so that segment content is predefined for "fill-in-the-blank," structured dictation. In this two-step approach (not specifically shown in FIG. 4), an operator text annotates 529 each segment with a different field name or category to create an incomplete session file 470 that may be dictated into, section by section, by another user who while viewing the field name or category (e.g., Patient Name) in the text annotation tab 5100 of the graphical user interface.

As a result of using an empty session file 464, speech input 301 (FIG. 3) may be segmented so that all dictated information for a given field is included regardless of the actual pause length between utterances. If dictating into the name field with audio annotation feature 528 of the session file editor 500 (FIG. 5), the user may have separated the first and last names with a long pause, e.g., "John [long pause] Doe". If segmented using silence detection, normally, this would result in two separate utterances (segments) due to the long pause (see FIG. 10). Other identifying information may be a separate division within the ISF (470), but contain two or more utterances. Consequently, the operator in step 434 of FIG. 4 may modify the tag lines to create data for a training session file 310 (FIG. 3).

During the transcription, using the find long utterance function in step 511, as described in FIG. 5, the operator may determine which recorded audio segments are too long for processing as a single utterance. These lengthy utterances may be shortened using speech analysis 512 and text and audio split 513 to create utterance lengths that are suitable for speech recognition training session file 310 (FIG. 3).

In another approach, the audio segments may be extracted and merged into a single audio file using process similar to the create audio file 1492 step of FIG. 14-2. The audio file 416 may be transcribed by a one or more speech recognition program 476 to create one or more transcribed session file 436, and loaded into the session file editor 500 (FIG. 5) in step 506.

Using the resegmenting and retagging methods described in association with FIG. 15 and the transcribed session file 436 from the extracted audio as the reference session file, the transcribed session file derived from empty session file 464 may be resegmented and retagged in the synchronize step 518. Synchronized text comparison 519 with use of the tab key to shift from successive differences may be used to facilitate rapid generation of verbatim text for training session file 310 (FIG. 3).

3. Other Speech Recognition for Dictation and Transcription

As disclosed in FIG. 4, depending upon segmentation selection 414, transcription may follow the "other" option 414b and be performed by other manual transcription 452 and/or other speech recognition 454 not using the common segmentation parameters.

The server-based or real-time programs may use Dragon® NaturallySpeaking® IBM® ViaVoice®, or other commercially available speech engines. In one embodiment, session files from other speech recognition 454 may be converted 458 to a proprietary .ses or other compatible files 460 before session file editor 500 (FIG. 5) processing.

Files that may be converted 458 include .csf and .sx2 files using server-based speech recognition 454 from commercially available products.

The compressed session file (.csf) may be created from use of speech recognition program 454 such as Dragon® NaturallySpeaking® or IBM® ViaVoice® by the same speaker at the same time, different speech input from the same speaker, or from intermediate level session files based on server based transcription employing Microsoft's Speech API ("SAPI") version. These files contain start and duration times (milliseconds) associated to each word or group of words. In one approach, an XML session file of the proprietary .ses file may contain the same information, but in a different format as these other session files.

In addition, the SAPI-layer files may contain incompletely forward-formatted text. This incompletely forward-formatted text may have incomplete formatting for dates, measures, and other strings that may be fully formatted using regular expressions or similar techniques. Consequently, the resulting session file (.ses) from conversion of the SAPI-layer session file may be forward-formatted using regular expressions or similar techniques, just as any speech engine layer text may be forward formatted.

ScanSoft® has also released a server-based version of the Dragon® NaturallySpeaking® software (Dragon® Systems Server) that outputs the text in a native Dragon® session file (.dra ) file and an XML tagged concordance file. The concordance file represents intermediate layer text that is not fully formatted. A sample of XML concordance file identifies utterance number, utterance start and end time, and the start and end time for each word in the utterance. In one file, the XML-tagged text "We are pleased" may be formatted as follows:

<Word S_Time="0.551" E_Time="0.771" C="0" RW="We">we</Word>
<Word S_Time="0.771" E_Time="0.821" C="0" RW="are">are</Word>
<Word S_Time="0.821" E_Time="1.232" C="0" RW="pleased">pleased</Word>

Using techniques well known to those skilled in the art and with present specifications before them, these and other XML-tagged session files may be converted 458 to .ses format. Once converted, the operator may proceed with switch tags 517, synchronize 518, and text compare 519 in the session file editor 500 (FIG. 5). Text compare may be performed segment by segment across the entire document, as shown by the left-hand "Text Compare" button 519A in FIG. 5B, or by phrase, as shown by "Text Compare" button 519B. In the optional switch tags (step 517), the operator may elect to switch audio or text segment tags to create a more user-friendly format, e.g., the segment annotation text may be displayed as segment text in the read/write window. As previously described, this may be performed by activation of a macro, e.g., "Shift F3" to swap text from text annotation to the read/write window, among other approaches. See FIGS. 5W-5X.

In the synchronization (step 518), the operator can produce an identical number of segments from asynchronized files. In one approach, this may use the resegmenting and retagging algorithm of FIG. 15. Synchronization 518 may be applied to, for instance, output from Dragon® NaturallySpeaking®, IBM® ViaVoice®, or other speech recognition 454 in FIG. 4, to SAPI-layer audio-aligned text, to the intermediate, unformatted text of the concordance file of the Dragon® Systems Server or to intermediate text after it has been forward-formatted using regular expressions or similar techniques.

Synchronization 518 to create an identical number of segments may be performed with windowing techniques using a standard text compare algorithm. FIG. 15. The number of segments in each text output is determined by the number of paired preceding and trailing matches. As the number of these pairs are identical in the two or more texts, the number of segments in the two texts is the same.

In cases where the first text is completely different from the second text (e.g., no common words), no matches will be found. If the reference text has 10 segments, the second text will have 10 merged segments. These segments will be merged into a single segment comprising the larger document. Each of the segments in the reference text will point to the entire second text as the unmatched segment. As the texts become more similar, there are an increasing number of matches between reference and target text. There are fewer merged segments where the segment in the target (second) file is part of a much larger segment. If the texts are identical, each word in the reference text will be matched to a word in the second text.

Generally, with speech input 301 (FIG. 3) transcribed by two or more different speech programs there will be varying numbers of matches and mismatches. As speech user profile (312) (FIG. 3) becomes better trained (accuracy approaches 90% or more with current technology), the number of matches increases, and the number of merged segments in the second (target) file decreases.

As shown in FIG. 15, the process begins with selection of reference session file 1 and text extraction of text 1, step 1505. If comparison is with text in another session file, the operator may use session file text for session file 2, convert session file 2 to .ses format (step 1510), extract text from converted session file (step 1515), and create text 2. After selection of windowing, text compare (step 1520) between texts 1 and 2 may be performed to find differences with adjacent matches and determination of start and duration time for each windowed difference in text #1 1525.

New session file may be created for text 1 1530. The start and duration times for each windowed difference in text 2 may be determined 1535. The windowed differences in text 2 may be tagged with audio from session file 1 1540. This results in synchronized .ses session files 1 and 2 with an identical number of segments 1550. The files may be opened in the session file editor 500.

As described by FIG. 15, after completion, the operator may determine whether there is poor matching between texts 1560 and a large number of merged segments in the target file. This may be based upon a sufficiently low percentage of merged segments compared to the total number. If there is poor matching, boundaries in the target session file may be established using least difference techniques to create an identical number of segments.

In this method, the start/duration time of each utterance segment in the first session file may be listed. The start/duration times for each word in the second session file may be generated (step 1525). The next step may be zeroing (time normalization) of the two files and all associated segments. If audio tags for utterance only are available for the second session file, these may be listed. In sequence, each segment start time for the first session file may be compared to each boundary in the second session file, and the time difference may be determined.

If there is a zero difference, the comparison process for that boundary may stop, and the start time may be selected as the start time for the corresponding segment in the second session file. If there are two successive differences where the absolute value of the difference increases, the start time associated to the first (smaller) difference may be used to establish the start time of the segment in the second session file.

This process may be continued until start times in the first reference file have corresponding start times in the second target file. A tagging algorithm may then be used to create a second session file with the new start times.

Once the session file has been converted to .ses format and segmented, audio tags from the reference session file may be used to retag the converted and resegmented session file. Consequently, the selected text of the second session file plays back the retagged audio of first session file.

Using these resegmenting and retagging techniques (FIG. 15), a text file transcribed without presegmentation of audio with other manual transcription 452 of FIG. 4 may also be segmented and audio tags applied from an audio file 416 transcribed by a server-based speech recognition program 476 or one not using a common segmentation module, as in step 492. In this case, the target file is the text file. The source file is the transcribed session file using the server-based techniques.

In one approach, a speech recognition program 476 or other speech recognition 454 of FIG. 4, such as Dragon® NaturallySpeaking® or IBM®ViaVoice®, may be used to transcribe an audio file 416. The audio-aligned text of the transcribed session file may be used with resegmenting and retagging techniques (FIG. 15) in the synchronize step 518 to create audio tags for text generated by other manual transcription 452. The text file could also be derived from manual processing in the session file editor 500 (FIG. 5) or from the transcribed session file from speech recognition 476 or other speech recognition 454.

The text compare techniques may also be used to synchronize 518 two or more translations from a single source or other text output. Similar resegmenting techniques using least differences methods may be used to create identical segments for two untranscribed session files 426, for a single untranscribed session file 426 as the reference file and a target transcribed session file 426, or for music or other segmented audio input, representing a form of bounded data input 202 in FIG. 2.

In another approach, two or more instances of the other speech recognition program 454 of FIG. 4 may be used. For instance, a server-based version of Dragon® NaturallySpeaking® may be used. In this approach, performance settings and/or different speech user profile may be used to vary output transcribed session file 456. In this approach, given use of the same proprietary segmentation processing algorithm, segmentation processing and number of segments output by each instance of the speech recognition program 454 most likely will be identical. After conversion 458 to a compatible format 460, the session file editor 500 (FIG. 5) may be used to evaluate synchronized output from the two or more instances of the other speech recognition program 454. If output is not synchronized, the resegmenting and retagging algorithm (FIG. 15) may be used to synchronize the asynchronized files and create an identical number of segments.

Synchronized Nondictation Speech Recognition and Other Speech Processing

As described in FIGS. 7 and 8, other speech and language processing applications 314 of FIG. 3 may represent command and control (voice activation), interactive voice response for telephony, text-based or phoneme-based audio mining, speaker recognition, machine translation, or natural language understanding. Manual and/or automated nondictated speech to text process (FIG. 3) corresponds to step 492 of FIG. 4.

Nondictation uses of speech recognition for command and control, interactive voice response for telephony, and text-based audio mining involve signal preprocessing with segmentation and Hidden Markov Modeling with acoustic model, language model, and lexicon. Those familiar with the technology will further recognize that a module may be added to the non-speech recognition and language processing application 314 (FIG. 3) that returns the results of the speech-to-text decoding to the end user for evaluation.

In one approach, as illustrated in FIG. 7, the postprocessing step 735 returns one or more session files 790. These may be further processed on the workflow 400 (FIG. 4) to produce output session file 309 or training session file 310. In each of these cases, the data processing after segmentation may also be performed manually, as illustrated in relation to FIGS. 3 and 4.

In other processes using speech recognition (FIG. 7), such as command and control or interactive voice response for telephony, the "final text" in the output session file 309 (FIG. 3) may include a report about computer function activated by the speech input 301. As illustrated in FIG. 7, command and control and interactive voice response use speech recognition to activate computer or device function, but also to create session file text for display in a graphical user interface. With speaker recognition text-based audio mining, the "final text" may represent a report about speaker identity or presence or absence of a search term.

In a further related approach, as described in FIG. 3, the speech pattern recognition program 304 may include programs, such as those described in FIG. 8, that share one or more components with the speech recognition application described in FIG. 7. Examples include speaker recognition (identification, detection, and verification) and phoneme-based audio mining. Both commonly include signal preprocessing with segmentation, speech-to-text decoding block with Hidden Markov Model processing, and an acoustic model and lexicon. Typically these programs do not use a language model, and accuracy may be improved by updating acoustic model 750 or lexicon 770.

With automatic text-to-speech (FIG. 8), the output session file 309 (FIG. 3) may represent human or computer-generated speech aligned to the input text. In this case, the linked text is not an output, but a source input. Using speaker recognition or phoneme-based audio mining (FIG. 8), the output session file may include a report, interpretation, or analysis that is aligned to a segment of speech input 301 (FIG. 3).

With machine translation (FIG. 8), the output text in the target language may be aligned with the segmented text in the source language. Source language (input) text represents a form of other data (FIG. 3) 895 that may be used to update a shared language model (FIG. 7). With natural language understanding (FIG. 8) searches of the web or other text corpus based upon content or key concept, the output session file 309 (FIG. 3) may include a report that aligns results with segmented text input. Similarly, the searched text may be used as other data 895 to update the shared language model (FIG. 7).

The source speech or text input 301 (FIG. 3) for these nondictation activities may also be divided into separate units of data input (boundary definition) 202 of FIG. 2 for human processing by an external segmentation application 302 that includes a common segmentation module for speech (FIG. 6) or text (FIG. 10). The segmented data input may be processed by a human operator in the session file editor 500 (FIG. 5). An example of this approach is provided in FIG. 9 that shows manual or automatic processing, or both, of text input for text to speech, translation, and key concept or content-based searches.

FIG. 4-2 shows that the output of these (step 492) manual and/or automated nondictation speech or text processing, as described in relation to FIGS. 7, 8, and 9, may be entered into the workflow 400 (FIG. 4) that is primarily used for dictation and transcription. As the processes use a common segmentation module (FIGS. 6, 10), the automatic or manual output is synchronized. If necessary, the one or more files 456 may be converted to the proprietary .ses format to create one or more compatible files 460. Incomplete session files with a single tag line are represented as "E" and may be further processed at step 426. Session files with two or more tag lines, such as transcribed session files from nondictation speech recognition processes (FIG. 7) or other session files, may be further processed at step 436, as represented as "G" following step 460.

A. Command and Control

In exemplary, related embodiments, command and control or interactive voice response ("IVR") may output a transcribed session file including the audio input and recognized commands. In one approach, illustrated in FIG. 7, training data material for creation of a unified acoustic model for telephone dictation interactive voice response is available by contemporaneously creating a session file consisting of the segmented speech input and the one or more voice commands recognized by the application. The commands may be expressed in text form in programming script or higher level representation that is more easily understood by end user.

The user may load one or more session files into the session file editor in step 506 (FIG. 5). In one approach, a command and control (voice activation) application or interactive voice response program may output a session file that includes the segmented speech aligned to the recognized text (e.g., "copy") and macro or script (e.g., "Ctrl+C") that was activated. If the application misrecognized the command, the user may create a verbatim annotation in step 531. This may be used to generate a training session file in step 516 for creation or update of a speech user profile 312 (FIG. 3).

In another approach, speech input commands may be transcribed by a human operator and provided in the verbatim text (e.g., "copy") or with reference to the function keys to be activated (e.g., "Ctrl+C"). Manual and computer conversion may be compared in the session file editor 500 (FIG. 5) with text compare 519.

As described in reference to FIG. 4, the speech input 412 may also be presegmented with the external segmentation application 424 and transcribed in the session file editor 500 step 434. For instance, the uttered audio command "Open File X" may be transcribed using the session file editor 500 (FIG. 5) as would any dictation audio. Results from manual or automatic processing, two or more manual conversions, or two or more automatic conversions may be compared to determine reliability in text compare 519. In this way, the session file editor 500 (FIG. 5) is not restricted to output comparison of only manually or only automatically generated output.

B. Interactive Voice Response

As illustrated in FIG. 7, acoustic model 750, language model 760, and lexicon 770 may be shared by the speech recognition for dictation and interactive voice response system. To promote recognition accuracy, lexicon 770 of the IVR system may be limited by creating a separate, small vocabulary lexicon for IVR use only. The speaker model may also be potentially shared by command and control and text-based audio mining that uses speech recognition (FIG. 7).

In another approach, an audio file 416 of the IVR interaction is created by conversation recording. This may be later transcribed by server based speech recognition 476. In the case of a telephone call-in system, this may be accomplished by line-tap techniques that record channel conversations. Methods for obtaining audio from telephone systems is already well understood and will not be discussed herein. But using ignore utterance feature 515, the operator may exclude material that was not spoken by the caller to create a training session file 310 for the caller's speech user profile 312 (FIG. 3).

In a further related approach, devices may be modified by those skilled in the art to create and save one or more transcribed session files 436 (FIG. 4) that may be downloaded using a docking station attached to a computer or transfer the session file data to a disk that may be loaded onto a docking station or computer. In addition to use by end user in creating a common speech user profile 312 (FIG. 3), the download process may be of assistance during quality assurance trials by manufacturers.

C. Text-Based Audio Mining

With text-based audio mining, an audio file is transcribed using server-based speech recognition to create a transcribed session file functionally equivalent to the transcribed session file in step 436 of FIG. 4. The text may be searched for a word or phrase using the standard find word functionality that was described in the previous, co-pending application. In that previously submitted, co-pending application, the assignee of the current application has also previously described text comparison for matches for speech recognition, text-based audio mining as a means to increase likelihood that the selected word is correctly transcribed. PCT Application No. PCT/US03/14, "Method for Locating An Audio Segment Within An Audio File," filed May 30, 2003 which claims the benefits of U.S. Provisional Application No. 60/384,540, filed May 30, 2002, each application of which is incorporated by reference to the extent permitted by law.

Figure 50:
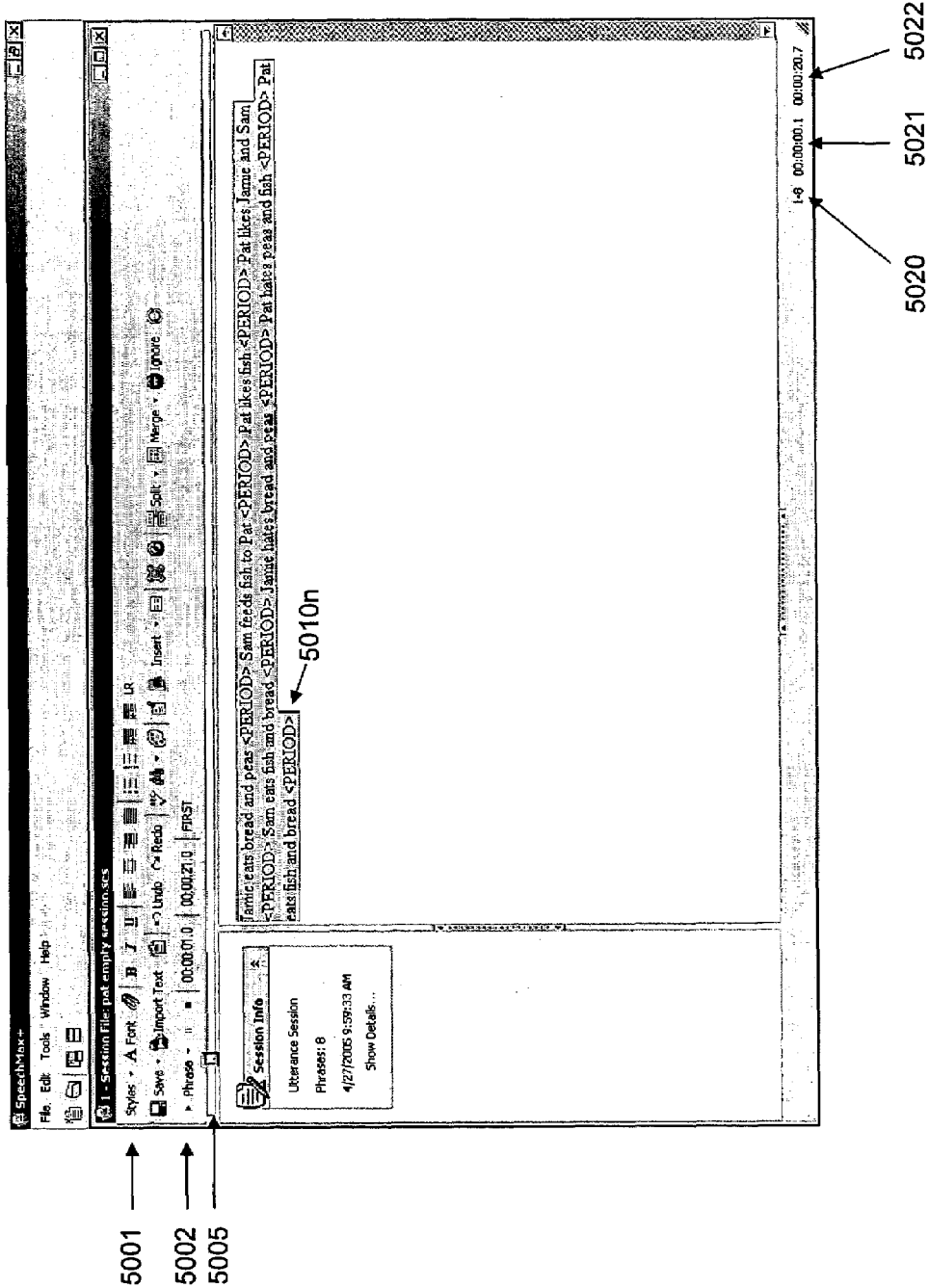

After the search term has been located, the user may use playback aligned audio 508 of the session file editor 500 (FIG. 50) to determine if the audio corresponds to the search term. If it does not, the operator may use verbatim annotation tab 531 to correct the misrecognition, and use the export paired text and audio functionality 534, FIG. 5G ("save" pull down menu), to submit the material for speaker model training. Consequently, the audio mining procedure may indirectly assist in improving the accuracy of the speaker model.

D. Speaker Recognition

One or more speaker recognition session files (FIG. 3) 855a, as illustrated in FIG. 8, may display text results for each segment. The results may indicate speaker identity, e.g., "John Doe," presence or absence of speech, e.g., "No Speech Detected," or verification of speaker identity, e.g., "Positive Speaker Verification for John Doe." Update of speech user profile 312 (FIG. 3) is described in relation to phoneme-based audio mining.

E. Phoneme-Based Audio Mining

One or more phoneme-based audio mining session files (855a), as illustrated in FIG. 8, may indicate the presence or absence of search word or phrase in segment, e.g., "Positive" or "Negative." In this approach, search may have been conducted using an offline server or desktop application searching one or more untranscribed session files (USF) for phonemes corresponding to submitted audio speech input for a word or phrase.

Both phoneme-based audio mining and speaker recognition (FIG. 8) generally attempt to match a spoken word or phrase against one or more stored combinations of phonemes in the speech user profile 312 (FIG. 3). In each case, moreover, the processing may be performed by one or more manual operators 303 or automatic processes 304 or both to produce one or more session files 305. Results may be compared in step 306 in the multiwindow session file editor for rapid detection of errors. See FIG. 5.

For instance, a speaker recognition program may require utterance of a particular set of words for positive recognition based upon the "voice print" embedded in the representational model. Similarly, phoneme-based audio mining searches an audio file for the presence of one or more words based upon similarity to representational models in a speech user profile 312 (FIG. 3).

The current disclosure permits the operator to compare output to detect errors and update the shared speaker model based upon newly processed audio. Update may include transcribing segmented audio for a training session file 310 (FIG. 3), export of paired audio and text 534 (FIG. 5), dictating additional audio with the same word to generate further training material for training session file 310 (FIG. 3), or adjusting the lexicon 770 entry using the lexicon model builder 775 (FIG. 7).

In a further related approach, the audio mining function may search the audio of each USF segment, record the one or more words found in each segment of each untranscribed session file, record the number of the session file and segment, and create a form of transcribed session file that displays a "Positive" or "Negative" text result for each segment in the buffered read/write window of the session file editor 500 (FIG. 5).

The positive search words themselves may be listed sequentially for display as tag lines for text annotation and viewed in the text annotation step 529. The audio for each positive search may be appended for display as tag lines for audio annotation in step 528. It may be played back in the audio annotation tab for each segment using the playback aligned audio step 508.

In one approach, the operator may load the session file 506 into the session file editor 500 (FIG. 5) and sequentially evaluate each "Positive" segment. The operator may view the text results in the text annotation tab 5100 (see FIG. 5N) in step 529, listen to the audio in the audio annotation tab in step 528, and playback aligned audio step 508 to determine if the audio segment actually contained the search word. Optionally, the operator may similarly evaluate the "Negative" results to rule out false negative responses.

In cases of false positive (words or phrases returned that supposedly contained the search term), the operator may substitute the search word for "Positive" in the read/write window (step 520) with the actual word uttered and export paired audio and text in step 534 for training. Similarly, in false negative cases (words or phrases that supposedly did not contain the search term but did), the operator could similarly transcribe the search term into the read/write window (step 520) and export the paired text and audio 534. In each case, the audio-verbatim text pair may be used as training data set for a training session file 310 (FIG. 3).

Text To Speech, Phonetic Generation, Translation, and Natural Language Understanding As described in FIG. 3, segmented source text input may be converted, interpreted, or analyzed by various transformations to create segmented session file output. The options for display in the exemplary session file editor 500 (FIG. 5) are similar or analogous to those with transcription, and the features of the session file editor may be used to review, create, or process text to speech, translation, or natural language understanding session files.

As illustrated in FIG. 9, each of the text-based processes could be performed by manual methods, automatically, or both. As described in an exemplary embodiment illustrated in FIG. 9 with text input 901, the process determines 903 whether to translate, convert text to speech, or perform key concept or content-based search. As discussed in relationship to FIG. 17, automated phonetic generation (conversion of text to phonetic representation) may be involved as one of the steps automated text to speech and is not specifically shown in FIG. 9. In each of the instances, the one or more session files (FIG. 3) 930 may be subject to post-human review in session file editor 500 (FIG. 5) in step 306 of FIG. 3. As further indicated, the text-based data from processes that do not use common text segmentation module 302 may also be compared and reviewed in step 365.

FIG. 10 describes an exemplary text segmentation module for synchronized processing. The module determines how to parse the text. Segmentation options may include paragraph, sentence, phrase, or word. As described in FIG. 10, the text segmentation parameters 1035 are determined beginning with one or more text files 1020 and other data 1030. Determination of text segmentation parameters 1035 may be determined by evaluating text in a text processor and performing text analysis 1025 by visual inspection and knowledge of other data concerning the intended conversion, interpretation, or analysis. Segmentation with sentence-based parsing may be of assistance in multiple tasks and is displayed in exemplary common text segmentation module 1000. The text segmentation parameters may be stored in a speech user profile (FIG. 3) and loaded into the application using a workflow manager (FIG. 4).

The common text segmentation module may be used by an external segmentation application (FIG. 3) prior to manual processing, or by an segmentation module (FIG. 3) integrated with automated text-to-speech, phonetic generation, natural language understanding, or machine translation.

The segmentation module consists of a text segmentation interface (TSI) 1002 that interfaces with higher layers of an application, such as the text external segmentation application or internal segmentation for text pattern recognition. In one approach, the module performs sentence based 1001 text segmentation. Boundary definition occurs in step 1003, and in sentenced based 1001 parsing, may be based upon recognition of sentence end points based upon punctuation, spacing, or both. The bounded data input, including words and punctuation, are assembled into a single buffer 1004 to create a segment buffer 1005. The results are sent 1006 to the text segmentation interface for transmission to the client application, such as external segmentation application or automated process such as text to speech, phonetic generation, machine translation, or natural language understanding.

A. Text to Speech

If the text input process 900 (FIG. 9) determines 903 to convert text to speech, it next decides step 905, whether to use human voice, automated text to speech, or both. In the record voice decision diamond 905, the process may determine to use record with human voice only (option 905a), generate speech from text using automatic text to speech, such as described in relation to FIG. 1 (option 905b), or use both approaches (option 905c).

In one approach, after manual text to speech is selected (option 905a), text may be segmented in text segmentation using an external application 910 including a common text segmentation module, as described in FIG. 10. If it selects human voice option, external segmentation 910 using the common text segmentation module (FIG. 10) results in an incomplete session file (ISF) for text to speech 915. The segmented input text may be saved in a session file for display in a text annotation tab, in a buffered read/write window, or in a specialized popup window that permits visualization of input text when a segment is selected. In one approach, professional voice talent may be used to read a script and record using the audio annotation function 528 of the session file editor 500 (FIG. 5). This script may be used to create voice prompts for interactive voice response telephony applications or other uses.

Audio may be saved for display as an audio annotation 528 or, using the switch tags 517 function of the session file editor process in FIG. 5, for playback of audio in main buffered read/write window with playback aligned audio feature 508. Containing audio-aligned text, the human voice text-to-speech session file 930 is the functional equivalent of a verbatim transcribed session file 436 if the spoken audio reflects the script. It corresponds to one or more session files of FIG. 3. Consequently, it may be used in process 300 for a training session file 310 for a speech user profile 312. This may be used for speech recognition for dictation 313 and other speech recognition and language processing applications 314, such as creation of a personalized text-to-speech voice font for use of, or sale by, the professional voice talent.

Session file editor 500 (FIG. 5) create audio annotation 528 feature may also be exploited for other script-related purposes. A director, producer, or playwright may create a script that is read by one or more auditioning actors. Each actor may record the lines using the audio annotation tab 528. The switch tags feature 517 may be used to convert annotated audio to playback audio from the main read/write window. The reviewing director, producer, or playwright may open each session file 508, select text and playback aligned audio 508 to hear one or more actors reading the same lines, and use the tab key, see FIG. 5BB, to review synchronized segments.

In another approach, a phonetics or language instructor may create a standard script segmented by sentence that is read and audio annotated 528 by one or more students. After using switch tags 514, the instructor may playback aligned audio 508, and use phrase synchronization with tabbing, see FIG. 5BB, to compare student performance based on identical text segments.

Alternatively, the process of FIG. 9 may determine (option 905*b*) to use an automatic method. In one approach, text may be segmented automatically 935 using an internal text segmentation module, as described in FIG. 10. If the process determines 905 not to use human voice, the text may be processed on a workflow by an offline, server-based text-to-speech engine 935, including one preferably with a personalized voice font created from a speaker-dependent speaker model 312 (FIG. 3). The text-to-speech engine 935 may output one or more session files (FIG. 3) in step 930 that may be opened in the session file editor in step 520 of FIG. 5. In one approach, the text may be displayed in the main read/write window. The audio may be tagged for playback using the playback aligned audio step 508 of the session file editor process. The session file 930 contains audio-aligned text, the same data as in a transcribed session file (TSF).

If a personalized voice font has been used by the text-to-speech engine, it is desirable that the speech playback have voice characteristics similar to the speaker. In some cases, it may not. This may reflect a variety of factors, including limited speaker representational model 312 (FIG. 3) or other limitations in the text-to-speech 935 conversion.

While the reviewing party may not know the source of the limited quality speech output, he or she may input additional data for speech user profile 312 (FIG. 3) update as a possible remedy. For instance, the speaker may dictate the passage one or more times and record 413 to create one or more audio files 416 based upon what he or she thinks the speech should sound like. The untranscribed session file 426 may be converted to one or more transcribed session files 436, as described in FIG. 4. The one or more audio files 416 may be based upon some or all of the text. A verbatim training session file 310, as described in FIG. 3, or export paired verbatim text audio file 534, as described in FIG. 5, may be used to update the speech user profile 312.

In another approach, phonemic representation may be changed. The lexicon entry may be modified with pronunciation data, as described in FIG. 7, through the lexicon model builder 775 to change associated pronunciation.

In a related approach, lexicon or acoustic model modification or change of playback parameters may be used for voice enhancement or voice animation. Voice enhancement or animation may be used to reduce noise, silence gaps, alter pitch, change rate, modify frequency intensity, or otherwise change or "morph" the character of the speech output.

By altering the parameters of speech production by the text-to-speech engine 935, enhanced or unusual speech for video games, animated characters, or other purposes can be created based upon a speaker-dependent acoustic model and lexicon. The resulting session file speech may be reviewed in the playback aligned audio step 508 of the session file editor process in FIG. 5. The synthetic voice may represent speech of a real or fictitious language. Alternatively, in some instances, the user may be quite satisfied with his or her voice and elect to use a personalized voice font for a video game or animation file that sounds as much like the real voice as possible.

In another approach, the text 901 may be processed by two or more TTS engines 935 using the same common segmentation module (FIG. 10). The two or more session files 930 may be opened in the session file editor in the load one or more session file step 520. In one approach, the segmented text may be displayed in a buffered read/write window 5040 of the session file editor. Different speech output resulting from same segmented text input may be evaluated by selection of text in the playback aligned audio step 508.

B. Translation

If the text input process 900 (FIG. 9) selects 903 the translation alternative, manual process (945*a*) may be selected (step 945), as well as automatic (945*b*) or both (945*c*). External text segmentation application 950 may be used to create an incomplete session file (ISF Translation), as illustrated by step 955 of FIG. 9. In one approach, the source text is displayed as segmented text in the buffered read/write windows in step 960. The incomplete session file text has the typical appearance of segmented text in a read/write window. See FIG. 5V.

In some situations, post-human review of the automatic segmentation may be of assistance where word detection by automatic means is unreliable. For instance while written English has a space between words, traditional Chinese, Japanese, and other Chinese-derived languages do not use orthographic spaces as word boundary markers.

In one approach, the operator may create one or more ISF (Translation) files based upon the initial text and open them in one or more buffered read/write windows 5040. The operator may use one as an index or reference file for translating the others and may use the delete function of the operating system to remove the text in the other buffered read/read windows. Using the first window as a reference, the operator may sequentially translate each text segment in one or more other windows using the transcribe text segment feature 509 of the session file editor 500 (FIG. 5) in step 960. The result is one or more session files 930, including the ISF (Translation) session file 955 in the source language. One or more other session files (FIG. 3) 930 may include the one or more synchronized translations.

In some cases, there may be two of more translations into the same language, e.g., English into two or more French translations, or into two or more languages, e.g., English into German and English into Spanish. See FIG. 5V. The session file editor 500 (FIG. 5) window 5087 contains original English, window 5088 contains German, and window 5089 contains Spanish. The operator may use the session file editor for text compare 519 of synchronized segments. Using the audio annotate feature 528, audio in the same or different language may be associated to each of the different segmented texts.

In one approach, the operator may select sufficiently long segments for synchronous display of equal number of segments for all translations. In one approach, text segmentation module 1000 may use sentences to parse the text input. Each of the translated session files will have an identical number of segments required for phase synchronization with tabbing.

In another, related approach not shown in FIG. 9, the human translator may begin with segmented text in a transcribed session file (TSF). In some instances, the utterances may correspond to sentences. See, e.g., FIG. 5P. The translation may be performed on a sentence by sentence basis without changing segment boundaries of the source text.

In some cases, segmentation for the original transcription may be defined by silence definition, as described in FIG. 6, with the result that segments includes one or more sentences, sometimes only phrases, or sometimes only words. Using session feature editor text and audio split 513 and merge 514 tools described in association with FIG. 5, the disclosure describes a technique for redefinition of utterance boundaries to lengthen or shorten the text segment unit being translated. For translation into a foreign (target) language, the most effective source text segment may often be the sentence.

In those instances where the speaker is multilingual and uses speech recognition with one or more languages, the translation from use of the transcribe segment feature 509 may be added to language data for the speaker model. As illustrated in FIG. 7, the translation may be added to the text corpus 767 used by the language model builder 765 to create a language model 760 for the (target) foreign language.

If the process selects machine translation 945, the first step may be creation of segmented session file with the source input text corresponding to the manually generated ISF (Translation) 955 session file after processing by the internal text segmentation module (FIG. 10). Each text segment may also be sequentially converted by the application 975 after text segmentation. A session file may be created by aligning the input text segments with the output text to create a machine translation session file (TRSF). If more than one machine TRSF is produced, this results in one or more session files (FIG. 3) in step 930. The one of more session files may have an identical format to those created manually in step 960 by the human operator. See FIG. 5V.

As indicated in FIG. 3, the one or more session files 305 may be processed in the session file editor 500 (FIG. 5) in preparation for postprocessing 307 and distribution 308.

In another application, the session file editor may be used as a teaching aid for foreign language or phonetic pronunciation instruction. The multiwindow session file editor may be used to compare synchronized corrected and uncorrected manually translated texts whose identically numbered segments each are linked to the same speech input.

In one approach, a Spanish-speaking student with English as a second language may provided with an incomplete session file for translation (ISF Translation), as described in FIG. 9 in step 955, consisting of segmented text only. This may have been prepared by the language instructor. The session file may consist of a series of segmented text in Spanish in a buffered read/write window.

The student may be asked to translate these into English sentence by sentence to create a human translation session file, as shown in step 930. Using the text compare functionality of the session file editor 500, as described in step 519 of FIG. 5, the student may compare his or her translation sentence by sentence to a segmented and synchronized English translation supplied by the instructor. In one approach, the English translation could have audio tag lines in English associated to the text for playback with playback aligned audio step 508 of FIG. 5.

C. Natural Language Understanding

Similar techniques may be applied to segmented text from one or more natural language understanding searches of a series of segmented text session file output. The text files may be segmented using text segmentation module as described in FIG. 10. The general process is described in FIG. 8. In one approach, as was described in relation to paragraph 11 (page 86) under creation of Final Transcribed Session File (FTSF), in step 527 of session file editor 500 (FIG. 5) process, the operator may elect to search for previous transcriptions based upon key concepts or paraphrases.

This may be applied to each segment of the different files. Output for each session file segment may be displayed as "Search Positive" or "Search Negative" and displayed in the session file editor 500 (FIG. 5). In this approach, a positive result reflects presence of unigram, bigram, or trigram associated to the key concept. A negative result reflects absence of any unigram, bigram, or trigram associated to the concept. In one approach, search results are displayed in a popup dialog window as each segment is reviewed in the main buffered read/write window. Results from two or more processes, human, computer, or both, may be compared using the text compare step 519 described in FIG. 5. Other N-grams may also be used if supported by the language model 760.

As described in FIG. 9, if the text input process determines to perform natural language understanding in step 903, it next determines 985 whether to use manual (985a) or automated (985b) process or both (985c). External segmentation 990 results may be processed in session file editor 500 (FIG. 5) in step 998 and result in one or more session files (FIG. 3) 930. Automated processing 997 may also result in one or more session files (FIG. 3) 930 for post-human review in the session file editor 500 (FIG. 5).

Unless errors were originally made in associating a unigram, bigram, or trigram to a particular key concept or search term, there should be no false positives. In cases of false negative, text annotation 529 may be created that links the key concept or search term to a segment unigram, bigram, or trigram that was not previously associated to the key concept or search term. Further, the new text may be used to update the language model 760 or lexicon 770.

Conversion, Interpretation, or Analysis of Other Bounded Data Input

FIG. 2 illustrates a general process of transformation to one or more session files with bounded data output. The process may begin with division of data input into bounded separate units (e.g., segments, regions of interest, volumes, spaces), manual or automatic processing of the separate bounded data units, creation of one or more session files, optional session file editor processing, postprocessing, and distribution of results from pattern recognition (including human processing) as bounded data output and use of distributed data for pattern recognition program training. The data input may consist of speech, text, handwriting, fingerprints, digitized photos, medical images, music, and other forms of data that may be processed using pattern recognition technology. Manual and/or automated bounded input image/audio data processing (FIG. 2) 496 and other related processes using different boundary definition (498) may be processed in the session file editor 500 (FIG. 5).

In one approach, two or more different pattern recognition programs are used to generate session file text output 205 for human review 206. Synchronization with tabbing as configured in basic options setup step 501, see FIG. 5BB, may be used to view results sequentially in two or more of buffered the read/write windows.

Text compare 519 as illustrated in FIG. 5, may be used to rapidly detect matches in synchronized output from different human operators, computer applications, or both. Matches in text output between human operators, automated pattern recognition programs, or both may indicate greater reliability.

As an example, in medical imaging, an application may create session files with sequential, embedded bounded data in each session file segment or pointers to the images. These pointers may include hyperlinks to a website or a path string on a local area network. Medical images may represent a wide variety of organs, pathologies, and imaging techniques. In radiology, these images may include digital mammograms, chest radiographs, virtual colonoscopy using three dimensional reconstructions following computerized tomography, or other images.

As an example, computer-aided diagnosis (CAD) program for mammography, such as described in FIG. 1, is available from different manufacturers and include Second Look™ (iCAD, Inc., Nashua, N.H.) or ImageChecker™ (R2 Technologies, Inc., Sunnyvale, Calif.). These programs are designed to detect suspicious breast masses or calcifications.

These and other computer-aided diagnosis imaging programs delimit and display the boundaries of the abnormal or suspicious area on the pixilated image. In one approach, a program may place a circle around a density suspicious for mass, a square around suspicious calcifications. If the computer-aided diagnosis program marks 2 suspicious areas per mammogram, the interpreting radiologist must investigate 2,000 marks per 1,000 mammograms. In many cases, there are 5 or more suspicious areas.

The circle or square represents a form of data division into separate units (boundary definition), as defined in step 202. Processing may be by one or more manual or automatic instances or both 203/204. Using techniques well known to those skilled in the art, these areas may be sequentially numbered and associated to a pointer in a text file or other file. This pointer may consist of web-based hyperlink, or string path to a thumbnail or large image that highlights or otherwise delineates the suspicious area. In another approach, the data may be embedded in a session file as a separate file.

In one approach, each hyperlink or string path may be sequentially pasted manually, or preferably automatically, into an empty session file (ESF). As disclosed in relation to a speech-to-text process 400 (FIG. 4), the ESF contains boundary markers but no associated tag lines. Assignment of a hyperlink or string path to each segment creates a form of incomplete session file (ISF) consisting of a reference to the suspicious area on the pixilated image. The reference may be recorded sequentially in the buffered read/write window in .html format in transcribe text segment 509 and numbered as a text annotation in step 529. In one approach, each mammography study would have its own incomplete session file. Similar results could be obtained by embedding an image file in each segment.

A session file containing these hyperlinks or path string pointers may be created for each study and appropriately identified using medical record number, social security number, or other patient identifying information. This reference session file may be termed the "Mammogram Session File." A corresponding "Mammogram Reporting Session File" may be created with an equal number of empty segments provided in the buffered read/write window and each segment identified in the text annotation. As the number of suspicious lesions identified by CAD will often vary, the number of segments in each Mammogram Reporting Session File will frequently differ.

In this system, the interpreting radiologist at a workstation may elect to view each mammogram study with the squares and circles on the image representing suspicious areas. In one approach, this may be performed at a dedicated, mammogram-viewing computerized workstation that displays standard mammogram views. After the mammogram is selected, the radiologist may use the session file editor 500 (FIG. 5) and load one or more session files 506 consisting of the Mammogram Session File and the Mammogram Reporting Session File. As each of the session files have an identical number of segments, they are synchronized. For convenience, these may displayed on a different monitor than the standard mammogram views. In one approach, as configured in the select basic options (tools) step 501, the interpreting radiologist may use the tab key to move from segment to segment in both session files, see FIG. 5BB.

In this approach, the radiologist may view the mammography study first and then reference the thumbnail images, hyperlinks, or other pointers in the Mammogram Session File. Alternatively, the radiologist may first view the original images with standard mammogram views to identify suspicious areas and then reference the Mammogram Session File. Using the Mammogram Reporting Session File, the radiologist may score each segment for each mammogram and dictate the results into the audio annotation tab of the corresponding Mammogram Reporting Session File in step 528 in FIG. 5.

The audio tag lines may be subsequently pasted into segments of the buffered read/write window in switch tags step 517 of FIG. 5. These may be played back using the playback aligned audio feature 508, transcribed 509 into the Mammogram Reporting Session file by one or more human operators. Each of the transcribed segments in this approach corresponds to a suspicious area bounded by a circle or square by the computer-aided diagnosis program and may be reviewed by a radiologist or other party in a create or edit text in session file in step 520.

In addition, one or more segments in the Mammogram Reporting Session File may be allocated for use by the dictating radiologist to report other findings not referenced by the mammogram CAD program and for recommendations for further evaluation. These may correspond to one or more segments left blank in the original Mammogram Session File.

Each of the separate sections of an image referenced by the CAD program corresponding to a segment in the Mammogram Session File may be scored using standard assessment categories and assessment for breast imaging reporting and data system used in the United States: 1-negative, 2-benign finding, 3-probably benign finding; short interval follow-up suggested, 0-need additional imaging evaluation, 4-suspicious abnormality, biopsy should be considered, and 5-highly suggestive of malignancy, appropriate action should be taken. The dictating radiologist may select to use a function key to execute a macro of the session file editor 500 (FIG. 5), see FIG. 5BB, to rapidly enter data for each suspicious bounded area that is identified by the CAD program using standardized findings. In the great majority of cases, based upon experience with current technology, the findings will be "1-negative" or "2-benign" finding. In another approach, the macro is voice activated.

Using a workflow manager, such as described in relation to FIG. 1, the Mammogram Session File with a hyperlink or other pointer to the suspicious areas may be distributed on a workflow. The images may be interpreted by one or more additional human reviewers, one or more computer aided detection programs, or both. This corresponds to the manual or automatic processing or both 203/204 step described in FIG. 2. Each interpreting instance may utilize and markup a separate Mammogram Reporting Session File that scores the results sequentially using the same protocol. As indicated for the initial reviewer, the results may be sequentially reported in segmented display in a buffered read/write window of the session file editor 500 (FIG. 5).

After interpretation for each bounded, suspicious section of the mammogram is rendered by two or more human reviewers, computerized systems, or both and entered into a separate Mammogram Reporting Session File, the two or more interpretive session files and original Mammogram Session File may be loaded 506 into the session file editor 500 (FIG. 5) for review 206, as described in FIG. 2. The original mammography image may also be viewed on a monitor at a dedicated digital mammography view station along with the other data.

Text compare 519, as described in FIG. 5, may be used to identify agreement in the scoring results between two or more human or computerized reviewers. Synchronization with tabbing may be used to view results sequentially in two or more of buffered the read/write windows from two or more human or computerized reviewers. See FIG. 5BB. After review 206 and postprocessing 207, the distribution 208 may include a final report including bounded data output 209 that references the findings of the final interpreting radiologist who has reviewed the manual or automatic interpretation or both. At a teaching institution, previous (manual) reviewers may include radiologists in training. Bounded data output may include training data 210 for training representational model of the pattern recognition program 215, in this case computer aided detection, if update capability is available. In one approach, only surgical or biopsy proven results would be used for a training data set. This would require surgical or biopsy specimen to confirm impression of malignancy or benign process before including results of human or computer interpretation in training data 210.

Creation of Shared Speech User Profile

Returning to FIG. 3, data for manual or automatic conversion of speech are based upon speech user profile 312. The profile may contain data that is user specific, shared, or global. A speaker may have one or more speech user profiles 312. These may differ based upon language (e.g., English, Chinese, French, Spanish), dialect (e.g., U.S. English), recording device (e.g., microphone, handheld recorder, telephone), signal preprocessing (e.g., normalization or noise reduction), and segmentation parameters used to create the audio segments for a training session file. The concept of speech user profile may be optionally expanded to include formatting speech engine text and other postprocessing rules.

The speech user may also be defined based upon voice condition (e.g., normal, upper respiratory tract infection), speech rate (e.g., fast vs. slow), environment (e.g., noisy background), and other variables. As a speech input 301 source may be a computer or (machine,) a speech user profile 312 may be based upon audio from text to speech or other forms of synthetic, enhanced, or animated speech. A speaker may also have different speech user profiles for dictation, command and control, and interactive voice response.

A. Segmentation (Boundary Detection) Parameters

Long silence generally separates utterances. Shorter pauses are seen between words. Different techniques for speech segmentation of speech input may be used to define end point and segment speech input by utterance for one or more speakers. See, e.g., DARPA EARS (Effective Affordable, Reusable, Speech-to-Text Program) (National Institute of Technology Standards (NIST, Washington, D.C.). Software examples include Acoustic Segmentation Software Version 0.5 (NIST) and Speech Filing System (University College, London, UK). For purposes of synchronization and output comparison by a human editor, in session file editor 500 (FIG. 5), the resulting equal number of segments is believed to be more important than the actual segmentation technique used.

1. Single Speaker

In one approach, as illustrated in FIG. 6, speech input segmentation is based upon detection of long silence between utterances. Before this data is available, segmentation parameters 635 must be created for use with the common speech segmentation module shown in FIG. 6. In one approach, one or more audio files 620 may be evaluated using speech analysis 625, such as with software described with FIG. 1, to create speech segmentation parameters 635. Other data 630 may also be considered, such as average long silence length seen in other speakers.

In some instances, use of common segmentation speech parameters 635 among different speakers based upon historical or group data may be sufficient. In one approach, the speech segmentation parameters are stored as part of the speech user profile 312 (FIG. 3) and loaded by a user management application that represents part of a workflow manager described in association with FIG. 1.

Speech analysis 635 may require determination of background noise so that the speech threshold can be set sufficiently high to exclude this component. A speech analysis program can display amplitude, intensity, or decibel (dB) of audio stream on the vertical axis against time on the horizontal axis. The operator can determine a (1) sound threshold (dB) below which there is silence, and (2) length of silence (milliseconds) separating words, phrases, and sentences.

By requiring longer pauses (silence) between words to define an utterance, the segmentation parameters 635 will result in fewer utterance segments. In one embodiment, the same segmentation parameters 635 used internally by the speech recognition program correspond to those segmentation parameters used in creating the particular speech user profile loaded into the speech recognition program, as described in FIG. 7.

As described in FIG. 6, audio segmentation may be based upon factors other than silence detection. In one approach, the segments are created independent of pause length by using characteristics independent of the speech input 301 (FIG. 3). An audio trigger tone, such as DTMF, may be of assistance for capture of all audio as a single segment between tones independent of pause length.

In another approach, as illustrated in FIG. 4, similar result may be accomplished with use of empty session file (ESF) 464 where the user records using audio annotation in session file editor (FIG. 5) 468. Segments are created independent of the pause length into an incomplete session file from structured dictation (ISF) 470.

2. Two or More Speakers

In an alternative embodiment, the audio file 416 (FIG. 4) may include speech input 412, corresponding to 301 of FIG.

3, from two or more speakers at a meeting, legal proceeding, or telephone conversation. This is termed "multispeaker, single channel."

One or more audio files for the speaker may also be analyzed with speech analysis application, as described in relation to FIG. 1, to determine appropriate segmentation parameters for the speaker for use with speech segmentation module (FIG. 6). The speech analysis application may also be used to generate segmentation parameters 635 for the multispeaker group as a whole or subgroups within it.

In cases of one or more files 620 containing speech input from two or more speakers, segmentation parameters 635 may be based upon a group average or values available in the literature or experience. In many instances, the segmentation parameters for different individuals will vary slightly and may be used for more than one speaker or for speech input 301 into a single recording device from two or more speakers. In this approach, returning to FIG. 3, the segmented speech input 301 from two or more speakers may be transcribed manually 303 or with a speech recognition program 304 with a multispeaker speech user profile 312 based upon the speech or two or more speakers.

If there are two or more channels for speech input, each speaker may have a separate recording, such as created by a microphone or selective, single-channel line tap for telephone system shown in FIG. 1. This "multispeaker, multichannel" case is treated the same, for segmentation purposes, as a single speaker, single source.

3. Text Segmentation

Text segmentation may be performed using regular expressions or similar techniques to parse the text. Determination of segmentation rules may be based upon process purpose. Sentence-based parsing may be more appropriate for translation, for example, but word-based parsing may be more appropriate for text to speech conversions. As disclosed in FIG. 8, a variety of text-based pattern recognition processes may be used, such as text to speech, phonetic generation, machine translation, or natural language understanding. Text segmentation may be used for related manual processes, as disclosed in FIGS. 9 and 10. Text segmentation using common text segmentation module (FIG. 10) may be based upon text characteristics, such as presence of one or more spaces between characters or carriage returns, presence of particular pronunciation or pronunciation tokens, such as <period>, <comma>, or others, or detection of trigger words or phrases. Other techniques may be used.

B. Lexicon

In the preferred embodiment, a lexicon 770 (pronunciation dictionary) for vocabulary is speaker specific. Unlike the generic lexicons included with many off-the-shelf applications, a speaker-specific lexicon may be tailored to the unique pronunciation or dialect of the speaker. This may be of assistance in many cases of unusual pronunciation, including instances where the speaker is foreign-born or attempting to learn a foreign language. For instance, a Pakistani-born physician practicing medicine in the U.S. and dictating medical reports may need a lexicon that reflects a Pakistani pronunciation of American English. Similarly, an American Midwesterner learning French may need, for speech recognition in French, a lexicon that reflects an American accent applied to French pronunciation. An individual with a cleft palate or other orofacial disorder that may affect pronunciation may similarly benefit from a lexicon tailored to that person's specific pronunciation needs.

Pronunciation data 780 is processed by a lexicon model builder 775 to create a lexicon 770 for speech recognition, as shown in FIG. 7. In one approach, each word is listed with its phonetic pronunciation using phonemes. If word models are used for acoustic modeling, the word may be listed with its pronunciation defined as the entire word, rather than as separate subunits.

While the pronunciation listing generally refers to a word in the same language, other options are available. As an example, the French word for "above" is "sur" and may have pronunciation of "above" listed in the lexicon 770 of FIG. 7. Consequently, when the speaker utters "above," speech-to-text decoding 730 results in the text "sur" in graphical user interface 740. This results in a word by word translation, which may be less effective than other translation, but does convey a general idea and represents a form of "gisting." This may be of particular use for the foreign traveler who does not know the country's language, but does have a personalized speech user profile 312 (FIG. 3) that may be used for speech recognition (FIG. 7) and "gisting" for communication. In a related approach, the traveler may have a list of selected words that each can be translated into a foreign language depending upon the lexicon selected. For example, the traveler might have multiple separate lexicons, one each for French, Spanish, German, and so on. The prior art describes multilanguage lexicon and language model, as illustrated by a reference submitted with this application, but the prior art commercially available speech recognition applications do not appear to use purely speaker dependent language model or word models for this purpose.

In a further related approach with a different lexicon, the same word model may reference the phonetic transcription for the word "above" (e.g. "ax b ah v"). In this case it can produce transcribed text using a phonetic representation (e.g., ax b ah v). In other instances, the user may elect to transcribe the uttered speech into a programming or imaginary language.

In some cases, the operator may elect to use word subunits for speaker modeling, but standard pronunciation alphabets may be unintelligible to the novice user or not available for some languages, dialects, or words (e.g., medical, legal, or scientific terms). In these situations, the disclosure teaches use of an audio pronunciation generator. See FIG. 17.

In an exemplary embodiment, the audio pronunciation generator process may use Microsoft SAPI 5.x (Microsoft Corporation, Redmond, Wash.) compliant text-to-speech engine, such as described in FIG. 1. The text-to-speech engine may use a SAPI Universal Phone Set (UPS) a machine-readable phone set based on the International Phonetic Alphabet (IPA), attached as a reference to this application. The SAPI Phone Converters specify the languages that they support in terms of a list of language identifiers. Audio playback in a compliant TTS engine may be based upon identification of the UPS code of the phoneme that are returned by the application.

The SAPI Phone IDs of the Universal Phone Set are the IPA Unicode values. Phones are listed by phonecode NUMBER phonecode NUMBER phonecode NUMBER. For example, a portion of the registry key includes aa 000a ae 000b ah 000c ao 000d aw 000e ax 000f ay 0010.

The UPS phoneme set may be related by data table or otherwise to other phonetic alphabets. In one embodiment, a simplified phonetic alphabet may be created similar to ones used to teach phonetics to grade school children (called "Simple" phonetic alphabet). This "Simple" phonetic representation may be related by a data table to corresponding representations using other phonetic alphabets.

In one approach, this data table may be provided by as part of a toolkit for development by independent speech vendors or to other end users. Alternatively, the data table may be prepared by a transcription service supervisor or systems administrator locally with minimal linguistics training. The experience of the inventors indicates that the particular representation is less important than relative consistency in assignment of a particular representation to a particular sound. Even then, there is some fault tolerance in the system. This may reflect use of multiple Gaussian models being created for the same phoneme, Hidden Markov Models that use both acoustic data and language model to generate a hypothesis in speech recognition (FIG. 7) and other related speech and language applications (FIG. 8), and a multiwindow session file editor 500 (FIG. 5) that permits rapid comparison of segmented output using different speech user profile 312 (FIG. 3) or different program (FIGS. 7, 8) configurable options.

In one approach, the word and phonetic pronunciation may be stored in the user lexicon file in hexadecimal format with UTF-7 (UCS Transformation Format, UCS=Universal Character Set). The UTF-7 transformation method represents Unicode character codepoints in a fashion compatible with ASCII-Compatible Encoding (ACE). During recognition, the speech engine may originally transcribe using UTF-7 format. This may be converted into Unicode characters in text post-processing 730 (FIG. 7).

Figure 17A:
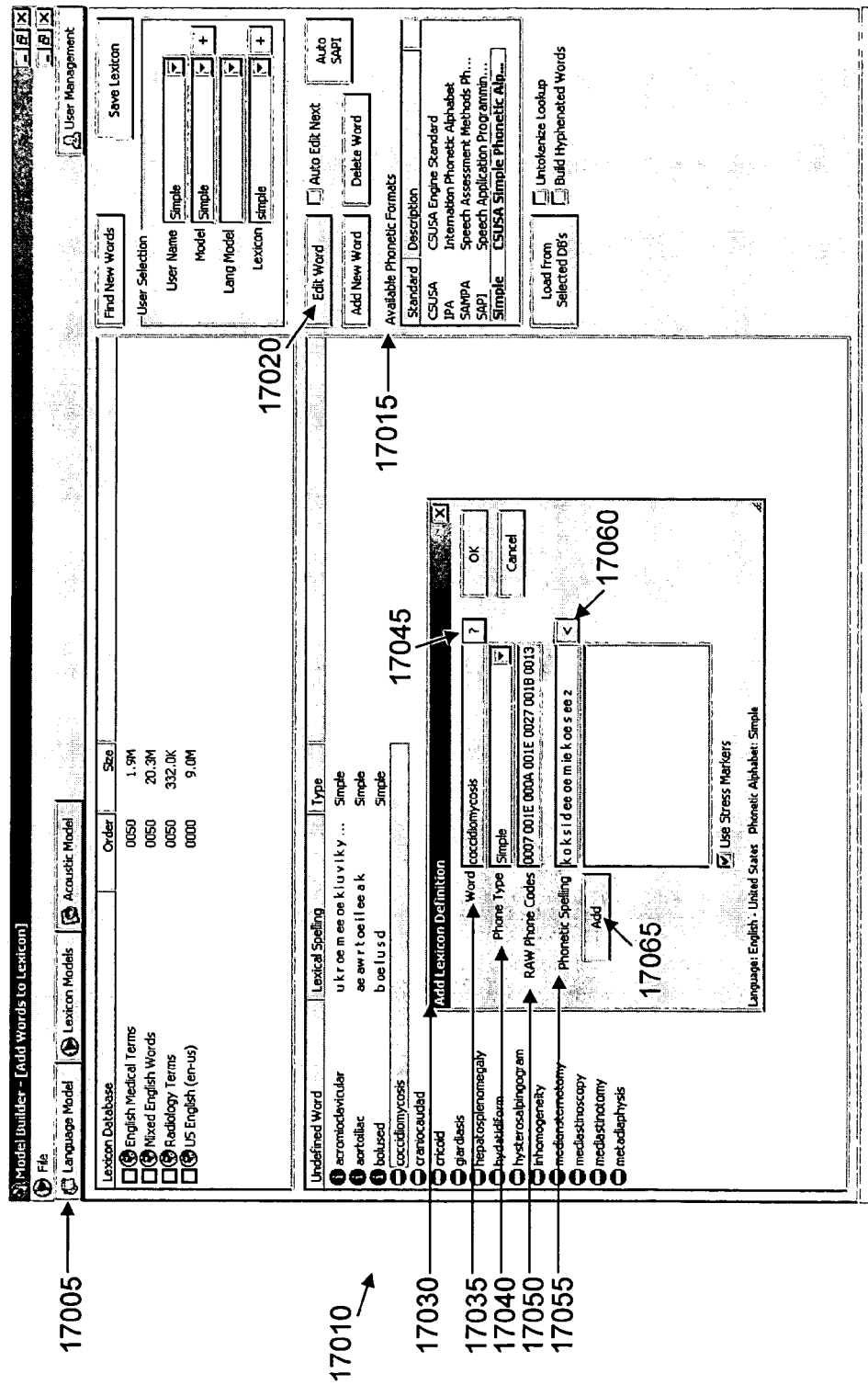
FIGS. 17A through 17B illustrate an exemplary embodiment of the graphical user interface for the automatic pronunciation generator.
Figure 17B:
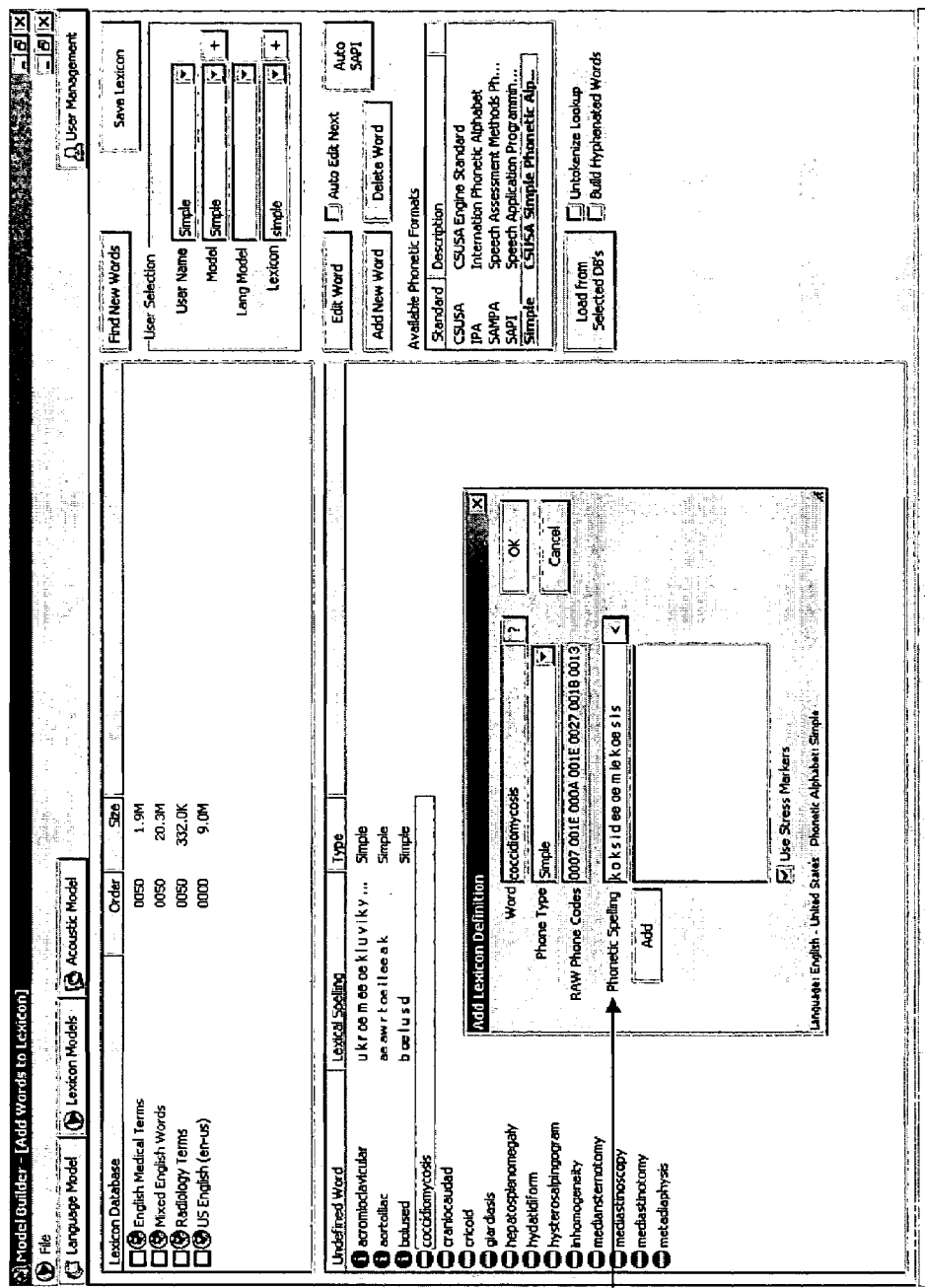

An exemplary graphical user interface for an audio pronunciation generator that is part of the lexicon model builder 775 (FIG. 7) is shown in FIGS. 17A-17B. In FIG. 17A, the operator has opened the Model Builder graphical user interface 17000, selected the "Lexicon Models" button 17005 in the Model Builder GUI, and opened a list in the lower part of the interface 17010 showing the phonetically undefined words in the lexicon 770 for a medical vocabulary. The undefined words are listed alphabetically and range from "coccidiomycosis" through "metadiaphysis." These words, unlike the first three words on the list of FIG. 17A, have no lexical spelling assigned to them.

In the first step, as described in FIG. 17, the user may select 1701 pronunciation protocol (phonetic alphabet). Various simple phonetic pronunciation conventions may be used, as well as standard representations used by professional phoneticists and linguists. The different phonetic representations for the same sounds using different phonetic alphabets may be related by a data table. In FIG. 17A, the user has selected the "Simple" alphabet that is described as the "CSUSA Simple Phonetic Alphabet" in the Available Phonetic Formats 17015 list (FIG. 17A). Additional phonetic alphabets may be added.

By clicking on the "Edit Word" button 17020, the user opens the "Add Lexicon Definition" dialog 17030 (shown FIG. 17B) and enters 1705 the phonetically undefined word into Word text box 17035. In the example, the phonetically undefined word is "coccidiomycosis." The Phone Type 17040 may also be entered. In this case, it is "Simple" corresponding to a simplified phonetic vocabulary.

By clicking on the "?" 17045 to the right of the Word text box, the user may begin review/modify the phonetic spelling 1710 sequence. The text is sent to the TTS compliant engine, corresponding to the TTS engine of FIG. 1, and converted to phone codes and UPS phones 1720, if a phonetic conversion generator is available for that language and dialect (e.g., U.S. English). This results in audio playback 1735 of the recognized text by the text-to-speech engine 1725.

The phone codes and UPS phones are returned to the audio pronunciation generator. The UPS phones are displayed 17050 in the RAW Phone Codes text box in the graphical user interface. Based upon the data table, the UPS phones 1730 are converted 1740 to the selected phonetic format (here the "Simple" format). The phonetic spelling 1745 is displayed in the Phonetic Spelling text box 17055, here corresponding to "k o k s i d ee oe m ie k oe s ee z".

If the operator determines that the audio sounds incorrect 1750, the user may returns to step 1710, and may keyboard new, alternative phonemes into the Phonetic Spelling text box 17055, and repeats the process until the audio sounds correct. To play back the new audio, the operator may click on the "<" button 17060 adjacent to the right of the Phonetic Spelling text box. If the audio sounds correct, user may accept 1755 the phonetic spelling and save it by clicking on the "Add" button 17065 under Phonetic Spelling. In FIG. 17B, for instance, the user changed the second to last phoneme from "ee" to "i" in the "Phonetic Spelling" text box 17055.

The user may elect 1760 to save the phonemic pronunciation to a local database 1765 only. If user elects 1760 to save into the lexicon 770 and language model 760, word plus phonetic spelling may be transformed with UTF-7, the format output by the speech-to-text decoder 730.

In one approach, the local database may have pronunciation data organized by language and dialect (e.g., U.S. English, CodePage 1033), and phonetic alphabet (SAPI (IPA), Simple, other). If the user selects the database only option 1760, the word and its phonetic pronunciation (in the selected phonetic format) may be stored locally on database list of 1 through N words, each with one or more phonetic pronunciations. If the user selects "no" to the only database storage option, the word and its phonetic pronunciation may be transformed to UTF-7 format and stored in the user specific lexicon 770 file and language model 760.

In one approach, a speaker-dependent speech user profile 312 (FIG. 3) may be used for the text-to-speech engine 1725. This may assist the user in determining the phonetic pronunciation associated to the speaker's speech.

With the audio pronunciation generator, a user can modify phonetic spelling 1710 and change audio playback 1735. For this reason, the application may also be used by the novice linguist or foreign language student in studying and recording phonetic pronunciation of different languages and dialects, as well as instructors in these fields.

C. Language Model

A language model 760 for speech recognition is prepared from a specific set of documents, reports, letters, or written text that are generally referred to as the text corpus 767. The language model builder 765 creates the language model 760. FIG. 7. The language model may be used for other speech and language processing. See FIG. 8.

In one approach, a language model builder 765 analyzes the pattern of word use to establish a statistical model based on trigram or other N-modeling. Other language model techniques may be used.

The language model 760 may be user specific, with data selection based upon other criteria that affect word use and context, such as document type, subject matter, topic or work type, language, dialect, or other classification. The language model is preferably based upon reverse formatted verbatim text with removal of nondictated material.

The language model may include text from one or more languages. Human translation session file (FIG. 3) 930 or machine translation session file (FIG. 3) 930, as illustrated in FIG. 9, may provide text in target foreign language. This translated text may be used to create a speaker-specific language model for speech-to-text decoding for a multilingual speaker who may dictate in several different languages and use a multilanguage language model 760 or lexicon 770, or a speaker who dictates in one language with output recognition in a foreign language.

D. Acoustic Model

As illustrated in FIG. 7, paired verbatim text and audio 793 is used by the acoustic model builder 745 to create the acoustic model 750. The paired verbatim text and audio 793 may be derived from the training session file 310 in FIG. 3.

1. Forced Alignment

In the preferred approach, the speech engine may be trained in forced alignment mode in which segmented audio with verbatim text is submitted as a training session file 310, as described in FIG. 3. Forced alignment techniques are well known to those skilled in the art and represent a form of supervised training.

The source acoustic data 301 may be from one or more speakers or computer sources, with data selection further determined by other factors that affect acoustic characteristics, such as language and dialect, speech user medical condition, speech rate, background noise, recording device, type of sound card or telephony card, audio postprocessing, and segmentation techniques. As pronunciation may be dependent upon vocabulary and context, different acoustic models may be based upon topic or work type.

2. Selection of Word Units or Subunits for Acoustic Model

Choices of basic acoustic units for the acoustic model 750 may include one or more of words, phone-like units, such as phonemes or triphones, syllables, dyad or half syllable-like units, acoustic units, or others. Normally, a single selection is made, but the acoustic model may be developed using one or more of these, such as word models with triphones. The phonetic pronunciation entered into the lexicon 770 typically corresponds to the acoustic units chosen for the representational model.

In a commonly used approach, context dependent triphones may also be created for each phoneme where the central monophone is linked to the preceding left and following right monophone within the word. If short pause precedes the central monophone, the silence may be indicated to the left or right of the monophone. In this approach, the word "above" has four phonemes "ax" "b" "ah" "v". The phonemes may be written as a series of context dependent triphones: sil-ax-b ax-b-ah b-ah-v ah-v-sil. Cross-word dependent phoneme modeling may also be deployed where the last monophone in one word may be dependent upon the first monophone in the next.

In American English, in one approach, there may be a total of 41 phonemes and, corresponding, a total of 41 monophones. The total number of triphone combinations excluding silence is $41^3$. That is, each monophone may be preceded and followed by each of the 41 possible monophones. The total number of context dependent triphones per phoneme is $41^3/41=41^2$. In practice, only a small percentage of the triphone combinations may be present in an acoustic model since some combinations are seen rarely if at all.

States may represent acoustic variations of the triphones. Mixtures may represent further acoustic differentiation of the states. Using techniques well known in the art, there may be 3 real states per triphone, 8 mixtures per state, and 39 features per mixture.

In a less common approach, word models (or templates) may be used to create a lexicon 770 entry for the entire word, phrase, or sentence, not just a phonetic pronunciation consisting of multiple phonemes. In this case, the lexicon pronunciation is a string of continuous characters, not a group of phone-like units, such as phonemes or triphones, separated by a space. For the word "above," the lexicon pronunciation entry is "above".

Word models train the acoustic model to recognize the word as a whole without reference to phonemes or other word subunits. This type of modeling may be used for recognition of words spoken in the speaker's native language and foreign languages and requires large amounts of material to generate an accurate acoustic model. Both accuracy and speed may be improved with the use of word models. In one approach, both word models and triphones or other subunits may be used.

Based upon experimentation of the inventors, many short words may be very well trained with triphones or other subunits. Using word models does not improve overall accuracy. Word models may be better used for long and complex words or phrases. These more likely are the cases that accuracy is less with triphones. For instance, the word "long" may be more frequently recognized correctly using triphones than a word such as "vicissitudes" due to less accurate triphone models. In one approach, words and phrases may be selected that are frequently misrecognized and updated with word models to improve overall accuracy. Because processing with word models may require more computational resources, in some cases, the number of word models used in the system may be limited.

In a less common approach, acoustic speech units may be used. Acoustic speech units may be "31 5 46 3" for the word "above" and reference the numerical representation of the digitized sounds that were generated by the clustering algorithm. This is based upon the assumption that the lexical model structure design does not correspond well with the acoustic data actually present in the utterance. A codebook of speech units may be created in the lexicon 770 that reflects data inferred from the digitized speech input rather than lexical pronunciation. There may be little or no correlation with standard phonetic representation. In one approach, acoustic speech units may be based upon clustering of segmented speech input from unlabeled speech. Use of word models and acoustic speech units both may reduce the pronunciation knowledge required for generation of the lexicon 770.

Selection of one or more reference speech units may depend upon language and performance considerations. In speaker-independent and speaker-adaptive systems, word models may be more suitable for small vocabulary tasks using 10-20 words compared to large vocabulary systems with 250,000 words or more. This reflects constraints of computational efficiency related to search algorithms.

In some cases the choice may reflect language or dialect. There are about 41 phonemes commonly used in English for speech recognition, but up to 30,000 syllables compared to only about 50 in Japanese. Due to time-limited search constraints during speech to text decoding 730 for speech recognition for dictation, syllables may be more appropriate for Japanese than English. Similar processing constraints generally apply to other speech and language processing applications. See FIGS. 7, 8.

In a speaker-dependent system, adequately trained word models may be of particular assistance in improving both accuracy and performance in day-to-day use of speech recognition for dictation 313. This may reflect the abundant examples of pronunciation of a given word that may be used to create the acoustic (representational) model for it. With large amounts of word-specific, speaker-dependent data, there are more likely to be multiple uttered instances of the word and sufficient audio data to create accurate acoustic word models that reflect the speaker's variable pronunciation of the word.

A speaker-dependent system for dictation 313 may be of further assistance to the small subset of dictating speakers who speak in two or more languages during a dictation session, e.g., English, French, and German. With speaker-dependent approach, the speaker model may better reflect the unusual speaking style of the speaker.

In one approach, a multilingual speaker may create a language-specific speech user profile 312 that is activated during dictation of that language by user selection or an automatic process. In another approach, a multilingual speaker may create a multilanguage, speaker-specific speech user profile. In a further approach, the speaker may use an acoustic model trained for one language with the language model and lexicon created for another. Success of this approach may depend upon the acoustic similarity of the speaker's pronunciation of the two languages.

3. Automatic Questions File Generator

Data classification (clustering) into subgroups may be performed in supervised and unsupervised modes, as is well known to those skilled in the art. In supervised classification, the subgroups are known at the outset. Clustering consists of assigning data to the different known groups. Unsupervised clustering consists of creating homogeneous subgroups based upon similarities in attributes.

Bottom-up clustering starts with original number of elements and subgroups according to attributes. A decision tree may be constructed in this way. Top-down clustering starts with clustered subgroups.

Linguistics questions may be used for state-tying by the acoustic model builder 745 in cases of data sparsity. Based upon the prior art, the questions may be generated by a lexical expert or automatically using clustering techniques. In one previously described approach, the linguistics questions subgroup triphones with the same central monophone into acoustically similar groups. In the prior art, as disclosed by two papers submitted with this application, one or more linguistics questions sets may be automatically generated using the occurrence and likelihood parameters that are commonly used for state-tying.

In the prior art, the decision whether to use an acoustic model generated with a given questions set is determined by recognition accuracy. Creation of an acoustic model 750 has traditionally been a time consuming process, often requiring many hours of computational time. To generate 30 different acoustic models based upon 30 different questions sets based upon various parameter combination values sets might require many hours of effort and significant computational resources. Additional effort would be required to transcribe audio files and determine the relative accuracies of the acoustic models.

Where a single speaker-independent acoustic model is being generated for use with a speaker adaptive system, the process of selecting the appropriate acoustic model need be performed only once. Where multiple speaker dependent acoustic models are being generated, the process must be performed for each speaker. Different combinations of parameter values might result in 25 to 30 or more different questions sets that could each could be used to create an acoustic model. Therefore, it would be desirable to utilize a method that reduced the time it required to identify a reliable questions set for use with state-tying to generate an acoustic model 750.

Consequently, the current method and system relies upon the prior art, but adds to the process (among other improvements) a critical last step that has not previously been described. This end step is a method of quickly determining which questions sets are likely to produce the most accurate acoustic model without the necessity of creating many different acoustic models and testing each one for recognition accuracy.

This is accomplished by generating a number of questions sets with a large number of questions and selecting a "best result" based upon maximum likelihood based distance measure, as defined in the paper by K. Beulen and H. Ney that is submitted with this application. In this method, the operator selects a range of parameter values for likelihood and occurrence variables (variables commonly used in state-tying). The range of parameter values can be similar to those described in the literature. Parameter tuning is then used to select a single question set for use based upon the maximum likelihood based distance measure.

In one approach, triphones with the same monophones in the middle position are clustered together. In this approach, 41 monophones are used. This corresponds to 41 context dependent triphone groups. The triphone states in a triphone group are further subgrouped together based on their location. In one approach, there may be 3 real states per triphone (left, middle, and right states) and a total of 123 state groups are generated.

A state-tying utility 1860 may use the best questions file to tie the triphone states with insufficient data to well-trained models. In this approach, the states with insufficient data are tied to other states for which there is sufficient data for each subgroup. Triphone states that are in the same group (out of the 123 groups discussed above) are "tied" since they are expected to be acoustically similar. The tied triphone states are part of the acoustic model 1870, corresponding to the acoustic model described in FIG. 7 for speech recognition.

Figure 18:
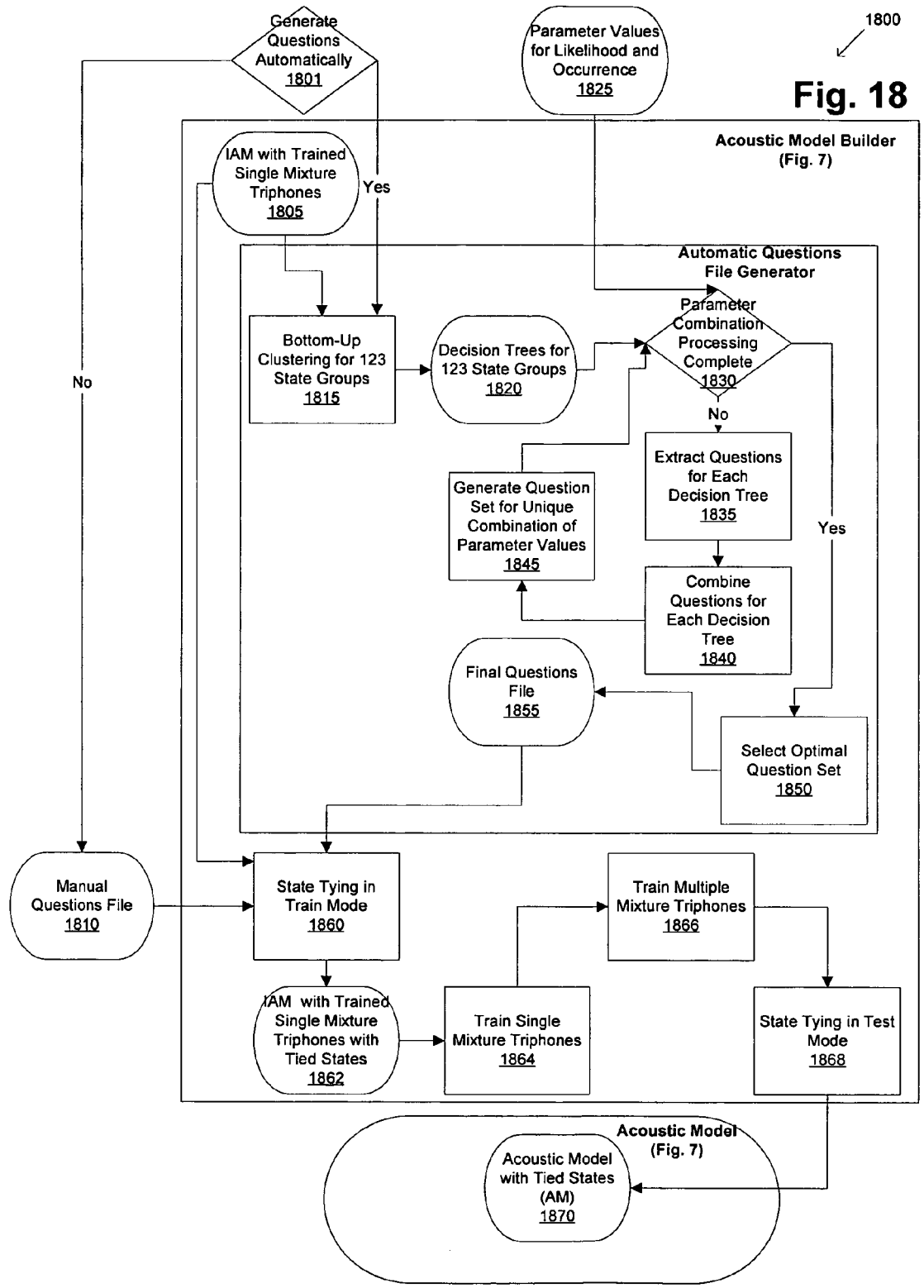
FIG. 18 is a flow diagram illustrating an exemplary embodiment of a questions file generator.

As illustrated in FIG. 18, the first step in the process is determination 1801 whether to use manual questions file 1810 or automatically generated final questions file 1855 for processing of the intermediate acoustic model (IAM) 1805 with trained single mixture triphones with untied states. If the manual method is selected, a manual questions file 1810 is created by a lexical expert for the subsequent state-tying process in train mode in step 1860. If an automatic process is selected, bottom-up clustering for each of the 123 groups 1815 is used to create a decision trees for 123 state groups discussed above. In one approach, the decision trees for monophones may be created using techniques described in the references submitted with this application.

The decision trees maximizes likelihood of acoustic similarity within clustered triphone state subgroups. Maximum likelihood of acoustic similarity may reflect minimum distance between the Gaussian distributions of the triphone states. All the 123 state groups are clustered together using a bottom-up clustering approach resulting in 123 decision trees.

After decisions tree creation 1820, in one approach, the operator provides incremental parameter values 1825 for analysis (as well as value range for testing (i.e., begin and end)). In a preferred embodiment, the two parameters may be likelihood of acoustic similarity and number of occurrences within the data set, as computed by the method described by K. Beulen and H. Ney.

As an example, the likelihood parameter range may be 3000 to 8000 with a parameter increment of 1000, leading to parameter values of 3000, 4000, 5000, 6000, 7000, and 8,000. The occurrence range may be 1 to 5, with an increment of 1 leading to occurrence range values of 1, 2, 3, 4 and 5.

Once the likelihood and occurrence parameter values have been selected, all combinations are used to create linguistic questions. If the full range of parameter combinations has not been used to create questions (the "no" decision branch in the loop), the process determines to continue the loop step 1830.

The total number of subprocess loops and question sets are determined, in this approach, by the total number of different parameter combinations. If there are 6 values for likelihood and 5 values for occurrence, the total number of combinations and generated question sets will equal 30.

Given each parameter combination, top-down clustering is performed for each of the 123 decision trees. For each of the resulting trees, there will be a different number of questions because of the different parameter values. From tree 1, there may be 30 questions, from tree 2, there may be 50 questions, and so on. The number is determined by the acoustic similarities of the data, and the amount of available data for each triphone for a particular speaker. The question set for a given parameter combination is generated by combining all the questions from all 123 trees.

The process is repeated for each parameter set. For example, where the parameter combination selected is 3 and 5000, 30 different question sets are may be generated. A question set for a single parameter value combination (e.g., 1, 5000) is generated within each process loop. The process is repeated by changing parameters (e.g., 2, 5000; 3,500; 4,5000; 5,5000; 1,6000; 2,6000; 3,6000; 4,6000; 5,6000; 1,7000 . . . 5,8000) for generation of the next question set. The result is 30 question sets.

During the process loop, questions are extracted for each decision tree 1835. This is followed by combine questions for each decision tree 1840 and generate question set for unique combination of parameter values 1845.

If the process determines that the parameter combination processing is complete 1830, a single, optimal questions set is selected, step 1850, to produce the final questions file 1855. In one approach, the optimal questions file generates the highest maximum likelihood gain based upon the maximum likelihood based distance measure. In top-down clustering of triphone states, the likelihood gain is computed for each sub-grouping based upon the results of Beulen and Ney, and every subgrouping is associated with a question in the question set. Therefore, each question is associated with the likelihood gain calculated during the subgrouping process. The average likelihood gain for a question set is found by averaging the likelihood gain of all questions in the question set. In this approach, word error rate is not considered for selection of the optimal question set.

Once the best question set out of all sets has been selected, state tying in train mode 1860 may be based upon grouping the triphone states with the same central monophone. This occurs within the acoustic model builder 745 (FIG. 7).

In one approach, an intermediate acoustic model (IAM) with trained single mixture triphones 1805 may undergo state tying 1860 to create an intermediate acoustic model with trained single mixture triphones with tied states 1862. This may be processed further to train single mixture triphones 1864 and train multiple mixture triphones 1866 before state-tying utility in test mode 1868 to produce an acoustic model with tied states (AM) 1870. In another approach, after state tying in test mode, one or more additional training cycles may be performed before creation of the acoustic model with tied states (AM) 1870. This final acoustic model is used for speech recognition process 700 (FIG. 7) and other speech processing applications process 800 (FIG. 8).

Experience of the inventors with this approach indicates that selecting best question set based upon maximum likelihood distance measure reduces the need to test results by creating different speaker models and transcribing to determine accuracy. There may be, however, instances where the operator may be uncertain of the best initial range of parameter values to select.

Range of parameter values may be based upon values in the literature, if available. Our experience further indicates that the optimal settings may be somewhat speaker independent for a given language and may be similar across languages. Cross-speaker settings may frequently be used successfully to produce accurate recognition.

Some trial and error may be required to determine an accurate range of parameter values for selection of likelihood and occurrence values. Parameter adjustment may be required to optimize recognition accuracy in different speakers or the same speaker using a different device or encountering different background. In these instances, high accuracy results may be used to validate the selection of certain parameters retrospectively.

In these cases of uncertainty, a wider range of parameter values may be selected. As an example, likelihood parameter range of 1,000 to 26,000 may be selected with increment of 5,000. The occurrence range may be 1 to 26, with increment of 5. Questions may be generated for each combination of the two parameters. Where there are large numbers of questions, additional parameter values closer to the high-yield values may be used to create additional question sets. Parameter tuning may be performed upon the question sets with large numbers of questions.

In another related approach, both manually 1815 and automatically generated questions may be submitted to the state-tying utility 1860. In this approach, the state-tying utility 1860 will select the optimal questions set.

3. Accumulator and Combiner

Accumulator and combiner techniques may be used to create an acoustic model 750 using multiple computers with distributed computing. The basic premise of this "parallel training" is described in an online tutorial submitted with this application. That disclosure describes the use of similar techniques whereby an acoustic model builder 745 creates an acoustic model 750 using a training session file (.trs) 310 from speech input 301 for dictation. The .trs file may be a compressed file that contains .raw files (one file per utterance), verbatim_format.txt (a verbatim file with formatted text), and word.train.txt (text corresponding to each .raw file). In one approach, an acoustic model 750 for speech recognition (FIG. 7) and other speech processing application (FIG. 8) may be created by training and tying states for a series of intermediate acoustic models. This results in an acoustic model with tied states 1870 that contains statistics, such as means, variances, and others, in binary format about the Hidden Markov Model triphone states derived from the original training session file 310.

In one improvement described in association with FIG. 19-1, acoustic model creation begins with a training session file A 1901, corresponding to a training session file 310. In create acoustic model step 1903 within the acoustic model builder 745, parallel training methods may be used to create intermediate acoustic models and a final set of acoustic models, including acoustic model—monophone model 1905, accumulator file "#"1 1910, and acoustic model (AMI) 1915. The AMI acoustic model 1915 is used in speech recognition (FIG. 7) or other speech processing applications (FIG. 8).

Intermediate models may be used for speech recognition (FIG. 7) or other speech processing (FIG. 8), but result in decreased accuracy and/or increased processing time. The create acoustic model process 1903 includes various subprocesses, including the time-consuming step of training multiple mixture triphones. Subprocesses include generation of a final acoustic model with tied states 1870, as described in FIG. 18. The accumulator file 1910 may be generated from the acoustic model-monophone model 1905 before final state-tying 1868 in test mode that produces acoustic model with tied states, corresponding to AM1 acoustic model 1915.

In the experience of the inventors, speech user creation with many hours from a single user may result in saturation of the acoustic model 750 where the model is not significantly modified with small amounts of update data. Updating the acoustic model using an adaptive technique with small amounts of data may, therefore, result in no significant improvement in error rate or transcription time. One example of adaptive training is the correction of misrecognitions in speaker-adaptive systems for submission to the speech engine. In the preferred embodiment, accumulator and combiner methods may be used both to create the speech user profile 312 and update it.

For instance, two hours of speech input 301 for dictation may be collected from a specific user to create a training session file 310 for creation of a speech user profile 312. After a couple of weeks another two hours of additional speech input may be available. Experience of the inventors indicates that improvement with MLLR update methods saturate quickly so that using five minutes of additional speech input will likely produce the same changes in accuracy as two hours. This may reflect the fact that MLLR is designed to use as little adaptation data as possible to approximate the characteristics of a more "speaker dependent" model, not actually use large amounts of new and old speaker-dependent data to compute these characteristics. Similar problems may be encountered using MAP methods, though experience of inventors indicates that MAP-trained acoustic model does not saturate as quickly.

An updating process is shown in FIG. 19, that may use both the new and old data to define a new acoustic model. In one approach, as described first in FIG. 19-1, the original acoustic model 750 may be loaded into the acoustic model builder 745. This includes the acoustic model-monophone model, accumulator file 1 1910, and acoustic model AM1 1915 that is used for processing.

A training session file B 1921 may be created based upon new, updated speech input 301 for dictation, as disclosed in FIG. 3. Using the accumulator file "#"1 1910 and new training session file B 1921, the acoustic model builder 745 may run in batch mode 1923 to create a new accumulator file 2 1930. In this process, the monophone model 1905 originally generated when creating the acoustic model (AM1) 1915 may be processed in batch mode 1923 with the training session file B 1921 to create a second accumulator file 1930.

Running in combine mode 1933, the acoustic model builder 745 may process the original accumulator file "#"1 1910 with the newly created accumulator file 2 1930 to create a new, combined monophone model 1935 and, as a byproduct of the process, a third accumulator file 1937. This third accumulator file 1937 may be used in further updates. Single mixture triphones may be trained in step 1939 to create an intermediate acoustic model with trained single mixture triphones (IAM1) 1941 that may undergo state tying in train mode 1943. This state-tying process corresponds to state-tying utility in step 1860 in FIG. 18. The result is a tied-states intermediate acoustic model (IAM2) 1945.

Untying/retying states module, FIG. 19-2, permits recreation of a new acoustic model and regeneration of state tying based upon new data. For instance, a speaker may have an acoustic model 750 based upon many hours of microphone speech and may elect to create a single new model based upon both microphone and telephone speech. The problem is that the state-tying for the original acoustic model 750 does not include data from the new training session file 310. As the acoustic characteristics of speech recorded by the two devices are usually substantially different, state untying is likely to result in improved performance because the new, combined acoustic model will reflect the characteristics of both forms of speech input.

More specifically, the original acoustic model (AMI) may, for example, have 3,000 trained triphone states. After creation of intermediate acoustic model "#"2 (IAM2) in step 1945 there may be, for example, an additional 3,000 triphone states that require modeling (in this hypothetical example) for 6,000 states. In one approach, the combined modeling may be accomplished by untying and retying states and mapping new triphone states to old ones.

Creation of second acoustic model without second training round for triphones may involve mapping the state numbers of each triphone state in both the original acoustic model (AM1) 1915 associated to accumulator file "#"1 1910 and intermediate acoustic model "#"2 (IAM2) 1945 associated to the combined original and new data. For instance, triphone x1–X2+x3 is modeled with states 243, 244, and 245 in the original acoustic model (AM1) 1915 and 456, 457, and 458 in the new user intermediate acoustic model IAM2 1945. In one approach, an acoustic model may be created for state 456 in the new user by using state 243 in the original user, for state 457 by state 243, and for state 458 by state 245. Evaluating all triphones in the new user can complete the mapping.

Based upon the experience of the inventors, sometimes a triphone that occurs in the new user may not be present in the original user. In one approach, these triphones may be skipped without performing state mapping for these triphones. Acoustic data for states may be based upon the training session file B 1921.

Based upon further experience of the inventors, there may be states in the new user that cannot be mapped to a state in the original user. In these situations, in one approach, the process may locate a triphone in which that state occurs (say, x1–x2+x3), determine the middle phone of the triphone (which is x2), locate the x2 central phone model in the original user, and map that unmapped state to the state in central phone x2.

For instance, x1–x2+x3 has states 10, 11, and 12 in the intermediate acoustic model "#"2 (IAM2) 1945, and x2 has states 100, 101, and 102 in the original acoustic model "#"1 (AM1) 1915. If the state that could not be mapped was state 12, state 12 in the new user may for instance be mapped to state 102 in the original acoustic model.

As disclosed in FIG. 19-2, the partially trained, intermediate acoustic model "#"2 (IAM2) 1945 is processed in the untying/retying state module that is part of the acoustic model builder (FIG. 7). The first step 1947 in the processing loop is finding the i-th triphone (tri-i) in the IAM2 acoustic model, followed by determining 1944 whether tri-i is present in the original acoustic model (AM1). The subprocess loop may start with value i=0. If tri-i is present in the original acoustic model 1915, it undergoes state mapping 1950. If not present, the process loop defines i=i+1 in step 1951 and asks whether such a triphone exists in IAM2 in step 1953. The process completes 1953 when the i+1 triphone is not present in IAM2.

If the first subprocess loop completes and determines in step 1955 that there are unmapped states in IAM2, in step 1957, the process may begin a second subprocess loop in which it finds the triphone model with the unmapped state in intermediate acoustic model "#"2 (IAM2). It may locate the middle phone (MP) of the triphone model with unmapped state (tri-um) in step 1959. In step 1961, it may locate 1961 the monophone model for the middle phone (MP) in acoustic model "#"1 (AM1), corresponding to the original acoustic model used for speech recognition (FIG. 7) and other speech processing (FIG. 8).

Once identified, it may map 1963 the unmapped state (trium) in acoustic model IAM2 to the corresponding state for the monophone model for the middle phone (MP) of acoustic model AM1. The process iteratively loops until no unmapped states are present. It then presents a set of retied states 1965 that may be used for further processing in FIG. 19-1

The retied states 1965 are processed in the replace states step 1967 to create an intermediate acoustic model (IAM3) 1969. This may be processed in train mode 1971 to produce acoustic model "#"3 (AM3) 1973. In one approach, the train mode runs four training cycles using the well-known Baum-Welch algorithm for determination of joint probability of training data.

This new acoustic model does not represent an approximation of variances, means, and other statistics of the original acoustic model 1915 based upon an estimate from a small amount of speaker-dependent data, but recomputation of the acoustic model based upon the original speaker data, as represented by accumulator file "#"1 1910, combined with new speaker data in the training session file B 1921.

In one approach, the new acoustic model (AM3) 1973 is used to transcribe test audio to determine accuracy 1975. If it is determined 1977 that target accuracy is achieved, the new acoustic model 1979 may be used. If not, parameters such as beam pruning settings and others are reset and the acoustic model is retested 1981. If the process determines 1983 that target accuracy is achieved, the new acoustic model is used with new parameters 1985. If not, additional training material is used 1987 to add to the training session file B for another iteration of acoustic model creation.

In a single-speaker setting, the accumulator and combiner process may be used to create and update an acoustic model 750 (FIG. 7) for a speech user profile 712. As previously described, in a multispeaker setting, the process may also be used to create and update an acoustic model 750 based upon the speech input 701 of a particular group of speakers. Various acoustic models may be created for various subgroups of speakers. For instance, multispeaker acoustic model number 1 may consist of training session file 740 based upon speech input 701 from speakers A, B, and C. Multispeaker acoustic model number 2 may consist of speech input 701 from speakers A, B, and D. Using accumulator and combiner techniques described in this application, it is relatively easy to create one or more multispeaker speech user profiles 712 for use when different combinations of speakers are present.

In another related approach, the acoustic model (FIG. 7) may represent speech input 301 (FIG. 3) from a first speaker that is used to initialize acoustic model (AM3) 1973 creation for a second speaker and limit selection of Gaussian vectors to a predefined range, thereby shortening the creation of the acoustic model for the second speaker. Selection of the first speaker may be made on basis of similar voice features reflected in age, sex, language or dialect, or other characteristics.

In one approach, a user B is selected that was trained before and has the same gender and similar pitch to user A. The monophone models may be trained with data from user A, followed by training of the single mixture cross-word triphone models with the same data. States may be tied and state-mapping performed where the states of user B are mapped to states of user A. In this approach, user A states will contain 16 mixtures after state-mapping. N training cycles may be performed to create new models for user A, followed by state tying. An additional training cycle may be performed to generate final models for user A. In this approach, the time consuming process of mixture training is avoided for the newer user.

Alternative methods for acoustic model update may include techniques such as MLLR or MAP. Repetitive, automated correction may also be used, such as that described by assignee of the current invention in U.S. Pat. No. 6,704,709, "System and Method for Improving the Accuracy of a Speech Recognition Program, and U.S. Pat. 6,490,558, "System and Method for Improving the Accuracy of a Speech Recognition Program Through Repetitive Training."

E. Formatting and Reverse Formatting Conventions

After speech-to-text decoding, the raw speech engine text output is "forward" formatted in the postprocessing step 735. For training purposes, the text is also "reverse" formatted to convert it to the original, speech engine format for the training session file 310 (FIG. 3). Regular expressions algorithms search and match text strings. They have been used in various utilities and text editors and may be used for the pattern matching for forward and reverse formatting. The conversion rules also may reflect locale and speaker or institutional preferences and may be included in the speech user profile 312, though technically not a speech-to-text conversion. The formatting conventions may be shared with manual and/or automated nondictation speech or text processing (FIG. 3) 492 and other similar processes (FIG. 3) 494.

II. CONCLUSION

The present invention describes processing of speech and text input for manual or automatic conversion, uniform segmentation of input, creating and processing one or more session files with an identical number of segments, and creating and updating a speech user profile that may be used for various speech and language processing applications that share one or more common interchangeable training or processing modules. Synchronization may be achieved by use of common segmentation module and identical segmentation parameters, or alternatively, by entry of sequential, segmented text in an empty session file.

While preferred embodiment uses a speaker-dependent speech user profile, speaker-independent and speaker-adaptive models may be used. The invention further describes a session file editor with read/write features, supervised and unsupervised training of the speech user profile, text-to-speech pronunciation generator, automatic questions file generation, accumulator and combiner techniques for update of speech user profile, real-time application speech recognition that creates an untranscribed session file for manual transcription, or an audio file for manual transcription or by offline server-based speech recognition, and resegmenting and retagging an asynchronized session file to create an identical number of segments. The system and method further discloses additional uses with other pattern recognition technologies.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. An apparatus transforming data input a plurality of diverse data sources selected from the group including text, audio, and image, the diverse data sources selected from the group including real-time and recorded, human and mechanically-generated audio, single-speaker and multispeaker, the apparatus comprising:
    means for dividing the data input into a uniform dataset with one or more data segments, each uniform dataset being associated with at least one respective data buffer such that each of the respective data buffers would have the same number of data segments given the same data input;
    first means for processing of the uniform dataset to produce a first processed uniform dataset with one or more data segments;
    second means for processing of the uniform dataset to produce a second processed uniform dataset with one or more data segments, wherein the first and second processed uniform dataset have the same number of data segments; and
    means for editing data selectively within each one of the one or more segments of the first and second processed uniform dataset wherein editing means creates a composite output data tile based on data selection from the first and second processed uniform dataset.

2. The apparatus according to claim 1 wherein the edited data is used to transform operations of at least one of the first and second processing means.

3. The apparatus according to claim 2 wherein one of the first and second processing means is a first speech-language computer application, the apparatus further including a speech user profile that contains data selected from the group including at least one of an acoustic model, a language model, and a lexicon.

4. The apparatus according to claim 3 wherein the speech user profile is speaker-dependent.

5. The apparatus according to claim 4 wherein the first speech-language computer application is selected from the group including speech recognition for dictation, speech recognition for command software, interactive voice response for telephony, speaker recognition, audio mining, text to speech, phonetic generation, machine translation, and natural language understanding.

6. The apparatus according to claim 1 wherein one of the first and second processing means is a computer application referencing user profile data selected from the group including an acoustic model, a language model, a lexicon and formatting preferences.

7. The apparatus according to claim 1 further including means for comparing data within each corresponding one of the one or more data segments of the first and second processed uniform dataset to one another.

8. The apparatus according to claim 1 further including distributing means for distributing one or more edited first and second processed uniform datasets as audio tags for utterances, for words, or for word subunits.

9. The apparatus according to claim 1 wherein the dividing means determines divisions based upon a predetermined boundary definition.

10. The apparatus according to claim 9 wherein the dividing means includes a an interface for graphically displaying the amplitude of the data per unit time to assist in the identification of the predetermined boundary definition.

11. The apparatus according to claim 10 wherein the predetermined boundary definition is selected from the group including a predetermined gradient, a discontinuity, a predetermined audio level, and null data.

12. The apparatus according to claim 1 wherein a reference session file is provided, the reference session file including one or more reference segments, the apparatus further comprising:
    means comparing the one or more reference segments on a segment by segment basis to each of the one or more data segments in one or both of the first and second processed uniform datasets;
    means tor identically numbering each matching reference segment and data segment; and
    means for retagging output in session file to sequentially reference data division.

13. The apparatus according to claim 12 wherein the comparing means uses a least differences boundary method, comprising:
    creating list of start times for each of the one or more reference segments in the reference session file;
    creating list of start times for each of the one or more data segment in each of the one or both of the first and second processed uniform datasets compared;
    sequentially establishing least differences between each segment start time from the reference session file and each respective division start tune from the one or both of the first anti second processed uniform datasets compared;
    creating new start times and new divisions for each of the one or both of the first and second processed uniform datasets compared; and
    retagging data segments of one or both of the respective first and second processed uniform datasets compared with data from reference session file.

14. The apparatus according to claim 1 wherein one of the first and second processing means is a session file editor having a human perceivable interface.

15. The apparatus according to claim 14 wherein the session file editor further includes means for establishing a distribution text.

16. The apparatus according to claim 15 wherein alterations of data within at least one of the first and second uniform datasets may be made using the humanly perceivable interface without affecting the distribution text.

17. The apparatus according to claim 15 wherein the data editor can simultaneously create a verbatim text and the distribution text.

18. The apparatus according to claim 1 wherein the editing means includes means for providing alternate data choices.

19. The apparatus according to claim 1 further includes an audio pronunciation generator that uses a text-to-speech engine for assistance in creating lexical pronunciation for a user profile.

20. The apparatus according to claim 14 wherein each of the session files are selected from either or both human and automatic processes.

21. The apparatus according to claim 1 further including distributing means for distributing one or more edited first and second processed uniform datasets toward training a user profile underlying a computer application selected from the group including speech recognition for dictation, speech recognition for command software, interactive voice response for telephony, speaker recognition, audio mining, text to speech, phonetic generation machine translation, and natural language understanding.

22. The apparatus according to claim 1 wherein the distributing means distributes data toward training a representational model for a computer-aided diagnosis program having pattern recognition capabilities.

23. The apparatus according to claim 1 further includes a speaker-dependent speech processing system.

24. The apparatus according to claim 23 wherein the speaker-dependent speech processing system includes an automatic question generator optimized for the speaker by an iterative selection process.

25. The apparatus according to claim 23 wherein speaker dependent computer application user profile is based upon user specific data.

26. The apparatus according to claim 1 further comprising means for creating an acoustic model from the collected data, the acoustic model creating means having an questions file generator in cases of data sparsity, the creating means comprising:

means for bottom-up clustering;

means for entering parameter values;

means for determining parameter combination processing completion;

means for automatically generating two or more linguistic question sets; and means for automatically selecting an optimal question set from the automatically generated two or more linguistic question sets.

27. The apparatus according to claim 26 wherein the means for automatically selecting an optimal question set includes using a maximum likelihood based distance measure.

28. The apparatus according to claim 26 further comprising means for running the acoustic model building means with original acoustic model to create one or more accumulator files and means for running the acoustic model building means to combine the acoustic model and accumulator file to create new acoustic model.

29. The apparatus according to claim 28 further including means for tying states.

30. The apparatus according to claim 29 further including means tor untying states.

* * * * *